(12) United States Patent
Hillman

(10) Patent No.: US 10,061,111 B2
(45) Date of Patent: Aug. 28, 2018

(54) SYSTEMS AND METHODS FOR THREE DIMENSIONAL IMAGING

(71) Applicant: The Trustees of Columbia University in the City of New York, New York, NY (US)

(72) Inventor: Elizabeth Hillman, New York, NY (US)

(73) Assignee: The Trustees of Columbia University in the City of New York, New York, NY (US)

(*) Notice: Subject to any disclaimer, the term of this patent is extended or adjusted under 35 U.S.C. 154(b) by 221 days.

(21) Appl. No.: 15/211,128

(22) Filed: Jul. 15, 2016

(65) Prior Publication Data

US 2016/0327779 A1  Nov. 10, 2016

Related U.S. Application Data

(63) Continuation-in-part of application No. PCT/US2015/012076, filed on Jan. 20, 2015.

(60) Provisional application No. 61/928,930, filed on Jan. 17, 2014, provisional application No. 61/950,608, filed on Mar. 10, 2014, provisional application No. 61/955,482, filed on Mar. 19, 2014, provisional application No. 61/969,712, filed on Mar. 24, 2014, provisional application No. 62/088,921, filed on Dec. 8, 2014, provisional application No. 62/194,155, filed on Jul. 17, 2015, provisional application No. 62/195,729, filed on Jul. 22, 2015, provisional application No. 62/202,126, filed on Aug. 6, 2015.

(51) Int. Cl.
*G02B 21/36* (2006.01)
*G02B 23/04* (2006.01)
*G02B 21/00* (2006.01)

(52) U.S. Cl.
CPC ....... *G02B 21/367* (2013.01); *G02B 21/0032* (2013.01); *G02B 21/0052* (2013.01); *G02B 21/361* (2013.01); *G02B 23/04* (2013.01)

(58) Field of Classification Search
CPC ............. G02B 21/367; G02B 21/0052; G02B 21/0032; G02B 21/361; G02B 23/04
See application file for complete search history.

(56) References Cited

U.S. PATENT DOCUMENTS

| 5,074,642 A | 12/1991 | Hicks |
| 5,304,810 A | 4/1994 | Amos |
| 5,442,573 A | 8/1995 | Bredberg et al. |

(Continued)

FOREIGN PATENT DOCUMENTS

| WO | 2000016151 A1 | 3/2000 |
| WO | 2015109323 A2 | 7/2015 |

OTHER PUBLICATIONS

Bouchard et al., "Laser-Scanning Intersecting Plane Tomography for High Speed, Translationless 3-D Microscopy," In Journal of General Physiology, Abstracts of Papers at the Sixty-Fourth Annual Meeting of the Society of General Physiologists, Jul. 1, 2010, vol. 136(1), p. 3A, (Abstract).

(Continued)

*Primary Examiner* — Tony Ko
(74) *Attorney, Agent, or Firm* — Potomac Law Group, PLLC; Mark Catan

(57) ABSTRACT

Methods, devices and systems for up to three-dimensional scanning of target regions at high magnification are disclosed.

25 Claims, 89 Drawing Sheets

(56) References Cited

U.S. PATENT DOCUMENTS

| | | |
|---|---|---|
| 7,068,878 B2 | 6/2006 | Crossman-Bosworth et al. |
| 7,285,089 B2 | 10/2007 | Viellerobe et al. |
| 8,254,020 B2 | 8/2012 | Holy et al. |
| 8,290,358 B1 | 10/2012 | Georgiev |
| 2001/0048082 A1 | 12/2001 | Osipchuk et al. |
| 2003/0021016 A1 | 1/2003 | Grier |
| 2003/0142934 A1 | 7/2003 | Pan et al. |
| 2006/0011804 A1 | 1/2006 | Engelmann et al. |
| 2006/0182320 A1 | 8/2006 | Peszynski et al. |
| 2007/0052958 A1 | 3/2007 | Ulrich et al. |
| 2007/0272842 A1 | 11/2007 | Knebel et al. |
| 2010/0230315 A1 | 11/2010 | Pan |
| 2011/0121202 A1 | 5/2011 | Li et al. |
| 2012/0140240 A1 | 6/2012 | Hillman et al. |
| 2012/0277288 A1 | 11/2012 | Drumm |
| 2014/0146376 A1 | 5/2014 | Kleppe et al. |
| 2015/0192461 A1* | 7/2015 | Chen .................. G02B 21/0032 356/366 |
| 2016/0327779 A1 | 11/2016 | Hillman |

OTHER PUBLICATIONS

Burgess et al., "Fiber-optic and articulating arm implementations of laminar optical tomography for clinical applications," Biomedical Optics Express, Oct. 1, 2010, vol. 1(3), pp. 780-790.

International Search Report and Written Opinion for International Application No. PCT/US2017/041393 dated Oct. 9, 2017.

Ra et al., "Three-dimensional in vivo imaging by a handheld dual-axes confocal microscope," Optics Express, May 12, 2008, vol. 16(10), pp. 7224-7232.

International Search Report and Written Opinion for International Application No. PCT/US2016/042398 dated Sep. 22, 2016.

Van-Der-Zee, "Measurement and modelling of the optical properties of human tissue in the near infrared, in Department of Medical Physics and Bioengineering", Thesis submitted for the degree of Ph.D. of the University of London: London, Dec. 1992.

Vaziri et al., "Ultrafast widefield optical sectioning microscopy by multifocal temporal focusing", Optics Express, Aug. 2010, vol. 18(19), p. 19645-55.

Verveer, et al., "High-resolution three-dimensional imaging of large specimens with light sheet-based microscopy", Nat Methods, Mar. 4, 2007, vol. 4(4): p. 311-3 (Abstract).

Wu et al., "Inverted selective plane illumination microscopy (iSPIM) enables coupled cell identity lineaging and neurodevelopmental imaging in Caenorhabditis elegans", Proceedings of the National Academy of Sciences, Oct. 25, 2011, vol. 108(43): p. 17708-17713.

Xie et al., "Imaging atrial arrhythmic intracellular calcium in intact heart", Journal of Molecular and Cellular Cardiology, Nov. 2013, vol. 64, p. 120-3.

Ahrens et al., "Whole-brain functional imaging at cellular resolution using lightsheet microscopy", Nature Methods, Mar. 18, 2013, vol. 10(5): p. 413-420 (Abstract).

Akerboom et al, "Genetically encoded calcium indicators for multicolor neural activity imaging and combination with optogenetics," Frontiers in Molecular Neuroscience, vol. 6, Article 2, pp. 1-29, Mar. 2013.

Akerboom et al., "Optimization of a GCaMP calcium indicator for neural activity imaging", J Neurosci, Oct. 3, 2012, vol. 32(40), p. 13319-40.

Baik et al., "Simultaneous tracking of 3D actin and microtubule strains in individual MLO-Y4 osteocytes under oscillatory flow", Biochemical and Biophysical Research Communications, 2013, vol. 431(4), p. 718-23.

Bouchard et al., "Technical considerations in longitudinal multispectral small animal molecular imaging," Journal of Biomedical Optics, vol. 12, Issue 5; p. 051601, Oct. 2007.

Broxton et al., "Wave optics theory and 3-D deconvolution for the light field microscope," Optics Express, Oct. 2013, vol. 21(21), p. 25418-39.

Carlson et al., "In vitro functional imaging in brain slices using fast voltage-sensitive dye imaging combined with whole-cell patch recording," Nature Protocols, Jan. 2008, vol. 3(2), pp. 249-255.

Chen et al., "Ultrasensitive fluorescent proteins for imaging neuronal activity", Nature, Jul. 17, 2013, vol. 499, p. 295-300 (Abstract).

Cotton et al., "Three-dimensional mapping of microcircuit correlation structure", Frontiers in Neural Circuits, Oct. 2013, vol. 7, Article 151, pp. 1-13.

Curtis et al., "Morphology of the pupal heart, adult heart, and associated tissues in the fruit fly,Drosophila melanogaster", Journal of Morphology, 1999, vol. 240, pp. 225-235.

Dodt et al, "Ultramicroscopy: three-dimensional visualization of neuronal networks in the whole mouse brain", Nature Methods, Mar. 25, 2007, vol. 4(4): p. 331-336 (Abstract).

Dunsby, "Optically sectioned imaging by oblique plane microscopy", Optics Express, Dec. 2008, vol. 16(25), p. 20306-16.

Dwyer et al., "Confocal reflectance theta line scanning microscope for imaging human skin in vivo", Opt Lett, Apr. 2006, vol. 31(7), p. 942-4.

Engelbrecht et al., "Resolution enhancement in a light-sheet-based microscope (SPIM)", Optics Letters, May 2006, vol. 31(10) pp. 1477-1479.

Fahrbach, et al., "Rapid 3D light-sheet microscopy with a tunable lens", Optics Express, Sep. 9, 2013, vol. 21(18): p. 21010-21026 (Abstract).

Friedrich et al., "STED-SPIM: Stimulated Emission Depletion Improves Sheet Illumination Microscopy Resolution", Biophysical Journal, Apr. 2011, vol. 100(8), pp. L43-L45.

Glickfeld et al., "Cortico-cortical projections in mouse visual cortex are functionally target specific", Nature Neuroscience, Feb. 2013, vol. 16(2), p. 219-26.

Göbel et al., "Imaging cellular network dynamics in three dimensions using fast 3D laser scanning", Nature Methods, Jan. 1, 2007, vol. 4(1), p. 73-9 (Abstract).

Golan et al., "Design and characteristics of holographic neural photo-stimulation systems," Journal of Neural Engineering, vol. 6, No. 6, pp. 1-14, Oct. 2009.

Grewe, et al., "High-speed in vivo calcium imaging reveals neuronal network activity with near-millisecond precision", Nature Methods, May 2010, vol. 7(5), p. 399-405 (Abstract).

Hillman et al., "All-optical anatomical co-registration for molecular imaging of small animals using dynamic contrast", Nature Photonics, 2007, vol. 1(9): pp. 526-530.

Hillman et al., "Laminar Optical Tomography: demonstration of millimeterscale depth-resolved imaging in turbid media", Optics Letters, Jul. 15, 2004, vol. 29(14), p. 1650-1652.

Hillman, "Optical brain imaging in vivo: techniques and applications from animal to man", J Biomed Opt, 2007, vol. 12(5), p. 051402.

Holekamp et al., "Fast Three-Dimensional Fluorescence Imaging of Activity in Neural Populations by Objective-Coupled Planar Illumination Microscopy", Neuron, Mar. 13, 2008, vol. 57, pp. 661-672.

Horton et al., "In vivo three-photon microscopy of subcortical structures within an intact mouse brain", Nature Photonics, Jan. 2013, vol. 7(3), p. 205-9.

International Search Report and Written Opinion for International Application No. PCT/U52015/012076 dated May 6, 2015.

Jia et al., "Linear integration of spine Ca2+ signals in layer 4 cortical neurons in vivo", Proceedings of the National Academy of Sciences, Jun. 2014, vol. 111(25), p. 9277-9282.

Jing, et al., "In situ intracellular calcium oscillations in osteocytes in intact mouse long bones under dynamic mechanical loading", The FASEB Journal, Apr. 2014, vol. 28(4), p. 1582-1592.

Katona et al., "Fast two-photon in vivo imaging with three-dimensional random-access scanning in large tissue volumes", Nature Methods, Jan. 2012, vol. 9, 201-8.

Keller, et al., "Fast, high-contrast imaging of animal development with scanned light sheet-based structured-illumination microscopy", Nat Meth, 2010, vol. 7(8): p. 637-642 (Abstract).

(56) References Cited

OTHER PUBLICATIONS

Kim, et al., "Vectorial point spread function and optical transfer function in oblique plane imaging", Optics Express, May 1, 2014, vol. 22(9), pp. 11140-11151.

Kobat et al., "Deep tissue multiphoton microscopy using longer wavelength excitation", Optics Express, Aug. 2009, vol. 17(16), p. 13354-64.

Kumar et al., "High-speed 2D and 3D fluorescence microscopy of cardiac myocytes", Optics Express, Jul. 2011, vol. 19(15), p. 13839-47.

Lavagnino et al., "Two-photon excitation selective plane illumination microscopy (2PE-SPIM) of highly scattering samples: characterization and application", Optics Express, Mar. 2013, 21(5), p. 5998-6008.

Lutz et al,, "Holographic photolysis of caged neurotransmitters", Nature Methods, Sep. 2008, vol. 5(9), p. 821-7.

Mittmann et al., "Two-photon calcium imaging of evoked activity from L5 somatosensory neurons in vivo", Nature Neuroscience, 2011, vol. 14(8), p. 1089-93.

Pankajakshan et al., "Point-spread function model for fluorescense macroscopy imaging," 44th Asilomar Conference on Signals, Systems and Computers, Monterey, United States, Nov. 2010.

Planchon et al., "Rapid three-dimensional isotropic imaging of living cells using Bessel beam plane illumination", Nature Methods, May 2011, vol. 8(5), p. 417-23.

Quirin et al,, "Simultaneous imaging of neural activity in three dimensions", Frontiers in Neural Circuits, vol. 8, Article 29, pp. 1-11, Apr. 2014.

Radosevich et al., "Hyperspectral in vivo two-photon microscopy of intrinsic contrast", Opt Lett, Sep. 2008, vol. 33(18), p. 2164-6.

Regmi et al., "Light sheet based imaging flow cytometry on a microfluidic platform", Microscopy Research and Technique, 2013, vol. 76(11), p. 1101-7.

Schrodel et al., "Brain-wide 3D imaging of neuronal activity in Caenorhabditis elegans with sculpted light", Nat Meth, 2013, vol. 10(10), p. 1013-20.

Schuster et al, "Genetic dissection of structural and functional components of synaptic plasticity. I. Fasciclin II controls synaptic stabilization and growth", Neuron, Oct. 1996. vol. 17(4), p. 641-54.

Sung et al., "Three-Dimensional Holographic Refractive-Index Measurement of Continuously Flowing Cells in a Microfluidic Channel", Physical Review Applied, Feb. 2014, vol. 1(1), p. 014002.

Supplementary European Search Report for application EP 15737758 dated Sep. 28, 2017.

Swoger et al., "Light-Sheet-Based fluorescence Microscopy for Three-Dimensional Imaging of Biological Samples", Adapted from Imaging: A Laboratory Manual (ed. Yuste). CSHL Press, Cold Spring Harbor, NY, USA, Jan. 1, 2011, copyrighted 2014 (downloaded Jun. 5, 2016).

Truong et al., "Deep and fast live imaging with two-photon scanned light-sheet microscopy", Nature Methods, 2011, vol. 8(9), p. 757-60.

Truscott et al., "Determining 3D Row Fields via Multi-camera Light Field Imaging", Journal of Visualized Experiments: JOVE, Mar. 6, 2013, vol. 73, p. 4325.

Tsai et al., "Principles, Design, and Construction of a Two-Photon Laser-Scanning Microscope for In Vitro and In Vivo Brain Imaging," Methods for in Vivo Optical Imaging, R. Frostig, ed., pp. 113-171, 2002.

Van Staveren et al., "Light scattering in Intralipid-10% in the wavelength range of 400-1100 nm", Applied Optics, Nov. 1991, vol. 30(31), p. 4507-14.

* cited by examiner

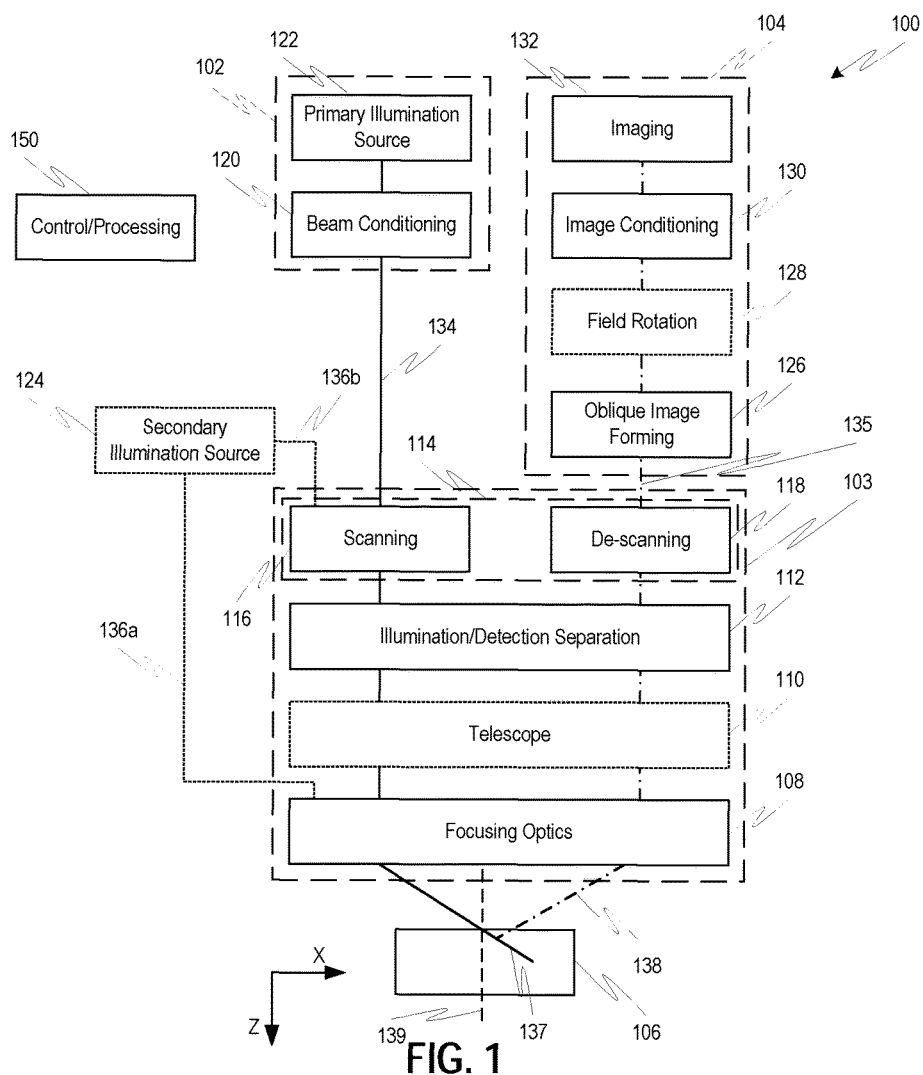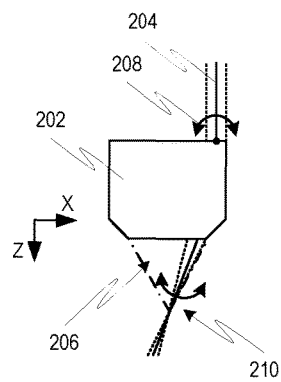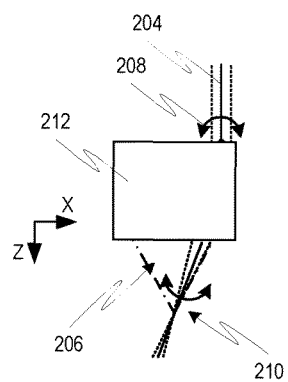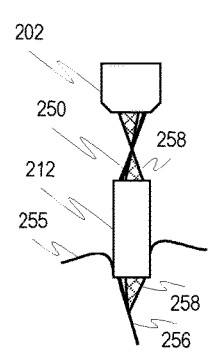
FIG. 1
FIG. 2A
FIG. 2B
FIG. 2C

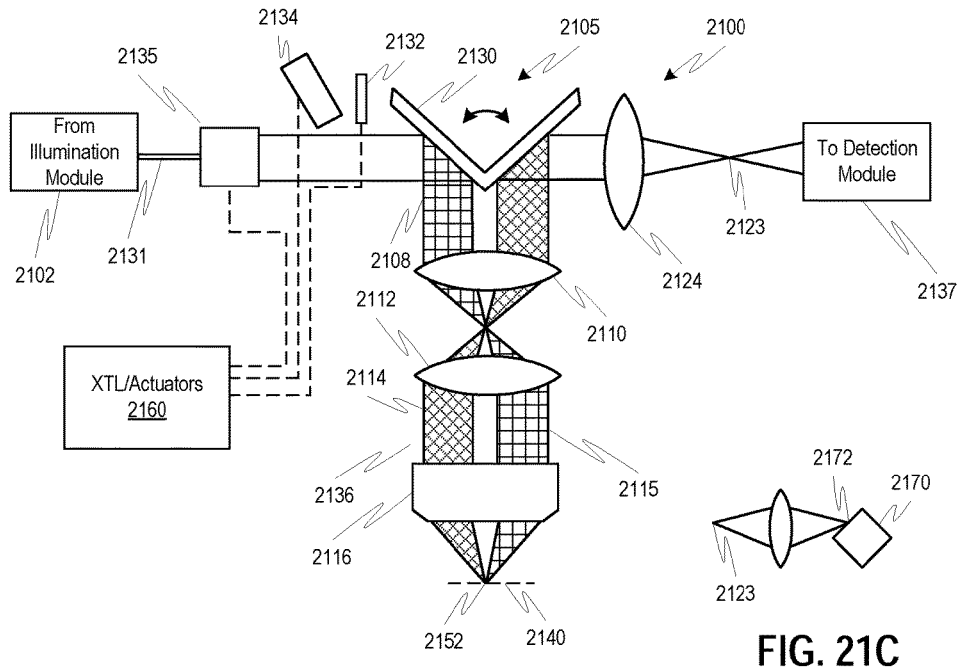
FIG. 21A
FIG. 21C
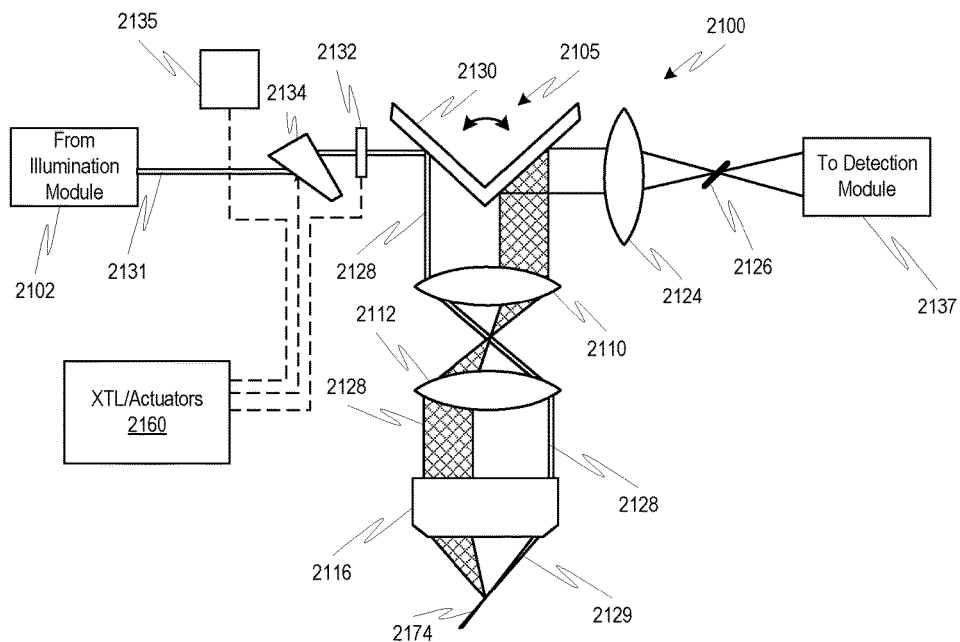
FIG. 21B

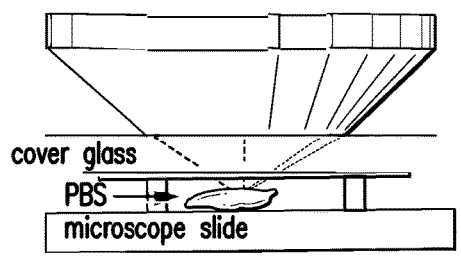
FIG. 27A
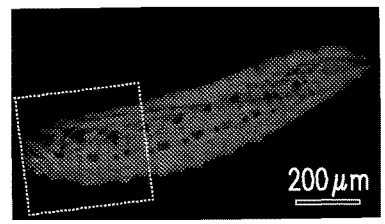
FIG. 27B
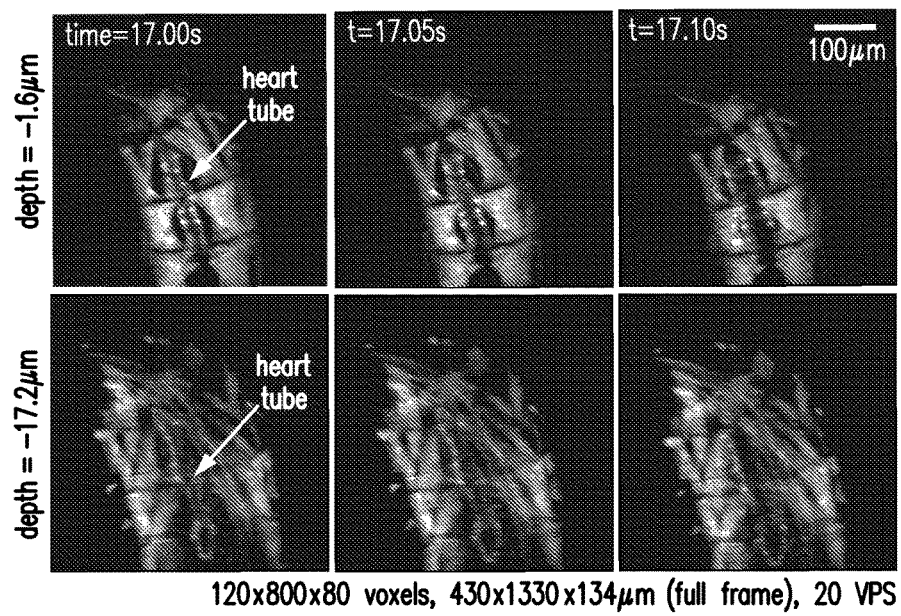
FIG. 27C
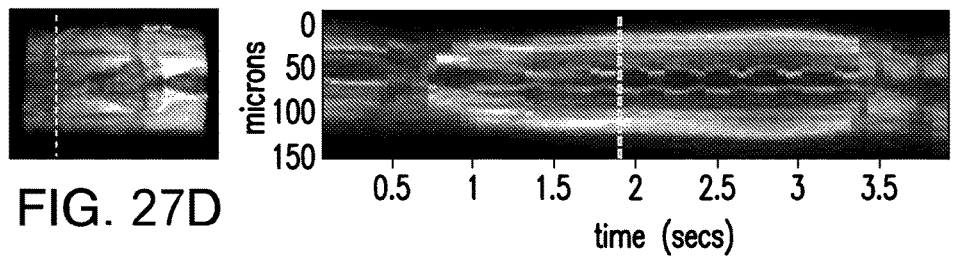
FIG. 27D
FIG. 27E 80x240x100 (x2 colors) 260x800x265 mm, 10VPS Two-photon scanning options/laser source.

Assumption is that a regenerative amplifier will concentrate pulses, since sheet requires more power to spread out, but requires less frequent pulses.

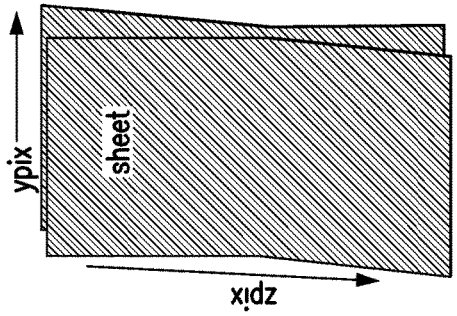
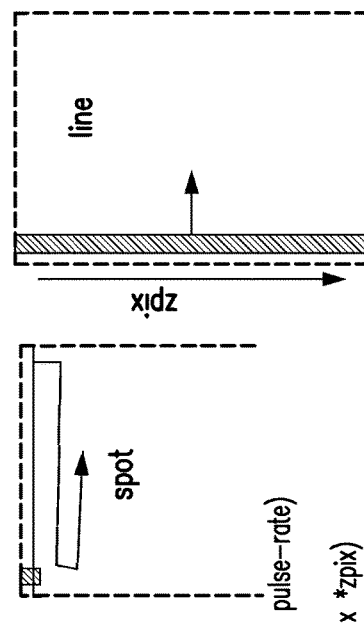

Standard Ti:Sapphire (spot)
PulseRate=80,000,000 Hz (max pulse-rate)
PowerperPulse=P/PulseRate;
TimeatPix=1 (VolRate *xpix *ypix *zpix)
numPulsesPerPix=TimeatPix. *PulseRate
PoweratPix=PowerperPulse
PhotonsperPix=numPulsesPerPix *(PoweratPix)$^2$
VolRate=xpix *ypix *zpix/PulseRate

Standard Ti:Sapphire (line)
PulseRate=80,000,000 Hz (max pulse-rate)
PowerperPulse=P/PulseRate
PoweratPix=PowerperPulse/zpix
TimeatPix=1 (VolRate *xpix *ypix)
numPulsesPerPix=TimeatPix. *PulseRate;
PhotonsperPix=numPulsesPerPix *(PoweratPix)$^2$

Regenerative amplifier (line)
PulseRate=VolRate *xpix *ypix
PowerperPulse=P/PulseRate
PoweratPix=PowerperPulse/(zpix)
Assume 1 pulse per line
PhotonsperPix=(P/VolRate *xpix *zpix *ypix)$^2$

Regenerative amplifier (sheet):
PulseRate=VolRate *xpix
PowerperPulse=P/PulseRate
PoweratPix=PowerperPulse/(zpix *ypix)
Assume 1 pulse per x-plane
PhotonsperPix=(P/VolRate *xpix *zpix *ypix)

FIG. 44

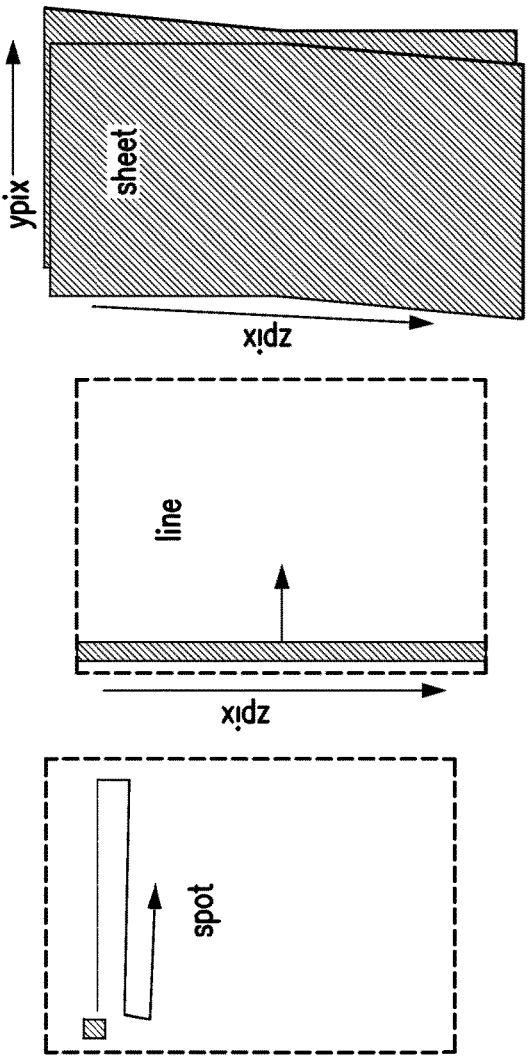

Assumption is that a regenerative amplifier will concentrate pulses, since sheet requires more power to spread out, but requires less frequent pulses Model confirms that line and sheet configurations are equivalent if a regenerative amplifier is used to combine pulses (assuming 1 pulse per line/sheet respectively).

Model shows that regenerative amplifier gives big improvement over standard line-scan mode with 80MHz pulse rate, but that signal will likely be less than for a standard slower rate spot scanning two-photon.

See plots from model on next page for volume rates of 5, 10 and 20 VPS

FIG. 44 (continued)

for 30mm focal length thin lens

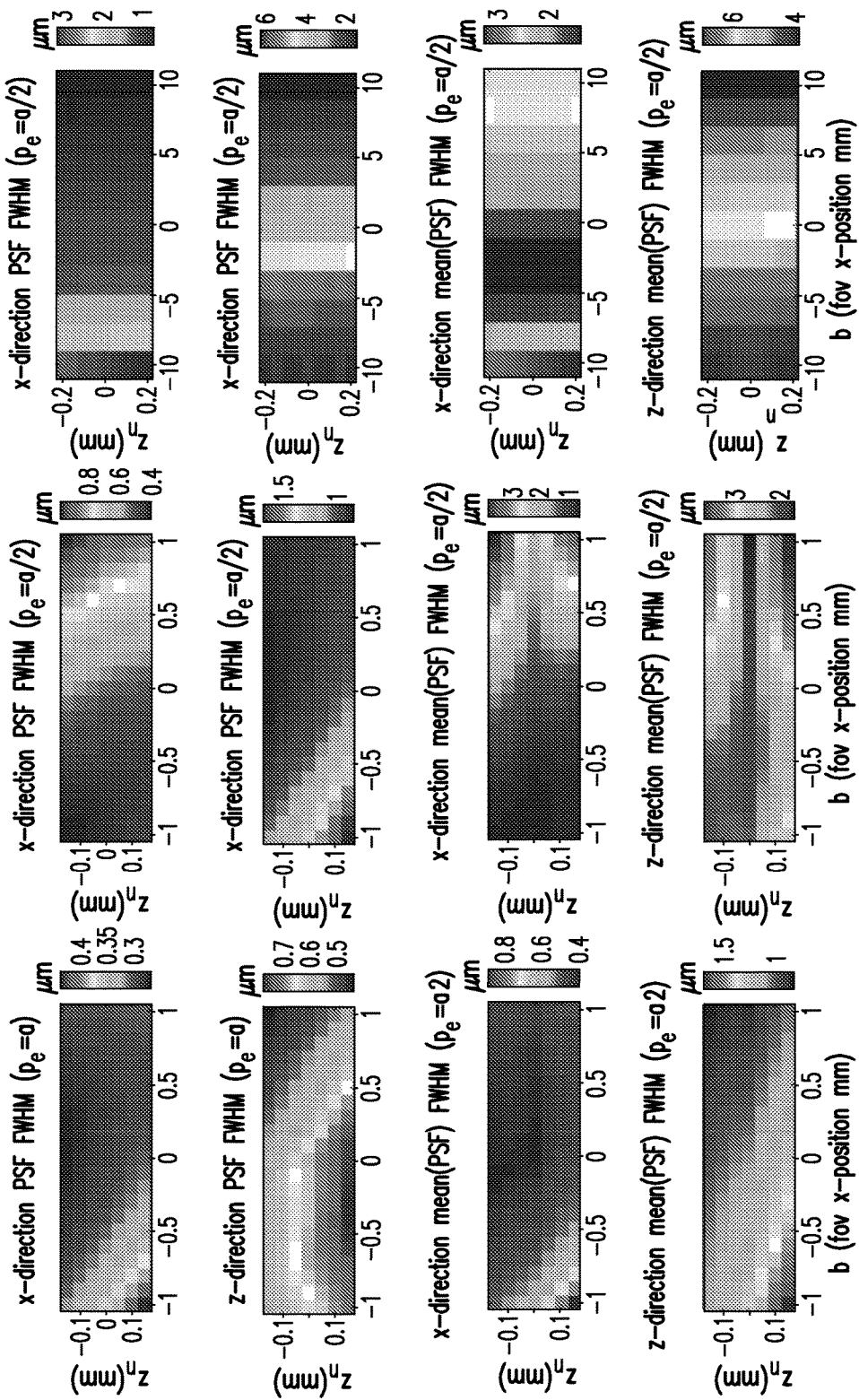

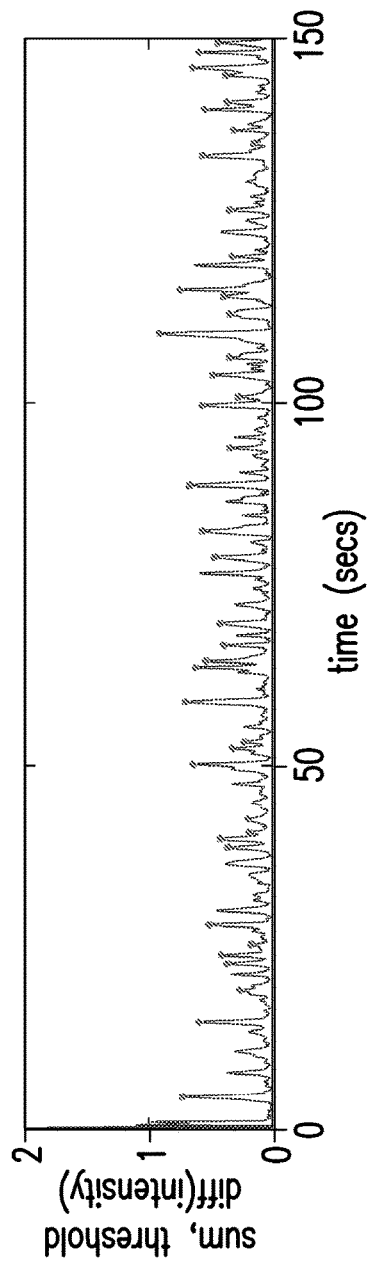
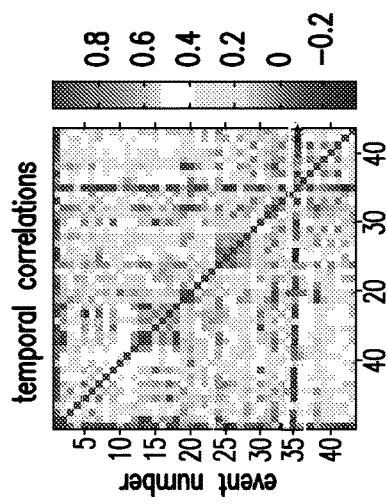
FIG. 53B
FIG. 53C

SYSTEMS AND METHODS FOR THREE DIMENSIONAL IMAGING

CROSS-REFERENCE TO RELATED APPLICATIONS

This application is a continuation-in-part of international application PCT/US 2015/012076 (filed Jan. 20, 2015), which claims the benefit of U.S. Provisional Applications 61/928,930 (filed Jan. 17, 2014), 61/950,608 (filed Mar. 10, 2014), 61/955,482 (filed Mar. 19, 2014), 61/969,712 (filed Mar. 24, 2014), and 62/088,921 (filed Dec. 8, 2014); this Application also claims the benefit of U.S. Provisional Applications 62/194,155 (filed Jul. 17, 2015), 62/195,729 (filed Jul. 22, 2015), and 62/202,126 (filed Aug. 6, 2015). Each of the above-identified applications is incorporated herein by reference in its entirety.

STATEMENT REGARDING FEDERALLY SPONSORED RESEARCH

This invention was made with government support under grants NS076628, NS063226, and NS053684 awarded by National Institutes of Health, grant 0954796 awarded by the National Science Foundation, and grant W911NF-12-1-0594 awarded by the Army Research Office. The government has certain rights in the invention.

FIELD

The present disclosure relates generally to depth-resolved imaging of microscopic subjects, and, in embodiments, more particularly, to volumetric three-dimensional optical imaging and/or time resolved imaging of microscopic subjects.

SUMMARY

The disclosed subject matter includes embodiments capable of conveying illumination light onto and/or into a subject and receiving image light returning from multiple depths over a surface or within the subject at a single instant. A convenient identifier for this process is depth-resolved imaging (DRI).

The illumination light may include excitation light; inhibiting light, as employed in photo-manipulation; and/or illumination light that is returned from a subject as a result of reflection, scattering or other processes so as to permit feature detection. The illumination light may be formed so as to provide, at the subject, a narrow low aspect-ratio collimated beam (pencil beam), a flat planar beam, a broader beam, or any other shape that is suitable for the purpose. In embodiments, the illumination light (identified also as illumination "beam" herein) may aid in feature discrimination by optical sectioning. In embodiments, multiple illumination beams may be projected, as in, for example in photo-manipulation systems.

In embodiments, the illumination beam position and/or orientation is varied by one or more beam redirectors to support the formation of a two- or three-dimensional image. The illumination beam further may be varied iteratively to provide for the generation of multiple images over time and thereby for the formation of a moving two- or three-dimensional image. The illumination beam may be swept progressively, in incremental steps, or directed in a discontinuous "scan" pattern. All of these mechanisms for varying the position of the illumination beam in the subject are identified herein by the term "scanning" of the illumination beam.

The scanning pattern may be continuous or discontinuous. A discontinuous scan pattern may be generated by aiming a beam by means of an acousto-optical deflector or spatial light modulator (SLM), for example such that it "jumps around" rather than forming a continuous, swept pattern. In addition, scanning of the illumination beam may produce a continuous but complex or irregular pattern, such as circular, FIG. 8, Lissajous patterns, or even complex chaotic patterns, etc. With flexible control of scanning, as afforded by acousto-optical deflectors or SLMs and others, scanning may be controlled to cause the illumination beam to make more frequent visits on areas of greater interest, such as subject regions where more rapid motion is occurring or more complex features are present. The possible patterns may include statistically random patterns but which may also focus more energy on regions of interest over time. The illumination beam may be directed in any manner that, at an instant in time, projects illumination light (again, in any manner that causes the return of imaging light) through multiple depths of the subject such that light returning from the multiple depths may be captured and used for imaging at said instant. Thus, the illumination beam may be projected axially (zero degrees) through the subject up to the highest angle (as nearly trans-axial as) permitted by the objective numerical aperture.

Light returning from the multiple depth regions that have been illuminated by the illumination beam is "de-scanned" to cause a stationary focused, or unfocused, image of the light returning from the multiple depths on one or more light detectors as the region changes due to scanning of the illumination beam. Note also that a light detector may be a zero-, one- or two-dimensional detector. In embodiments, the light returning from the multiple depths is directed synchronously with the redirecting of the illumination beam. Effectively both the illumination beam and the image "beam" are aimed so that the image remains stationary on a detector and only the one or more elements required for aiming are controlled during the process of forming the image covering the subject region. The stationary image can be a single image representative of the subject at a single point in time or multiple images representing the subject at multiple points in time, collectively forming a moving image (i.e., time-resolved image).

Note that although the image light may be referred to herein as an image "beam," this is a figurative identifier for what will be readily understood to be the light directed from the subject region back toward the light detector or detectors by imaging optical elements. Note that the terms scanning and de-scanning are used to characterize the redirection of illumination and image beams for forming a single static image as well as for making multiple time-resolved images. Scanning and de-scanning may be done in multiple axes independently. For example, an illumination beam may be swept along one axis to illuminate a planar region and the illuminated planar region may be swept over a volume by sweeping along a different axis.

In distinct embodiments, the illumination and image beams pass through a single optical assembly, an objective. At any instant, the optical elements conveying the illumination beam through the objective and those receiving light from the subject and conveying an image beam to a light detector, are redirected by an element of a scanning/de-scanning assembly that is controlled to redirect light such that the illumination and image beams remain in a relationship that permits the formation of a stationary image on one or more light detectors. In embodiments, a single moving element, such as a mirror, redirects an outgoing illumination beam and an adjacent incoming image beam passing through the same aperture of the scanning/de-scanning assembly. In variants, the outgoing illumination beam and an adjacent incoming image beam are redirected by independent but synchronously-controlled beam redirectors. Also, independent illumination beams from, for example a photo-manipulation source, may be controlled by separate beam redirectors.

The position and orientation of the illumination beam may include any that permits light to be captured and conveyed as an image beam from multiple depths in the subject by the same objective that is used to position and form the illumination beam. The illumination beam within the subject may be parallel to the optical axis of the objective or at an oblique angle relative to it. The range of patterns resulting from the scanning of the illumination beam may cause the angle, position, or both the angle and the position of the beam in the subject to change. At all of these positions and orientations, the one or more light redirectors hold an image of the illuminated region in the subject on one or more light detectors.

The optical elements that hold the image on the one or more light detectors may include imaging optics that form an intermediate image in a plane whose normal forms a non-right angle relative to a first imaging optical axis of the subject-side optics at the point where the intermediate image is formed. That is, because the image beam contains light from multiple depths in the region of the subject, the points at which light from the different depths comes to a focus is at different locations axially, effectively defining an intermediate image in a plane whose normal is slanted with respect to, or perpendicular to, the first imaging optical axis. In embodiments, a light detector may be placed such that the intermediate image coincides with a one or two-dimensional detector such as a CCD. In further embodiments, an unfocused further image may be generated from the intermediate image by imaging it with further imaging optics. Such further imaging optics may be aligned with its optical axis at an angle to the optical axis of the imaging optics that forms the intermediate image, but not normal to the plane of the intermediate image. The angle of the alignment may be chosen to make a less sharp angle than if the optical axis of the further imaging optics were aligned normal to the intermediate image plane. This may facilitate the collision-free positioning and adjustment of the optical elements on either side of the intermediate image and also increase the total amount of light conveyed ultimately to the one or light detectors. In embodiments, a light detector may be placed at the location of the unfocused further image. In further embodiments, the unfocused image may be captured by imaging optics whose axis is normal to the plane of the unfocused image to generate a further image on a light detector.

In still further embodiments, where the intermediate image is formed, a beam-turning optical element, such as an optical wedge, may be placed at or near the position of the intermediate image to effectively rotate the plane of the intermediate image. Further imaging optics that image the intermediate image may be aligned with their optical axis parallel with the imaging optics that form the intermediate image. Alternatively, a light detector may be placed at the point where a rotated image is formed by the beam-turning optical element.

In still further embodiments, the optical elements that hold the image on the one or more light detectors include imaging optics that can form an intermediate image in a plane whose normal forms a non-right angle with a first imaging optical axis of the subject-side optics at the location where the intermediate image would otherwise be formed, but a mirror is placed at this point causing the light to be reflected back into the subject-side optics. As above, because the image beam contains light from multiple depths in the region of the subject, the points at which light from the different depths comes to a focus is at different locations axially, effectively defining an intermediate image whose normal is slanted or perpendicular with respect to the first imaging optical axis, depending on the angle of the illumination beam. The mirror is angled at half the angle of the plane of this intermediate image such that the light forming the intermediate image is reflected back into the imaging optics and may then be separated from the incoming image beam by a beam splitter and directed to a light detector. Thus, in this embodiment, the imaging optics that form an intermediate image also serve as the optics by which the intermediate image is captured and is ultimately conveyed to the light detector. Since the optical axes of the imaging optics is non-parallel to the normal of the intermediate image plane normal, the imaging optics are not focused thereon.

Note that more than one light detector may be employed to detect one or more different wavelengths in an image beam. These wavelengths may be separated from an image beam by dichroic beam splitters, each selecting a predefined range of wavelengths so as to direct selected light to a respective light detector.

In DRI embodiments, it may be desirable to maximize the numerical aperture of the image beam. In embodiments, the image beam may be extended, as nearly as possible, to the full aperture of the objective. In embodiments, the image beam extends over a major fraction of the objective aperture. In embodiments, the image beam covers a continuous or discontinuous region extending to opposite sides of the objective optical axis (i.e., not confined to a single side of the objective optical axis). In embodiments, the image beam is confined to a single side of the optical axis while the illumination beam is confined to an opposite side of the objective optical axis. In embodiments, the image beam covers a region of the aperture that constitutes a majority of the area of the objective aperture.

Further embodiments permit the capture of depth-resolved images as well as confocal imaging in the same basic apparatus which is configurable as a multiple mode DRI/confocal microscope. In embodiments, a beam from an illumination light source can be formed with a certain shape for depth resolved-imaging and different properties for confocal imaging. Or alternatively, different light sources may be provided. For example, the beam shape and size may be varied using known techniques and devices. Here, the same one or more imaging optics and light redirectors may be used to scan and de-scan a broad beam for confocal microscopy as is used to scan and de-scan for DRI. According to embodiments, in confocal mode, a DRI microscope can illuminate a trans-axial line or a spot by causing a broad illumination beam to come to a focus on a line or spot coinciding with a front focal plane. The multiple mode DRI/confocal microscope may provide for varying of the front focal plane by providing for automated adjustability of the elevation (Z-axis or axial position) of the subject (or more accurately, a support for the subject), the objective, or configure or move elements of the imaging device to implement focusing techniques as known in the art to changing the elevation of the focal plane.

Objects and advantages of embodiments of the disclosed subject matter will become apparent from the following description when considered in conjunction with the accompanying drawings.

BRIEF DESCRIPTION OF DRAWINGS

Embodiments will hereinafter be described with reference to the accompanying drawings, which have not been drawn to scale. Throughout the figures, like reference numerals denote like elements. Some features may not be illustrated or intentionally not drawn to scale in order to assist in the illustration and description of underlying features. Indeed, in most of the drawings, to avoid unnecessary complexity in the depicted rays and because designer choice may permit variations in such features as the apertures of the optical elements, only marginal and centerline rays are shown to indicate the paths followed by illumination and image beams.

FIG. 1 is a schematic diagram showing various high-level features of a three-dimensional imaging system according to one or more embodiments of the disclosed subject matter.

FIG. 2A illustrates an objective lens that can be used as part of the focusing module 108 in the schematic diagram of FIG. 1, according to one or more embodiments of the disclosed subject matter.

FIG. 2B illustrates a gradient-index (GRIN) lens that can be used as part of the focusing module 108 in the simplified diagram of FIG. 1, according to one or more embodiments of the disclosed subject matter.

FIG. 2C illustrates a portion of an DRI configuration showing objective lens in association with a GRIN lens, according to embodiments of the disclosed subject matter.

FIG. 21A shows a multi-mode confocal/DRI microscope in a theta confocal configuration, according to embodiments of the disclosed subject matter.

FIG. 21B shows the multi-mode confocal/DRI microscope of FIG. 21A in a DRI configuration, according to embodiments of the disclosed subject matter.

FIG. 21C shows a feature of the embodiment of FIGS. 21A and 21B, according to embodiments of the disclosed subject matter.

FIG. 27A depicts an en-face imaging geometry.

FIG. 27B depicts a large field of view SCAPE image of an entire larva.

FIG. 27C depicts a set of depth sections.

FIG. 27D depicts a volume rendering of a section of these data.

FIG. 27E depicts shows a kymograph of 2 micron thick section of the y' plane of FIG. 27D.

FIGS. 48F, 48G, and 48H, show 'resolution maps' as a function of x-z field of view position.

FIG. 53A-D depict spontaneous neuronal firing in the awake behaving mouse brain.

FIG. 54 depicts reference two-photon microscopy images.

FIG. 55 depicts a detailed view of an embodiment of the invention.

FIG. 56 depicts a detailed view of an embodiment of the invention.

FIG. 57 depicts a detailed view of an embodiment of the invention.

FIG. 58 depicts a detailed view of an embodiment of the invention.

FIG. 59 depicts a detailed view of an embodiment of the invention.

FIG. 60 depicts a detailed view of an embodiment of the invention.

FIG. 61 depicts a detailed view of an embodiment of the invention.

DETAILED DESCRIPTION OF THE PREFERRED EMBODIMENTS

Figure 3A:
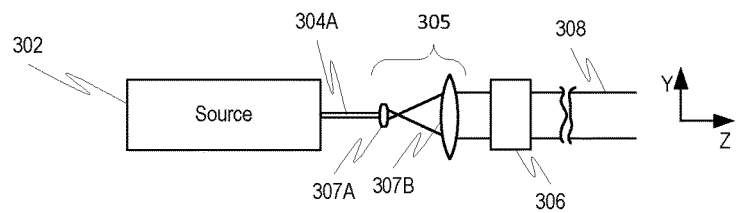
FIG. 3A illustrates an illumination setup employing a cylindrical lens that can be used as part of the beam conditioning module 120 in the simplified diagram of FIG. 1, according to one or more embodiments of the disclosed subject matter.

Embodiments of the disclosed subject matter are directed to imaging techniques in which image light from a subject is captured simultaneously from multiple depths to form one or more images, identified herewithin as depth-resolved imaging (DRI). In particular DRI embodiments, an illumination beam is applied to a subject of interest such that the beam traverses multiple depths. The shape of the illumination beam may be chosen to facilitate feature discrimination as in planar illumination beam fluorescence microscopy. Simultaneously with the application of the illumination beam, image light resulting from, for example, emission or reflection, is captured from the multiple depths and used to form an image. By generating, for example, an illumination beam in the form of a planar beam and scanning the planar beam while de-scanning the resulting image light, a volume may be sequentially traversed and imaged rapidly. This may be repeated to capture motion of, and within, the subject The disclosed subject matter includes applications and enhancement of DRI devices and particular DRI devices, methods, and systems for DRI. In examples, DRI may be used for the rapid creation of two and three-dimensional images and especially for the generation of moving images. Some embodiments also related to methods, devices, and systems with multiple modes capable of confocal imaging as well as DRI.

In embodiments, a single objective is used for both illumination and detection. The term "illumination" as used herein connotes any type of outgoing light used in imaging whether it excites or inhibits the emission of secondary radiation used to construct an image or is returned through some physical phenomenon such as reflection, scattering or any other means. Thus illumination light may generate image light by fluorescence excitation, reflection, scattering, second harmonic generation, Raman scattering, and/or any other mechanism. Further, the illumination energy may suppress the image light at desired locations for resolution refinement. Among other benefits, the use of a single objective for projecting illumination light and imaging may simplify subject positioning and alignment as compared to light-sheet imaging that employs separate optical components for projecting illumination and for receiving imaging light.

In embodiments of DRI, a light beam is projected through an objective into a subject along an elongate narrow or planar beam that extends into multiple depths of the subject and image light returning from the subject captured from the multiple depths simultaneously and used for imaging the features at the multiple depths. The beam may be scanned through multiple positions to allow the formation of a three-dimensional image. In an embodiment that employs illumination light in the shape of a planar beam, the subject may be optically-sectioned and the resulting image light from the illuminated plane can be captured through the same objective as the planar illumination beam is swept or otherwise repositioned. As the beam is moved, the returning image light is de-scanned and imaged onto a light detector such as a camera. The de-scanning holds a projection of the light returned from multiple-depth on the light detector. De-scanning herein refers to holding, progressively or stepwise, a certain mapping of the sources of light in the subject in the detection range of the light detector. For example, de-scanning may maintain a swept illumination planar beam in focus on the image plane of a camera. Embodiments capture or display multiple discrete, or a continuous range, of planar images to generate 3D volumetric images without physically translating the objective lens or the subject, thereby significantly increasing imaging speeds while avoiding subject preparation and selection limitations associated with other imaging modalities.

In the embodiments described, a scanning element is described that employs a reflecting element, but other mechanisms for moving a beam, progressively, incrementally, or discontinuously, may be employed in any of the embodiments, including those defined by the claims. Such additional embodiments may use other light-redirecting devices such as refracting or diffracting elements to scan one or narrow or planar beams of light. These may include mirrors, prisms, acousto-optic deflectors, electric lenses, spatial light modulators (SLM), beam steering mirrors or optics, flexible optical light guides or fibers, other types of adaptive optics, or any other mechanism for controlling the directions of outgoing and incoming light. Such variations are considered to be substitutable for the ones identified in any of the disclosed embodiments, including the claims, and the resulting embodiments are included in the disclosed subject matter of the present application.

In embodiments of the disclosed subject matter, the scanning and de-scanning optics are configured such that the illuminated path remains aligned with a stationary light detector (e.g., a linear or two-dimensional light sensor) that is sampled to provide optical sectioning. In embodiments, a planar illumination beam is swept through the subject by moving a scanning mirror to alter the angle at which the illumination light is incident at the back of an objective thereby causing the angle at which it emerges from the objective to vary. Note that a planar illumination beam may be formed from multiple discrete cylindrical beams that are swept by scanning to traverse a sheet of light or by an optical element that flattens a cylindrical beam. A planar illumination beam may also be formed by multiple discrete parallel cylindrical beams that are formed at respective instants. This alteration in angle causes the planar illumination beam to sweep across the subject. As noted, other patterns of illumination are possible to form two dimensional or three dimensional images or even linear depth-resolved detection. Light from the illuminated region within the subject (e.g., via fluorescence excitation, reflection, scattering, second harmonic generation, and/or Raman scattering) travels back through the same objective lens and is de-scanned. By de-scanning, even though the light moves (or more generally, is repositioned) through the subject, the detected light forms an image of the illuminated region that is stationary and aligned with the illuminated region, much in the same way that a confocal pinhole stays aligned with the scanning illuminated focal point in a laser scanning confocal microscope.

De-scanning may employ multiple optical components to generate a stationary image. A camera may be focused on the image (an intermediate image) to form a further image on a light detector. An unfocused camera may be aimed at the image. The image may be formed directly on a light detector. The light detector may include a high-speed CMOS camera, CCD camera, photomultiplier tube array, a linear detector array or any other light detection or imaging device. Alternatively, the imaging device, or an input to the imaging device, can be placed at the image plane. The single stationary objective configuration in combination with the scanning/de-scanning configuration in embodiments of the disclosed subject matter allows DRI to be used in a manner similar to other upright or inverted microscopes, or to be provided as an addition or modification to existing microscopes, such as confocal microscopes. Both scanning and de-scanning may comprehend varying the angle, position, or both angle and position of one or more of a narrow (pencil) beam or planar beam of light.

Referring to FIG. 1, various high-level features associated with embodiments of a DRI system 100 are illustrated. Embodiments may include some or all of the features illustrated in FIG. 1, as well as other features not specifically illustrated in FIG. 1. In some embodiments, some of the features in FIG. 1 can be omitted or rearranged with respect to other features, whether illustrated or not illustrated. Moreover, the features illustrated are of simplified components performing one or more functions. Based on the general discussion of FIG. 1 and the following detailed discussion of various examples, many alternatives for performing the one or more functions represented by the simplified components will be readily apparent to one of ordinary skill.

In one or more embodiments, a DRI system 100 can be used to image a subject 106, either microscopically or macroscopically. The DRI system 100 may include, among other things, a first optical module 102 (i.e., an illumination module), a second optical module 103, and a third optical module 104 (i.e., a detection module). The illumination module 102 can provide, for example, a beam of laser light, and pre-condition the light such that it forms into a linear or planar beam within the subject 106. The pre-conditioning of the beam may cause it to form a narrow or planar illumination pattern within the subject. Optics may not themselves form a beam or plane. An SLM is an option to precondition the beam to reduce aberrations, e.g. via adaptive optics. Or Bessel beam formation etc. The illumination beam can be modulated in time to create spatial patterns in the plane or otherwise patterned to create structured illumination which may then be subject to image processing to generate "super-resolution" images. The illumination module 102 can provide input light 134 for scanning to the second optical module 103 via one or more optical pathways. The detection module 104 can receive light 135 that has been reflected, scattered, and/or emitted by illuminated plane within the subject 106 in response to the incident light.

The illumination module 102 may include a primary illumination source 122, for example, a laser light source or collimated beam source. An illumination beam generated by the primary illumination source 122 can be provided to a beam conditioning module 120, which includes one or more illumination optics and/or components for conditioning the light beam to achieve a desired illumination characteristic. For example, the one or more illumination optics and/or components of the beam conditioning module 120 may include refractive, reflective, and/or diffractive optics for forming a beam into a linear or planar beam within subject 106. For example, for forming a planar illumination beam, the refractive, reflective, and/or diffractive optics may include active elements such as a scanner or passive elements such as a cylindrical lens. Alternatively or additionally, the one or more illumination optics and/or components of the beam conditioning module 120 may include beam conditioning components, such as wavelength selective filters, polarization selective or altering components, graduated neutral-density filters, modulators, etc. Alternatively or additionally, the one or more illumination optics and/or components of the beam conditioning module 120 may include an aperture that limits a size of the beam prior to any conditioning of the beam, after some or all of the conditioning of the beam, or at any other point along the optical path between the light source and the subject. Alternatively or additionally, the one or more illumination optics and/or components of the beam conditioning module 120 may include a zoom lenses (not shown, but may be disposed before focusing module 108, for example, within telescope 110, depending on the configuration of the system) that can be used to change a magnification of the second module 103 and/or an electric lens (not shown) that can be used to alter a position of the illumination with respect to the focusing module 108. Alternatively or additionally, the beam conditioning module 120 may include adaptive optics, such as a spatial light modulator (SLM), which can pre-condition the beam to reduce aberrations.

Note that in the disclosed embodiment, one or more types of aberrations may arise due to the system's function to acquire and hold focus at multiple depths (axial positions relative to the objective). These may include chromatic aberration and spherical aberration depending on designer-selected configurations. These aberrations may be reduced or eliminated using known techniques for example aspherical lenses, GRIN lenses, multiple element optics, or other techniques. In some of the embodiments, the aberrations arising in the objective are compensated by transmitting light through a lens assembly whose characteristics are selected to fully or substantially compensate the aberrations introduced by the objective. For example, a lens assembly that is identical to the objective may be used.

In some configurations, the primary illumination source 122 can be modulated in time to create spatial patterns in the illuminated plane within the subject, or otherwise patterned to create structured illumination for enhancing resolution (i.e., "super-resolution"), such as in lattice light-sheet microscopy. Alternatively or additionally, the primary illumination source 122 can generate one or more Bessel beams that form the planar illumination beam that illuminates the subject.

In some configurations, the primary illumination source 122 may include a plurality of light sources, for example, a plurality of laser light sources having different center wavelengths. In such configurations, the beam conditioning module 120 may further include optics and/or components for selection of wavelengths for illumination, for example, by switching between appropriate filters, by selective activation of a particular laser, or by moving one of the plurality of laser sources (or a corresponding input component) into a singular input position. Alternatively or additionally, the beam conditioning module 120 may include optics and/or components for combining multiple light beams into a single beam. In such a configuration, additional optics and/or components can be provided downstream of the illumination module 102, for example, by including multi-band dichroics as part of the separation module 112 and/or by employing notch filters as part of image conditioning module 130, to accommodate the simultaneous multi-wavelength illumination and resulting detected light. Alternatively or additionally, combinations of a plurality of light sources can permit stimulated emission depletion (STED) imaging, for example, by forming a combination of planar beams that yield a narrower planar beam. Alternatively or additionally, combinations of a plurality of lights sources can permit pump-probe imaging similar to stimulated Raman scattering (SRS) imaging and/or coherent anti-Stokes Raman scattering (CARS) imaging.

Other optics and/or components for the beam conditioning module 120 in addition to those specifically discussed above are also possible in any of the embodiments. Although laser sources have been described herein, any collimated light source (or light source capable of being collimated) or combination of light sources, for example, pulsed or continuous wave, can be used. In embodiments, a regenerative amplifier can be used to generate the primary illumination from source 122.

The input illumination 134 can be provided to a scanning module 116 of the second module 103. The scanning module 116 may include one or more optics and/or components for redirecting the input illumination 134 toward the subject 106 and to effect scanning of the resulting planar illumination beam within the subject. For example, the scanning module 103 may include one or more reflective elements (e.g., a movable mirror mounted on a galvanometer) to vary the optical path of the input illumination 134. After redirection by the scanning module 103, the illumination can proceed to a separation module 112, where light to be directed to the subject is separated from any detection light returning from the subject.

In some embodiments, the separation module 112 comprises one or more optical components for distinguishing between illumination and detection light. For example, the separation module 112 may include a wavelength selective beamsplitter (e.g., a dichroic mirror/filter or a dielectric mirror/filter) or a polarization selective beamsplitter so as to direct the illumination and detection light along separate optical pathways. In other embodiments, the separation module 112 comprises an arrangement of optics or components of other modules within system 100 that act to physically separate the illumination and detection light without use of a beamsplitter (see, for example, FIG. 12). Although the separation module 112 has been illustrated in FIG. 1 as after the scanning module 116 along the input light path, it is also contemplated that the separation module 112, or components thereof, can be before the scanning module 116 (and/or after de-scanning module 118 along the detected light path), as shown, for example, in FIG. 10.

Figure 4A:
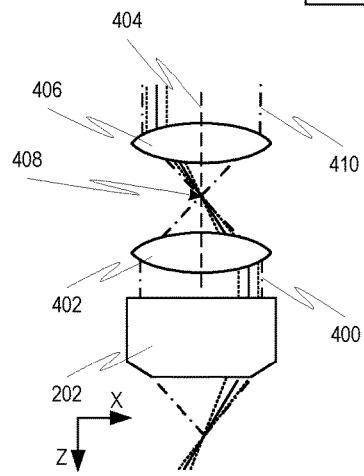
FIG. 4A illustrates an objective lens in combination with a lenses arrangement that can be used as part of the telescope module 110 in the simplified diagram of FIG. 1, according to one or more embodiments of the disclosed subject matter.

Proceeding from the scanning 116 and separation 112 modules, the input planar illumination beam proceeds to an optional telescope module 110, which may include one or more optics or components that form a telescope for imaging the input illumination onto a back aperture (or a back input plane, which may be different than the back aperture) of the focusing module 108. For example, the optional telescope module 110 can image the input illumination onto a plane that is stationary at some point relative to the objective, e.g., the back aperture, the back focal plane, or any other point depending on the desired scan pattern. Such a configuration may be advantageous in minimizing, or at least reducing, the amount light lost during a scan. Alternatively or additionally, the optional telescope module 110 can magnify the location of the incoming illumination onto the edge of the back aperture of the objective (e.g., of focusing module 108) versus the size of the scanning mirror (e.g., of scanning module 116) so that a smaller scanning mirror can be used relative to the back aperture. Similar features as a result of the magnification provided by the telescope module 110 could apply to any de-scanning mirror (e.g., of de-scanning module 118) for the detected light 138 as well. When the optional telescope module 110 is provided, it may include, for example, a pair of lenses disposed along the optical path, as illustrated in FIG. 4A.

The focusing module 108 (for example, an objective lenses or other reflective, diffractive, or refractive focusing optical components) receives the input illumination from the telescope module 110 and focuses the illumination into a planar beam 137 at an oblique angle (i.e., with respect to an optical axis of the objective lens) within the subject 106 (or alternatively aligned with the axis—not shown—such that multiple depths within the subject are illuminated). The focusing module 108 can also serve to receive light 138 from the subject 106, for example, using the same objective lens used for forming the input planar illumination beam 137. The system 100 can be configured such that during the scanning and detection, components of the focusing module 108 and the subject 106 (or at least the imaging volume, for example, when the subject is moving independently of the imaging volume) can remain substantially stationary.

The light 138 from the subject 106 can be directed via the focusing module 108 through many of the same, or similar, modules of the second module 103 en route to the detection module 104. For example, the focusing module 108 can direct the light 138 to the telescope module 110, where it is processed by the same telescope lens grouping that imaged the input illumination onto the focusing module 108. The light 138 can be separated by separation module 112 (e.g., either specific optics or components for separation or by appropriate arrangement of input and output light paths) and de-scanned by de-scanning module 118. Alternatively, as noted above, the de-scanning by the de-scanning module 118 may occur prior to separation by separation module 112.

Figure 10:
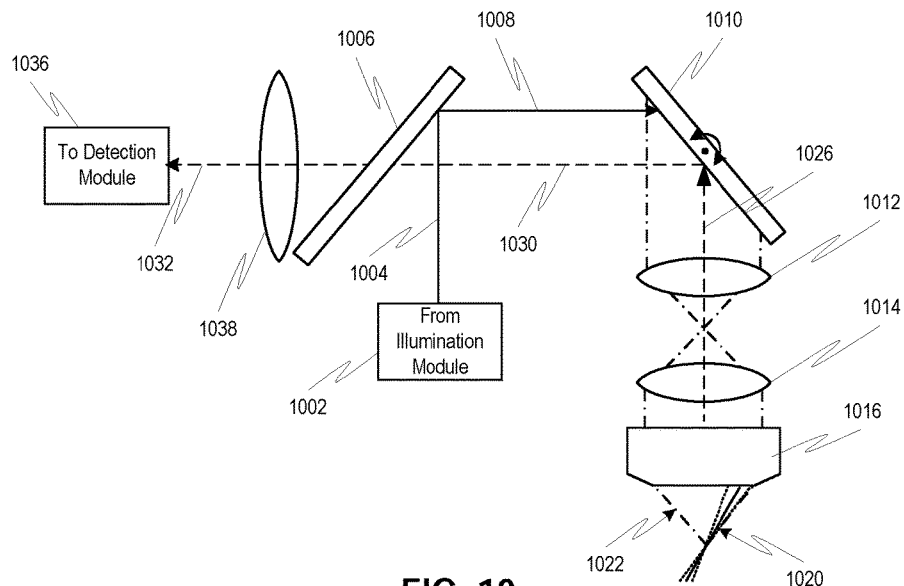
FIG. 10 illustrates a configuration of a depth-resolved imaging system employing a single scanning mirror, according to one or more embodiments of the disclosed subject matter.
Figure 11:
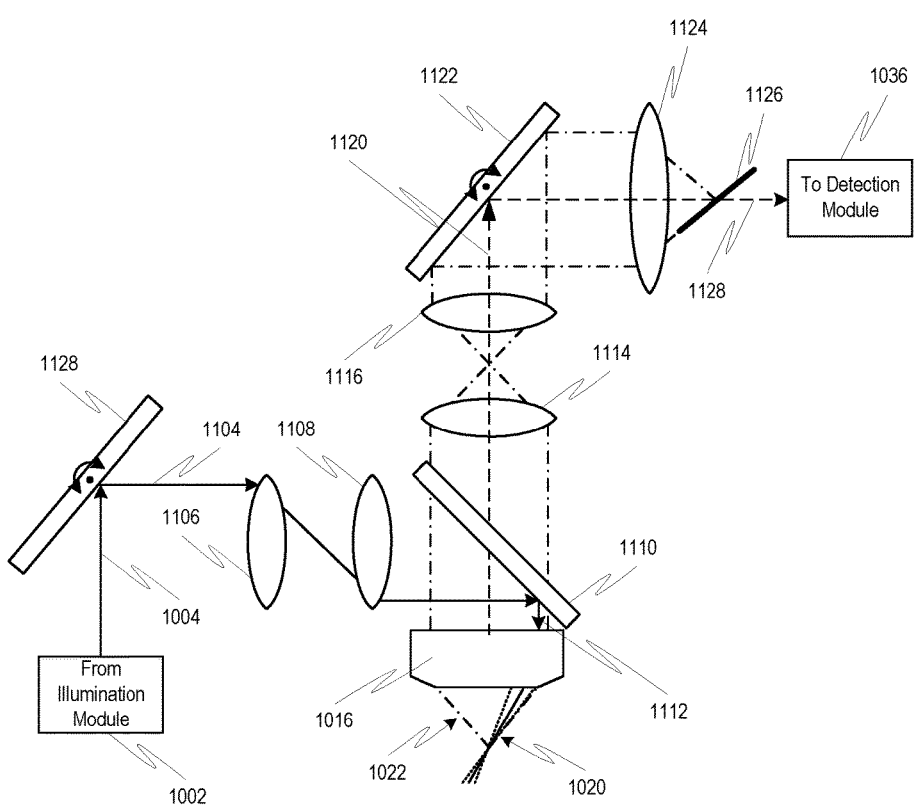
FIG. 11 illustrates a configuration of a depth-resolved imaging system employing a pair of scanning mirrors, according to one or more embodiments of the disclosed subject matter.

The de-scanning by module 118 can maintain a stationary detection plane of the imaging module 132 corresponding to the plane in the subject illuminated by the input illumination, despite the scanning motion of the illumination. The de-scanning module 118 may include one or more optics and/or components for redirecting the light from the subject. The re-directing by the de-scanning module 118 can be synchronized with the redirecting by the scanning module 116, such that the detected plane imaged by the system 100 corresponds to the plane illuminated by the system 100. In some embodiments, the scanning module 116 and the de-scanning module 118 share some of the same components (i.e., comprise a scan/de-scan module 114, for example, as illustrated in FIG. 10). In such embodiments, the scanning/de-scanning can be performed by the same mirror. In other embodiments, the scanning module 116 and the de-scanning module 118 use only separate components (e.g., employ independent mirrors, for example, as illustrated in FIG. 11). In such embodiments, the scanning can be performed by a first mirror separate from a second mirror that does the de-scanning, although the motions of the mirrors may be coordinated to maintain the desired correspondence between illuminated plane and detected light.

In some embodiments, the scan/de-scan module 114 comprises one or more reflective surface, such as tilting macroscale mirrors or facets of polygonal mirror. However, other reflective, diffractive, or refractive optical components for effective scanning/de-scanning are also possible according to one or more contemplated embodiments. For example, the scanning/de-scanning can be provided by other macroscale optical components, such as a deformable mirrors or SLM, or microscale optical components, such as MEMS mirrors and digital light processors (DLP).

The resulting detected light 135 from the second module 103 can be received by the detection module 104 for further optical processing and imaging. For example, the detection module 104 may include an image-forming module 126, an optional field rotation module 128, an image conditioning module 130, and an imaging module 132. The image-forming module 126 can be designed to form an image of the illuminated plane and/or to compensate for aberrations (e.g., any aberrations that may be introduced the second module 103). Thus, the image-forming module 126 may include optics and/or components similar or identical to the optics and/or components of the optional telescope module 110 and the focusing module 108.

In one or more embodiments, the optics and/or components of the image-forming module 126 and the focusing module 108 can have respective magnifications selected to dictate the angle of the intermediate image plane formed by the imaging forming module 126. For example, by selecting the respective magnifications to produce an overall 1× magnification at the intermediate image (and taking into account any immersion medium for the objective lenses of the modules 108, 126), the angle of the intermediate image plane can be the same as the illuminated plane in the subject, i.e., with zero rotation. Changing the respective magnifications to produce overall magnifications different than 1× can change the resulting image plane angle and may introduce aberrations. Thus, the image-forming module 126, in combination with the focusing module 108 and the optional telescope module 112, can be designed to produce an image of the illuminated plane in the subject 106 at or near unity magnification. Other magnifications other than 1× are also possible according to one or more contemplated embodiments, for example, to rotate the image plane to increase light capture or for any other purpose.

The resulting image produced by the image-forming module 126 is at an oblique angle with respect to the optical axis. If imaging was performed with the detection plane of the detector to the optical axis, the light will form an image of the illuminated plane that is blurred above and below the focal plane of the focusing module 108 (e.g., the primary objective) due to the oblique angle of the image. In some embodiments, this blurring may acceptable and/or be addressed by rotating the detection plane of the detector to match or be near the image plane. In other embodiments, an optional field rotation module 128 can be used to re-orient this image plane. For example, the field rotation module 128 can use one or more optical components to rotate the image plane fully or partially to allow the image to coincide with a detection plane of the detector while maintaining the whole image (and thus all depths) in focus. Other configurations of the field rotation module 128 can address the depth-resolved image formation without actual rotation of the image plane and are discussed in further detail below.

Before, within, or after field rotation module 128 (or when field rotation module 128 is not provided, before, within, or after image-forming module 126), an image conditioning module 130 with one or more optics and/or components can be provided for conditioning the detected light (i.e., adjusting position, magnification, and/or angle of the image plane) for final detection by an imaging module 132, which may be a single detection element (e.g., a photomultiplier tube (PMT)), a linear array (e.g., a linear detector array or a linear array of PMTS), or a two-dimensional array (e.g., a CCD camera). For example, the image-forming module 130 may include optics or components for shaping the detected light or adjusting numerical aperture (e.g., adjustable apertures or irises), for wavelength selection (e.g., an emission filter or multi-color imaging components), and/or for image enhancement (e.g., image intensification or variable magnitude adjustment). Alternatively or additionally, the image conditioning module 130 may include optics and/or components for directing the light output by the field rotation module 128 (or the image-forming module 126) to the imaging module 132, for example, by focusing the output light onto an input plane of the imaging module 132.

Alternatively or additionally, the image conditioning module 130 and/or the image-forming module 126 may include one or more field lenses (not shown, but could be disposed at or near intermediate image planes), one or more wedge elements, and/or one or more reflective, refractive or diffractive elements (e.g., mirror or spatial light modulator) to improve light collection and image formation. Rotation of the image by field rotation module 128 can result in loss of light due to the directionality of the light forming an intermediate image and the numerical aperture of the objective lens imaging the image. The field lenses can redirect this light without altering its focal plane. In an example, a field lens can be positioned at the focal plane of a relay lens set of the field rotation module.

Moreover, various combinations of lenses and glass elements, for example, incorporating combinations of concave and convex lenses in the image conditioning module 130 can be used to improve aberrations, change magnification, and/or improve through-put according to one or more contemplated embodiments. For example, the image conditioning module 130 can produce a magnification different from unity, even when the magnification produced by the combination of the second module 103 and the image-forming module 126 produce a depth-resolved image with a magnification at or near 1×. In particular, the image conditioning module 130 (together with optional field rotation module 128) can magnify the intermediate 1× image so that the desired resolution in the final image corresponds to the size of individual pixels of the detector.

The image conditioning module 130 can also use other optics or components, such as, but not limited to mirrors and mirror combinations, prisms, gratings, deformable mirrors, and spatial light modulators (SLMs) that can redirect light to form an image at a specified position and orientation. Alternatively or additionally, the image-forming module 130 may include one or more zoom lens modules (not shown). The zoom lens module can also allow alteration of the magnification of the detection module 104, for example, to match the pixel size of the detector of the imaging module 132 to image at a desired resolution. The zoom lens module or an electric lens may able so used to accommodate changes to the primary objective of the focusing module 108, for example, to change magnification. In such a configuration, the zoom lens module or electric lens can compensate for different back apertures (or back focal plane characteristics) by moving the position of the input illumination thereon. Alternatively or additionally, the position of the input illumination on the back aperture can be changed by translating the beam on the scanning mirror (e.g., of scanning module 116).

The imaging conditioning module 130 can also include, for example, a displaceable component that changes objectives (e.g., an objective of the optional field rotation module 128) to change between different desired magnifications. Thus, instead of changing the primary objective at the subject (e.g., an objective of the focusing module 108), the magnification of the final image can be changed by simply actuating the displaceable component (e.g., a turret of objectives with different magnifications) to select between different objectives. In such a configuration, the magnification of the image-forming module 126 can be changed in a corresponding manner, for example, to maintain the condition of the magnification being at or near unity, as described above.

The imaging module 132 may include various types of detecting elements and/or configurations according to one or more contemplated embodiments. In some embodiments, the imaging module 132 may include a high-speed (e.g., at least 1 MHz pixel rate, for example, 300 MHz) camera with a two-dimensional detecting element array, such as a CMOS imager, sCMOS imager, or CCD imager. Alternatively or additionally, the imaging module 132 may include a linear array of detecting elements. In some embodiments, the imaging module 132 may include a linear or two-dimensional array of high-sensitivity detecting elements, such as photomultiplier tubes, avalanche photodiodes, or single-photon avalanche diodes. Alternatively or additionally, the imaging module 132 may include one or more waveguides (e.g., optical fibers) or conduits that direct light to a series of individual detectors or an array of detector elements.

A control module 150 can be provided for processing images detected by the imaging module 132 and/or coordinating operation of the system 100. For example, control module 150 can control illumination module 102 to form the input illumination 134, such as by scanning a beam from a laser or by controlling a spatial light modulator (SLM). Alternatively or additionally, control module 150 can control the timing of illumination from or selection of wavelengths in the illumination module 102, for example, to modulate the illumination to form structured illumination. Alternatively or additionally, control module 150 can control the scanning module 116 to effect scanning of the planar illumination beam within the subject. The control module 150 can also control de-scanning module 118 to synchronize the de-scanning of the detected light 138. Alternatively, the scanning module 116 and the de-scanning module 118 can be the same (e.g., scan/de-scan module 114) and the control module 150 can control the module 114 to provide simultaneous scanning and de-scanning.

In one or more contemplated embodiments, the control module 150 can be configured to move the subject 106 (e.g., via a motorized stage) and/or the focusing module 108 (e.g., a primary objective lens). In such a configuration, the subject 106 may be sequentially illuminated from multiple directions or sides to provide more isotropic resolution.

The control module 150 can be further configured to construct one or more images (e.g., a 2-D image or combining multiple 2-D images into a 3-D image) based on the detected light by imaging module 132 and the angles of the scanning 116 and de-scanning 118 modules during the corresponding detection. Alternatively or additionally, the control module 150 can correct for the real position of the illumination planar beam 137 within the subject. For example, the control module 150 could use feedback signals from the scanning 116 and the de-scanning 118 to determine actual angles and positions of the illuminated and detected light, as well as models of the optics and/or components of the system 100. Alternatively or additionally, the control module 150 can be configured to control system 100 to perform 2-photon imaging, optical coherence tomography (OCT), structured illumination imaging, stimulated emission depletion, or any other imaging modality.

The control module 150 can also be configured to further process the images. In particular, the control module 150 can apply many different analysis and image correction strategies to improve resolution, contrast and spatial linearity, for example. In one or more embodiments, the imaging geometry (including optics and components of the various modules of the first through third modules 102-104) can be modeled to map detecting elements (e.g., pixels of a camera) detected during a scan to 3-D Cartesian space at the object plane. This model can be stored by the control module 150 and used to generate predicted spatially-varying point spread functions (PSF) for full deconvolution of the resulting data, which can improve resolution and sectioning of the resulting images. Alternatively or additionally, the PSF can be estimated from a data set or form calibration using a standard (e.g., a phantom with fluorescent beads) or estimated using an automated algorithm. Estimating the PSF can occur before or after the conversion to Cartesian space. Deconvolution by the control module 150 may be applied before lateral shift adjustment or after lateral shift adjustment, described below.

Alternatively or additionally, radiative transport-type models of light propagation could be stored by the control module 150 and used to further correct for the effects of scattering of light (e.g., illumination planar beam 137 and/or detection light 138) to reconstruct a corrected image, similar to laminar optical tomography (LOT) or diffuse optical tomography.

Alternatively or additionally, the control module 150 can also be configured to manipulate images, for example, by applying a lateral shift adjustment to each image in compiling a 3-D model of the subject 106. Because of the angle of illumination, stacking acquired images into a simple cube does not correct for skew. In other words, each depth layer acquired at a single scan position of illumination planar beam 137 is laterally shifted with respect to the one above, which shift is dependent on the angle of the illumination planar beam 137 with respect to the optical axis 139. The control system 150 can account for this skew by laterally shifting each layer, for example, in one or more dimensions, optionally with interpolation for non-integer shifts. The amount of shift may be determined by simulation, estimation from resulting images, and/or calibration using an object, and stored by control module 150. In embodiments, the reshaping of the tilted image into Cartesian coordinates can be model-based or approximated by applying the lateral shift adjustment.

Alternatively or additionally, the control module 150 can be configured to employ diffuse background subtraction. To compensate for any undesired scattering, the system 100 can employ, for example, two-photon imaging (e.g., using longer wavelength excitation that reduces scattering of the excitation light and which produces a narrower planar beam because of the non-linearity of the two-photon effect), structured illumination (e.g., by appropriate manipulation of the primary illumination source 122 and resulting detection schema), stimulated emission depletion (STED) imaging (e.g., by selectively deactivating fluorophores in specific regions while leaving a central focal spot active to emit fluorescence in the subject), HiLo imaging (e.g., by acquiring sequential images with uniform and structured illumination and synthesizing a single image by fusing high and low spatial frequency information from both images), high-pass filtering (e.g., to accentuate higher resolution structures), low-pass filtering (e.g., to subtract low pass filtered data from the image to accentuate higher resolution structures), spatio-temporal recognition (e.g., by distinguishing features that have a distinct pattern of temporal fluctuations, similar to photoactivated localization microscopy (PALM) to stochastic optical reconstruction microscopy (STORM)), mathematical correction by extracting dynamic changes in the images and/or mathematical correction using diffuse background subtraction. For example, the control module 150 can identify common patterns in each sequential image obtained, which common pattern may shift laterally during a scan. The common pattern can be shifted, scaled and subtracted from each image (e.g., subsequently obtained images) to isolate the differences between each measurement which correspond to the selectively subject plane.

In some embodiments, system 100 can be provided with an optional secondary illumination source 124. For example, the secondary illumination source 124 may be used to provide photo-manipulation, stimulated emission-depletion (STED), or any other desired effect on the subject independent of or in conjunction with light from the primary illumination source 122. Other optics or components (not shown) can be provided with the secondary illumination source 124 to manipulate light (e.g., beam steering or shaping) from the source 124 to provide the desired illumination effect. For example, the secondary illumination source 124 can be provided with a spatial light modulator (SLM), beam steering mirrors or optics, acousto-optic deflectors, phase plates, adaptive optics, or any other optical components to achieve the desired effect. Control module 150 can also control operation of secondary illumination source 124 in conjunction with the other modules 102-104 of system 100.

In some configurations (e.g., a photo-manipulation configuration), the secondary illumination from source 124 may be provided directly to the focusing module 108 (e.g., along beam path 136a) for irradiating the subject 106, thereby bypassing other modules of the second module 103. Photo-manipulation light can be generated by any beam-shaping optical components, from simply focusing laser light at the focusing module's focal plane, to scanning with galvanometer mirrors, acousto-optic scanners, MEMs scanners, DLP devices or SLMs. For example, SLMs can be used to generate arbitrary 3-D patterns of photo-manipulation, which can be dynamically altered during imaging. Photo-manipulation may include, but is not limited to, optogenetic excitation or inhibition of cells, optical tweezing, photocoagulation, photobleaching, optically induced cell death or impairment (i.e., photothrombosis), optical cavitation for the photo-release from micro or nanoparticles, photo-uncaging, burning, reactive oxygen species generation, or any other manipulation using electromagnetic radiation.

Alternatively or additionally, the secondary illumination from source 124 may propagate along a fully or partially identical path or adjacent path through the second module 103 to that of the primary illumination. For example, in a STED configuration, the secondary illumination from source 124 can be directed along path 136b to an input end of the second module 103 and proceed to the subject 106 along a similar beam path as the input planar illumination beam 134. STED is a super-resolution technique that employs stimulated emission depletion to reduce the size of a diffraction limited spot or plane. In embodiments, STED can be achieved by aligning the secondary light source 124 to produce beams surrounding, bounding, or adjacent to the primary illumination. Thus, for point scanning, an annular beam spot of secondary illumination may be produced around the focal point of the primary illumination. For lines scanning, a stretched annular shape of secondary illumination can be provided around the primary line illumination. For planar beam scanning, two planar beams of secondary illumination can be provided on sides of the primary illumination planar illumination beam. Other configurations for primary and secondary illumination are also possible according to one or more contemplated embodiments. Configurations and use of the secondary illumination source other than for photo-manipulation and STED are also possible according to one or more contemplated embodiments.

Although certain features have been illustrated in FIG. 1, it will be appreciated that additional features could be added to those specifically illustrated, according to one or more contemplated embodiments. In addition, it will be further appreciated that certain features can be omitted, replaced, or revised according to one or more contemplated embodiments. While a specific order and configuration of features has been illustrated in FIG. 1, embodiments of the disclosed subject matter are not limited thereto. Rather, features may be re-ordered to achieve different configurations according to one or more contemplated embodiments. For example, the scanning 116 and de-scanning 118 modules may be positioned in the optical path between the separation module 112 and the telescope module 110, rather than between the illumination 102 and detection 104 modules and the separation module 112 as presently illustrated in FIG. 1. Other re-arrangements and re-configurations of features and modules illustrated in FIG. 1 would be apparent to one of ordinary skill in the art and fall within the scope of the present disclosure.

Moreover, system 100 can be embodied in many different configurations according to respective embodiments. For example, system 100 may be configured as a microscopy system, where focusing module 108 provides one or more microscope objectives for imaging a subject 106 held by a microscope stage. In another example, system 100 can be configured as a macroscopic (i.e., without magnification) imaging system, where focusing module 108 provides one or more high numerical aperture focusing lenses for imaging a subject. In still another example, system 100 can be miniaturized (e.g., by employing microfabricated components, for example using microelectromechanical systems (MEMS) devices and/or miniaturized imagers (e.g., semiconductor-chip imagers) and/or miniaturized light sources (e.g., laser diodes or light-emitting diodes (LEDS)) for certain applications. For example, optical components may be included in an endoscope for imaging structures internal to an organism, where light acquired by the system is processed by a detector within the endoscope or guided to a remote detector (such as PMT array) by, for example, one or more optical fibers.

Referring to FIG. 2A, a configuration that uses an objective lens 202 is illustrated. Such a configuration may form the focusing module 108 of FIG. 1 in whole or in part. To form the geometry of the DR imaging system, the illumination beam 204 can be positioned off-center with respect to the back aperture of the objective 202. The position of the illumination beam 204 on the back focal plane (or equivalently, the position may be taken with respect to the back aperture) of the objective 202 determines the angle of the resulting planar illumination beam 210 in the subject. The system may be set up (i.e., via the optics and/or components of the second module 103) such that illumination beam 204 is incident at a consistent location at or near the back focal plane of the objective 202 despite scanning by scanning module 116. In other words, the illumination beam 204 can pivot 208 about a point on or near the back aperture of the objective 202 to effect scanning of the beam 210 within the subject. At the same time, objective 202 can be used to acquire detected light 206 from the subject. For example, a telescope, such as the telescope configuration in FIG. 4A, can be used to image the illumination scanner and the detection de-scanner onto a stationary plane (e.g., a back focal plane) close to the back aperture of the objective so as to minimize, or at least reduce, light loss during scanning.

Although illustrated in FIG. 2A as illuminating a subject from the top, it is also possible that objective 202 (and the other components of system 100) can be maintained at or repositioned at different locations with respect to the subject. For example, the objective 202 may be in an inverted configuration, such that the subject is illuminated from the bottom. Alternatively or additionally, the objective 202 can be such that the subject is illuminated from the side.

In some embodiments, excessive illumination of the surface of the subject (i.e., in order to better illuminate deeper structures within the subject) can be addressed by shaping the input plane such that intensity is more spatially distributed at the surface of the subject. For example, this can be achieved by positioning the axial focal plane of the planar illumination beam 210 deeper within the subject, thereby reducing the power density experienced by upper layers. While this may lead to poorer resolution of upper layer structures, it can enhance resolution and signal to noise at deeper depths and may be especially useful for two-photon implementations. The deeper positioning of the axial focal length can be achieved by moving the illumination focal plane, i.e., by moving the subject and/or the objective. Alternative or additionally, the relative difference in energy density at the surface versus the axial focus can be increased by using a higher numerical aperture illumination beam, or through more advanced beam designs such as, but not limited to, Airy beams, Bessel beams, or combinations of beamlets.

Although an objective lens 202 is illustrated in FIG. 2A, other optics and/or components for the focusing module 108 are also possible according to one or more contemplated embodiments. For example, the objective lens 202 can be replaced with a gradient-index (GRIN) lens, as illustrated in FIG. 2B, or used in combination with an objective lens (not shown). Such a configuration can provide especially useful in deep-tissue imaging, for example, by being part of a needle or endoscope inserted into a tissue for in situ imaging. Alternatively or additionally, the GRIN lens could be used as a relay lens, especially when used as part of a needle or endoscope.

In addition, although an objective lens 202 is illustrated in FIG. 2A, any type of optic or component that focuses could be used in the focusing module 108. For example, a spatial light modulator (SLM) could be used in place of, or in addition to, an objective lens 202. In another example, any positive lens could be used in place of, or in addition to, an objective lens 202. In some embodiments, an objective lens 202 is not needed at all, for example, as described below with respect to FIG. 19.

Referring now to FIG. 2C, any of the disclosed microscope embodiments with an objective 202 (other elements of a microscope not being shown) may form an DRI that includes a GRIN lens arranged as shown to extend the field of illumination and imaging to a position that may be otherwise inaccessible or difficult to access. For example, in soft tissue 255 of a brain or other body part of an animal a deeper region may be imaged by plunging a microscope with a GRIN lens 212 into the tissue 255. The objective 202 transmits the illumination planar beam into the GRIN lens whereupon it is refocused to form an illumination planar beam 256 and image beam 258 as in any of the embodiments. The image beam 258 may be returned to detection optics according to any of the disclosed embodiments. Using this apparatus, and by suitable choice of GRIN lens, the location of the interrogated volumetric, planar, line, or point regions may be extended into the substance of a target material such as a biological tissue. Note that in variations, confocal microscopes or other types of microscopes may be used.

Figure 3B:
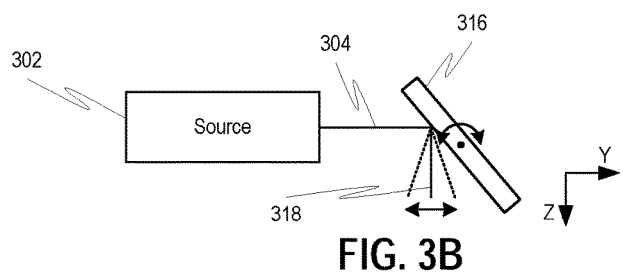
FIG. 3B illustrates an illumination setup employing a single scanning mirror to provide illumination scanning and that can be used as part of the beam conditioning module 120 in the simplified diagram of FIG. 1, according to one or more embodiments of the disclosed subject matter.
Figure 3C:
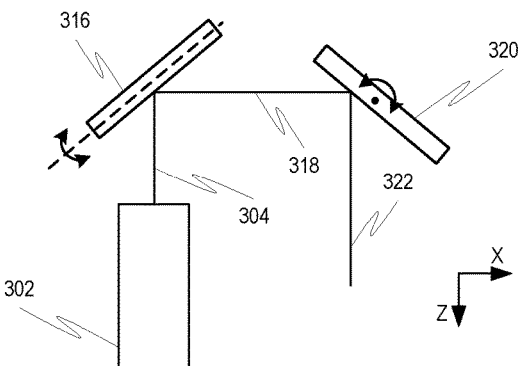
FIG. 3C illustrates an illumination setup employing a pair of scanning mirrors to provide illumination scanning and that can be used as part of the beam conditioning module 120 in the simplified diagram of FIG. 1, according to one or more embodiments of the disclosed subject matter.

Referring to FIGS. 3A-3C, configurations of components for beam conditioning module 120 of FIG. 1 are illustrated. As noted above, beam conditioning module 120 can form the light from the primary illumination source into a line or planar beam for scanning at the subject. Referring now to FIG. 3A, the source 302 generates an illumination beam 304A incident on a beam expander 305, which may be provided. The beam expander 305 may include one or more optical elements such as lenses 307A and 307B. The resulting expanded beam 304B may be incident on a planar beam-forming element 306 to form a planar beam 308. The orientation of the cylindrical lens 306 focuses the beam 304 in the X-direction. The resulting beam 308 is directed to the subject through optics that include an objective ultimately to form a focused illumination planar beam within the subject, the planar beam being at an oblique angle in the X-Z plane. The illumination 308 can scanned with the subject using the second module 103, for example, by translating and/or rotating the beam in the X-Z plane as a result of motion of scanning module 116. The planar beam forming element 306 may employ any suitable technique for forming a planar beam, for example, a cylindrical or combinations of cylindrical and spherical lens, as well understood by those of skill in the optical arts. Note that other planar beam forming optical approaches may be used. For example, the beam expander 305 may be omitted.

In some embodiments, it may be preferable to scan a line rather than a planar beam at the subject. For example, the illumination from the source can be spread projected as a line of illumination (e.g., along the Y-direction) that can then scanned laterally to illuminate an area equivalent to a planar beam, thereby accommodating the power requirements necessary for two-photon imaging. Such a configuration is illustrated in FIG. 3B, where scanning mirror 316 is used to scan a spot produced by beam 304 to produce line illumination 318.

In some embodiments, a regenerative amplifier, or a similar pulsed laser with lower repetition rate than a standard Ti:sapphire laser, can be used to provide improved two-photon excitation performance. A regenerative amplifier concentrates the pulses of a ~MHz laser into lower frequency pulses with much higher peak energy. For example, an 80 MHz Ti:sapphire can have its pulses concentrated into 5 kHz pulses with a mean power of 7 W. As a result, over fifty-thousand (50,000) times more power per pulse can be generated for the illumination beam than a standard 80 MHz laser. This illumination can be spatially spread out over the illumination plane to provide equivalent instantaneous excitation to a pulse from an 80 MHz laser. The slower pulse rate can be accommodated if image acquisition of the illuminated plane is at or about 2,000 frames per second, such that each plane can be illuminated with two pulses from the regenerative amplifier. Assuming one pulse per subject point, integration or dwell time does not factor into the amount of light emitted, making line and planar beam excitation configurations in the pulse-rate matched scheme largely equivalent. In both cases, a 2D detector array or camera, or other configuration of image detection could be implemented. Alternatively, the plane could be de-scanned onto a linear detector subject at a higher rate than a camera, which linear detectors may have a higher bandwidth and/or better sensitivity as compared to the camera.

Similar efficiencies are found when using line-scanning type configurations to form the planar illumination beam. For example, in FIG. 3C a separate scanner 320 can be used to scan a low NA (or similar) single beam 304 to compose the planar beam illumination 322, prior to sweeping of the planar beam through the subject. Such a configuration as illustrated in FIG. 3C may also be used to pattern the planar illumination beam, for example, to use the primary illumination to provide structured light. In particular, structured light can be used to improve the in-plane resolution and sectioning of in the DRI system, similar to structured illumination or HiLo microscopy. By patterning illumination at different spatial frequencies, low and high frequency components of the image can be separated leading to improved resolution. In some embodiments, structured illumination can be created by modulating the intensity of the illumination beam at specific frequencies in the configuration of FIG. 3B or FIG. 3C. Alternatively or additionally, the structure can be created by using a diffraction grating or spatial light modulator in the illumination path.

Referring to FIG. 4A, a configuration of components for telescope module 110 of FIG. 1 is illustrated. As noted above, the telescope module 110 can image the input planar illumination beam onto the back aperture (or a back input plane) of the focusing module 108 (e.g., objective lens 202). In addition, the telescope module 110 can convey the detected light 400 from the focusing module 108 (e.g., objective lens 202). For example, in FIG. 4A, a telescope can be formed using a first lens 402 in combination with a second lens 406 along a common optical axis 404. The lenses 402, 406 can be arranged such that foci thereof overlap at 408. The telescope can map the scanner (e.g., scanning module 116 and/or de-scanning module 118) onto the back focal plane (or back aperture) of the objective lens 202.

Figure 4B:
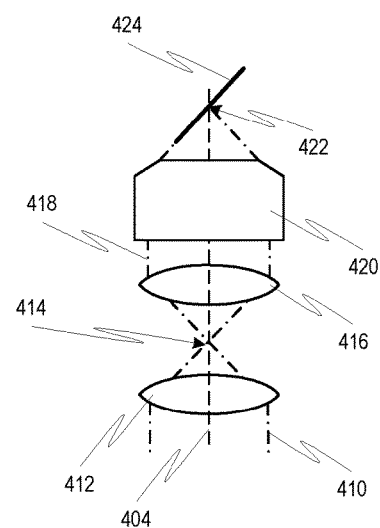
FIG. 4B illustrates a lens arrangement that can be used as part of the image-forming module 126 in the simplified diagram of FIG. 1, according to one or more embodiments of the disclosed subject matter.

Referring to FIG. 4B, a configuration of components for image-forming module 126 of FIG. 1 is illustrated. As noted above, the image-forming module 126, together with the optics of the second module 103, for example, the objective 202 and the telescope lenses 402, 406, can form an image at or near unity magnification. As illustrated in FIG. 4B, the image-forming module 126 may include a third lens 412, a fourth lens 416, and a lens assembly 420, which may be similar or identical to the optics and/or components of the telescope module 110 (e.g., lenses 402, 406) and the focusing module 108 (e.g., objective 202). In other words, the optical components of the imaging forming module 126 may be similar to or the same as the optical components of the focusing module 108 and the telescope module 110, although when immersion materials are used for the objectives a different magnification may be necessary for the image-forming module to yield the desired unity magnification of the image. The lenses 412, 416 can be arranged such that foci thereof overlap at 414. Thus, light 404 (e.g., conveyed from the telescope of FIG. 4A) is focused by third lens 412 to focus 414, and light from focus 414 can be refracted by fourth lens 416 to yield rays 418 en route to a lens assembly 420 (or other high numerical aperture lens) to form an image 424 of the illuminated plane from the subject at intermediate image plane 422.

Figure 5A:
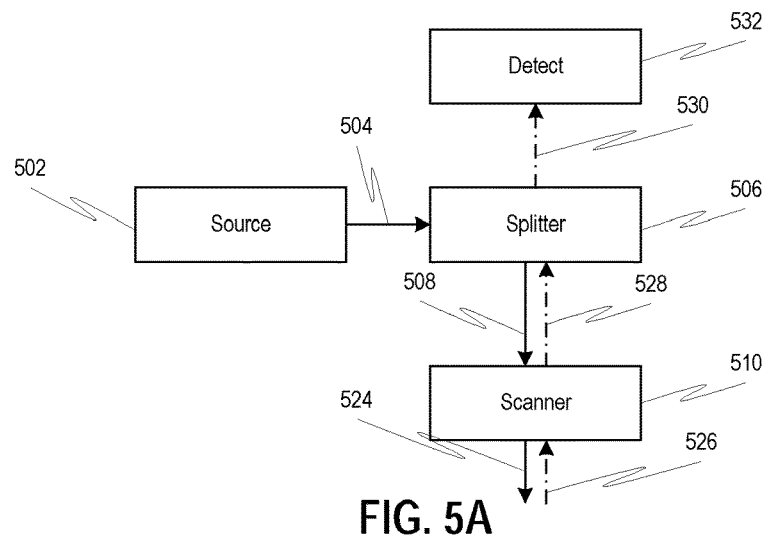
FIG. 5A is a schematic diagram illustrating a first arrangement for scanning module 116, de-scanning module 118, and separation module 112 of FIG. 1, according to one or more embodiments of the disclosed subject matter.
Figure 5B:
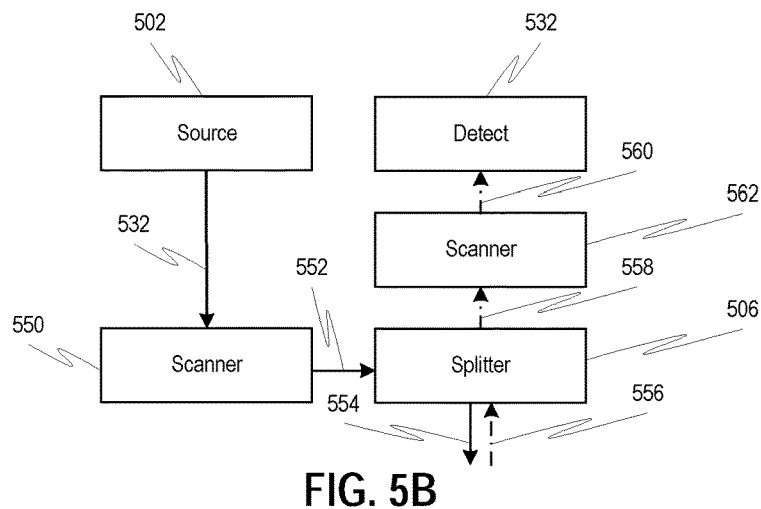
FIG. 5B is a schematic diagram illustrating a second arrangement for scanning module 116, de-scanning module 118, and separation module 112 of FIG. 1, according to one or more embodiments of the disclosed subject matter.
Figure 5C:
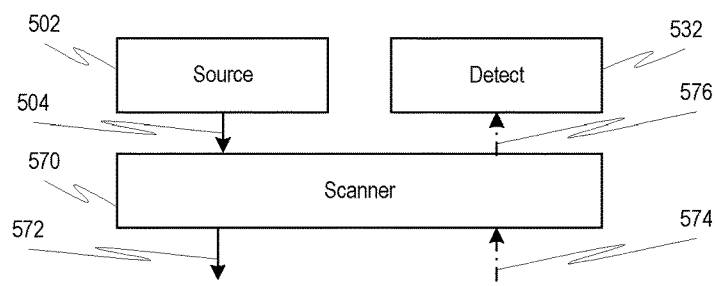
FIG. 5C is a schematic diagram illustrating a third arrangement for scanning module 116, de-scanning module 118, and separation module 112 of FIG. 1, according to one or more embodiments of the disclosed subject matter.

Referring to FIGS. 5A-5C, configurations for the scanning 116, de-scanning 118, and separation modules 112 of FIG. 1 are illustrated. As noted above, the scanning module 116 can scan the illumination planar beam through the subject, while the de-scanning module 118 can de-scan the detected light corresponding to the illuminated plane in the subject. The separation module 112 can act to separate the illuminated light from the detected light, for example, using a beam splitter or separation of optical paths. In some embodiments, the scanning module 116 and de-scanning module 118 can share some of the same components.

Such a configuration is illustrated in FIG. 5A, where illumination light 504 from the illumination module 502 is directed to a common scan/de-scan module 510 via a beam splitter 506 (e.g., dichroic, polarizing beam splitter, or other beam splitting element). The input illumination light 508 is redirected by the scan/de-scan module 510 to scan through the subject. The resulting detected light 526 is redirected by the scan/de-scan module 510. The redirected detected light 528 is separated from the optical path shared with the illumination light 508 by beam splitter 506. For example, the beam splitter can be placed within the infinity space of the optical path of the second module 103, e.g., between the scan/de-scan module 510 and the detection module 104. For example, where the detected light is fluorescent light excited by the illumination planar illumination beam, the beam splitter 506 can be a long-pass filter that allows the detected light 528 (e.g., having a wavelength of 525 nm) to pass through while reflecting wavelengths less than the detected light 528, in particular, wavelengths of the illumination/excitation light 504 (e.g. having a wavelength of 488 nm). Alternatively, the beam splitter 506 can be a short-pass filter or a polarizing beam splitter.

In some embodiments, the scanning module 116 and de-scanning module 118 can be separate modules for the illumination and detection light, respectively. Such a configuration is illustrated in FIG. 5B, where illumination light 532 from the illumination module 502 is directed to a scan module 550. The scanned beam 552 is directed to a beam splitter 506 (e.g., dichroic, polarizing beam splitter, or other beam splitting element), after which the illumination beam 554 can be scanned through the subject. For example, the beam splitter 506 can be placed within the infinity space of the optical path of the second module 103, e.g., between the focusing module 108 and the telescope module 110. The resulting detected light 556 can be received by the beam splitter 506, which separates the detected light from the optical path shared with illumination light 554. The detected light 558 is redirected by de-scan module 562 as de-scanned light 560 to detection module 532. As with the embodiment of FIG. 5A, the beam splitter 506 can be a long-pass filter that allows the detected light 556 to pass through while the illumination/excitation light 552. Alternatively, the beam splitter 506 can be a short-pass filter or a polarizing beam splitter.

In some embodiments, the separation between illumination and detection light can be achieved by optical path separation. Such a configuration is illustrated in FIG. 5C, where illumination light 504 from the illumination module 502 is directed to a common scan/de-scan module 570, which may be, for example, separate mirrored facets of a polygonal mirror, separate mirrored surfaces whose motions are synchronized, or separate mirror elements of a reflective array (e.g., digital micromirror array or other MEMS device). The scanned beam 572 can be directed to the subject without passing through a beam splitter. The resulting detected light 574 can be received by the scan/de-scan module 570, which redirects the de-scanned light 576 to detection module 532.

Figure 5D:
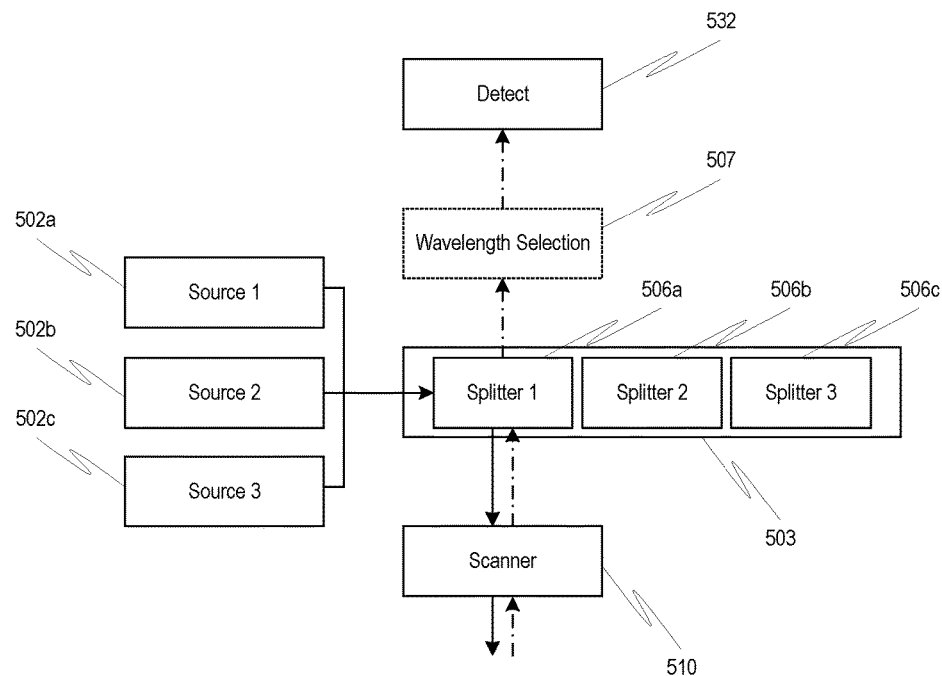
FIG. 5D is a schematic diagram illustrating an arrangement for scanning module 116, de-scanning module 118, and separation module 112 of FIG. 1 to handle multiple illumination sources, according to one or more embodiments of the disclosed subject matter.

In some embodiments, multiple light sources having different wavelengths may be used to simultaneously or sequentially illuminate the subject. To accommodate such multi-wavelength excitation and/or multi-wavelength emission, selectable splitter components can be used. For example, FIG. 5D illustrates a configuration for multi-wavelength excitation from a plurality of illumination sources 502a-502c using a single scanner 510 for both illumination and detection light. In such a configuration, a selectable splitter module 503 can be provided with individual splitter elements 506a-506c corresponding to the excitation wavelengths of the sources 502a-502c (and/or emission wavelengths generated by the excitation wavelengths). For example, the selectable splitter module 503 can comprise a selectable turret or wheel of individual dichroic elements, each dichroic having a different pass band. Thus, when a source 502a having a first wavelength is used, a first dichroic 506a can be selected using the splitter module 503 that will allow the first wavelength excitation to reach the subject and to pass the resulting emission to the detector 507. Similarly, the second 506b or third dichroic 506c can be selected using the splitter module 503 when it is desired to use source 502b or source 502c, respectively. Optionally, a wavelength selection component 507 can be disposed in the detection arm prior to the detector 532, for example, to filter out any excitation light or other undesired wavelengths that may be directed along the detection arm.

Figure 5E:
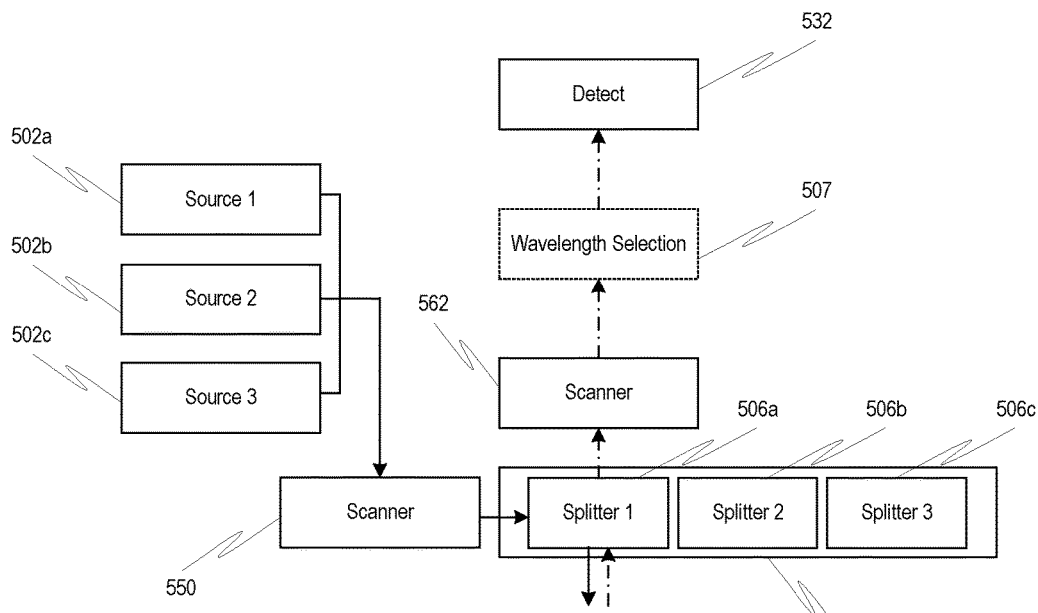
FIG. 5E is a schematic diagram illustrating another arrangement for scanning module 116, de-scanning module 118, and separation module 112 of FIG. 1 to handle multiple illumination sources, according to one or more embodiments of the disclosed subject matter.

Alternatively, FIG. 5E illustrates a configuration for multi-wavelength excitation from a plurality of illumination sources 502a-502c using a scanner 550 for illumination and a separate scanner 562 for detection light. In such a configuration, the selectable splitter module 503 can operate much in the same manner as FIG. 5D.

Although three sources 502a-502c are illustrated in FIGS. 5D-5E, fewer or additional sources are also possible according to one or more embodiments. In addition, although only a single detector 532 is illustrated in FIGS. 5D-5E, additional detectors are also possible according to one or more contemplated embodiments. Indeed, the plurality of detectors may be provided with a separate selectable splitter module, similar to splitter module 503, and/or selectable wavelength filters to select for the desired detection wavelength.

Referring to FIGS. 6A-6G, configurations for imaging the intermediate image plane, for example, with and without the optional field rotation module 128 of FIG. 1 are illustrated. Embodiments of the disclosed imaging systems can acquire data from multiple depths simultaneously by illuminating the subject with a narrow beam or planar beam of light with extent along the depth direction. The focusing module can create an image of the subject that has axial extent, and the image created can have axial extent too. In the extreme case, the image could be of a completely axial plane. However, planar illumination beam illumination with a more slanted plane (i.e., at a non-orthogonal angle with respect to the optical axis) can provide improved sectioning because the angle between illumination plane and detected light can be larger. As a result of the depth dimension of the illumination, the resulting image also extends in the depth dimension, in the example, forming an oblique image.

Figure 6A:
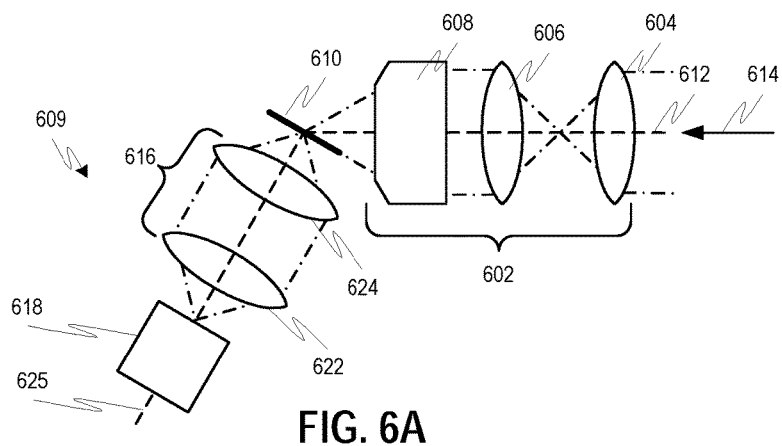
FIG. 6A illustrates an optical setup for depth-resolved imaging that can be used for the optional field rotation module 128 in the simplified diagram of FIG. 1, according to one or more embodiments of the disclosed subject matter.

If a detector is positioned with its input plane perpendicular to the optical axis of the image-forming objective, rather than aligned to the image plane, light from above and below the axial focal plane of the planar illumination beam will form a blurred image of the illuminated plane. Image rotation optics can be used to re-orient this angled image plane to allow it to focus onto the input plane of a detector, while maintaining the whole image, and thus all depths, in focus at the same time. The field rotation module 128 can use one or more optical components to rotate the image plane to allow the image to coincide with an input plane perpendicular to the optical axis while maintaining the whole image (and thus all depths) in focus, as illustrated in FIG. 6A. For example, detected light 614 can proceed along optical axis 612 to image-forming optics 602, which may include a fifth lens 604, a sixth lens 606, and an objective lens 608. The detected light 614 is thus focused to form an intermediate image 610.

The field rotation optics may include a lens system 616, which includes, for example, a high-numerical aperture seventh lens 624 (e.g., another objective lens) and an eighth lens 622 arranged along a second optical axis 625 that is at an angle (i.e., non-parallel, non-orthogonal angle) with respect to optical axis 612. For example, the lens system 616 can magnify the image in contrast to the lens system 602, which in combination with the focusing and optional telescope modules and an immersion media produces a unity magnification for the intermediate image 610. For example, the lens system 616 can be used to magnify the image so that the desired image resolution corresponds to the pixel size of the detector n.

The detector 618 can be provided at the focus of second lens 622, for example, with an input plane thereof perpendicular to the second optical axis 624 and/or parallel to the image plane of image 610. Since the focal plane of first lens 624 is coincident with the image plane of the image 610, the detector 618 can produce a focused image of the image plane.

Figure 6B:
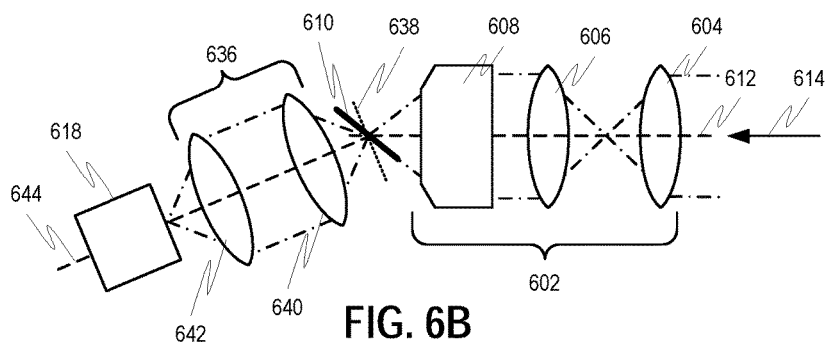
FIG. 6B illustrates an alternative optical setup for depth-resolved imaging that can be used for the optional field rotation module 128 in the simplified diagram of FIG. 1, according to one or more embodiments of the disclosed subject matter.

Other configurations of the field rotation module 128 can address the depth-resolving aspect of the image formation without complete rotation of the image plane. Partial image rotation may be advantageous to improve the amount of light collected and channeled to the detector 618, albeit at the potential expense of image quality. For example, FIG. 6B illustrates a field rotation module configuration where the image is only partially rotated, which recognizes that there is a tradeoff between correcting for the multiple axial depths to be imaged and the amount of light transferred between the lens system 602 and the lens system 616. As in the embodiment of FIG. 6A, detected light 614 can proceed along optical axis 612 to aberration correction optics 602, which may include a fifth lens 604, a sixth lens 606, and an objective lens 608. The detected light 614 is thus focused to form an intermediate image 610.

In FIG. 6B, the field rotation module may include a lens system 636, which includes, for example, a high-numerical aperture seventh lens 640 (e.g., another objective lens) and an eighth lens 642 arranged along a second optical axis 644 that is at an angle (i.e., non-parallel, non-orthogonal angle) with respect to optical axis 612. Note that the angle of rotation of second optical axis 644 with respect to optical axis 612 is less in FIG. 6B than the angle of rotation of optical axis 625 with respect to optical axis 612 in FIG. 6A.

A detector 618 can be provided at the focus of second lens 642, for example, with an input plane thereof perpendicular to the second optical axis 644. However, in contrast to the embodiment of FIG. 6A, the focal plane 638 of the first lens 640 is not coincident with the image plane of the image 610. Accordingly, the input plane of the detector 618 is not necessarily parallel to the image plane of the image 610. Nevertheless, despite the incomplete rotation, an image of the image 610 can be produced by the detector 618 with acceptable blurring, especially since collection efficiency of the detected light 614 may be improved. Note that the angle between the optical axes 612 and 625 may be selected to optimize the tradeoff between blurring due to axial variation of the illuminated region of the target (out of focus depths of the subject) and loss of captured light due to reduction in numerical aperture between objective lens 608 and first lens 624 caused by the increase in the angle between the optical axes 612 and 625.

Figure 6C:
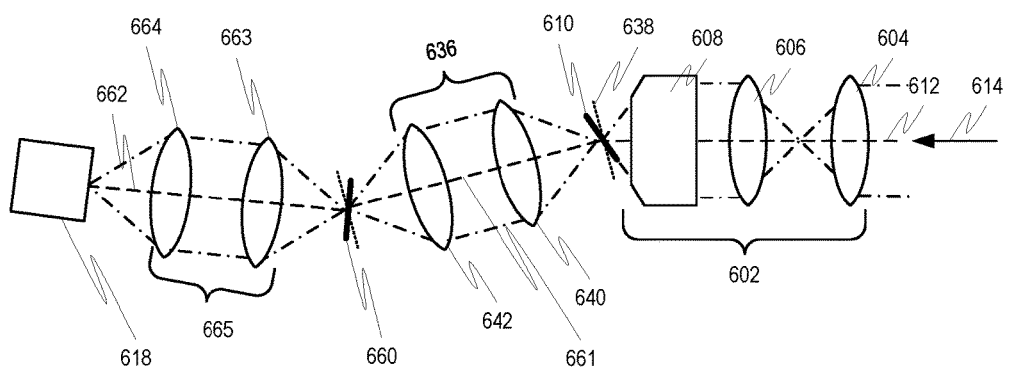
FIG. 6C illustrates a multi-stage alternative optical setup for depth-resolved imaging that can be used for the optional field rotation module 128 in the simplified diagram of FIG. 1, according to one or more embodiments of the disclosed subject matter.

It is further contemplated that image rotation by the field rotation module may occur in multiple stages rather than just a single stage. In such a configuration, each stage of the field rotation module may partially rotate the image, thereby increasing the amount of light that may be collected versus a configuration that completed the rotation in only a single stage. Such a configuration is illustrated in FIG. 6C where the image is only partially rotated in each stage. As in the embodiments of FIGS. 6A-6B, detected light 614 can proceed along optical axis 612 to aberration correction optics 602, which may include a fifth lens 604, a sixth lens 606, and an objective lens 608. The detected light 614 is thus focused to form an intermediate image 610.

In FIG. 6C, the field rotation module may include a first lens stage 636, which includes, for example, a high-numerical aperture ninth lens 640 (e.g., another objective lens) and a tenth lens 642 arranged along a second optical axis 661 that is at an angle (i.e., non-parallel, non-orthogonal angle) with respect to optical axis 612. The field rotation module may include a second lens stage 665, which includes, for example, a high-numerical aperture eleventh lens 663 (e.g., another objective lens) and a twelfth lens 664 arranged along a third optical axis 662 that is at an angle with respect to both optical axes 612 and 661. Thus, the first lens stage 636, which has an input focal plane 638 defined by the first lens 640, partially rotates the image plane of the image 610 to form another intermediate image 660. The second lens stage 665, which has an input focal plane defined by the third lens 663 that is coincident with the image plane of the intermediate image 660, completes the image rotation and allows the image to be mapped onto the input face of the detector 618.

Although two stages are illustrated in FIG. 6C, additional rotation stages are also possible according to one or more contemplated embodiments. For example, two or more lens stages can be provided with each stage rotating the image by the same or a different amount to effect complete or at least partial image rotation. Each of the lens stages can provide gradual magnification of the image from the 1× magnification resulting from lens system 602. This gradual magnification may minimize, or least reduce, any aberration that would result from stretching of the image if the total magnification was performed in a single lens stage.

Although the individual lenses and lens stages are shown as separate components, it is further contemplated that the rotation of the image can be performed by using a composite lens system. Such a composite lens system may also be adjustable to accommodate changes in angle of the illumination planar beam as well as optimize alignment.

Figure 6D:
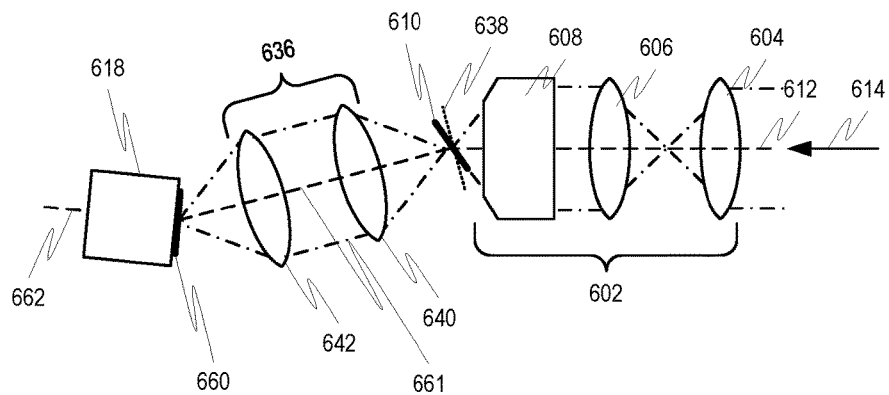
FIG. 6D illustrates a further alternative optical setup with depth-resolved imaging that can be used for the optional field rotation module 128 in the simplified diagram of FIG. 1, according to one or more embodiments of the disclosed subject matter.

As noted above, in some embodiments, incomplete image rotation may be desirable to increase the amount of light recovered for imaging. For example, FIG. 6D illustrates a field rotation module configuration where the image is only partially rotated. As in the embodiment of FIG. 6A, detected light 614 can proceed along optical axis 612 to aberration correction optics 602, which may include a fifth lens 604, a sixth lens 606, and an objective lens 608. The detected light 614 is thus focused to form an intermediate image 610.

Similar to the embodiment of FIG. 6C, the field rotation module may include a lens system 636, which includes, for example, a high-numerical aperture ninth lens 640 (e.g., another objective lens) and a tenth lens 642 arranged along a second optical axis 661 that is at an angle (i.e., non-parallel, non-orthogonal angle) with respect to optical axis 612. However, the detector 618 can be placed with an input plane thereof perpendicular to a third optical axis 662, which is at an angle with respect to the second optical axis, and aligned with the image plane of the intermediate image 660. As a result, a focused image of the image 610 can be produced by the detector 618.

Figure 6E:
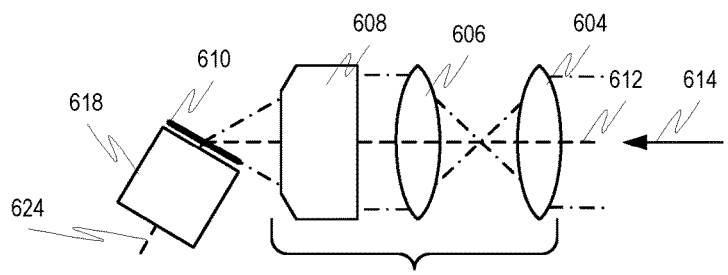
FIG. 6E illustrates an alternative optical setup for the simplified diagram of FIG. 1 without optional field rotation module 128, according to one or more embodiments of the disclosed subject matter.
Figure 6F:
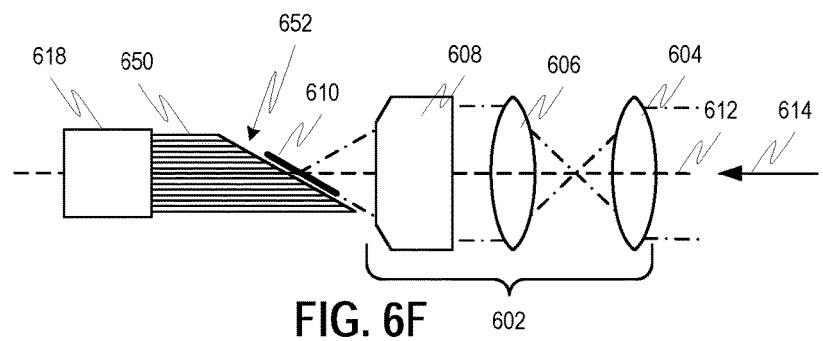
FIG. 6F illustrates an alternative optical setup employing an array of optical fibers for the simplified diagram of FIG. 1 without optional field rotation module 128, according to one or more embodiments of the disclosed subject matter.

In other configurations, image rotation using a field rotation module can be avoided altogether. For example, a detector 618 can be placed with its detection face at the image plane of the image 610, as illustrated in FIG. 6E. Such a configuration can avoid significant light losses and aberrations associated with image rotation optics. Alternatively or additionally, a dense fiber array 650 can be positioned with a beveled end 652 that matches the angle of the image 610 plane, as illustrated in FIG. 6F. The fiber array 650 thus relays the angled detection plane to the flat detection face of the detector 618, such that the image can be directly mapped onto detector.

Figure 6G:
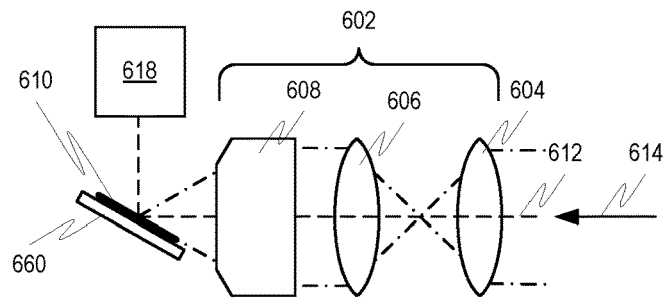
FIG. 6G illustrates an alternative optical setup employing a spatial light modulator or custom optical component that can be used for the optional field rotation module 128 in the simplified diagram of FIG. 1, according to one or more embodiments of the disclosed subject matter.

In still other configurations, the field rotation module may include custom optical components that manipulate the optical field of the image without using the rotation configurations of FIGS. 6A-6D. For example, the relative position of the de-scanned image plane 610 does not change during scanning such that correction optics can be static during 3-D scanning. A spatial light modulator 660 can take advantage of this static de-scanned image plane to reorient the image for detection by detector 618, as illustrated in FIG. 6G. For example, the spatial light modulator 660 can independently adjust the phase and/or direction of light incident at each point along its face to refocus each point on the image plane 610 to a normal plane at the detector 618. Alternatively or additionally, once a desired pattern is optimized using the spatial light modulator 660, the spatial light modulator 660 can be replaced with a custom optical component that provides the desired refraction pattern or an equivalent reflection or transmission pattern by using the optimized spatial light modulator as a design target.

Alternatively or additionally, a mirror (not shown) can be provided at the image plane 610 to reflect the image to a detector, similar to the location of the SLM in FIG. 6G. In such a configuration, the detector 618 may detect the image without rotation, similar to the embodiment described above with respect to FIG. 6E.

Figure 6H:
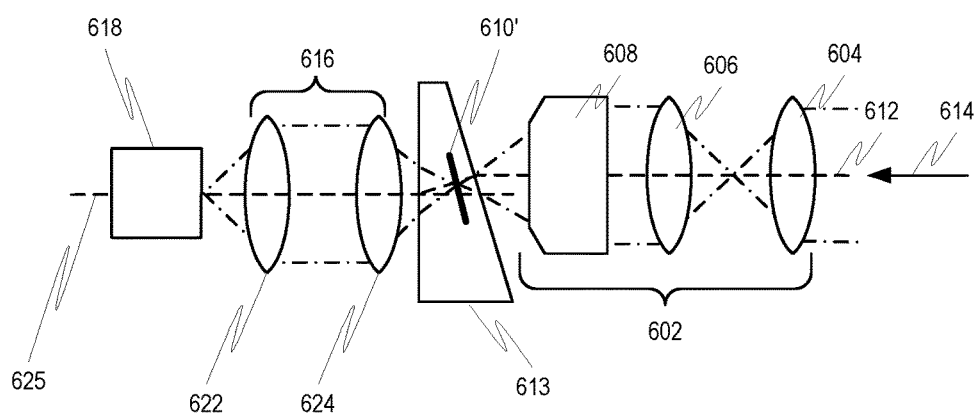
FIG. 6H illustrates an alternative optical setup employing a wedge component that can be used in the optional field rotation module 128 in the simplified diagram of FIG. 1, according to one or more embodiments of the disclosed subject matter.

In still other configurations, the field rotation module may include a light-redirecting element to orient an image plane acquired by the detection module 104 thereby substituting for field rotation. See the discussion of FIGS. 20A and 20B, infra. Referring to FIG. 6H, an optical wedge 613 may be inserted between the lens system 616 and aberration correction optics 602, as illustrated in FIG. 6H. The wedge 613 may cause the otherwise-oblique image 610 to rotate partially or fully to yield intermediate image 610' plane that is rotated such as to permit such that the detection module 104 (lens system 616) optical axis 625 to be parallel to the aberration correction optics 602 optical axis 612, which may improve light capture efficiency as well as decrease image blurring. Alternatively or additionally, the optical axis 625 can be offset from optical axis 612 due to the introduction of the wedge 613. The optical wedge 613 may be selected such that the detection module 104 (lens system 616) optical axis 625 is parallel to the aberration correction optics 602 optical axis 612. Note that FIG. 6H shows one axial position and extent while further embodiments discussed with reference to FIGS. 20A through 20D may have other axial positions. FIGS. 20C and 20D show additional embodiments employing one or more light redirector elements which are adapted to rotate a plane of an intermediate image.

Figure 6I:
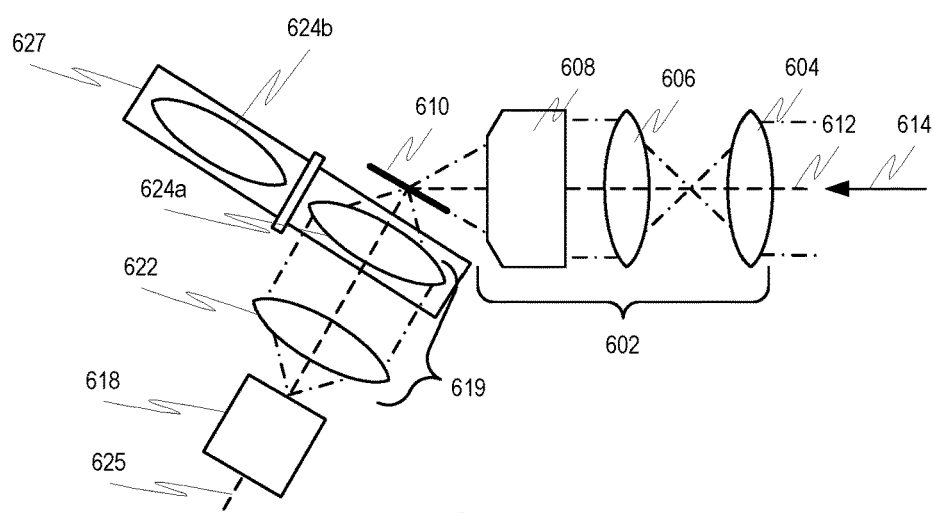
FIG. 6I illustrates a variation for the optional field rotation module 128 employing selectable lenses to provide different magnifications, according to one or more embodiments of the disclosed subject matter.

In some embodiments, additional lenses (not shown) can be added within the beam path between the image plane of the image 610 and the detector 618 to adjust the magnification of the image to match the size of the detector 618. Alternatively or additionally, the lens system 619 following the image 610 can be provided with a selectable lens module 627 for changing between lenses with different characteristics, as illustrated in FIG. 6I. For example, selectable lens module 627 can be an objective lens turret supporting a plurality of objective lenses 624a-624b with different magnifications, working distances, and/or numerical apertures. Although only two lenses 624a-624b are illustrated in FIG. 6I, fewer or additional lenses are also possible according to one or more contemplated embodiments.

Referring to FIGS. 7A-8E, configurations for the image conditioning module 130 of FIG. 1 are illustrated. As discussed above, the image conditioning module 130 may include one or more optics and/or components that condition the detected light (i.e., adjusting position, magnification, and/or angle of the image plane) for final detection by an imaging module 132. Such optics and/or components of the image conditioning module 130 can be distributed within detection module 104, for example, before, within, or after the field rotation module 128 and/or image-forming module 126.

Figure 7A:
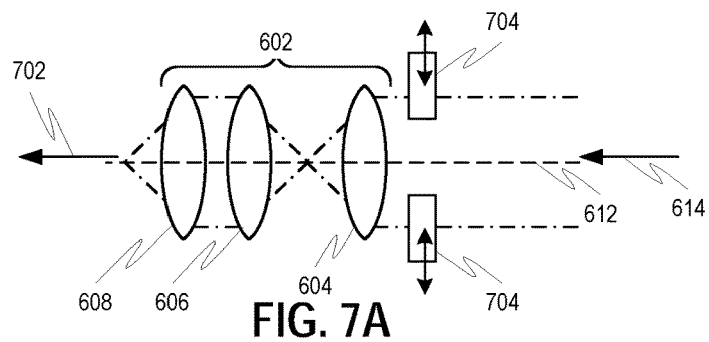
FIG. 7A illustrates a detection arm setup employing movable stops to adjust the aperture and that can be used as part of the image conditioning module 130 of FIG. 1, according to one or more embodiments of the disclosed subject matter.

In some embodiments, the image/forming processing module may include an adjustable aperture 704 disposed before optics of an image-forming module 602, as illustrated in FIG. 7A. Similar to the embodiment of FIG. 6A, detected light 614 can proceed along optical axis 612 to image-forming optics 602, which may include a fifth lens 604, a sixth lens 606, and an objective lens 608. The detected light 614 is thus focused to form an intermediate image and is directed to other modules of the detection module 104 at 702. The adjustable aperture 704, which is provided before the fifth lens 604 of the image-forming optics 602 can be used to adjust the numerical aperture of the detected light. Alternatively or additionally, the adjustable aperture 704 can be provided between lens 606 and objective lens 608.

Figure 7B:
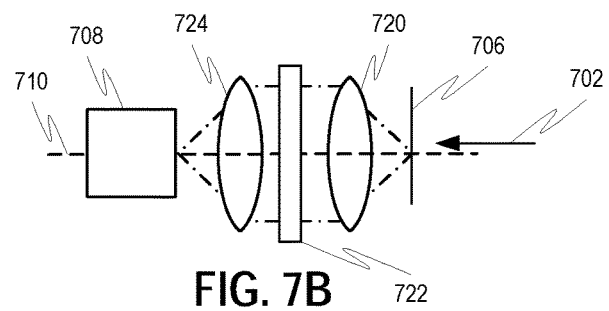
FIG. 7B illustrates a detection arm setup employing an emission filter and that can be used as part of the image conditioning module 130 of FIG. 1, according to one or more embodiments of the disclosed subject matter.

Alternatively or additionally, the image/forming processing module may include one or more imaging lenses and/or an emission filter, as illustrated in FIG. 7B. Detected light 702 from image-forming module and/or field rotation module can be provided along optical axis 710, with an image plane 706 for the image perpendicular to the optical axis 710 and coinciding with a focal plane of a first lens 720. Light from the image plane 706 is refracted by the first lens 720 to form a beam that passes through emission filter 722 (i.e., that allows emission wavelengths of the detected light to pass but blocks excitation wavelengths of the illumination light). Second lens 724 can focus the filtered detection light onto the input plane of a detector 708 for imaging.

Alternatively or additionally, the image/forming processing module may include optical components to account for intensity variations within the image. In particular, when imaging deeper structures within a subject, light detected from shallow to deep layers can be attenuated to different degrees. For example, since the image of an obliquely illuminated plane is captured in a single detection frame, signals corresponding to structures closest to the surface of the subject could be relatively strong while signals corresponding to the deeper structures in the subject could be relatively weak. For certain subjects, the detector could be saturated by this brighter signal.

Figure 7C:
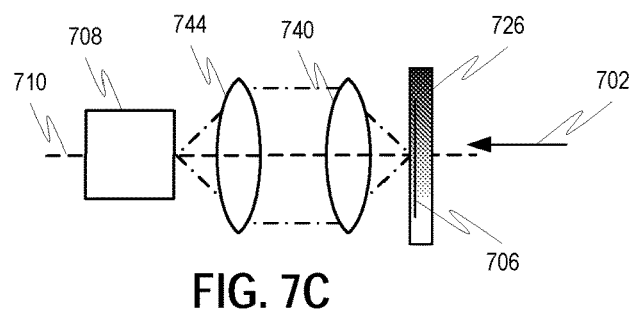
FIG. 7C illustrates a detection arm setup employing a graded filter and that can be used as part of the image conditioning module 130 of FIG. 1, according to one or more embodiments of the disclosed subject matter.

To extend dynamic range of the system, it is possible to use a spatially varying attenuator 726 (e.g., a neutral density gradient filter), for example, at the input face of the detector 708 or at or near an intermediate image plane 706 between the second module 103 and the detector 708, as illustrated in FIG. 7C. Thus, the image mapped onto the detector 708 by lenses can 740, 740 can be compensated for spatially varying intensity values. Alternatively or additionally, a strip of attenuator (e.g., a partially reflective or absorbing glass or film) can be positioned to decrease the intensity of detected light reaching the detector from the upper layers of the subject, while letting all or at least more of the light from the deeper layers to reach the detector. This can permit higher incident light illumination or detector integration time/gain without saturation.

Alternatively or additionally, a graded attenuator could be used to achieve a similar effect as in FIG. 7C. Such attenuators could be physically moved in plane parallel to the image plane 706 (or altered using a LCD-type adjustable filter or reflective surface such as an SLM or digital micromirror device (DMD)) to adjust the amount of attenuation in a subject-specific manner. Information about the location of a sliding attenuator, or the relative pattern of attenuation from a spatially varying attenuator, can be used during image processing to correct data acquired by the detector 708 for this attenuation.

Figure 7D:
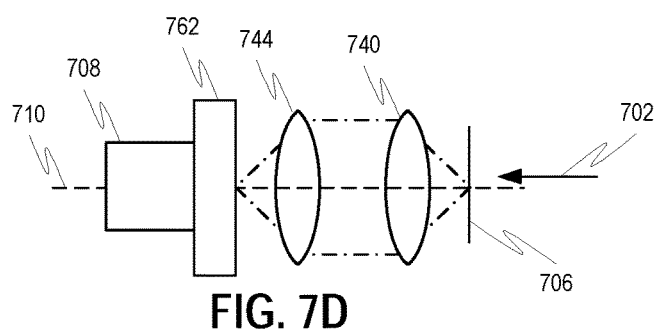
FIG. 7D illustrates a detection arm setup employing an image intensifier and that can be used as part of the image conditioning module 130 of FIG. 1, according to one or more embodiments of the disclosed subject matter.

Alternatively or additionally, the image conditioning module may include an image intensifier 762 to amplify the intensity of the detected light prior to detection by the detector 708, as illustrated in FIG. 7D. While the image intensifier may decrease resolution, it can significantly increase detection efficiency for low light levels, thereby increasing imaging speed. The image intensifier 762 can be disposed at, or just prior to, the detection plane of the detector 708, although other locations of the image intensifier 762 are also possible according to one or more contemplated embodiments. Alternatively, the image intensifier 762 may be an integrated part of detector 708.

Alternatively or additionally, the image conditioning module may include one or more components for multi-wavelength imaging of the detected light. For example, multiple wavelengths or sources of light (in parallel or sequentially) can be used to illuminate the subject to evoke different physical processes in the subject. Spectral separation of detected light can be used to permit multi-color detection and imaging. For example, various color channels can be separated onto different parts of a detector chip and custom parts can be commissioned for a variety of wavelength channel separations. Such separation may be limited by detector pixel density, frame rate and the optics available to perform the spectral separation.

Figure 8A:
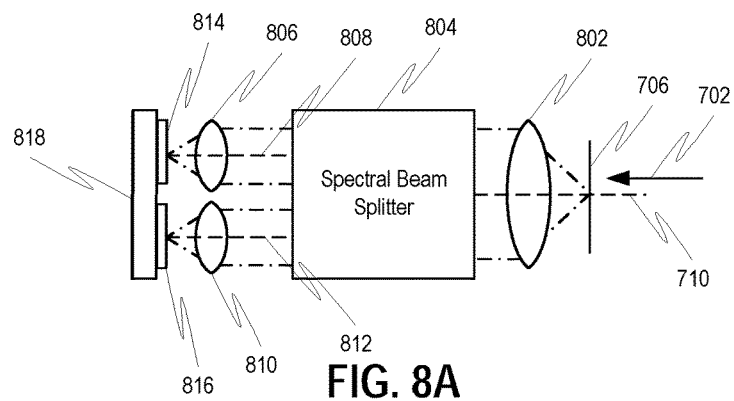
FIG. 8A illustrates a detection arm setup employing a spectral beam splitter and that can be used as part of the image conditioning module 130 of FIG. 1, according to one or more embodiments of the disclosed subject matter.

For example, the multi-wavelength detection can be provided by using a spectral beam splitter 804, as illustrated in FIG. 8A. Detected light 702 from image-forming module and/or field rotation module can be provided along optical axis 710, with an image plane 706 for the image perpendicular to the optical axis 710 and coinciding with a focal plane of a first lens 802. Light from the image plane 706 is refracted by the first lens 802 to form a substantially parallel beam that passes through spectral beam splitter 804. The spectral beam splitter 804 can separate the detected light 702 into different optical paths, e.g., 808 and 812, depending on the wavelength of the detected light. Each optical path 808, 812 may be provided with a respective second lens 806, 810 that focuses the separated light onto respective detection regions 814, 816 of detector 818. The control module 150 may combine the images generated by detection regions 814, 816 to form a single multi-color image.

Figure 8B:
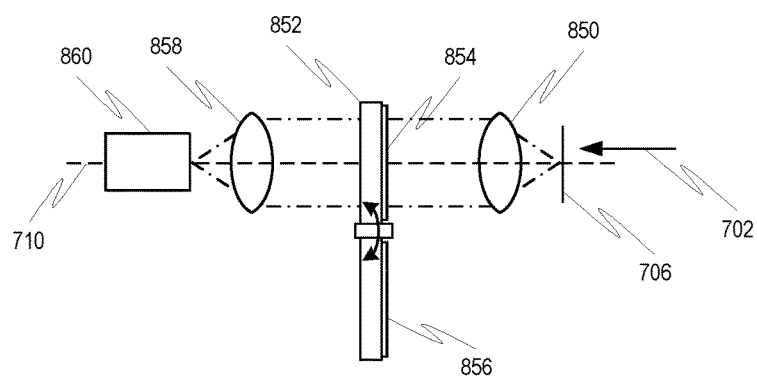
FIG. 8B illustrates a detection arm setup employing a filter wheel and that can be used as part of the image conditioning module 130 of FIG. 1, according to one or more embodiments of the disclosed subject matter.

Alternatively or additionally, the multi-wavelength detection can be provided by a filter wheel 852, as illustrated in FIG. 8B. Detected light 702 from image-forming module and/or field rotation module can be provided along optical axis 710, with an image plane 706 for the image perpendicular to the optical axis 710 and coinciding with a focal plane of a first lens 850. Light from the image plane 706 is refracted by the first lens 850 to form a substantially parallel beam that passes through a selected first filter 854 of the filter wheel 852. Filtered light is then focused by a second lens 858 onto detector 860 for imaging. Different wavelength images can be obtained by rotating the filter wheel such that another filter, e.g., filter 856, is in the optical path between lenses 850 and 858. In this manner, different color images may be sequentially obtained for detected light 702. As with the embodiment of FIG. 8A, the control module 150 may combine the sequentially obtained different color images to form a single multi-color image.

Figure 8C:
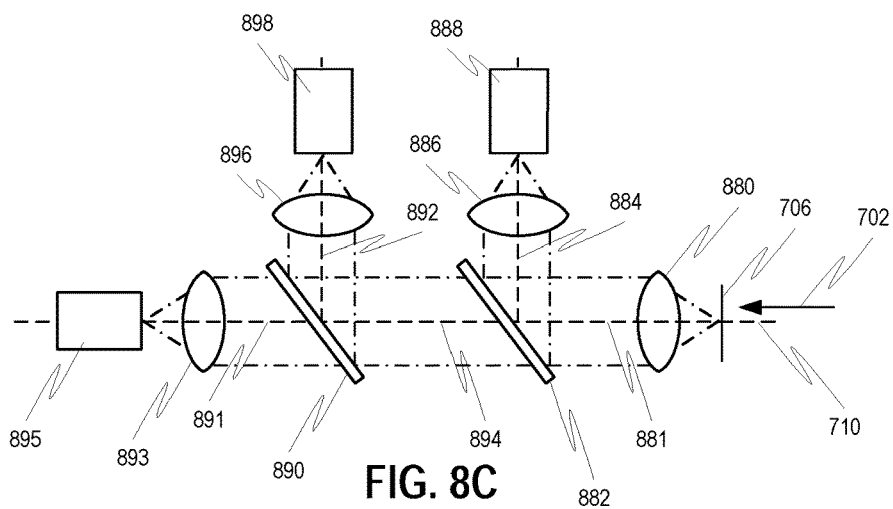
FIG. 8C illustrates a detection arm setup using multiple wavelength selective beam splitters and that can be used as part of the image conditioning module 130 of FIG. 1, according to one or more embodiments of the disclosed subject matter.
Figure 8D:
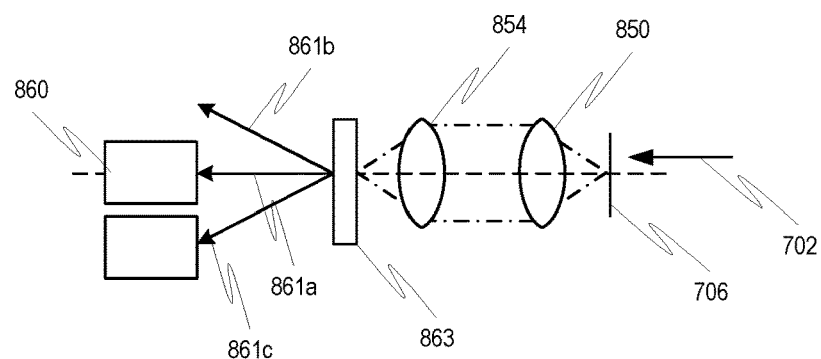
FIG. 8D illustrates a detection arm setup using an acousto-optic tunable filter and that can be used as part of the image conditioning module 130 of FIG. 1, according to one or more embodiments of the disclosed subject matter.

In some configurations where multi-spectral imaging is desired, a filter wheel 852 may not be sufficiently fast to provide real-time imaging for different wavelengths. Instead of filter wheel 852, an acousto-optical tunable filter (AOTF) 863 can be used, as illustrated in FIG. 8D. The AOTF 863 can use the acousto-optic effect to change the diffraction of light passing therethrough using sound waves. Thus, using a first sound wave, the acousto-optic filter 863 can direct light 861a having a first wavelength onto detector 860. Light 861b and 861c having a different wavelength than the first wavelength is refracted away from detector 860. But by increasing or decreasing the frequency of the sound waves for the AOTF 863, light 861b or 861c can be refracted onto the detector 860 in turn. Since the AOTF 863 does not involve moving parts, it can potentially change between different wavelengths quicker than a rotating filter wheel 852.

Alternatively, to provide multi-spectral imaging, multiple detectors can be used to image the different wavelengths at the same time. FIG. 8C illustrates such a configuration, which employs a combination of multiple detectors and wavelength selective beam splitters (e.g., dichroics). Detected light 702 from image-forming module and/or field rotation module can be provided along optical axis 710, with an image plane 706 for the image perpendicular to the optical axis 710 and coinciding with a focal plane of a first lens 880. Light from the image plane 706 is refracted by the first lens 880 to form beam 881. The beam 881 is incident on a first beam splitter 882 that allows light 894 having first and second wavelengths ($\lambda_1$, $\lambda_2$) to pass therethrough but reflects light 884 having third wavelengths ($\lambda_3$). For example, where the beam splitter 882 is a long pass beam splitter, $\lambda_1$ and $\lambda_2$ may be greater than $\lambda_3$. The reflected light 884 is then focused by a lens 886 onto a first detector 888 for imaging. The transmitted light beam 894 can then be incident on a second beam splitter 890 that allows light 891 having the first wavelength ($\lambda_1$) to pass therethrough but reflects light 892 having the second wavelength ($\lambda_2$). For example, where the beam splitter 890 is a long pass beam splitter, $\lambda_1$ may be greater than $\lambda_2$. The reflected light 892 is then focused by a lens 896 onto a second detector 898 for imaging, while the transmitted light 891 is focused by a lens 893 onto a third detector 895 for imaging. In this manner, different color images may be simultaneously obtained for detected light 702. As with the embodiment of FIG. 8A, the control module 150 may combine the sequentially obtained different color images to form a single multi-color image.

Other configurations of the beam splitters and detectors are also possible according to one or more contemplated embodiments. For example, more or fewer numbers of beam splitter, detectors, and/or wavelengths than those specifically illustrated in FIG. 8C can be provided. Moreover, the beam splitters can be short-pass beam splitters rather than long-pass beam splitters. Other variations and configurations should be readily apparent to one of ordinary skill in the art.

Figure 8E:
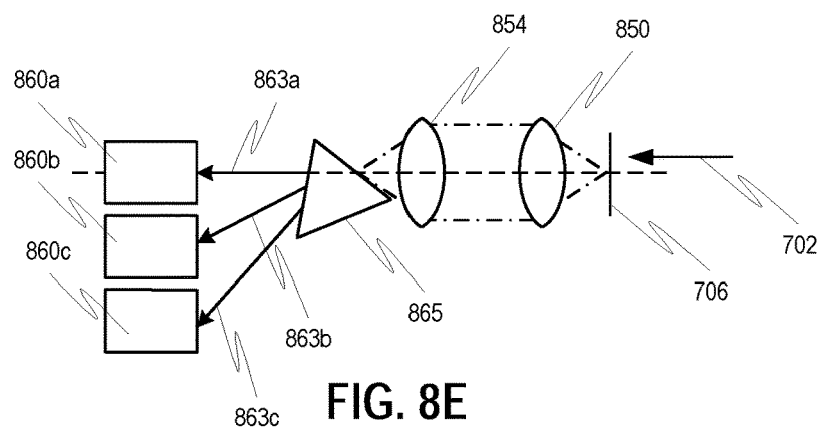
FIG. 8E illustrates a detection arm setup using a prism and that can be used as part of the image conditioning module 130 of FIG. 1, according to one or more embodiments of the disclosed subject matter.

Alternatively, the multiple beam splitters 882/890 of FIG. 8C can be replaced by a prism 865, as illustrated in FIG. 8E. Thus, detected light 702 from image-forming module and/or field rotation module can be provided along optical axis 710, with an image plane 706 for the image perpendicular to the optical axis 710 and coinciding with a focal plane of a first lens 850. Light from the image plane 706 is refracted by the first lens 850 and then focused by second lens 854 onto an input face of prism 865. For example, prism 865 can be a dispersive prism that refracts input light along different directions based on the wavelength of the light. Thus, light 863a having a first wavelength can be directed to a first detector 860a, light 863b having a second wavelength can be directed to a second detector, and light 863c having a third wavelength can be directed to a third detector 860b. In this manner, different color images may be simultaneously obtained for detected light 702. Another alternative to a prism may be a diffracting element such as a reflective grating which may perform essentially the same function.

Although only three detectors are illustrated in FIG. 8C, fewer or additional detectors are also possible according to one or more contemplated embodiments. In addition, although the detectors 860a-860c are shown as separate components, the detectors could be part of a single detector unit. For example, detectors 860a-860c could be individual detector elements of a single detector or detector array.

Other optical elements for spatially separating different wavelengths for simultaneous detection by one or more detectors are also possible according to one or more contemplated embodiments. For example, the prism 865 in FIG. 8E could be replaced with a diffraction grating.

Figure 9A:
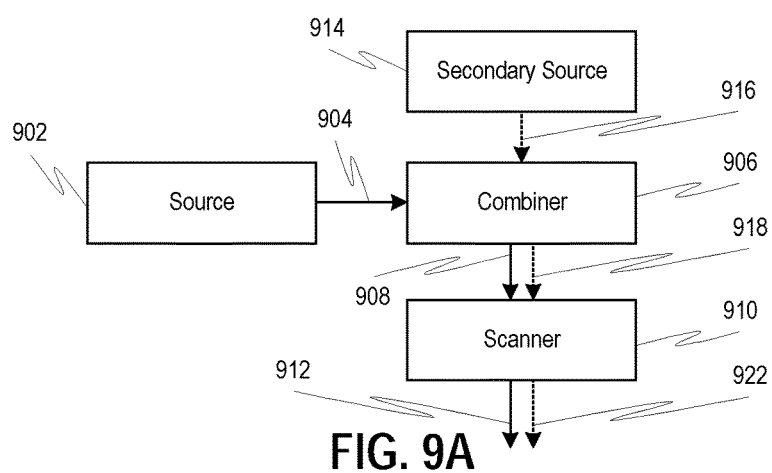
FIG. 9A is a schematic diagram illustrating a first arrangement for primary 122 and secondary 124 illumination sources of FIG. 1, according to one or more embodiments of the disclosed subject matter.
Figure 9B:
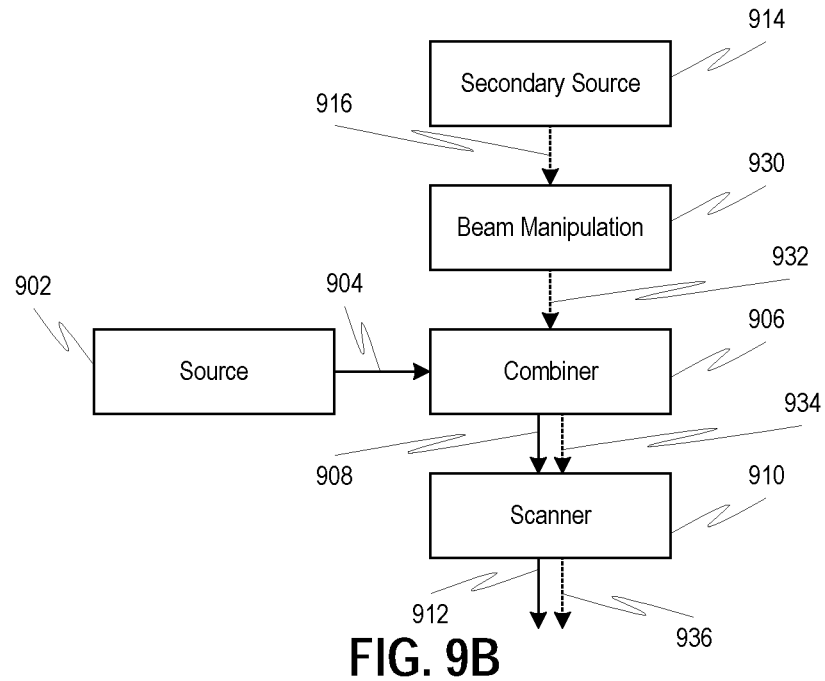
FIG. 9B is a schematic diagram illustrating a second arrangement for primary 122 and secondary 124 illumination sources of FIG. 1, according to one or more embodiments of the disclosed subject matter.
Figure 9C:
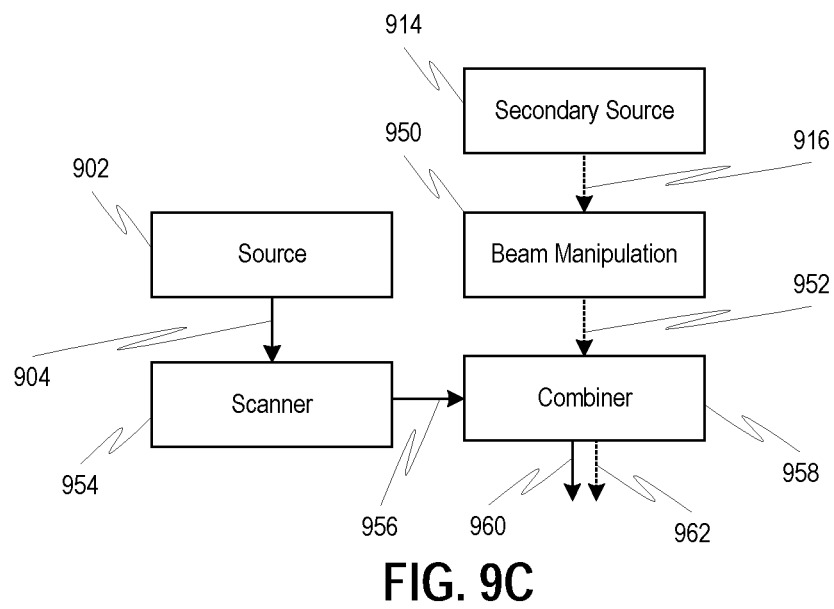
FIG. 9C is a schematic diagram illustrating a third arrangement for primary 122 and secondary 124 illumination sources of FIG. 1, according to one or more embodiments of the disclosed subject matter.

Referring to FIGS. 9A-9C, configurations for the scanning 116, de-scanning 118, and separation modules 112 for primary 122 and secondary 124 illumination sources of FIG. 1 are illustrated. As noted above, the secondary illumination source 124 may be used to provide photo-manipulation, stimulated emission-depletion (STED), or any other desired effect on the subject independent of or in conjunction with light from the primary illumination source 122. For example, the secondary illumination from source 124 may propagate along a similar optical path through the second module 103 as the primary illumination. Such a configuration is shown in FIG. 9A. Primary illumination 904 from illumination module 902 can be directed to a beam separation module 906, which directs the primary illumination 908 toward a scanning module 910. Similarly, secondary illumination 916 from secondary illumination source 914 can be directed to the beam separation module 906, where it is directed at 918 along the same optical path as the primary illumination 908 to the scanning module 910. The scanning module 910 can then direct the primary illumination 912 and the secondary illumination 922 to scan through the subject, either simultaneously or sequentially.

Alternatively or additionally, the secondary illumination can be provided with one or more beam manipulation components 930, for example, SLMs, beam steering mirrors or optics, acousto-optic deflectors, phase plates, adaptive optics, or any other optical components to achieve the desired manipulation, as illustrated in FIG. 9B. Thus, the beam manipulation components 930 can be provided between the secondary illumination source 914 and the beam separation module 906 so as to manipulate the light prior to combination with the primary illumination light 908 and scanning 936 by scanning module 910.

In some configurations (e.g., a photo-manipulation configuration), the secondary illumination 916 from source 914 may be provided directly to the focusing module 108 (e.g., via beam separation module 958) rather than passing by way of scanning module 954. Thus, the primary illumination light 960 may be scanned through the subject via scanning module 954 while the secondary illumination light 962 is static or at least unaffected by the scanning.

Referring to FIG. 10, an embodiment of DR imaging system employing a single scanning mirror 1010 is illustrated. Illumination light 1004, such as an illumination planar beam or line, can be provided from a primary illumination module 1002, such as illumination module 102 in FIG. 1. The illumination light 1004 is incident on a beam splitter 1006, such as a dichroic or polarizing beam splitter, which acts to reflect the light along optical path 1008. The illumination light is then redirected by scanning mirror 1010 through scan lens 1012 and tubular lens 1014 (which lenses 1012, 1014 together form a telescope) to an edge portion at the back aperture of objective lens 1016. The objective lens 1016 focuses the illumination light into a planar illumination beam 1020 within the subject. The scanning mirror 1010 is configured to alter the direction of the illumination light such that the angle the illumination light makes with the edge portion at the back aperture of the objective lens 1016 changes, thereby scanning the illumination planar beam 1020 within the subject.

The resulting light 1022 can be collected by the objective lens 1016 based on its full numerical aperture. Detected light from the objective 1016 can pass through the telescope formed by lenses 1012, 1014 along optical axis 1026 so at to be incident on the same scanning mirror 1010 as the illumination light. The scanning mirror 1010 can thus de-scan the detection light, i.e., by redirecting the detection light along optical axis 1030 toward detection module 1036, as well as scan the illumination light beam 1008. The illustrated configuration using a single mirror 1010 for scanning and de-scanning allows sampling the 'full aperture' of light emerging from the subject, which can improve resolution and throughput as compared to partial aperture implementations, such as the embodiment in FIG. 12.

After de-scanning by the scanning mirror 1010, the detection light can be incident on beam splitter 1006, which is constructed to allow all or some of the detected light (e.g., based on wavelength or polarization thereof) to pass therethrough. One or more detection module optics, exemplified by lens 1038 (although additional optics and/or components are contemplated, for example, as discussed with respect to FIGS. 6A-7D above), can be used to form an intermediate image 1034, which can then be further processed by detection module 1036, such as detection module 104 in FIG. 1, to generate an image of the illuminated region in the subject.

Referring to FIG. 11, an alternative embodiment of DR imaging system employing separate scanning and de-scanning mirrors is illustrated. Illumination light 1004, such as an illumination planar beam or line, can be provided from a primary illumination module 1002, such as illumination module 102 in FIG. 1. The illumination light 1004 is incident on a scanning mirror 1128, which redirects the illumination light 1104 through scan lens 1106 and tubular lens 1108 (which lenses 1106, 1108 together form a first telescope) to a beam splitter 1110, such as a dichroic or polarizing beam splitter. The beam splitter 1110 reflects the light along optical path 1112 such that it is incident on an edge portion at the back aperture of objective lens 1016. The objective lens 1016 focuses the illumination light into a planar illumination beam 1020 (oblique relative to the axis) within the subject. The scanning mirror 1128 is configured to alter the direction of the illumination light such that the angle the illumination light makes with the edge portion at the back aperture of the objective lens 1016 changes, thereby scanning the illumination planar beam 1020 within the subject.

The resulting light 1022 can be collected by the objective lens 1016 based on its full numerical aperture, similar to the embodiment of FIG. 10. However, rather than passing through the same telescope as the illumination light in FIG. 10, the detected light from the objective 1016 passes through the beam splitter 1110 (either partially based on polarization or completely based on wavelength) so as to proceed along a different optical path 1120 than the illumination light 1104. Thus, the detected light proceeds from the beam splitter 1110 to its own tubular lens 1114 and de-scan lens 1116 (which lenses 1114, 1116 together form a second telescope), which direct the detected light 1120 onto a separate de-scan mirror 1122. The de-scan mirror 1122 can de-scan the detection light, i.e., by redirecting the detection light along optical axis 1128 toward detection module 1036. Thus, mirror 1128 scans the planar illumination beam 1004, while the other mirror 1122 de-scans the returning light. The respective movements of the mirrors 1122, 1128 can be synchronized such that the detected image at the detection device corresponds to the illuminated plane within the subject.

After de-scanning by the de-scan mirror 1122, the detected light can be directed to one or more detection module optics, exemplified by lens 1124 (although additional optics and/or components are contemplated, for example, as discussed with respect to FIGS. 6A-7D above), which can be used to form an intermediate image 1126. The intermediate image 1126 can be further processed by detection module 1036, such as detection module 104 in FIG. 1, to generate an image of the illuminated region in the subject.

Figure 12:
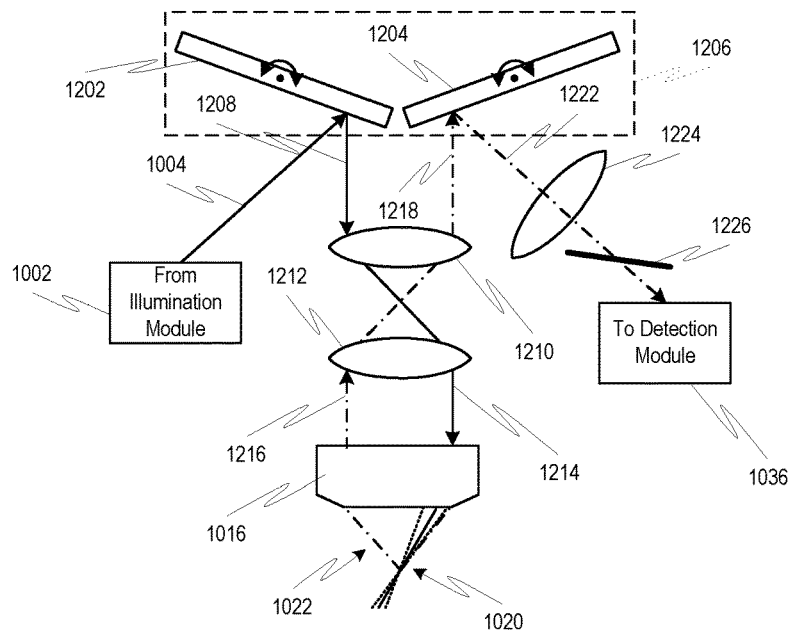
FIG. 12 illustrates a configuration of a depth-resolved imaging system employing moveable mirror panels, according to one or more embodiments of the disclosed subject matter.

Referring to FIG. 12, an alternative embodiment of DR imaging system employing separate scanning and de-scanning mirror portions with partial aperture detection is illustrated. Illumination light 1004, such as an illumination planar beam or line, can be provided from a primary illumination module 1002, such as illumination module 102 in FIG. 1. The illumination light 1004 is incident on a first mirror portion 1202, which redirects the illumination light 1208 through scan lens 1210 and tubular lens 1212 (which lenses 1210, 1210 together form a telescope) such that the illumination light 1214 is incident on an edge portion at the back aperture of objective lens 1016. The objective lens 1016 focuses the illumination light into an oblique planar illumination beam 1020 within the subject. The first mirror portion 1202 is configured to alter the direction of the illumination light such that the angle the illumination light makes with the edge portion at the back aperture of the objective lens 1016 changes, thereby scanning the illumination planar beam 1020 within the subject.

The resulting light 1022 can be collected by the objective lens 1016 based on a partial numerical aperture. That is, detected light 1216 at an opposite edge portion at the back aperture of the objective 1016 is directed to the detector for imaging, whereas other detected light 1022 does not follow an optical path capable of being detected. Detected light can proceed through the telescope formed by lenses 1212 and 1210 so as to be incident on a second mirror portion 1204, which can de-scan the detected light, i.e., by redirecting the detection light 1218 along optical axis 1222 toward detection module 1036. As with the embodiment of FIG. 11, the respective movements of the first and second mirror portions 1202, 1204 can be synchronized such that the detected image at the detection device corresponds to the illuminated plane within the subject.

After de-scanning by the second mirror portion 1204, the detected light 1222 can be directed to one or more detection module optics, exemplified by lens 1224 (although additional optics and/or components are contemplated, for example, as discussed with respect to FIGS. 6A-7D above), which can be used to form an intermediate image 1226. The intermediate image 1226 can be further processed by detection module 1036, such as detection module 104 in FIG. 1, to generate an image of the illuminated region in the subject.

Although illustrated as separate components in FIG. 12, the first and second mirror portions 1202, 1204 may be portions of the same optical component, for example, different mirror facets of a polygonal mirror 1206. Thus, synchronization of the movement of the first and second mirror portions 1202, 1204 can be achieved by simply rotating (or ratcheting back and forth) the polygonal mirror 1206 about its axis of rotation.

Physical coupling of scan and de-scan mirror portions is offered by a polygonal mirror, thereby permitting precisely coupled scanning and de-scanning. However, given that the speed at which the planar beam must be scanned, even for high volume rates of 50-100 volumes per second is relatively slow (e.g., on the order of 50-100 sweeps per second), synchronization of two separate mirrors is readily achievable. In addition, rotation of the polygon mirror does not provide an ideal scan/de-scan pattern since the mirrored facet both translates and rotates as the polygonal mirror rotates about its rotation axis of rotation. This can cause scan/de-scan errors that negatively affect imaging. As noted above, use of the polygonal mirror can limit the detected light to only half of the light emerging from the back aperture of the objective lens 1016, which limits the numerical aperture (NA) of the detected light. The limitation in NA can reduce the resolution of the resulting image and/or reduce the amount of emitted light reaching the detector, thereby reducing the signal-to-noise ratio. Accordingly, some applications may be better served by the single or dual mirror embodiments of FIGS. 10-11.

Figure 13A:
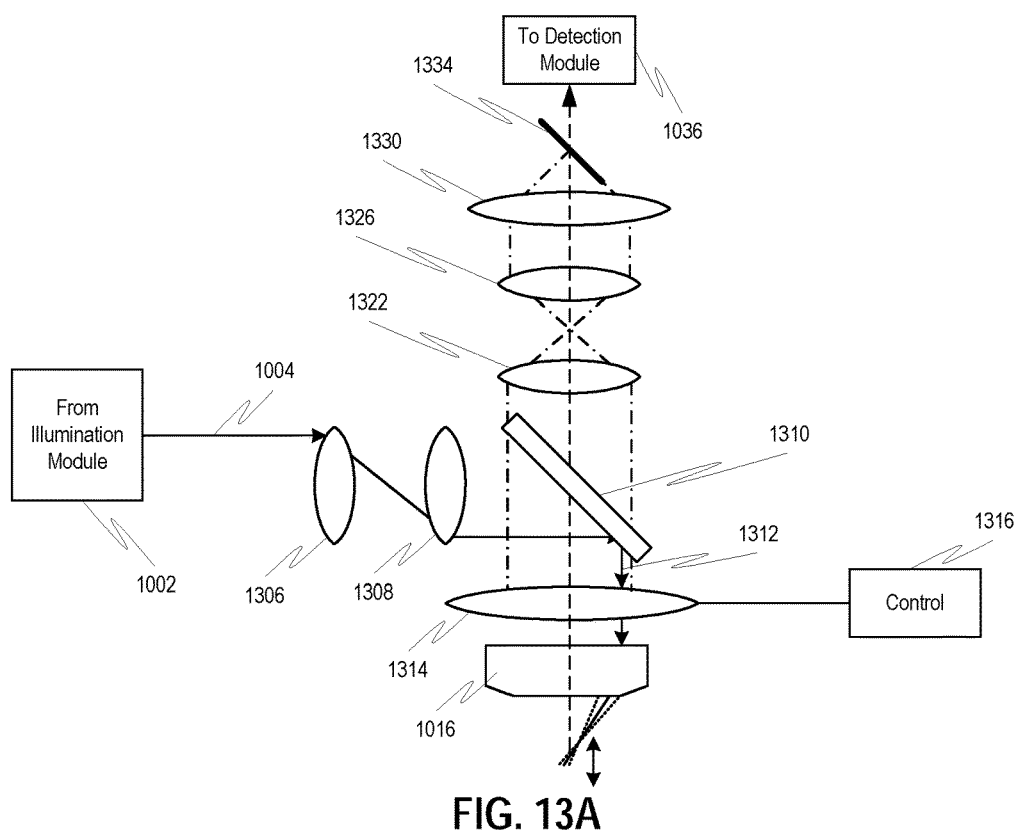
FIG. 13A illustrates a configuration of a depth-resolved imaging system using an electric lens to effect scanning within the subject, according to one or more embodiments of the disclosed subject matter.

Referring to FIG. 13A, an alternative embodiment of DR imaging system employing an electric lens 1314 is illustrated. For example, one or more electric lenses can be used to adjust the vertical position of the illumination and/or detection planes in order to subject the volume. Illumination light 1004 can be provided from a primary illumination module 1002, such as illumination module 102 in FIG. 1. The illumination light 1004 is mapped by a first telescope formed by lenses 1306, 1308 onto beam splitter 1310 (e.g., dichroic) where it is reflected onto the back focal plane of objective lens 1016 via electric lens 1314 to form a planar illumination beam (or line) for scanning within the subject. Detected light passes via objective lens 1016 and electric lens 1314 to beam splitter 1310, where it is mapped by a second telescope formed by lenses 1322, 1326 onto an imaging lens 1330 (e.g., second objective lens) to form intermediate image 1334. Alternatively, the first and second telescopes can be combined such that the illumination and detection light share the telescope (for example, as illustrated by telescope with lenses 1322, 1326 in FIG. 13B).

The electronic lens 1314 can be disposed between the dichroic beam splitter 1310 and the objective lens 1314 to adjust the focus of the illumination beam 1312 with respect to the back focal plane of the objective lens 1314. The electric lens 1314 directs the illumination beam 1312 onto an edge portion at the back aperture of objective lens 1016*a*. As with other embodiments, the objective lens 1016*a* focuses the illumination light into an oblique planar illumination beam 1020 within the subject.

Figure 13B:
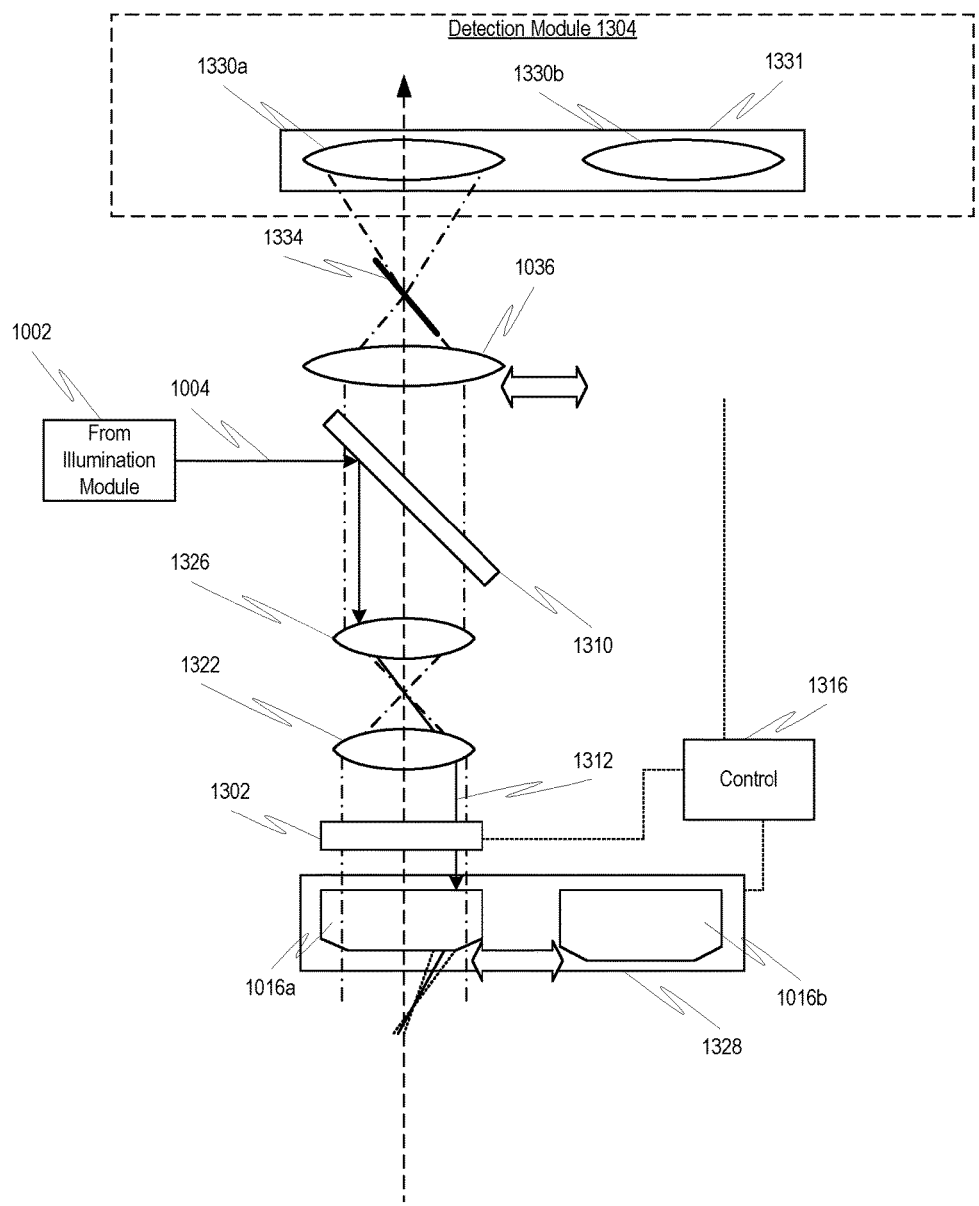
FIG. 13B illustrates configuration of a depth-resolved imaging system with selectable objective lenses to provide different magnifications, according to one or more embodiments of the disclosed subject matter.

The incoming illumination beam of light 1312 can be positioned off-center on the back focal plane of the objective 1016*a* with respect to an optical axis thereof. This position determines the angle of the planar illumination beam in the subject. Some objectives have different sizes and/or locations of back focal plane. If there is a desire to change objective, e.g., to switch from a first objective 1016*a* to a second objective 1016*b*, for example using a turret 1328 of objectives as shown in FIG. 13B. The turret 1328 may include objective lenses of different properties (such as magnification) that can be used interchangeably.

To accommodate switching between objectives 1016*a*, it may be necessary to alter the light path to accommodate the different back aperture geometries. For example, alteration of the illumination beam light path can be achieved by changing the magnification of the scan 1306 and tube 1308 lens combination, which can be done by inserting a zoom-lens type geometry (not shown) in which a combination of concave and convex lenses are moved (via motorized or manual displacement) in combination to alter the position of the beam at the back focal plane of the objective lens 1016*b*. Alternatively or additionally, variable focusing element 1302, which can be a zoom lens or electric lens, can be used to change magnification and/or alter the beam path for the illumination beam 1312 to accommodate the geometry changes introduced by changing objectives. This adjustment could also be achieved through insertion of specially designed lenses or composite lenses attached to each objective lens 1016*b* to be used in the system. Alternatively or additionally, the location of the beam 1312 can be translated across the back focal plane (e.g., by a scanning mirror (not shown)) to account for the different geometry of the objective lens.

Similar adjustment to the lenses on the detection side can also be made to provide different levels of magnification, dependent on the configuration of the detection side optics and method of de-scanning and image rotation. For example, a turret 1331, having lenses 1330*a*, 1330*b*, can be provided at the detector side as the first lens of the detection module 1304.

Switching from objective lens 1016*a* to 1016*b* can cause a corresponding change by objective lens turret 1331 to switch from lens 1330*a* to 1330*b*, for example, to maintain a desired magnification (e.g., 1×) at the intermediate image. Alternatively or additionally, translation of the detection lenses (e.g., lenses 1322, 1326 of the telescope and/or lens 1330*a*) can permit optimal adjustment of the focus of the image on the detector of detector module 1036. A control module 1316 can be provided to coordinate operation of the primary objective lens turret 1328, the secondary lens turret 1331, and/or the variable focusing element 1302.

Figure 14A:
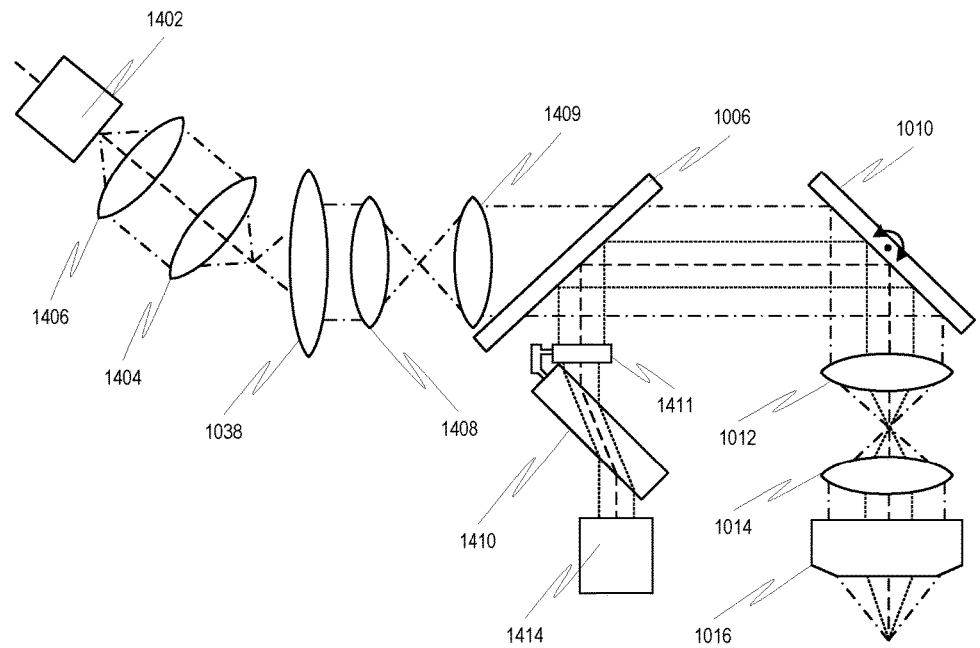
FIGS. 14A and 14B show a multiple mode confocal microscope that is configurable for conventional confocal imaging or depth-resolved imaging according to scanning plane microscopy (DRI) embodiments, respectively, according to embodiments of the disclosed subject matter.
Figure 14B:
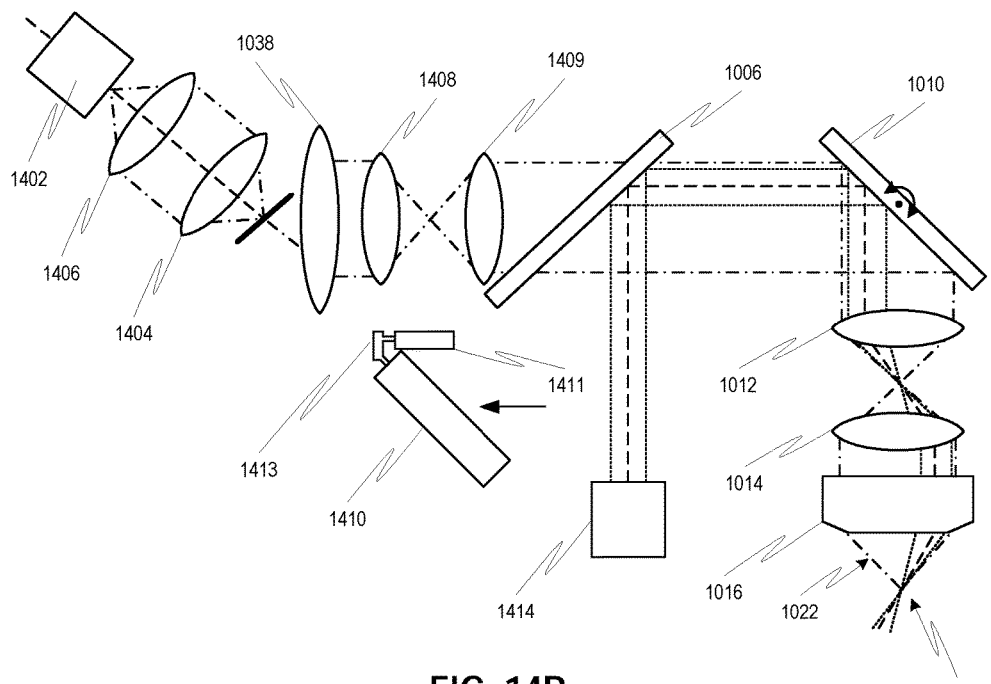

In one or more embodiments, a microscope can provide both DRI/depth-resolved imaging and confocal imaging in different modes. An example of such a microscope is shown in FIGS. 14A-14B, where FIG. 14A represents the system in a confocal configuration and FIG. 14B represents the system in a DRI configuration. An illumination source 1414 generates an illumination beam that is reflected by a beam splitter 1006, in embodiments, a dichroic beam splitter whose reflecting wavelength is selected to direct the illumination beam as shown. A beam translation component 1410 (e.g., a wedge or angled pate) and/or a beam expander 1411 coupled via arm 1413 to the beam translation component 1410 can be selectively provided in the beam path between the source 1414 and the beam splitter 1006. In confocal configurations (as illustrated in FIG. 14A), the beam translation component 1410 and beam expander 1411 can be provided in the beam path so as to shift and expand the beam from the light source to illuminate the subject along optical axis of the objective lens 1016. A scanning mirror 1010 is operative to scan the focus about the axes perpendicular to the optical axes as indicated by the double-headed arrows. An objective lens 1016 focuses the illumination beam onto a focal spot within the subject. An adjustable telescope formed by lenses 1012 and 1014 may be moved to adjust the axial position of the focus 1017 or other mechanisms for axial displacement of the focus may be provided.

An image beam is captured by the objective 1016 and conveyed through the telescope formed by lenses 1012 and 1014, directed by the scanning mirror 1010 through the dichroic beam splitter 1006, through another telescope formed by lenses 1408, 1409, and imaged to an intermediate image plane by lens 1038. A detection arm may include a high numerical aperture lens 1404 (e.g., an objective lens) and an imaging lens 1406 that focuses light onto the detection plane of detector 1402, which may be a two-dimensional detector. The detection arm and/or plane of detector 1402 can be angled, for example, at an appropriate angle for image rotation when operating in DRI mode. However, when operating in confocal mode, the rotation of the detection arm (or detection plane) may be the same as in DRI. Alternatively or additionally, the detection arm can be rotated to align with the optical axis of the imaging lens 1038 and telescope lenses 1408, 1409.

Confocal imaging in the configuration of FIG. 14A can be provided by sampling the central line (row or column, depending on detector orientation) of detection elements of the detector. Additionally or alternatively, the lines of detection elements of the detector adjacent to the central line (e.g., above and below, or to either side, depending on detector orientation) can be used to deconvolve the confocal signal, for example, by using light that would otherwise be rejected by a confocal pinhole to improve signal to noise ratio and image resolution, similar to the concept of Airy scanning (Zeiss systems).

To convert from the confocal microscope configuration of FIG. 14A to the DRI configuration of FIG. 14B, the beam translation component 1410 and beam expander 1413 can be displaced out of the illumination beam path, thereby allowing the illumination beam to proceed to the edge of the objective 1016 by way of beam splitter 1006, scanning mirror 1010, and telescope lenses 1012, 1014. In addition, or as an alternative, a stop plate (not shown) may be provided and shifted into position to adjust the numerical aperture of the illumination beam. The illumination source 1414 may be placed in the selective configuration by which it generates a planar illumination beam within the subject. Once in the DRI configuration, the planar illumination beam 1020 can be scanned and generated light 1022 captured. The light 1022 can be de-scanned via scanning mirror 1010 and transmitted back to the detector 1402 to form an image as in other DRI embodiments.

Figure 15:
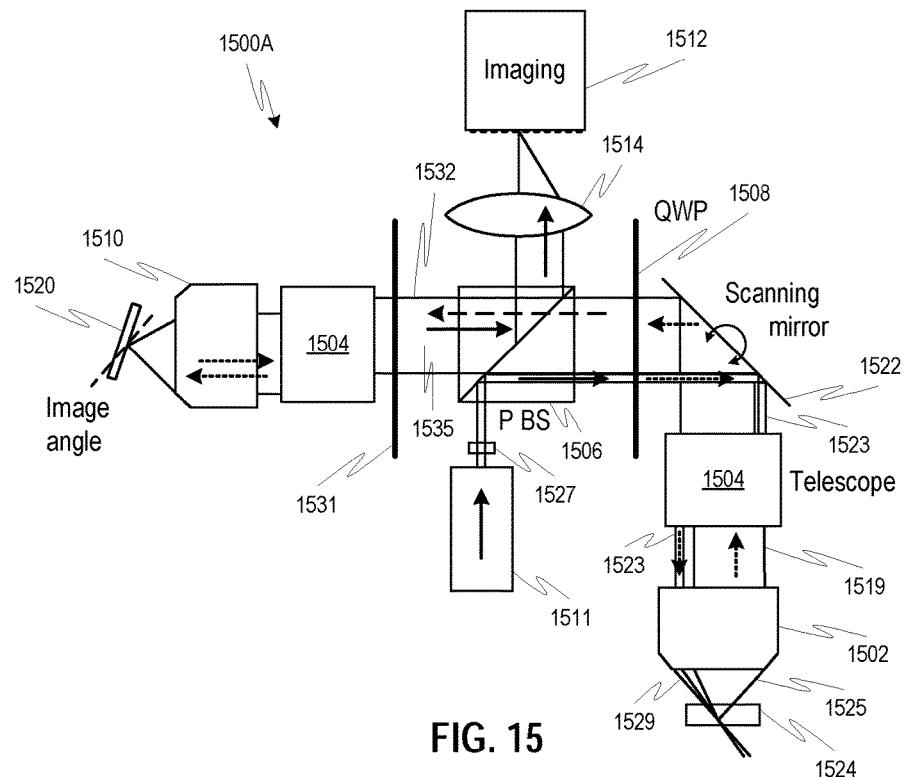
FIG. 15 shows an embodiment employing a single mirror scanning element for both illumination scanning and image beam de-scanning and in which field rotation and image-forming optics employ the same optical elements, according to embodiments of the disclosed subject matter.

Referring to FIG. 15, a microscope 1500A has an objective 1502 positioned to image a subject 1524. The objective 1052 transmits an illumination planar beam 1529 whose width transects the plane of the drawing and which is scanned to cause a traversal through a range of angles and/or positions to scan through a volume of the subject 1524. The scan traversal may be in directions that are parallel to the plane of the drawing and have at least a component that is perpendicular to the plane of the illumination planar beam 1529. An image of the subject illuminated by the illumination planar beam 1529 is captured through an acceptance angular range indicated at 1525. The illumination planar beam 1529 is generated using a light source 1511 which directs an illumination beam using a scanning mirror 1522. A cylindrical lens 1527 may be provided, as in other embodiments, in the light path of the illumination beam 1523 to form a planar beam. The illumination beam 1523 may be conditioned by the light source 1511 to have a planar polarization that is reflected by a polarizing beam splitter 1506 toward the scanning mirror 1522. The illumination beam's polarization may be converted to circular using a quarter wave plate 1508 before it is reflected by the scanning mirror 1522. The illumination beam 1523 passes through a telescope 1504 into the objective 1502 to form illumination planar beam 1529 as discussed in connection with the foregoing and other embodiments.

The scanning mirror 1522 also de-scans the image beam 1519 received through the objective 1502 and the telescope 1504. The image beam 1519 polarization is changed again by the quarter wave plate 1508 to be perpendicular to that of the illumination beam as it emanated from the light source 1511 and therefore passes through the polarizing beam splitter 1506. The image beam 1532 passes through another quarter wave plate 1531 to become circularly polarized. The image beam 1532 passes through a telescope 1504 and a lens assembly 1510 to be reflected by a mirror 1520. The lens assembly 1510 may be selected to have properties identical to objective 1502. The mirror 1520 is oriented at an angle that is half that of an intermediate image that would be formed at the axial position of the mirror 1520, and positioned at the axial position at which a real image would be produced for an image plane in the subject oriented perpendicular to the optical axis. This position and orientation are such that z-axis aberrations generated by objective 1502 are compensated as described in "Vectorial point spread function and optical transfer function in depth-resolved imaging," J Kim, T Li, Y Wang, X Zhang, Optics Express 22 (9), 11140-11151. The image beam 1535 is converted again by the quarter wave plate 1531 such that it is reflected by the polarizing beam splitter 1506 through an imaging lens 1514 to an imaging sensor 1512.

In the configuration of FIG. 15A, a stage or other specimen support may be provided to allow the subject 1524 to be positioned. The subject 1524 is not part of the microscope 1500A. The telescope 1504 may or may not be present. In embodiments, the objective 1502 and lens assembly 1510 are of a telecentric configuration. Lens 1514 is a figurative element and may include a multi-element optical component. The lens assembly 1510 may be identified as a corrective lens assembly since the combination of optical characteristics identical to the objective 1502 and the angular and axial position of the mirror 1520, as explained by Kim, is to compensate the z-axis (optical axis) aberrations by double-passing the image light through it.

The elements of telescope 1504 may be adjustable. Note that in the embodiment of FIG. 15, the use of polarized beam splitter 1506 and quarter wave plates 1531 and 1508 may be such as to minimize the amount of light lost during redirection through the beam splitter 1506. The use of polarized beam splitters and quarter wave plates may be employed in a similar fashion with any of the disclosed embodiments as applicable. In the embodiment of FIG. 15, the single scanning mirror 1522 may be replaced by separate mirrors, one for de-scanning the image beam 1519 and one for scanning the illumination beam 1523. The two mirrors may be controlled for synchronous movement or mechanically coupled.

Figure 16A:
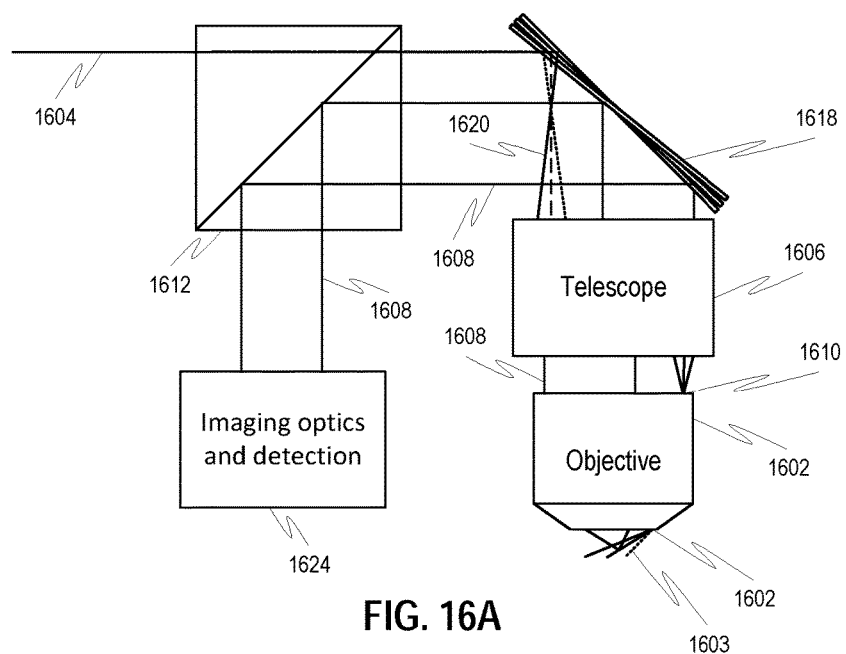
FIG. 16A shows an embodiment employing a single mirror scanning element for both illumination scanning and image beam de-scanning, according to embodiments of the disclosed subject matter.

Referring now to FIG. 16A, a planar beam 1604 may be generated using any of the disclosed methods or others. The planar beam passes through a beam splitter 1612 to be scanned by a scanning mirror 1618, which is shown in multiple orientations in superposition. The imaging and illumination beams pass through a telescope 1606. For each orientation of the scanning mirror 1610, a respective reflected beam is shown at 1620. Although three orientations and beams are shown, it is understood that these may be instance of a continuous range of orientations and beams or ones of a smaller or larger set of discrete orientations and beams. The beams 1620 enter the telescope such that they emerge to enter a region 1610 at different angles at the back aperture of an objective 1602 and such that planar illumination beams 1603 emerge from the objective to sweep a range of angles stemming from the edge of the front aperture of the objective 1602 as indicated at 1601. An image beam 1608 is captured, de-scanned by the scanning mirror 1618 and relayed through the beam splitter 1612 to an imaging device 1624.

Figure 16B:
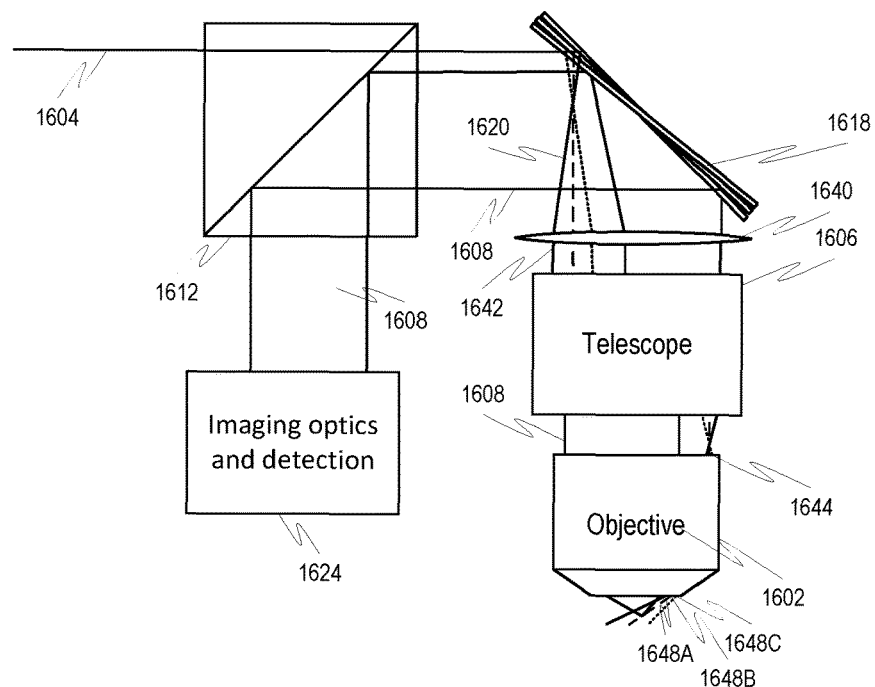
FIG. 16B shows an embodiment employing a single mirror scanning element for both illumination scanning and image beam de-scanning similar to that of FIG. 16A but arranged to walk the illumination beam across the objective front aperture as the illumination beam is tilted, thereby improving the thickness-uniformity of successive three-dimensional slices of the subject, according to embodiments of the disclosed subject matter.
Figure 16C:
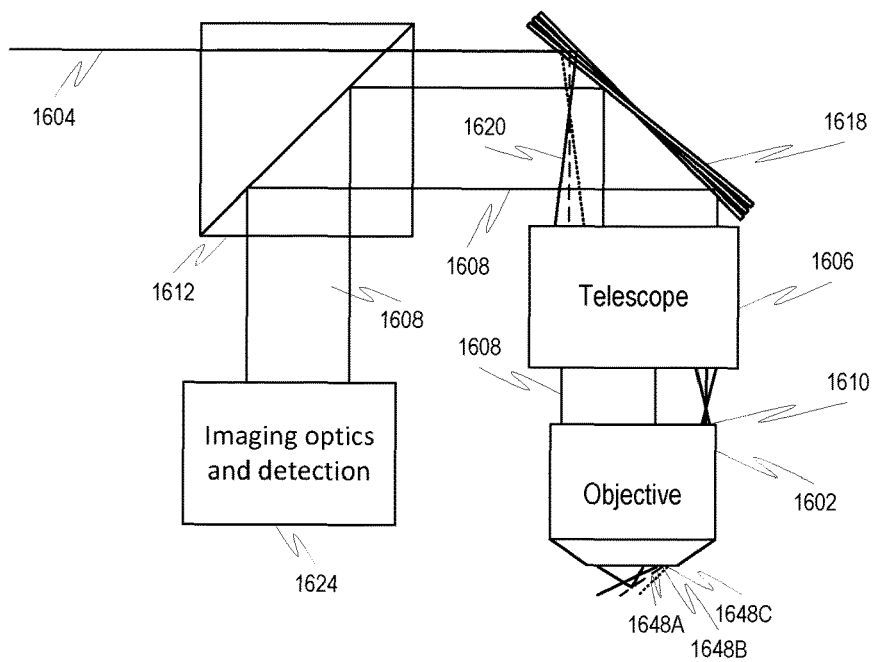
FIG. 16C shows another embodiment employing a single mirror scanning element for both illumination scanning and image beam de-scanning, according to embodiments of the disclosed subject matter.

Referring to FIG. 16B, the introduction of converging optical element 1640 changes the angles through which the illumination beam 1620 is scanned and, correspondingly, the angles through which the image beam 1608 is scanned. Instead of the beams 1620 entering the telescope such that they emerge to enter close together in the region 1610 at the back aperture of an objective 1602 whereby they emerge from the objective at the edge of the front aperture of the objective 1602 as indicated at 1601, the beams emerge at multiple points at the edge of the front aperture toward the axis. The effect is that the scanning causes the illumination planar beam 1648A, 1648B, 1648C to "walk" along a radial path from the front aperture and sweep a narrower angular range, whereby the scanned slices are more parallel than in the embodiment of 1600B. The image beam 1642 is captured, de-scanned by the scanning mirror 1618 and relayed through the beam splitter 1612 to an imaging device 1624 as in the embodiment of FIG. 1600A but by passing through the converging optical element 1640, the focus of the imaging device 1624 is held on the scanned planar illumination beam (1648A, 1648B, 1648C). In FIG. 16C, a similar effect as in FIG. 16B can be achieved by moving the objective 1602 relative to the telescope 1606 relative to the position of FIG. 16A.

Figure 17:
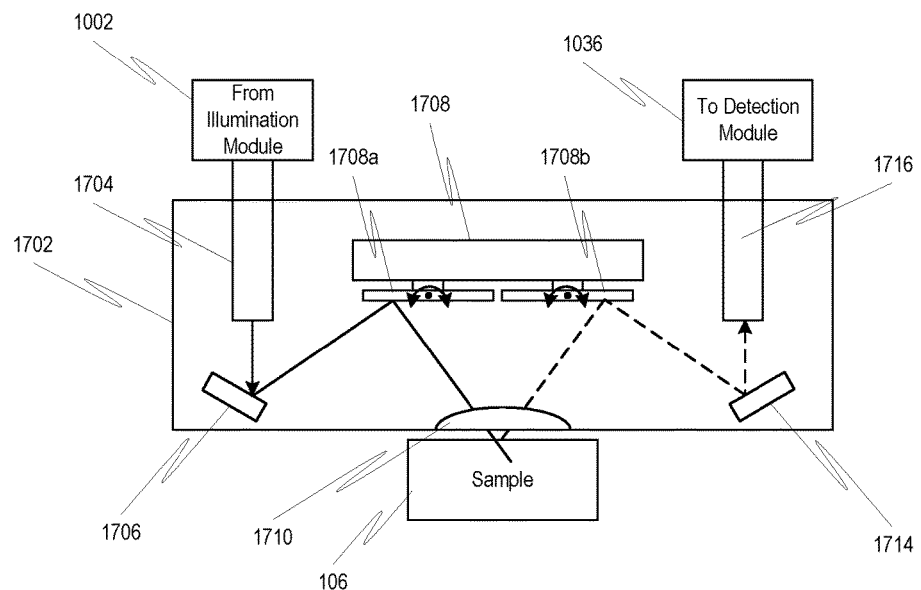
FIG. 17 shows a dual-axis confocal endoscopy configuration for depth-resolved imaging, according to one or more embodiments of the disclosed subject matter.

Although embodiments have been described above using an objective lens to focus the illumination beam onto the subject and to receive the light from the subject, embodiments of the disclosed subject matter are not limited thereto. For example, FIG. 17 illustrates a configuration for dual axis confocal imaging without using objective lenses, for example, as part of an endoscopic device 1702. Endoscopic device 1702 can be disposed adjacent a subject 106, which may be an internal organ or structure of a patient in which the endoscopic device 1702 has been inserted. Light from illumination module 1002 can be directed to the endoscopic device 1702 via an input waveguide 1704, which may include a collimating device (e.g., a GRIN lens) at an output end thereof. The illumination light is incident on a stationary optical element 1706 (e.g., a parabolic mirror) that redirects the input light to a respective scanning element 1708a of a scanning device 1708. For example, the scanning device can be a MEMS mirror array with individually addressed mirror surfaces that can tilt in two-dimensions. The scanning element 1708a can thus redirect the illumination to scan the illumination in the subject 106.

A lens 1710 can be disposed in the optical path between scanning device 1708 and the subject 106 to focus the illumination and receive detected light. For example, the lens 1710 can be a hemispherical lens, a solid-immersion lens, or a GRIN lens. The light from the subject and received by lens 1710 can be incident on another scanning element 1708b of scanning device 1708. The scanning device 1708 can control the motion of scanning element 1708b to correspond to the motion of the scanning element 1708a, such that the imaged plane corresponds to the illuminated plane. The detected light can be incident on a stationary optical element 1714 (e.g., a parabolic mirror) that redirects the detected light to a respective waveguide 1716, which may include a collimating device (e.g., a GRIN lens) at an input end thereof. Although shown as a single waveguide 1716 in FIG. 17, it is contemplated that the waveguide could be a plurality of waveguides, for example, the beveled waveguide of FIG. 6F that provides image rotation as well as detected light transmission to a detector of detector module 1036. The detected light from the output waveguide 1716 can be provided to detection module 1036 for imaging in a manner consistent with the other embodiments described above. Alternatively or additionally, the waveguide 1716 can comprise a one dimensional array of waveguides (e.g., a 1000×1 fiber bundle) that conveys the de-scanned light to a linear detector.

Figure 18:
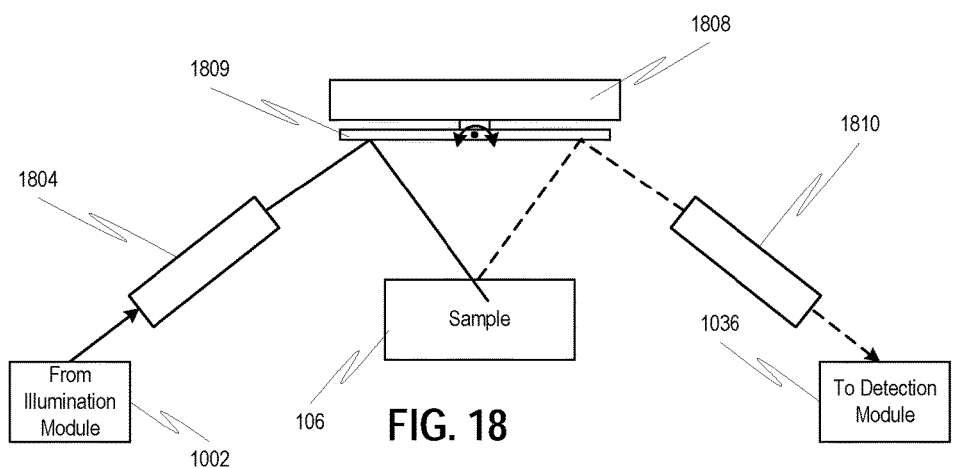
FIG. 18 shows an objective-less configuration for depth-resolved imaging, according to one or more embodiments of the disclosed subject matter.

FIG. 18 illustrates another configuration for depth-resolved imaging without using objective lenses. Light from illumination module 1002 can be directed via an input waveguide 1804 or other input optics to a scanning device 1808. Meanwhile, detected light from the subject 106 can be redirected to an output waveguide 1810 or other output optics via the scanning device 1808. The scanning device 1808 can have a single scanning element 1809 which simultaneously provides both scanning and de-scanning, as shown in FIG. 18, or multiple scanning elements that are synchronized, as described above with respect to FIG. 17. As with the embodiment of FIG. 17, the scanning element 1809 of scanning device 1808 can move to scan the illumination beam through the subject 106, and the resulting light corresponding to the illuminated plane can be imaged by detection module 1036.

Figure 19:
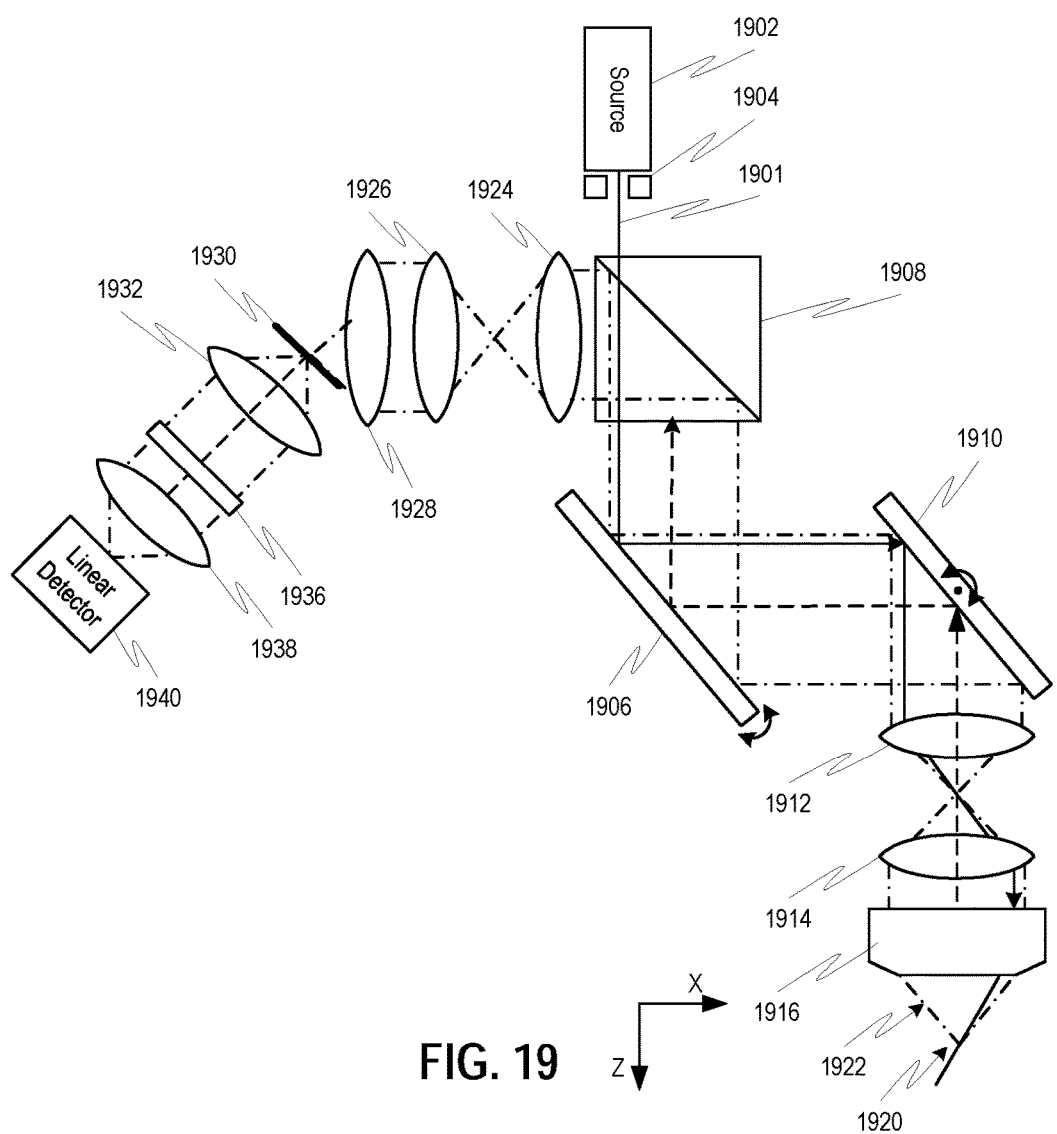
FIG. 19 shows a configuration employing a line-scan and a linear detector for depth-resolved imaging, according to one or more embodiments of the disclosed subject matter.

In one or more embodiments, a linear detector can be used to perform the depth-resolved imaging. In such configurations, a line beam (narrow beam) can be scanned rather than scanning of a planar beam. Such a configuration is illustrated in FIG. 19 and may especially useful for 2-photon imaging, for example. An excitation light source 1902 (e.g., an infrared laser source) generates an excitation beam 1901, that can pass through an aperture 1904 and be incident on a first scanning mirror 1906 after passing through a dichroic beam splitter 1908. The first scanning mirror 1906 can be configured to sweep in a lateral Y-dimension. The resulting illumination line can be directed to a second scanning mirror 1910. The second scanning mirror 1910 can be configured to sweep the illumination in a scan dimension (e.g., in the X-Z plane). The resulting scanned beam can be mapped onto the back focal plane of objective lens 1916 by a telescope formed by lenses 1912, 1914 and focused into the subject to form illumination beam 1920. Emission light 1922 (e.g., fluorescence in the range of 400-500 nm generated by fluorophores within the subject) can be captured by the objective lens 1916 and mapped onto the second scanning mirror 1910 by the telescope formed by lenses 1912, 1914. The second scanning mirror 1910 de-scans the emission light and directs it to beam splitter 1908.

After de-scanning by the mirrors 1906 and 1910, image light is reflected by the beam splitter 1908 and the detected light is then mapped by another telescope formed by lenses 1924, 1926 onto an imaging objective lens 1928 to form an intermediate image in a plane 1930 forming an angle with the optical axis, similar to other embodiments described above. The intermediate image plane 1930 can then be focused (and/or filtered, e.g., by emission filter 1936) onto a detection plane of detector 1940 by lens 1932 and lens 1938. However, in contrast to some of the above described embodiments, the detector 1940 may be a linear detector array rather than a two-dimensional imaging array. In this case, the image at the image plane is a linear map of the diagonal line in the Z-X plane where emission light 1922 is captured by the objective lens 1916. The scanning and de-scanning by the mirrors 1906 and 1910 traverse the volume of the subject region. In embodiments, the linear detector 1940 is an array of PMTs. The signal generated by each element of the linear detector 1940 corresponds to a depth within the subject for a given line scan.

Figure 20A:
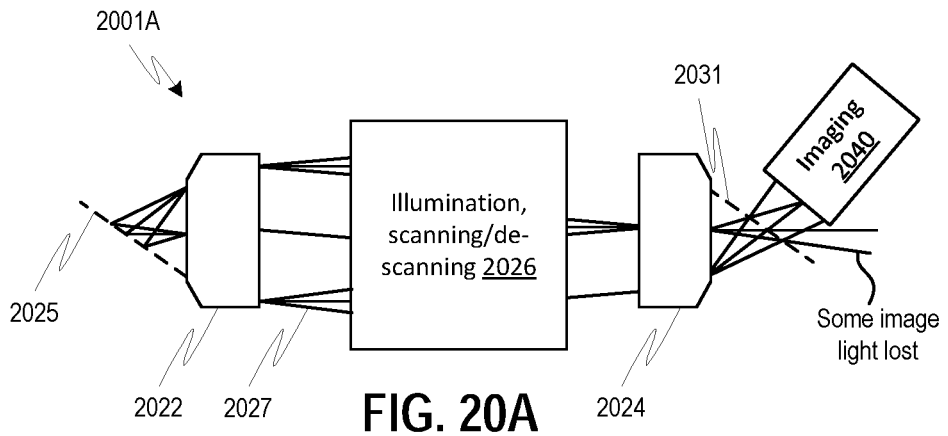
FIGS. 20A through 20C support discussion of a mechanism for image rotation that permits the angle between image-forming optics and field rotation optics to be selected independently, such that, in embodiments, the angle can be zero, according to embodiments of the disclosed subject matter.
Figure 20B:
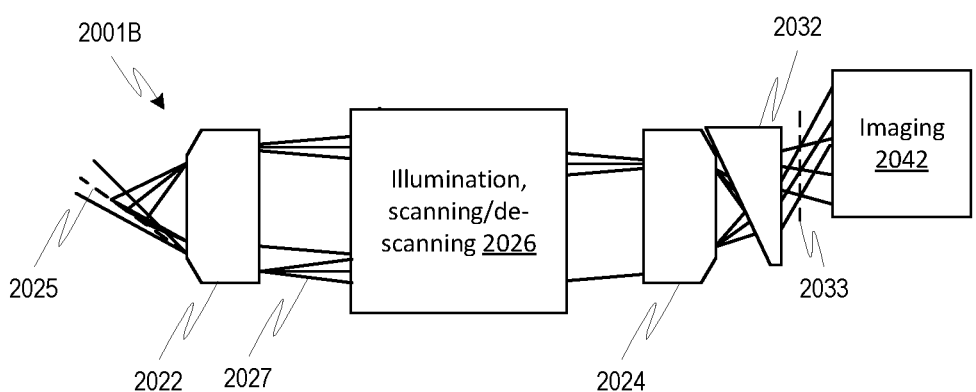
Figure 20C:
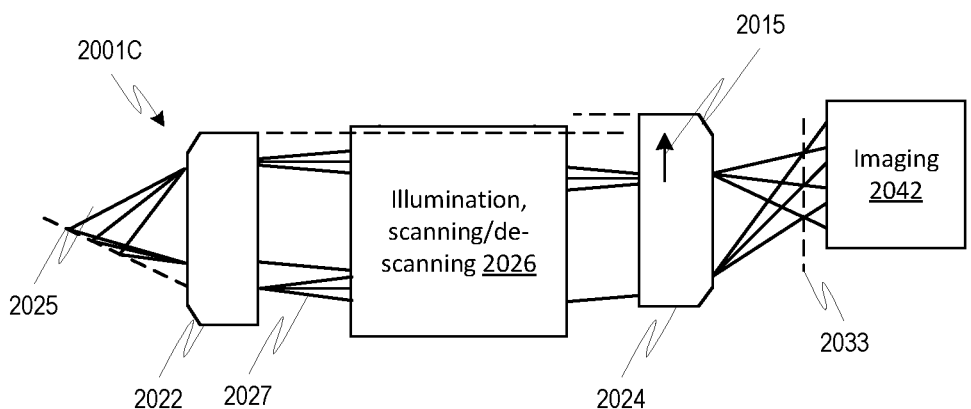
Figure 20D:
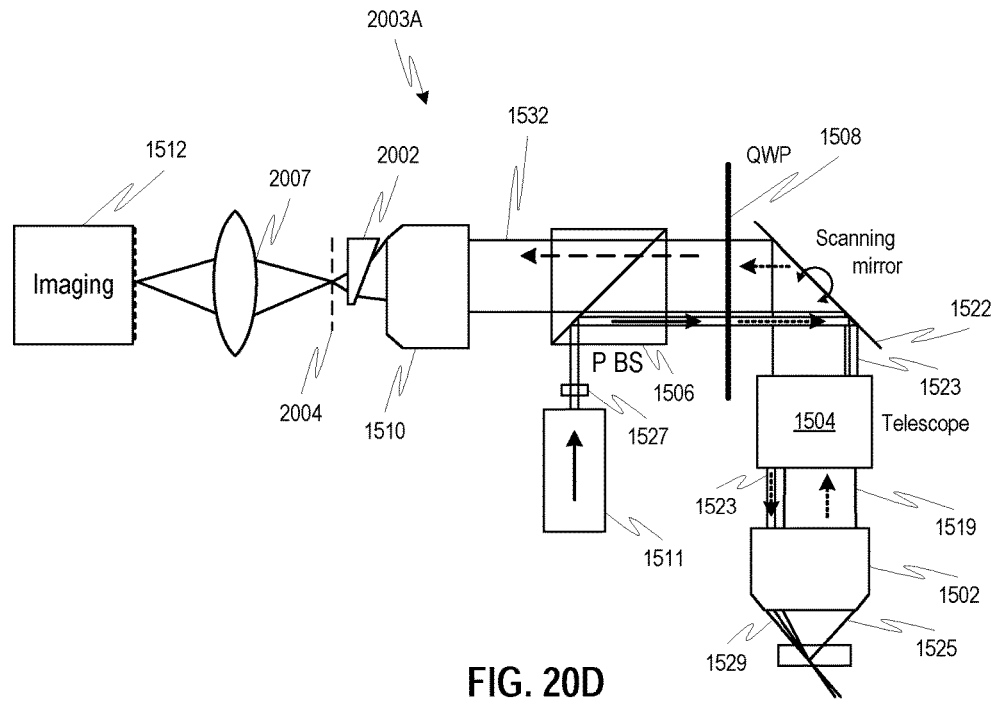
FIGS. 20D and 20E illustrate variants of the embodiment of FIG. 15 which employs the field rotation mechanism described initially with reference to FIG. 20B.
Figure 20E:
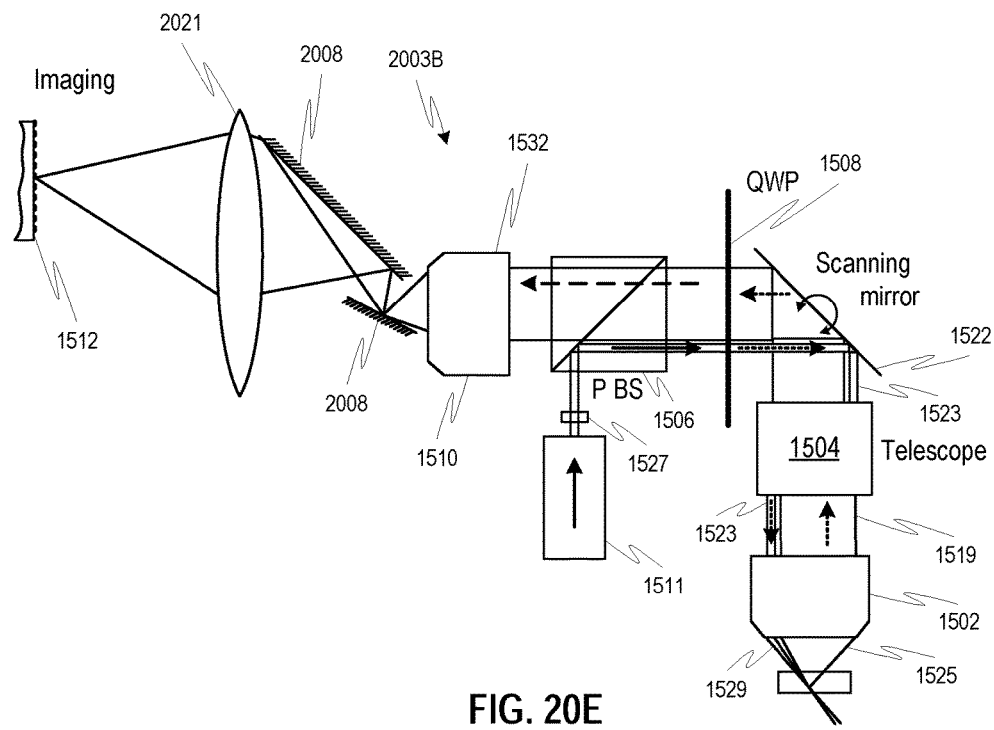

Referring to FIG. 20A, an imaging device 2001A has a telecentric objective 2022 that receives image light from a planar image region 2026 that is scanned by illuminating planar illumination beam 2027 coincident with the image region 2026. Light from the image region is de-scanned as described according to any of the various mechanisms described herein. The mechanism 2026 for scanning and de-scanning is not shown but may include any of the applicable mechanisms described herein. A lens assembly 2024 whose properties may be selected to compensate certain axial focusing aberrations as discussed elsewhere is used to generate an image 2031 that can be captured, mapped to a sensor, and stored by an imaging device 2040 which conforms to the description of detection module 104 and all the varied embodiments thereof. The imaging device 2040 may focus on the image 2031 and produce a focused image on a light detector thereof. The imaging device 2001A schematically is similar to many of the embodiments described herein. FIG. 20B shows an imaging device 2001B that is the same as imaging device 2001A except that an optical wedge 2032 is included which produces an image 2033 that is at a different angle, for example, perpendicular to an optical axis of the lens assembly 2024, as shown. FIG. 20C an imaging device 2001C that uses an alternative mechanism to achieve the effect of prism 2032. Here, the lens assembly 2024 is shifted as indicated by the arrow 2015 which is equivalent to turning the image beams as by the prism 2032. Again imaging device 2042 is the same as imaging device 2040 and may be focused on the image 2033 to project an image of the image 2033 onto a light detector.

FIG. 20C shows an imaging device 2003A that is based upon the microscope 1500A except that image light passing through lens assembly 1510, rather than being reflected back through the lens assembly 1510, passes through an optical wedge 2002 oriented to change the angle of the image plane 2004. As in FIG. 20B, the angle of the image plane 2004 may be such that it can be acquired by imaging optics 2007 whose optical axis is parallel to the axis of the lens assembly 1510. FIG. 20D has a similar function as imaging device 2003A except that instead of an optical wedge, a pair of reflectors 2008 are used, where the angles of the reflectors 2008 may be chosen such that the optical axis of imaging optics 2021 are parallel to that of the lens assembly 1532. The lens assembly 1532 has the same function as 1510 of the imaging device 2003A. In the imaging devices 2003A and 2003B, the imaging light, after passing through an optical assembly to correct axial aberrations is redirected, by refraction as by a wedge prism or by folding using reflectors. This may be done in such a way that an image plane is tilted to a position that reduces the angle required between image-forming optics axis and field rotation optics. For example, see FIG. 6A field rotation optics 609 (which includes lens system 616 and camera 618) image-forming optics 602. The sharp angle may cause loss of precious image light due to the low aperture of light between the image-forming and field rotation optics. Again imaging device 2042 is the same as imaging device 2040 and may be focused on the image 2033 to project an image of the image 2033 onto a light detector.

Note that in the embodiments of FIGS. 20B and 20C, the imaging device 2042 may be a light detector whose detection surface is aligned and positioned to coincide with the image 2031 or 2033 as discussed with reference to the embodiment of FIG. 6E. Note also that an additional benefit of the embodiments of FIGS. 20B and 20C is that by allowing the optics of imaging device 2042 to be more parallel with the optical axis of lens assembly 2024, a higher numerical aperture of the optics of imaging device 2042 because the optical elements of imaging device 2042 can be brought closer to lens assembly 2024 without a collision. In addition, rotation of the image plane 2031 or 2033 may allow the complexity of mechanical alignment to be reduced, for example by providing alignment tables that provide only for relative translation of the optical elements of imaging device 2042 and the lens assembly 2024 rather than need to provide for both relative angle and position adjustment.

FIG. 21A shows a multi-mode confocal/DRI microscope 2100 in a theta confocal configuration, according to embodiments of the disclosed subject matter. An illumination module 2102, whose function fits within the description of illumination module 102 in FIG. 1, beam expander provides is positioned a source of collimated light. Illumination module 2012 may generate a narrow collimated beam 2131 which may be selectively spread by a beam expander 2135 which may be as discussed with reference to beam expander 305 of FIG. 3A. The beam expander 2135 may be selectively positioned in the path of the collimated beam 2131 under control of one or more controllers and/or actuators identified at 2160. In the confocal mode the beam expander 2135 may be positioned in the path of collimated beam 2131 to provide a broad beam 2108 after reflection by a prismatic mirror element 2130 used for scanning the beam. The scanning of prismatic mirror element 2130 may also be under control of the one or more controllers and/or actuators 2160. The prismatic mirror element 2130 redirects the illumination beam 2108 through scan lens 2110 and tube lens 2112 (which lenses 1210, 1210 together form a telescope) such that the illumination beam 2114 is incident on the back aperture of objective lens 2116 after passing through a cylindrical lens 2136 that is selectively positioned in the path of the illumination light 2114 under control of the one or more controllers and/or actuators 2160.

The cylindrical lens causes the illumination beam 2114, after focusing by the objective lens 2116 to form a focused line at 2152 at focal plane 2140. An image beam 2115, returning after passing through the objective 2116 passes through scan lens 2110 and tube lens 2112 (forming a telescope) and lens 2124 to be focused and detected as a line ultimately by the detection module 2137. An intermediate real image may be generated at 2123. The prismatic mirror element 2130 de-scans the image beam 2115. The detection module 2137 of any of the DRI embodiments disclosed, including those described with reference to FIGS. 6A through 6I.

FIG. 21B shows the multi-mode confocal/DRI microscope of FIG. 21A in a DRI configuration, according to embodiments of the disclosed subject matter. The collimated beam 2131 is incident directly on a beam realigner 2134, for example, an optical slab or other type of beam diverter, which is selectively placed in its path to place the multi-mode confocal/DRI microscope 2100 in DRI mode. A cylindrical lens 2132 selected to form a planar beam after focusing by the objective 2116 is selectively positioned in the offset beam 2131 path by placing the multi-mode confocal/DRI microscope 2100 in DRI mode. The mode switching may be performed under control of the one or more controllers and/or actuators 2160 in response to a command through a user interface or lab computer interface (not shown). The scanning of prismatic mirror element 2130 redirects the illumination planar beam 2128 through scan lens 2110 and tube lens 2112 (which lenses 1210, 1210 together form a telescope) such that the illumination planar beam 2128 is incident on the back aperture of objective lens 2116. The cylindrical lens 2136 is positioned outside the path of the illumination planar beam 2128 by the one or more controllers and/or actuators 2160 when the multi-mode confocal/DRI microscope 2100 is placed in DRI mode. The 2128 forms an illumination planar beam 2129 which is scanned as the prismatic mirror element 2130 is pivoted.

Image beam 2115 returns after passing through the objective 2116 and thereafter passes through scan lens 2110 and tube lens 2112 (forming a telescope) and lens 2124 to be focused and detected. In embodiments, an intermediate image 2126 may be generated which is imaged by detection module 2137 according to any of the embodiments described herein. As above, the prismatic mirror element 2130 de-scans the image beam 2115. The detection module 2137 of any of the DRI embodiments disclosed, including those described with reference to FIGS. 6A through 6I.

Referring momentarily also to FIG. 21C, for example, the line may be projected onto an angled detector 2170 which may be a CCD camera. To exclude undesired light to form an image at the selected focal plane 2140, selected pixels of the detector may be used to form the image. The selected pixels on either side of the image, along with those lying at the line, may be applied to deconvolution algorithm to enhance the resolution. This may avoid the need for a slit. If the cylindrical lens 2136 is positioned out of the path of the image beam 2115, the illumination beam 2114 may be focused to a point in which case, the need for a pinhole may be avoided by selecting one or pixels of a CCD camera as required to measure the light levels from the targeted focus region 2152. Note that instead of a CCD camera, the detector 2170 of detection module 2137 may be a linear array of photomultiplier elements oriented to align with a linear one dimensional image produced by the multi-mode confocal/DRI microscope 2100 when in DRI mode.

Figure 22A:
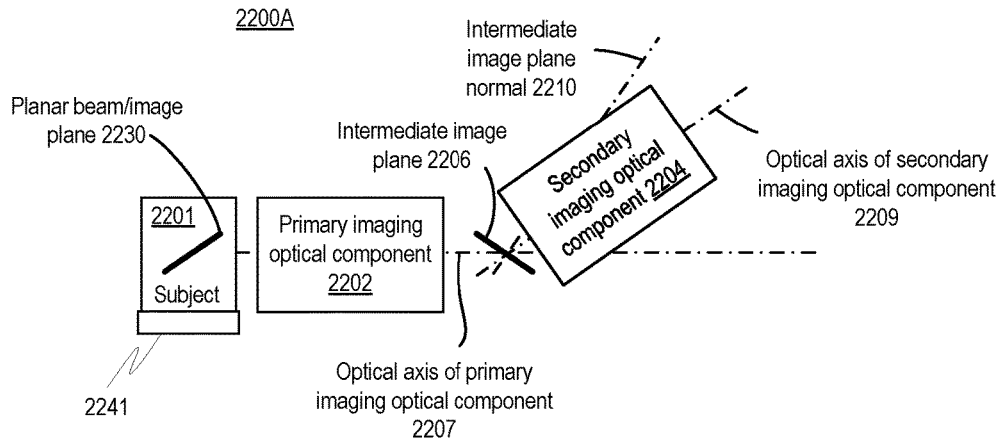
FIGS. 22A and 22B identify features of a configuration of which the embodiments of FIGS. 6B and 6C are specific examples.

Referring now to FIG. 22A, shows elements of an imaging device 2200A, such as a microscope, for illuminating and imaging a continuous or discontinuous series of illumination planar beams, indicated at 2230, within a subject volume 2201 so as to generate a two-dimensional or three-dimensional image thereof in a light detector of one of the secondary 2204 or tertiary 2205 imaging optical components described below with reference to FIG. 22A or FIG. 22B. A primary imaging optical component 2202 may have an objective lens (not shown separately but subsumed in the primary imaging optical component 2202) that can be positioned relative to a subject support 2241 to image the portion of the subject illuminated by the illumination planar beam 2230. The first optical component 2202 has optical elements selected to generate, in cooperation with the objective lens, a first intermediate image 2206 of the portion of the subject illuminated by the illumination planar beam 2230 which is in the region at a front of the objective lens. A light source and a scanning/de-scanning element with a movable light redirecting element may be included in the primary imaging optical component 2202 to direct the illumination planar beam at 2230 which is generated by a light source through the primary imaging optical component so as to move the illumination planar beam thereby to scan it across a pre-defined volume of the subject region. The scanning/de-scanning element movable light redirecting element further directs image light received from the first optical component to hold a focus of the illumination planar beam onto a plane of the first intermediate image 2206 as the illumination planar beam is swept. The details which are covered in the foregoing descriptions are not repeated here for clarity. A secondary imaging optical component 2204 has an optical axis 2209 that lies at a first angle between an optical axis of the primary imaging optical component 2207 and the normal of the plane of said first intermediate image 2210. As a result, the size of the first angle is not what would allow the secondary imaging optical component 2204 to focus on the plane of said first intermediate image 2206. The secondary imaging optical component may include a light detector such as a CCD chip onto which an image of the intermediate image is projected by the optics thereof.

Figure 22B:
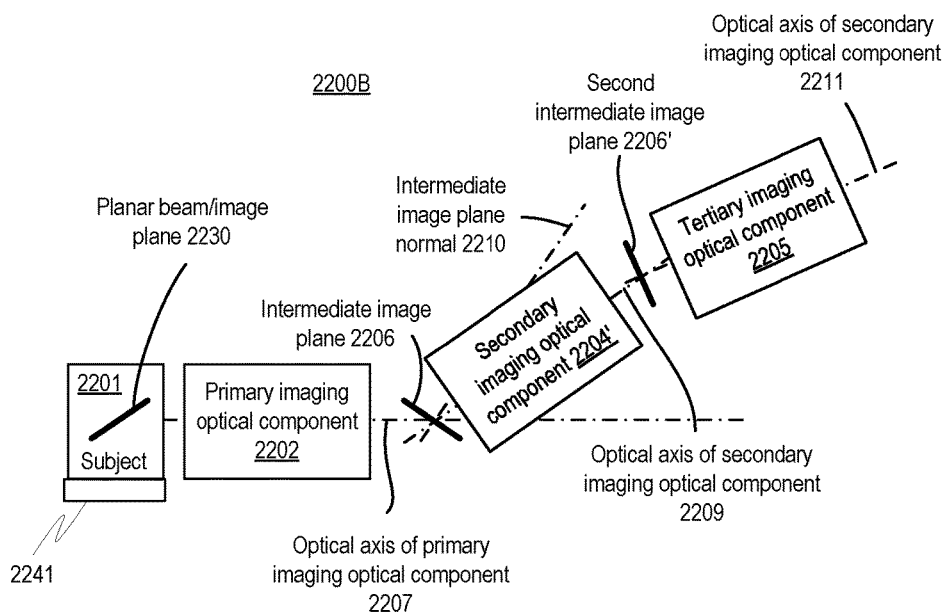

Referring now to FIG. 22B, the components of FIG. 22A are reproduced here where the reference numerals are the same, but secondary imaging optical component 2204' may be different in that it generates a second intermediate image that can be imaged by a tertiary imaging optical component 2205. A tertiary imaging optical component 2205 has an optical axis 2211 and is positioned to focus on a second intermediate image 2206' formed by the secondary imaging optical component 2204'. The tertiary imaging optical component 2205 creates a focused image onto a light detector such as a CCD sensor. The tertiary imaging optical component 2205 may have an optical axis that lies at a second angle 2211 between the first angle 2209 and the optical axis of the primary imaging optical component 2207.

Note that in any of the embodiments, rather than an optical wedge, a similar element may be employed that accomplishes the described function. For example, a GRIN element can provide the same or similar function of tilting the image plane, for example to an orientation that is perpendicular to the optical axis of the lens assembly 2024.

Figure 23A:
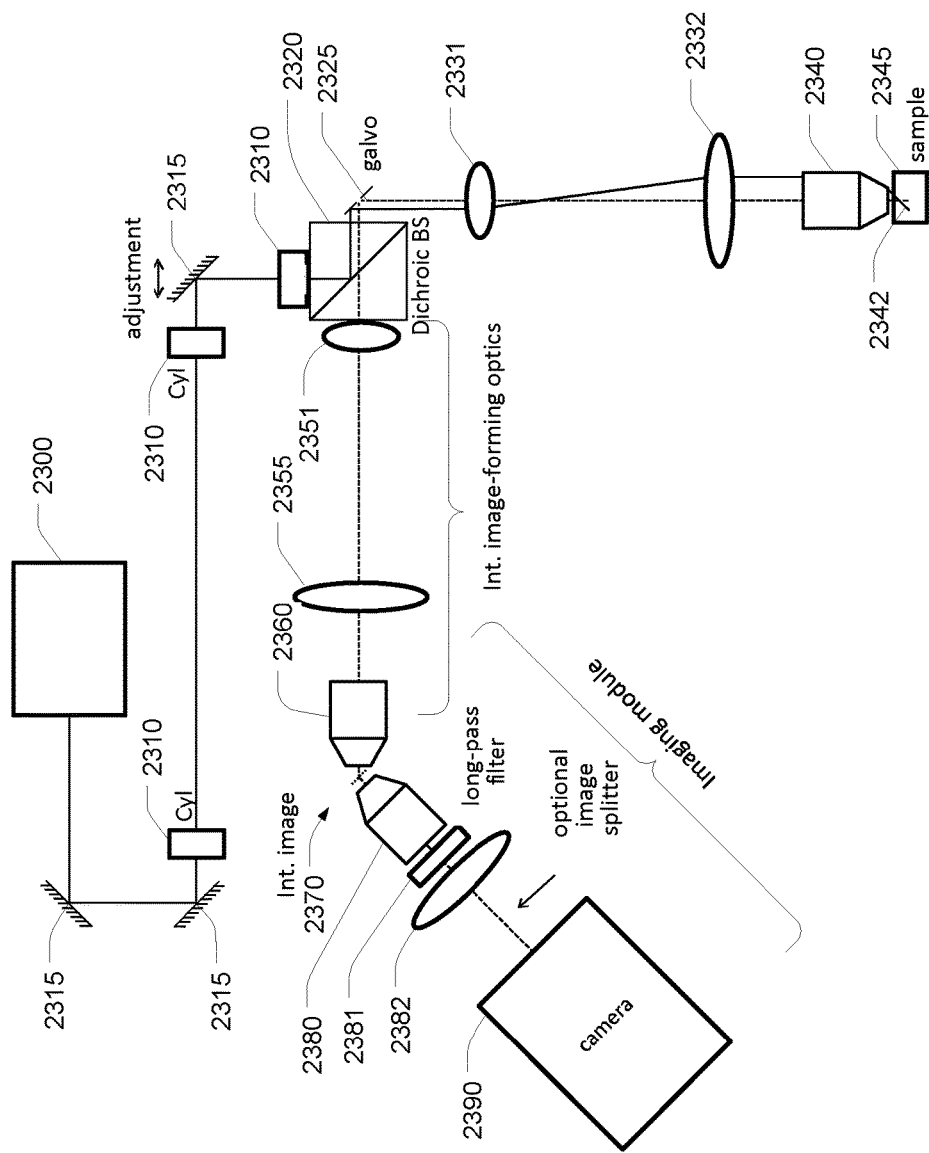
FIG. 23A shows a DRI microscope functionally as the embodiment of FIG. 10 with an example of a detection module and showing a mostly rectangular layout that provides ease of adjustment and configurability, for example with the selectable insertion of an angle mirror)(45°) for rapid switching between upright and inverted configurations.

FIG. 23A shows a DRI microscope functionally as the embodiment of FIG. 10 with an example of a detection module and showing a mostly rectangular layout that provides ease of adjustment and configurability, for example with the selectable insertion of an angle mirror (45°) for rapid switching between upright and inverted configurations. Illumination light from a light source such as a laser 2300 is directed by mirrors 2315 and shaped by cylindrical lenses 2310 such that it forms a sheet of illumination in a sample. Optionally, an adjustment for the last mirror 2315 may be included for alignment. That same adjustment may also be used for conversion between confocal and DR modes. A beam splitter such as dichroic beam splitter 2320 redirects the illumination beam along a first optical path to a scan/de-scan assembly that includes a scanning element such as galvo-mirror 2325 or other type of light-redirector. Light exiting the galvo mirror passes then through optical elements 2331, 2332, for example defining a telescope to direct the illumination beam into a peripheral region of an objective 2340, for example, a telecentric objective. The beam emerges as an oblique sheet of light 2342 into the sample 2345 which by virtue of the scan/de-scan assembly is moved (i.e., depending on an orientation of the galvo mirror 2325) as described with respect to other embodiments to illuminated multiple regions of the sample 2345, each being illuminated at multiple depths.

Image light from the oblique imaging plane is captured by the same objective 2340, and passes through the optical elements 2331, 2332 along a second optical path. It is then descanned by the same galvo mirror 2325 and passes through the beam splitter 2320. A tilted intermediate image 2370 is then formed by image forming optics such as a telescope that includes lenses 2351, 2355 and a second objective 2360. Notably, this tilted intermediate image remains stationary regardless of the orientation of the galvo mirror 2325. In some preferred embodiments, the optical characteristics of telescope and objective that are used to form the intermediate image (i.e. telescope 2351, 2355 and objective 2360) match the optical characteristics of the corresponding items in the illumination arm (i.e. telescope 2331, 2332 and objective 2340), as this eliminates certain distortions in the tilted intermediate image 2370. Descanning, rotation, and imaging can then proceed as discussed with regard to a FIG. 10. For example, rotation and imaging may be implemented by an imaging module that includes an objective 2380 sequentially followed by a long pass filter 2381, a lens 2382, and a camera 2390 that includes a light detector (e.g., a CCD).

The selectable insertion of a 45° angle mirror (not shown) between the distal element 2332 of the telescope and the objective 2340 can be added to provide for rapid switching between upright and inverted configurations In the FIG. 23A embodiment, a single mirror 2325 is used for scanning and de-scanning. Also, in the illustrated layout, alignment of orthogonal arms facilities setup and adjustment for precise images. The overall configuration of the layout is similar to a common configuration for confocal microscopes and can be switched between a confocal mode and DRI mode as described above. In some embodiments, as discussed above, there is a problem of loss of light caused by the alignment and interference between the imaging module and the intermediate image forming optics which arises, due to the image rotation approach. Solutions to this problem are discussed above and in the embodiments that follow.

Figure 23B:
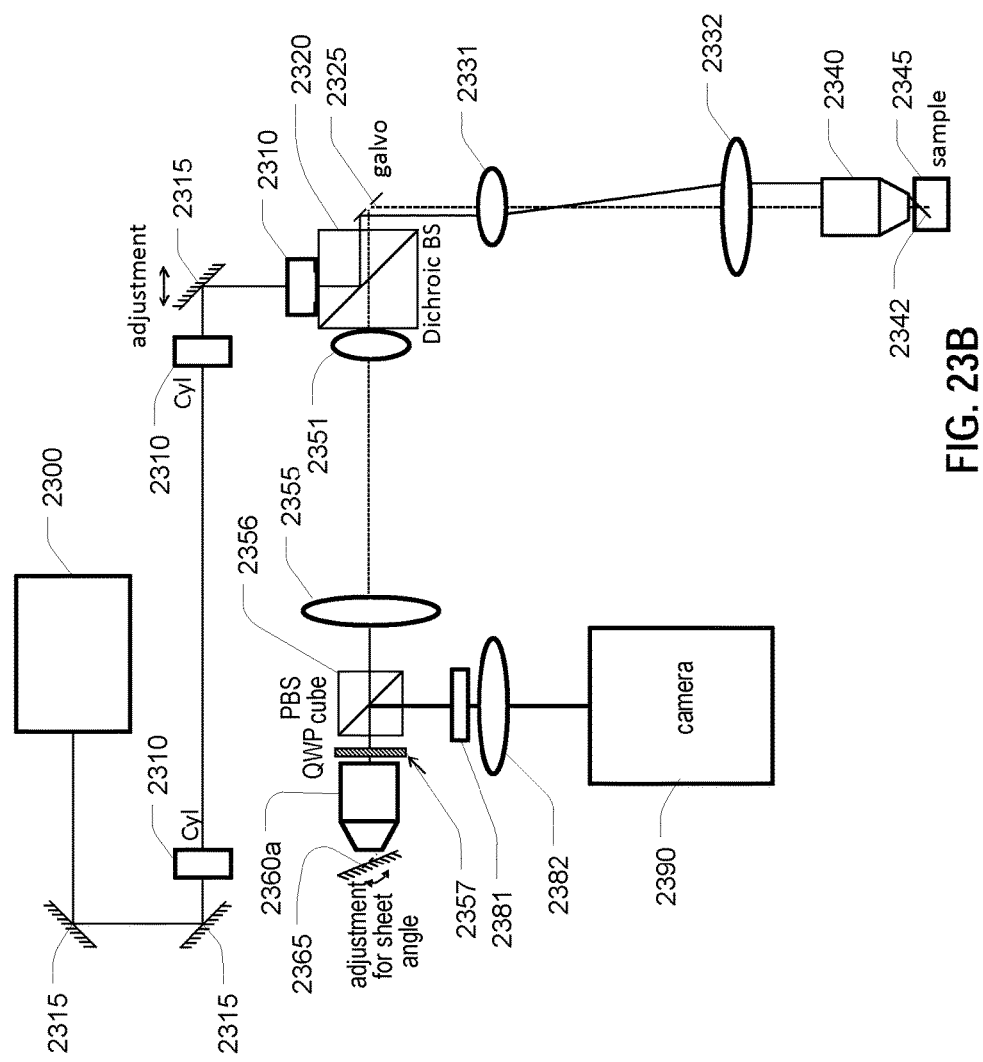
FIG. 23B shows a DRI microscope functionally as the embodiment of FIG. 15 with an example of a detection module and showing a mostly rectangular layout that provides ease of adjustment and configurability, for example with the selectable insertion of an angle mirror)(45°) for rapid switching between upright and inverted configurations.

FIG. 23B shows a DRI microscope functionally as the embodiment of FIG. 15 with an example of a detection module and showing a mostly rectangular layout that provides ease of adjustment and configurability, for example with the selectable insertion of an angle mirror (45°) for rapid switching between upright and inverted configurations as described above in connection with FIG. 23A. Components in FIG. 23B that share reference numbers with counterparts in FIG. 23A operate in the same way as their counterparts in that figure. Here, the principles described in the discussion of FIG. 15 are applicable. Here again, using remote-focusing principles, image rotation is achieved by a double-pass through a single objective lens 2360a. Illumination sheet angle adjustment is made simpler and can permit higher numerical aperture (i.e., light transfer in the intermediate image rotation stage with shorter working distance lenses for improved light collection and resolution. An adjustable mirror 2365 that reflects image light back into the objective used for imaging. Here again, a quarter wave plate 2357 may be used to ensure that the image beam passing through the polarized beam splitter 2356 is reflected upon second pass. A long pass filter 2381 is used to select image light from a fluorescing (or multiphoton) subject from reflected or scattered light.

In a variation of this FIG. 23B embodiment, the magnification of the second objective 2360a is selected to be higher than the magnification of the first objective 2340. For example, the magnification of the second objective 2360a may be 60× while the magnification of the first objective 2340 is 20×. When this disparity in magnification exists, the angle of the reflection mirror 2365 can be reduced (i.e., flattened), which can minimize light loss and simplify alignment of the system.

Figure 23C:
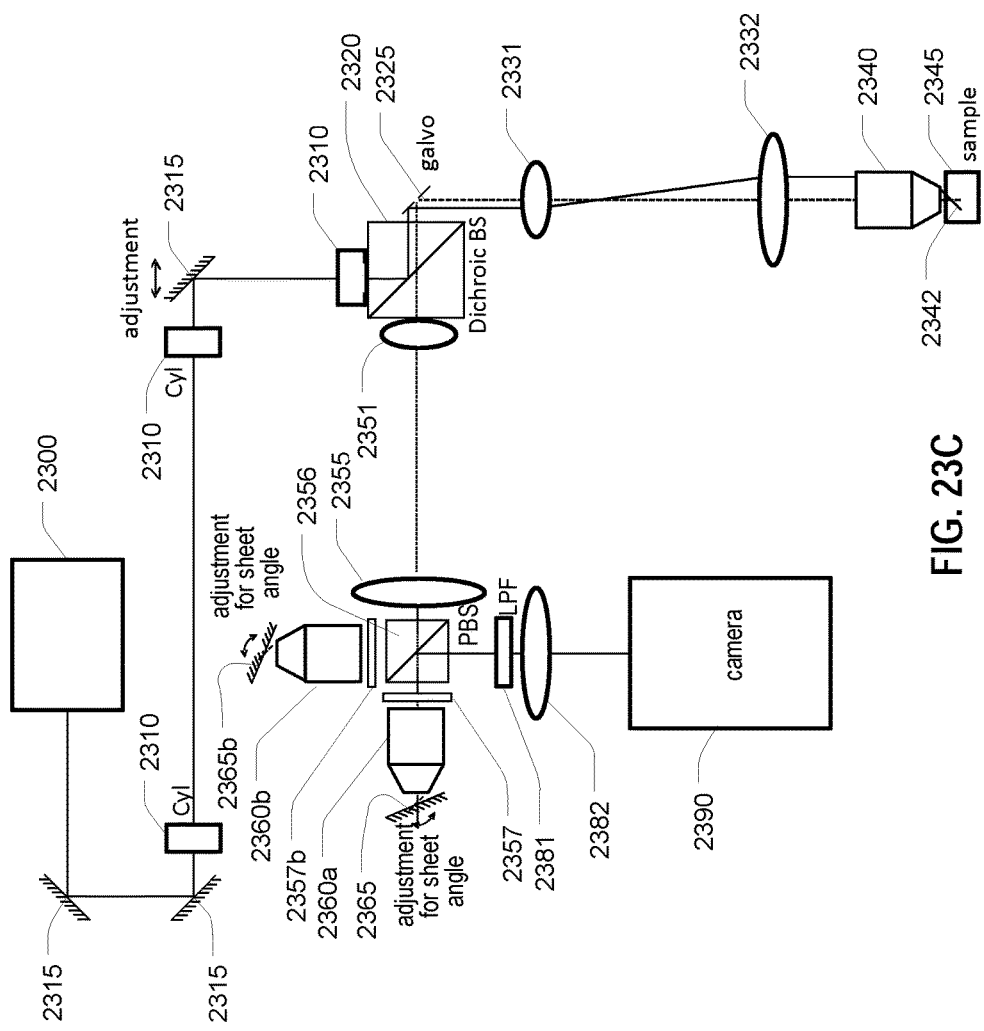
FIG. 23C shows a DRI microscope functionally similar to the embodiment of FIG. 23B in which a third lens assembly is added to recover light that may otherwise be lost due to the splitting of a received image light beam from the sample.

A disadvantage of the configuration of FIG. 23B may be the loss of image light due to the passage through the polarization beam splitter. FIG. 23C shows a DRI microscope functionally similar to the embodiment of FIG. 23B in which a third lens assembly is added to recover light that may otherwise be lost due to the splitting of a received image light beam from the sample. Components in FIG. 23C that share reference numbers with counterparts in FIG. 23A-B operate in the same way as their counterparts in those figures. Here a third objective 2360b captures light that, in the configuration of FIG. 23B, was lost due to reflection by the polarized beam splitter (PBS) 2356 and additional mirror 2365. The light captured by the third objective 2360b is reflected by the adjustable mirror 2365b back through the objective 2360b and is passed through QWP 2357b and the PBS 2356 using the quarter wave plate-based trap technique describe elsewhere. Other features are as described also elsewhere herein.

Figure 23D:
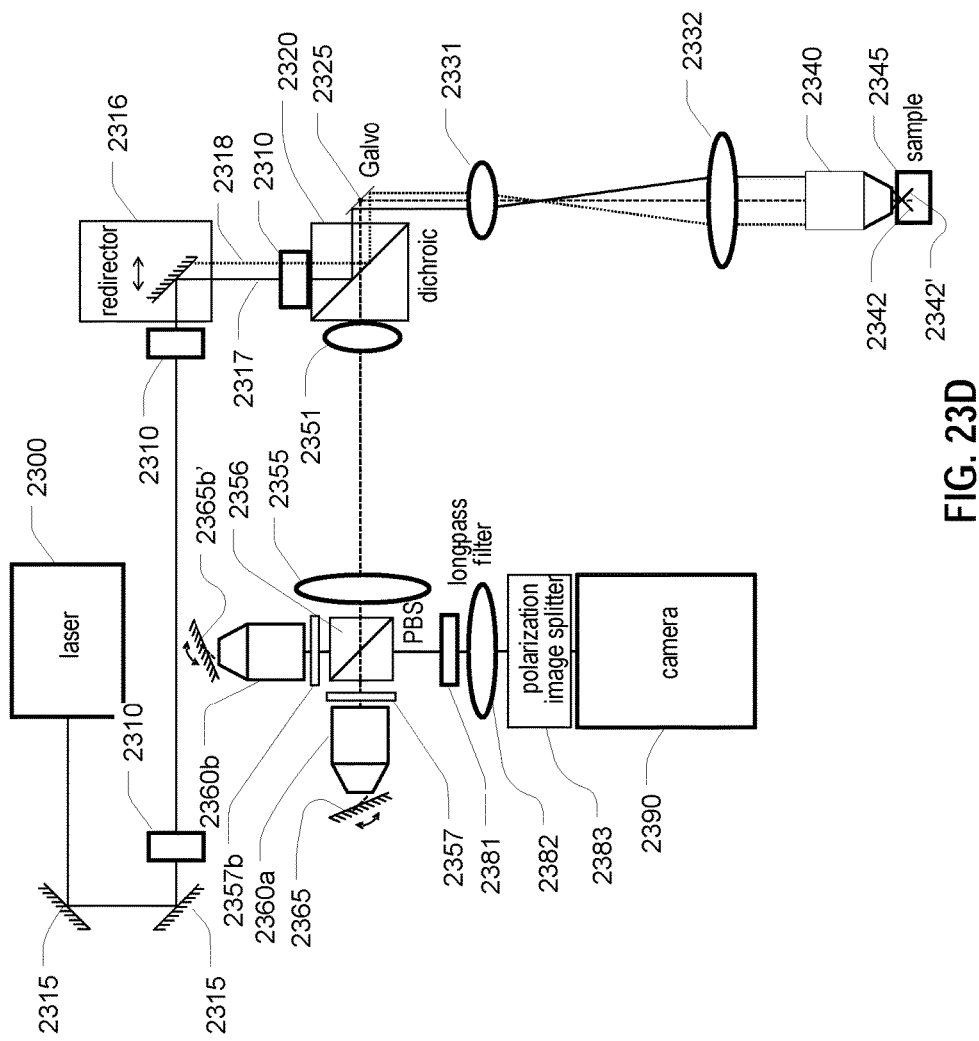
FIG. 23D shows a DRI microscope that illuminates a sample from using light sheets coming alternating sides of the objective which captures and separates light to form images from alternating illumination.

FIG. 23D shows a DRI microscope that illuminates a sample from different angles using light sheets 2342, 2342' coming from alternating sides of the objective 2340 which captures and separates light to form images from alternating illumination. Components in FIG. 23D that share reference numbers with counterparts in FIG. 23A-C operate in the same way as their counterparts in those figures. This embodiment has a layout similar to that of FIG. 23C however, the angle of the mirror 2365b' of the third objective 2360b is angled oppositely so as to pass image light from an opposite side of the primary objective 2340 corresponding to depth-resolved imaging light received from the alternate-side illumination beam or sheet. Here the laser is conditioned to form a sheet of light by cylindrical lenses 2310 and an automated redirector 2316 is introduced to selectively displace the illumination beam as indicated by the solid and dotted lines (2317 and 2318, respectively). During a first instant or cycle, the illumination beam is directed to form an angled illumination sheet 2342 in the sample from one side of the primary objective 2340; and during the next instant or cycle, the incoming beam is switched to the other side of the primary objective 2340 by the redirector 2316, thereby switching the direction and angle of the illumination beam or sheet to 2342'. Image light received, principally from the opposite side of the primary objective 2340 is relayed through the dichroic beam splitter 2320 to the polarization beam splitter 2356 where the second objective 2360a and the third objective 2360b are both used to form and rotate the intermediate image of the light from the illumination directed in a respective direction during a respective instant or cycle.

During a cycle, a scan/de-scan can be performed with the illumination beam 2342 directed in a single direction. Then in a subsequent cycle, a scan/de-scan can be performed with the illumination beam 2342' directed in the opposite direction. Between each cycle the redirector 2316 switches the path of the illumination beam to the other side of the primary objective 2340 to cause the direction to change. In embodiments, where the beam direction is changed each instant, the redirector 2316 changes the path of the illumination beam multiple times during a single scan/de-scan cycle. In both embodiments that switch the illumination beam each cycle or each instant, the PBS 2356 transmits a respective rotated depth-resolved image to a polarization image splitter 2383. For image light received from the second objective 2360a, the illumination energy is polarized one way; and for image light received from the third objective 2360b, the illumination energy is polarized the other way such that the image beams can be mapped by a polarization image splitter 2383 to respective parts of an imaging device 2390 (or to respective imaging devices) such as a camera or cameras. In embodiments, images from the illumination on one side can be made to appear on the light detector array next to images from the illumination on the other side.

Figure 23E:
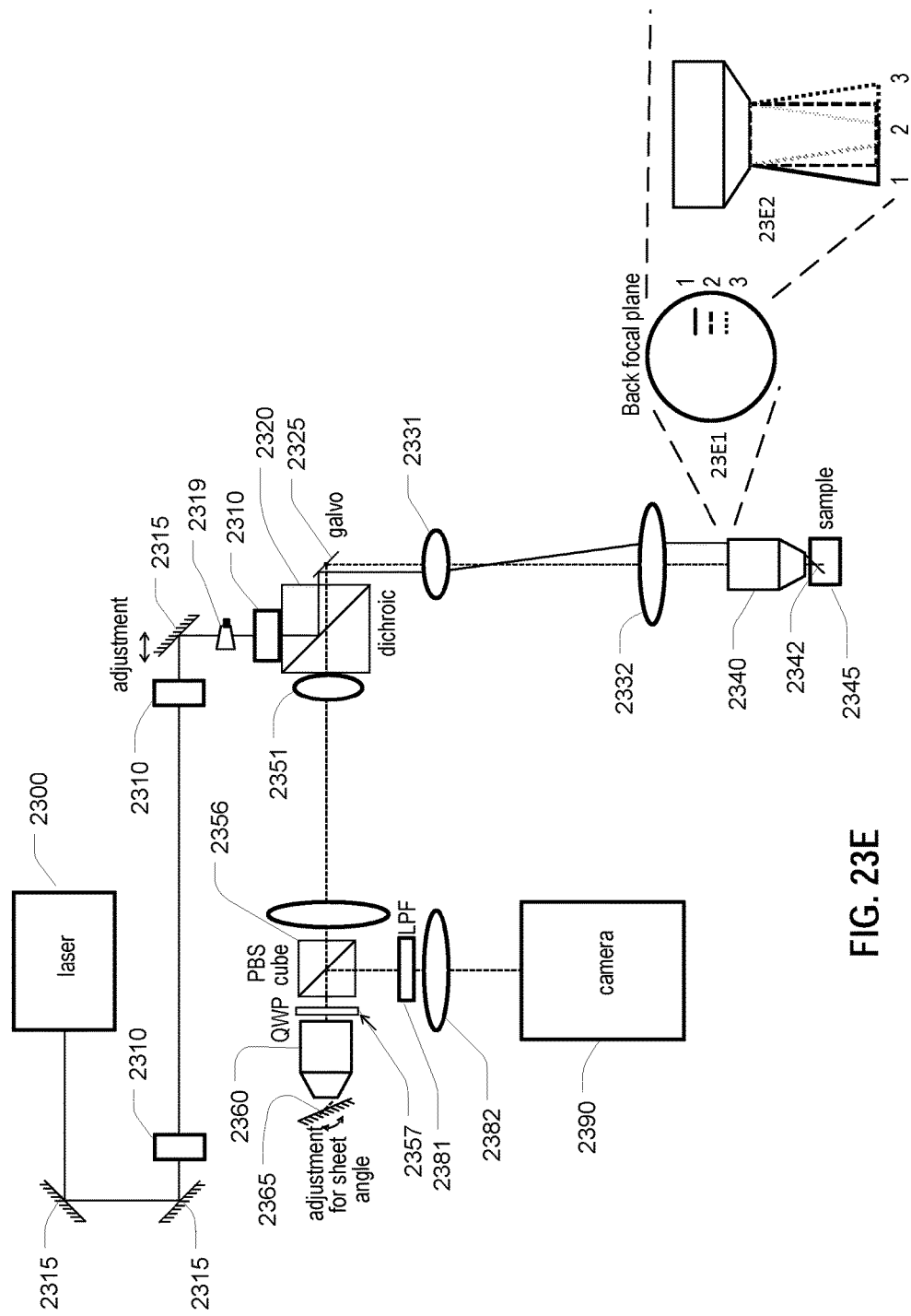
FIG. 23E shows a DRI microscope that provides a mechanism to improve the shadowing effects of surface structures by collecting images with illumination beams or sheets projected at multiple angles.

FIG. 23E shows a DRI microscope that provides a mechanism to improve the shadowing effects of surface structures by collecting images with illumination beams or sheets projected at multiple angles. Components in FIG. 23E that share reference numbers with counterparts in FIG. 23A-D operate in the same way as their counterparts in those figures. Here, the illumination sheet is angled using an additional galvo-mirror 2319 such that it is pivoted in a plane parallel to the plane of the light sheet in the sample (i.e., in and out of the drawing page). As a result, the beam will arrive at the back focal plane of the objective at different positions 1, 2, 3 within the peripheral region of the objective 2340 as depicted in the insert 23E1. This changes the orientation of the sheet of light to respective positions 1, 2, 3, as depicted in the insert 23E2, which in turn changes the position of shadows such that features that may otherwise be under-illuminated may be revealed. Using image processing, the optimal regions of each image (each image being formed by light of different in-sheet directions by galvo-mirror A) may be selected to form a single optimized image. Of course, many thus-optimized images may be combined to form a single 3D image. This embodiment may be identified as a "rocking sheet" configuration.

Figure 23F:
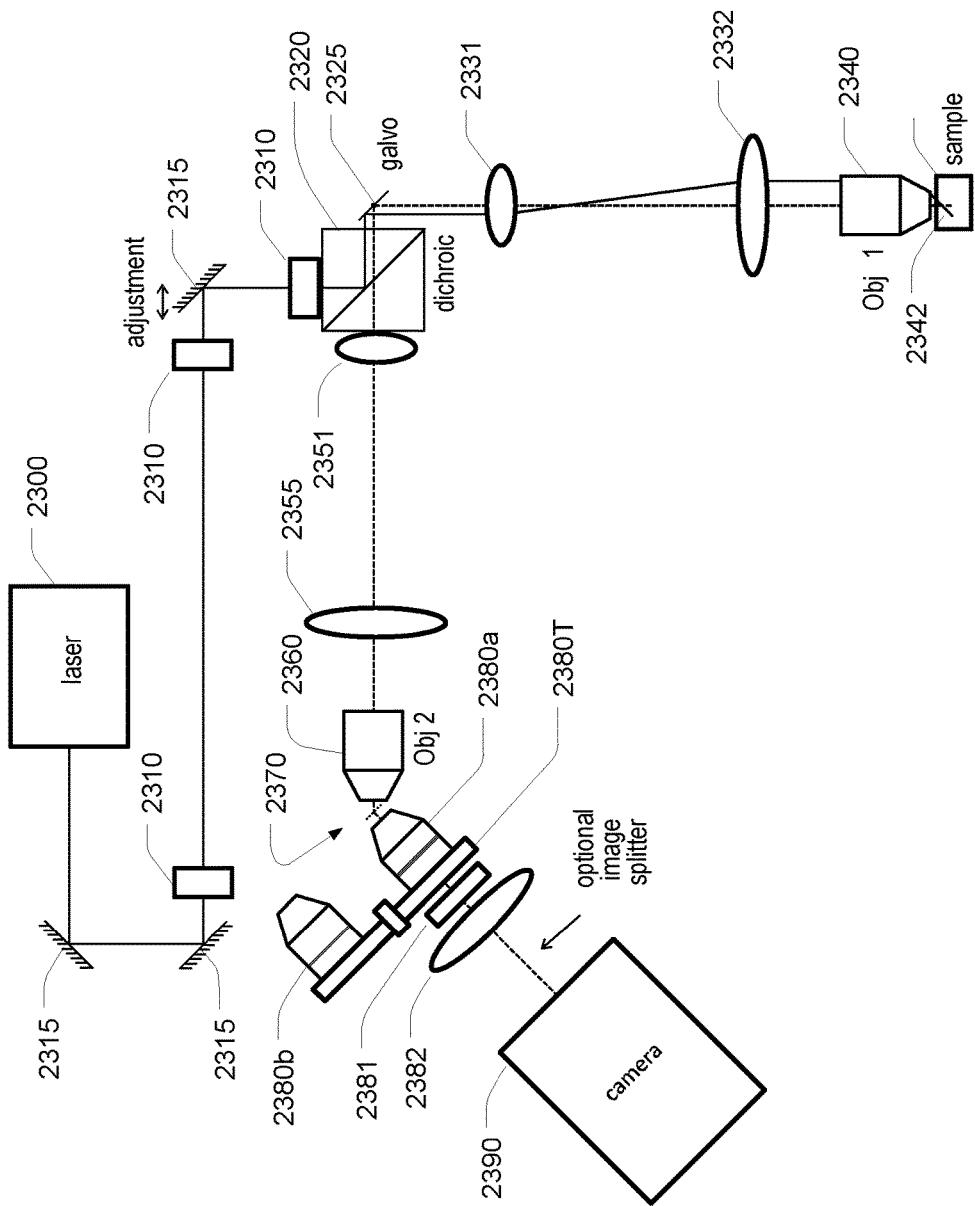
FIG. 23F shows a DRI microscope functionally similar features to the embodiments of FIGS. 6I, 10, and 13B with a turret permitting selection of the first lens assembly of the detection module to permit adjustability of magnification by switching the lens assembly on the turret.

FIG. 23F shows a DRI microscope functionally similar features to the embodiments of FIGS. 6I, 10, and 13B with a turret 2380T. Components in FIG. 23F that share reference numbers with counterparts in FIG. 23A operate in the same way as their counterparts in that figure. The turret 2380T permits selection of the first lens assembly of the detection module to permit adjustability of magnification by switching the lens assembly on the turret. More specifically, rotation of the turret 2380T inserts one of the plurality of third objectives 2380a, 2380b, etc. into the optical path on the way towards the camera 2390. Optionally, an image splitter may be included in front of the camera 2390.

Figure 23G:
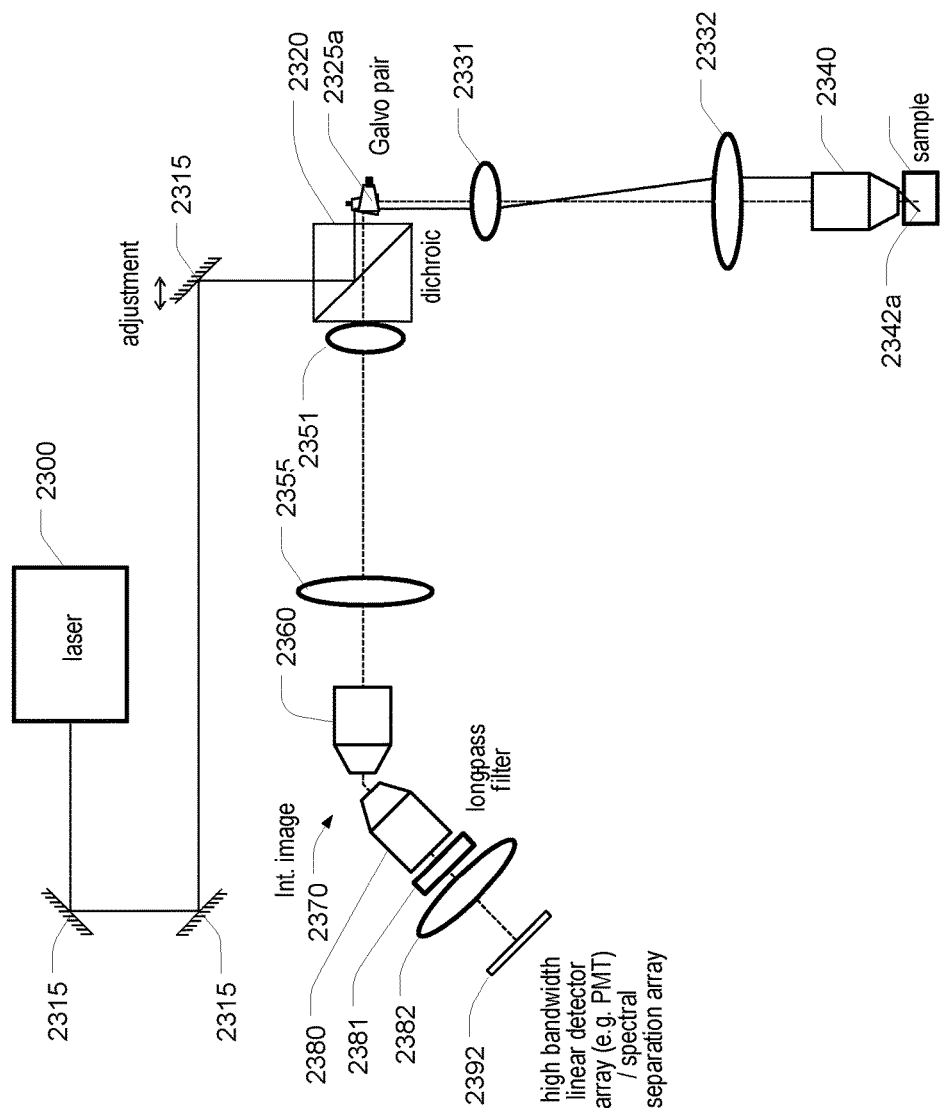
FIG. 23G shows a DRI microscope that scans a line at multiple depths and descans to achieve depth-resolved point measurements of returned light from the scanned line with the point measurements taken many-at-time by multiple photomultiplier cells of a linear array with various features for high frame rate and high sensitivity.

FIG. 23G shows a DRI microscope that scans a line at multiple depths and descans to achieve depth-resolved point measurements of returned light from the scanned line with the point measurements taken many-at-time by multiple photomultiplier cells of a linear array with various features for high frame rate and high sensitivity. Components in FIG. 23G that share reference numbers with counterparts in FIG. 23A operate in the same way as their counterparts in that figure. The operation of this embodiment is similar to the FIG. 23A embodiment, except that instead of projecting a sheet of light 2342 into the sample 2345, a pencil beam of light 2342a is projected into the sample. This pencil beam 2342a is then swept to effectively form a sheet of light. This is accomplished by eliminating the cylindrical lenses 2310 and replacing the galvo mirror 2325 in the FIG. 23A embodiment with a galvo pair 2325a. The galvo mirror pair 2325a operates to sweep a pencil beam side to side to form, effectively, a reconstituted sheet of light, as well as toward and away from the primary objective optical axis to sweep out a volume. Thus, the first direction of sweep is out of the plane of the drawing page.

A high bandwidth linear detector array 2392 such as one with photomultiplier elements (for example ten elements) receives the depth resolved light as the pencil beam is scanned and de-scanned by the galvo-mirror pair 2325a. Although one mechanism for image rotation is shown (using components 2380-2382), any of the alternative mechanisms for image rotation described herein may be used instead. For example, the linear detector array (with smaller pixels) may be placed directly at the position of the intermediate image plane in which case the magnification associated with components 2370-2382 is deleted from the system. Each detector (i.e. each pixel) of the linear detector receives light from a different depth in the sample. Each may be processed by separate signal channels clocked in parallel to increase throughput and scanning speed. In addition, each pixel can have an independently selected gain to permit optimization of the varying luminance received for each depth for the full linear depth-resolved "image." That is, light from deeper depths has a lower intensity and therefor may be compensated at a higher gain than light from shallower depths.

This embodiment extends the depth-dependent detection configuration of to be more compatible with both two-photon and endoscopy. The linear detector resolves the different depths within a sample simply by focusing on them diagonally, and circumvents many of the problems with traditional multi-layer two-photon and confocal approaches. For example, this embodiment obviates the need for piezo scanners and objective motion/synchronization, and also obviates the use of temporal or spectral encoding which adds cost and complexity.

X-Y (or Lissajou, AOD, MEMs or equivalent) scanners move at the standard two-photon frame rate, but yields as many depths as elements in the linear detector array. This embodiment can provide improved detection bandwidth compared to conventional volumetric scanning because each detector can have high bandwidth for a single depth. This embodiment also permits use of higher bandwidth and sensitivity detectors such as APD and PMT arrays compared to conventional camera technologies. It can also provide improved dynamic range because each detector element can have a fixed gain for its depth position, (with deeper detectors having higher gain/sensitivity to compensate for the attenuated return from those deeper depths). In these embodiments, the linear array acts as a slit, reducing the effects of detection-light scattering compared to sheet illumination (analogous to rolling-shutter type SPIM). It is also easy to adjust the configuration in this embodiment to acquire conventional confocal microscopy with z-stage.

Figure 23H:
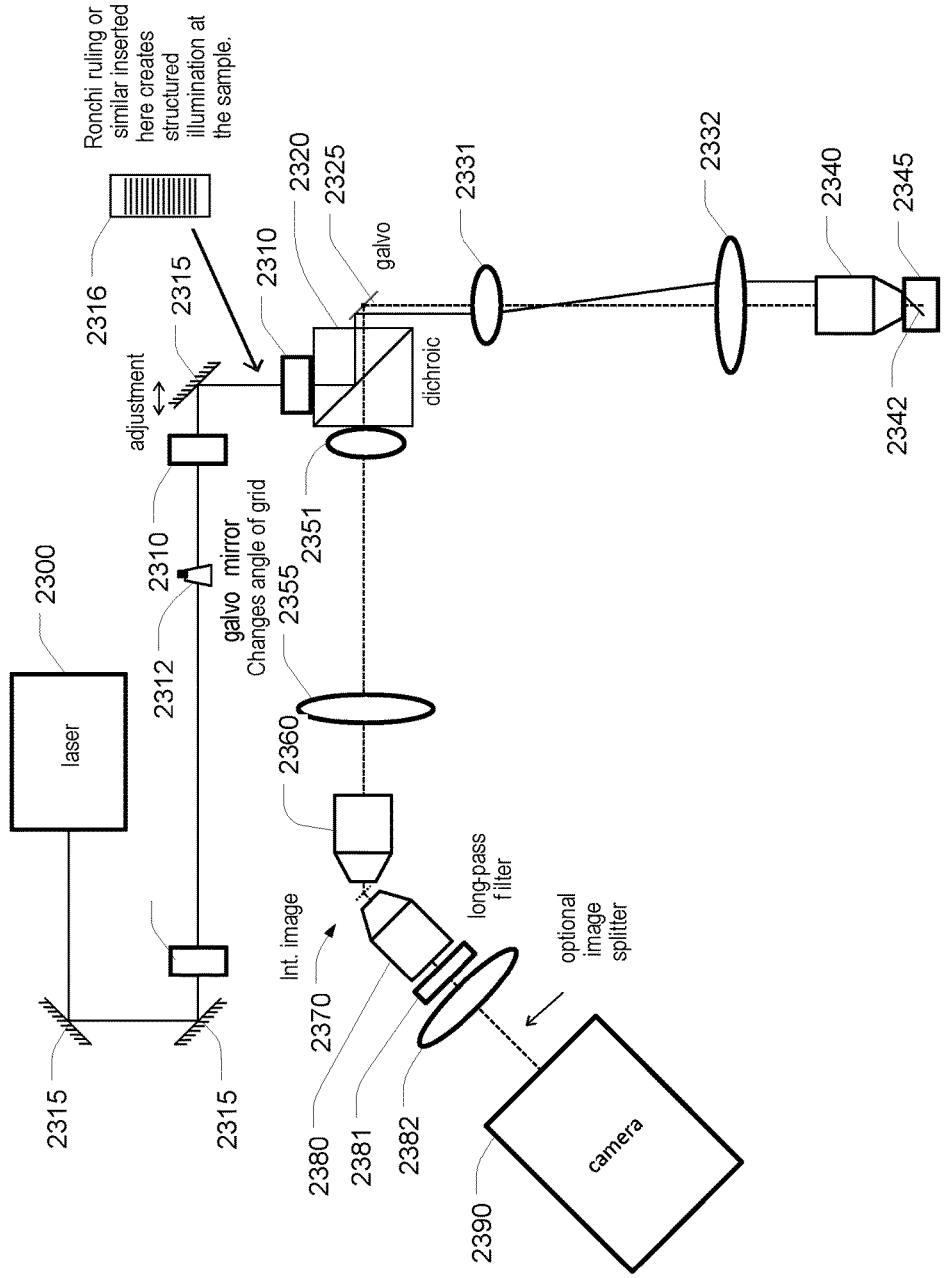
FIG. 23H illustrates structured illumination in the context of embodiments based on that of FIG. 23A with a Ronchi ruling being used for structuring a beam of light.

FIG. 23H illustrates structured illumination in the context of embodiments based on that of FIG. 23A with a Ronchi ruling being used for structuring a beam of light. Components in FIG. 23H that share reference numbers with counterparts in FIG. 23A operate in the same way as their counterparts in that figure. In the FIG. 23H embodiment, a Ronchi ruled element 2316 is inserted in the path of the illumination beam before it reaches the beam splitter 2320. This will cause a beam-parallel grid of illumination to emerge from the primary objective 2340 into the sample. Optionally, an additional galvo-mirror 2312 may be added to the illumination beam before it reaches the Ronchi ruled element 2316, in order to rock the grid of light in the sample (similar to the rocking sheet configuration of FIG. 23E) thereby permitting out of plane rejection improvement and/or superresolution imaging.

Figure 23J:
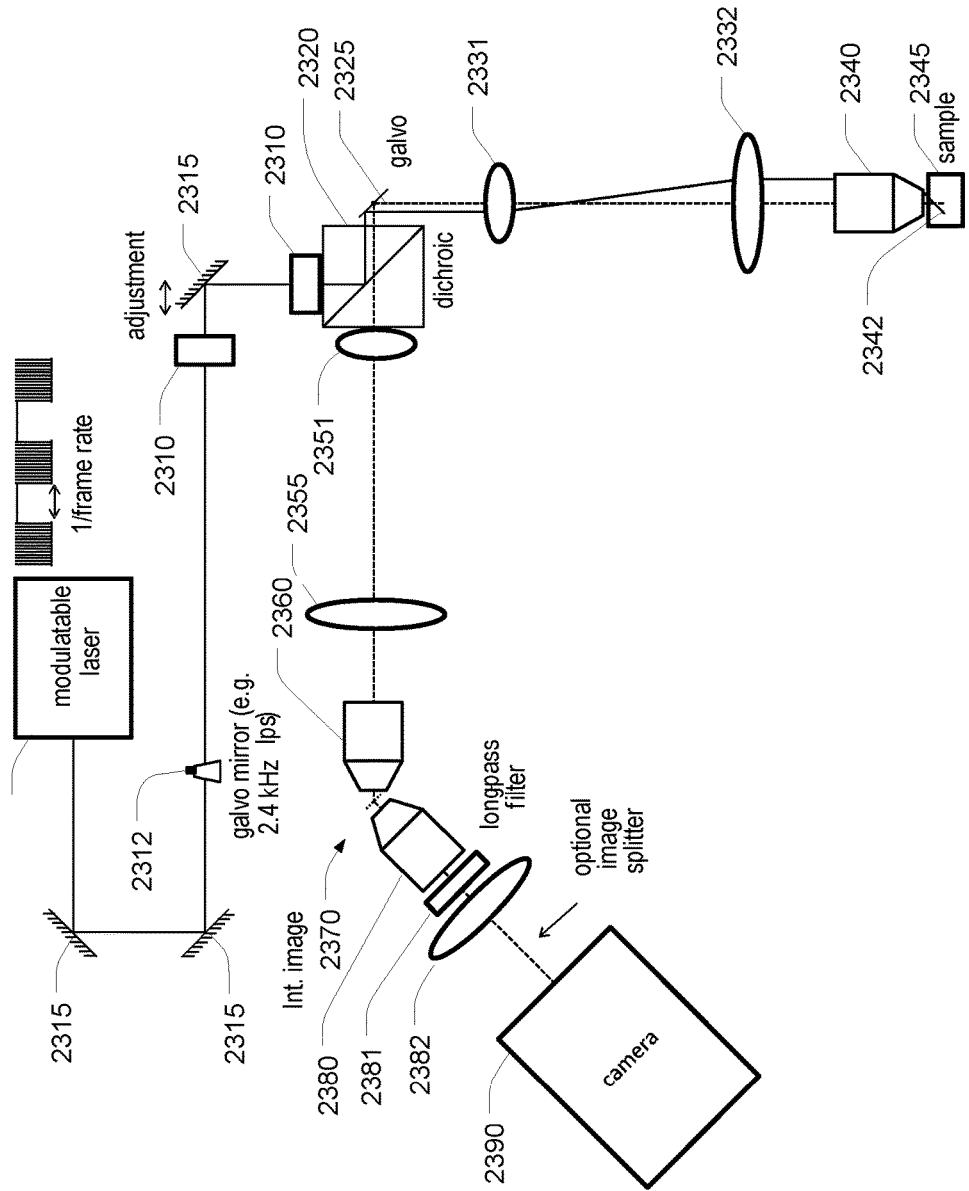
FIG. 23J illustrates structured illumination where a modulatable laser is swept to create structured illumination in a sample.

FIG. 23J illustrates an alternative approach for implementing structured illumination. Components in FIG. 23J that share reference numbers with counterparts in FIG. 23A operate in the same way as their counterparts in that figure. In the FIG. 23J embodiment, a modulatable laser 2302 such as a Coherent Obis laser is used (instead of the continuous laser 2300 from the FIG. 23A embodiment). The illumination light is switched on and off rapidly, and is swept by and added galvo mirror 2312 to create structured illumination in a sample. Note that the galvo mirror 2312 only has to line-scan at camera image frame rate. This approach could improve sectioning at the cost of a significant speed reduction, and would provide a benefit for imaging in scattering tissues such as mouse brain tissue. It could also be implemented with a two-photon embodiment to ameliorate the effects of detected light scattering.

In alternative embodiments, instead of adding the galvo mirror 2312 depicted in FIG. 23J, the same effect can be achieved by replacing the standard galvo mirror 2325 with a bidirectional galvo mirror (not shown). The on-off condition of the laser during bidirectional sweeping generates a grid pattern in the sample to provide structured illumination.

Figure 23K:
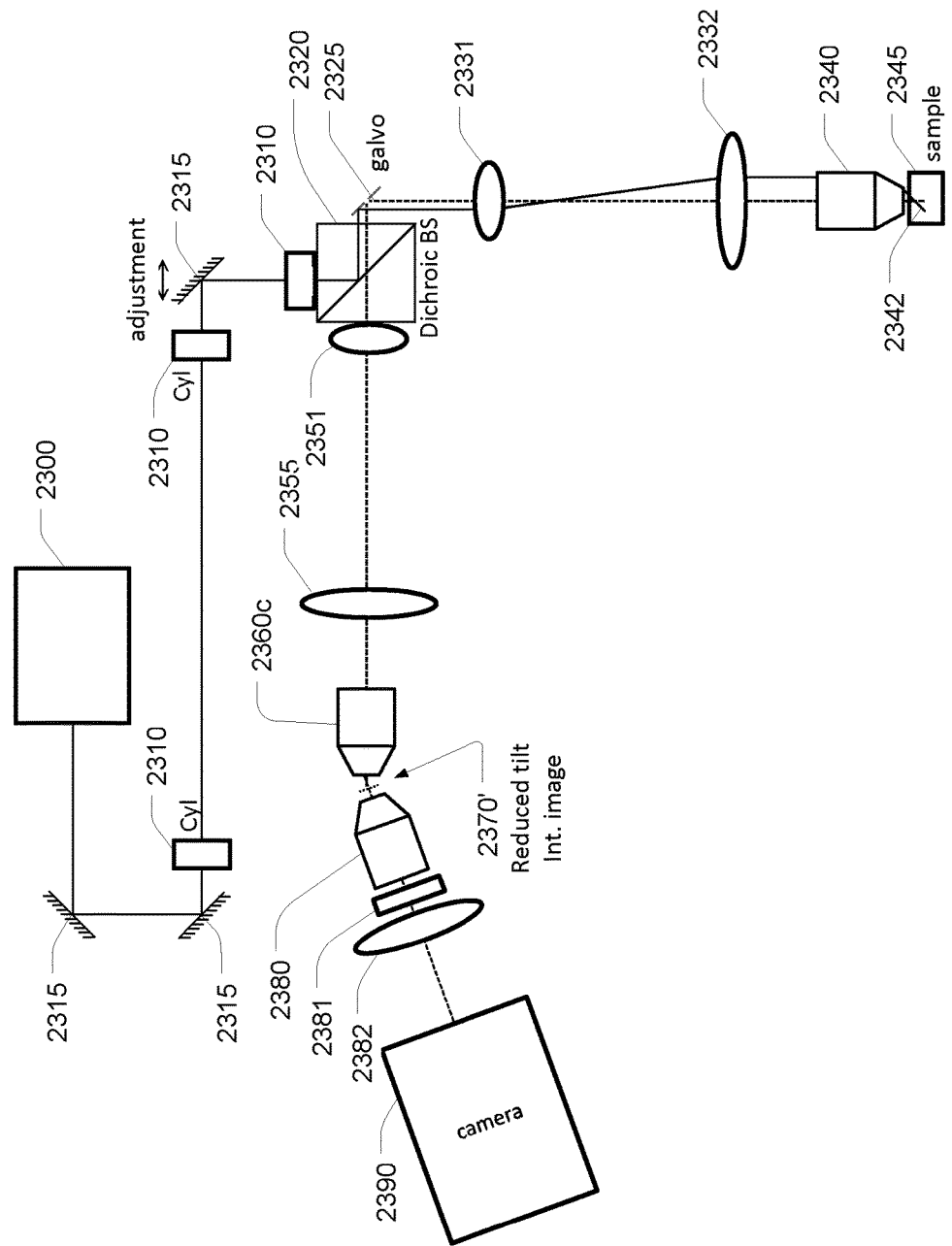
FIG. 23K depicts a variation on the FIG. 23A embodiment in which the magnification in the detection arm is greater than the magnification in the illumination arm.

FIG. 23K depicts a variation on the FIG. 23A embodiment in which the magnification in the detection arm is greater than the magnification in the illumination arm. Components in FIG. 23K that share reference numbers with counterparts in FIG. 23A operate in the same way as their counterparts in that figure. In this embodiment, the magnification of the second objective 2360c in the detection arm is greater than the magnification of the first objective 2340 in the illumination arm. This disparity reduces the tilt of the intermediate image plane 2370'. This demagnification of the intermediate image plane can provide easier alignment of the camera, more throughput, higher NA detection, use of shorter WD, higher NA lenses. Optionally, additional magnification can be added after the image rotation without affecting the angle of tilt of the intermediate image plane.

In embodiments employing a confocal microscope configuration, the detector can simply expose as the line sweeps to form the illumination planar beam, filling the plane and forming one 2-D image. This strategy can be combined and synchronized with a rolling shutter type acquisition on the detector which would be similar to having a detection slit (e.g., as in line-scanning confocal) which can improve optical sectioning and resolution.

In embodiments, the detection light can be both de-scanned in the usual way (e.g., along a first direction) and de-scanned again (e.g., along a second direction orthogonal to the first) to correct for the motion of the plane-forming linear beam. De-scanning in this second dimension can reduce the detection side image to a single line corresponding to the line of light illuminating the subject (in the oblique z' direction) at a given point in time. This incident beam scanning, and/or additional de-scanning would be at the line-scan rate equal to the volume rate (e.g., ~20 volumes per second) multiplied by the y' sweep rate (e.g., ~200 y' pixels per plane), which is an achievable 4 kHz scan/de-scan rate. Detection de-scanning of light along the second direction can also be combined with conventional cylindrical lens or similar formation of the full excitation planar illumination beam, or any other combination of plane formation and de-scanning.

In embodiments, linear detectors used in such implementations can be line-scan cameras or linear arrays (e.g., arrays of photomultiplier tubes or avalanche photodiode) or linear fiber bundles leading to linear arrays or even individual detectors, with the number of elements corresponding to the number of depths along z' acquired. Such a configuration may be advantageous for endoscopic implementations since a linear fiber bundle can be used to relay the imaging data to an external linear imaging array.

Throughout the specification and claims, the terms "actuator" and "motor" should be read to include any type of final control element capable of generating a motive force. In addition, in any of the embodiments that employ a light redirector, reflector, or any device identified or described for the function of scanning and/or de-scanning, any type of controllable beam deflector may be used, including, for example, acousto-optical deflector(s) and spatial light modulator(s) (SLM). Such variants are considered to be additional embodiments of the disclosed subject matter.

Although shown as discrete mirrors in FIGS. 10-22, it is contemplated that each of the scan and/or de-scan mirrors could be a mirror, another type of reflective optical element, a refractive element, a diffractive element, an acousto-optic modulator, a MEMS device, an SLM, or any other optical component.

In every embodiment in which a narrow beam of light is scanned transversely to form a planar, it should be recognized that a variety of different illumination patterns may be scanned including regular progressive pattern and even non-rectilinear patterns such as Lissajou figures or even irregular patterns and even random patterns. Further various illumination beam shapes may be provided. It should also be clear that key features of the disclosed subject matter relate to the function of forming depth-resolved detection of feature of a target subject and that the angle of the illumination beam in a subject may be parallel to, or angled with respect to, the optical axis of the objective. These possible variations apply to all embodiments and all claims. Embodiments and claims where illumination light is projected from an edge of the objective, may be modified such that the light beam is projected from the middle and aimed parallel, or nearly so, to the optical axis, there being sufficient optical aperture from a high numerical aperture objective to gather light emitted from the illuminated region to form an image.

In the present application, by depth-resolved it is intended to indicate that the light that is imaged comes from multiple axial positions forward of the objective.

In one or more first embodiments, an imaging device such as a microscope comprises an objective and a further lens assembly, a light source, a scanning/de-scanning optical assembly, and a light sensor. The objective and the further lens assembly are of identical configuration with respect to at least axial focusing aberrations. The objective and further lens assembly are arranged to pass image light, received by the objective lens, through the further lens assembly. The scanning/de-scanning optical assembly has a movable light-redirecting element that directs light from the light source to cause an illumination planar beam to emanate obliquely from the objective and sweep a volume region. The swept illumination planar beam scans across the volume region. The movable light-redirecting element redirects image light received from the volume region to hold a focus of light returning from a planar region illuminated by the illumination planar beam onto the light sensor as the sheet of light is swept.

In the first embodiments or any other embodiment, the imaging device further comprises a beam splitter arranged to form a junction positioned such that the image light and the light from the light source follow adjacent paths into and from the objective and follow divided paths remote from the objective.

In the first embodiments or any other embodiment, the imaging device further comprises a stationary reflector positioned to reflect the image light back through the further lens assembly. In the first embodiments or any other embodiment, the stationary reflector is oriented at an angle with respect to the optical axis of the further lens assembly. The angle is selected responsively to an angle of an intermediate image that would be formed at the position of the mirror by the objective and further lens assembly.

In the first embodiments or any other embodiment, the movable light-redirecting element is a motor-controlled reflecting element. In the first embodiments or any other embodiment, the reflecting element has a reflecting characteristic that makes identical angular changes in the direction of the light from the light source and the light received from the volume region as would a single planar reflecting surface. In the first embodiments or any other embodiment, the reflecting element has a single planar reflecting surface on which both the light from the light source and the light received from the volume region are incident.

In the first embodiments or any other embodiment, the light source generates light that is selected to generate fluorescence in a subject containing fluorescent dye. In the first embodiments or any other embodiment, the light source includes a beam flattening optical element that flattens a round beam into said planar beam of light.

In the first embodiments or any other embodiment, the light sensor includes a camera, a linear array of photomultiplier elements, and/or a single photomultiplier element.

In the first embodiments or any other embodiment, the scanning/de-scanning optical assembly includes a movable optical element that can be selectively positioned in the path of light from the light source to change the illumination beam between a planar beam of light directed toward an edge of a back aperture of said objective (identifiable as a scan mode) and a broad illumination beam extending across said back aperture (identifiable as a confocal mode). In the first embodiments or any other embodiment, the movable optical element is refractive and expands a width of the light from the light source. In the first embodiments or any other embodiment, the movable optical element is refractive and shifts a centerline of the light from the light source. In the first embodiments or any other embodiment, the scanning-de-scanning assembly is configured to control a position of said light-redirecting element over a predefined range at a time when said movable optical element is selectively positioned to provide a broad illumination beam extending across said back aperture (confocal mode). In the first embodiments or any other embodiment, the scanning-de-scanning assembly is configured to control a position of said light-redirecting element over a predefined range in response to a confocal mode control command that selectively positions said movable optical element.

In the first embodiments or any other embodiment, the scanning-de-scanning assembly includes image-forming optics, with an optical axis, that, in scan mode, generate an intermediate real image of image light returned from said illumination planar beam and a detection module that images said intermediate real image, the light sensor including a linear or two-dimensional array of pixels onto which an image of said intermediate real image is focused. The detection module has an optical axis that is oblique to said image-forming optics optical axis, whereby one or selected ones of said pixels may function as a confocal pinhole or slit in confocal mode and whereby, in scan mode, the angle between said detection module and image-forming optics optical axes is effective for correcting for variations in axial positions of points along said illumination planar beam that are imaged by said detection module.

In one or more second embodiments, an imaging device, such as a microscope, comprises an objective, a further lens assembly, a light source, and a scanning/de-scanning optical assembly. The objective and further lens assembly is arranged to pass image light, received by the objective lens, through the further lens assembly. The scanning/de-scanning optical assembly has one or more movable light-redirecting elements that direct light from the light source to generate a swept planar beam of light that emanates obliquely from an edge of the objective, the swept planar beam of light moving so as to traverse a volume. The scanning/de-scanning optical assembly includes an imaging light sensor. The one or more movable light-redirecting elements redirect image light received from the volume region to hold a focus of the illumination planar beam onto the light sensor as said sheet of light is swept. The scanning/de-scanning optical assembly include a movable optical element that can be selectively positioned in the path of light from the light source to change the illumination beam between a sheet of light directed toward an edge of a back aperture of said objective (identifiable as a scan mode) and a broad illumination beam extending across said back aperture (identifiable as a confocal mode).

In the second embodiments or any other embodiment, the imaging device further comprises a beam splitter arranged to form a junction positioned such that the image light and the light from the light source follow adjacent paths into and from the objective and follow divided paths remote from the objective.

In the second embodiments or any other embodiment, the imaging device further comprises a stationary reflector positioned to reflect the image light back through the further lens assembly. In the second embodiments or any other embodiment, the stationary reflector is oriented at an angle with respect to the optical axis of the further lens assembly, and the angle is selected responsively to one or more of the angles of the sheet of light swept obliquely from the objective.

In the second embodiments or any other embodiment, the movable light-redirecting element is a motor-controlled reflecting element.

In the second embodiments or any other embodiment, the light sensor includes a camera, a linear array of photomultiplier elements, and/or a single photomultiplier element.

In the second embodiments or any other embodiment, the light source includes a beam flattening optical element that flattens a round beam into said sheet of light.

In the second embodiments or any other embodiment, the movable optical element is refractive and expands a width of the light from the light source. In the second embodiments or any other embodiment, the movable optical element is refractive and shifts a centerline of the light from the light source.

In the second embodiments or any other embodiment, the scanning-de-scanning assembly is configured scan a focused spot or line in the volume region at a time when said movable optical element is selectively positioned to provide a broad illumination beam extending across said back aperture (confocal mode).

In the second embodiments or any other embodiment, the scanning-de-scanning assembly is configured to scan a focused spot or line in the volume region in response to a confocal mode control command that selectively positions said movable optical element.

In the second embodiments or any other embodiment, the scanning-de-scanning assembly is configured to adjust a range of positions of said light-redirecting element at a time responsively to said movable optical element being selectively positioned to provide a broad illumination beam extending across said back aperture (confocal mode). In the second embodiments or any other embodiment, the scanning-de-scanning assembly is configured to adjust a position of said light-redirecting element over a corresponding range of positions in response to a confocal mode control command that selectively positions said movable optical element.

In the second embodiments or any other embodiment, the scanning-de-scanning assembly includes image-forming optics, with an optical axis, that, in scan mode, generate an intermediate real image of image light returned from said illumination planar beam and a detection module that images said intermediate real image, the light sensor including a linear or two-dimensional array of pixels onto which an image of said intermediate real image is focused. The detection module has an optical axis that is oblique to said image-forming optics optical axis, whereby one or selected ones of said pixels may function as a confocal pinhole or slit in confocal mode and whereby, in scan mode, the angle between said detection module and image-forming optics optical axes is effective for correcting for variations in axial positions of points along said illumination planar beam that are imaged by said detection module.

In one or more third embodiments, a microscope illuminates and images a continuous or discontinuous series of illumination planar beams in a target volume so as to generate a three-dimensional view. The microscope comprises a primary imaging optical component, a light source, a scanning/de-scanning element, and a secondary imaging optical component. The primary imaging optical component has an objective lens that can be positioned relative to a subject support. The first optical assembly has optical elements selected to generate, in cooperation with the objective lens, a first intermediate image of a planar subregion within a region at a front of said objective lens. The scanning/de-scanning element has a movable light redirecting element that directs illumination light from the light source through the first optical assembly so as to generate a swept sheet of light that emanates obliquely from the objective, the swept sheet of light scanning across a volume of said region. The scanning/de-scanning element movable light redirecting element further directs image light received from the first optical assembly to hold a focus of the illumination planar beam onto a plane of said first intermediate image as said sheet of light is swept. The secondary imaging optical component has an optical axis that forms a first oblique angle with respect to an optical axis of the primary imaging optical component and an angle with the normal of the plane of said first intermediate image, whereby the size of the oblique angle is less than would be required to focus the secondary imaging optical component on said plane of said first intermediate image.

In the third embodiments or any other embodiment, the secondary imaging optical component includes a tertiary imaging optical component with an optical axis, the tertiary imaging optical component being positioned to focus a second intermediate image formed by the secondary imaging optical component onto an imaging light sensor.

In the third embodiments or any other embodiment, the device comprises a tertiary imaging optical component with an optical axis that lies at a second angle between the first angle and the optical axis of the primary imaging optical component.

In the third embodiments or any other embodiment, the primary optical imaging component includes a further component such that the first intermediate image has zero magnification.

In the third embodiments or any other embodiment, the primary optical imaging component includes a further component whose axial aberration properties are identical to those of the objective and arranged such that axial aberrations of the first intermediate image are compensated.

In the third embodiments or any other embodiment, the secondary imaging optical component includes an imaging light sensor having a sensor array defining a plane, a normal to the plane of the sensor array forming an angle with respect to the optical axis of the secondary imaging optical component optical axis.

In one or more fourth embodiments, an imaging device such as a microscope for imaging a region in a target volume comprises a primary imaging optical component, a secondary imaging optical component, and an angle-correcting element. The primary imaging optical component has an objective lens that can be positioned relative to a subject support, the first optical assembly, by itself, having optical elements effective to generate, in cooperation with the objective lens, a first intermediate image of a planar region within a region at a front of said objective lens. The secondary imaging optical component has an optical axis that is parallel to an optical axis of the primary imaging optical component and has a back focal plane at which an imaging light sensor may be located. The angle-correcting element is between the primary and second imaging optical components and causes the first intermediate image to be focused on the second imaging optical component back focal plane.

In the fourth embodiments or any other embodiment, the angle-correcting element includes an optical wedge. In the fourth embodiments or any other embodiment, the angle correcting element includes a refracting element.

In the fourth embodiments or any other embodiment, the secondary imaging optical component optical axis is non-collinear with the optical axis of the primary imaging optical component.

In the fourth embodiments or any other embodiment, the imaging device further comprises a camera sensor positioned at said back focal plane.

In the fourth embodiments or any other embodiment, the imaging device further comprises a light source and a scanning/de-scanning element with a movable light redirecting element that directs illumination light from the light source through primary imaging optical component so as to generate a swept sheet of light that emanates obliquely from the objective, the swept sheet of light scanning across a volume of said region. The scanning/de-scanning element movable light redirecting element further directs image light received from the primary imaging optical component to hold a focus of the illumination planar beam onto said back focal plane as said sheet of light is swept.

In one or more fifth embodiments, an imaging device, such as a microscope, comprises a controllable light redirecting element and a beam splitter. The controllable light redirecting element is positioned to sweep a light beam, received from a light source, through a subject volume so as to illuminate a volumetric region. The light redirecting element is further positioned and configured to receive light from multiple depths within the subject volume illuminated by the light received from the light source and to hold a focus of received light to an imaging sensor so as to form an image of the volumetric region. The beam splitter is located and configured so as to separate light received from the light source from light received from the multiple depths within the subject volume. The light redirecting element has a single planar reflecting surface on which both light received from the light source from light received from the multiple depths within the subject volume are incident.

In the fifth embodiments or any other embodiment, the beam splitter is a polarizing or dichroic beam splitter.

In the fifth embodiments or any other embodiment, the imaging device further comprises a beam-flattening element that forms a sheet of light from the light source. The light swept through the subject volume is swept having a direction of sweep with a substantial component normal to a principal plane of said sheet of light.

In the fifth embodiments or any other embodiment, the light redirecting element is controlled to form a stationary image of the subject volume on the imaging sensor, whereby a changing feature of the subject volume is received by the imaging sensor.

In the fifth embodiments or any other embodiment, the microscope comprises an element configured to receive the light from different depths within the subject volume and to compensate for an oblique orientation of the stationary image with respect to an optical axis of a primary objective.

In one or more sixth embodiments, an imaging device, such as a microscope, comprises an objective and a light source. The objective captures and transmits image light, received by the objective lens, to a scanning/de-scanning optical assembly. The scanning/de-scanning optical assembly directs light from the light source to cause a swept sheet of light to emanate obliquely from the objective. The swept sheet of light scans across a volume region. The scanning/de-scanning optical assembly includes a light sensor. The movable light-redirecting element redirects image light received from the volume region to hold a focus of the illumination planar beam onto the light sensor as said sheet of light is swept. The image light of said focus includes light passing through said objective on both sides of an optical axis thereof such that central portions of an aperture thereof are captured and used for forming an image of a target.

In the sixth embodiments or any other embodiments, the image light of said focus includes light passing through a major fraction of an aperture of said objective.

In the sixth embodiments or any other embodiments, the imaging device further comprises a further lens assembly that are of identical configuration with respect to at least axial focusing aberrations, the objective and further lens assembly being arranged to pass image light, received by the objective lens, through the further lens assembly and a stationary reflector positioned to reflect the image light back through the further lens assembly. In the sixth embodiments or any other embodiments, the stationary reflector is oriented at an angle with respect to the optical axis of the further lens assembly, the angle being selected responsively to one or more of the angles of the sheet of light swept obliquely from the objective.

In the sixth embodiments or any other embodiments, the scanning/de-scanning optical assembly includes a movable light-redirecting element. In the sixth embodiments or any other embodiments, the movable light-redirecting element is moved by an actively controlled light redirecting element of the scanning/de-scanning optical assembly. In the sixth embodiments or any other embodiments, the reflecting element has a reflecting characteristic that makes identical angular changes in the direction of the light from the light source and the light received from the volume region as would a single planar reflecting surface. In the sixth embodiments or any other embodiments, the reflecting element has a single planar reflecting surface on which both the light from the light source and the light received from the volume region are incident.

In the sixth embodiments or any other embodiments, the light source generates light that is selected to generate fluorescence in a subject containing fluorescent dye. In the sixth embodiments or any other embodiments, the light source includes a beam flattening optical element that flattens a round beam into said sheet of light.

In the sixth embodiments or any other embodiments, the light sensor includes a camera, a linear array of photomultiplier elements, and/or a single photomultiplier element.

In the sixth embodiments or any other embodiments, the scanning/de-scanning optical assembly includes a movable optical element that can be selectively positioned in the path of light from the light source to change the illumination beam between a sheet of light directed toward an edge of a back aperture of said objective (identifiable as a scan mode) and a broad illumination beam extending across said back aperture (identifiable as a confocal mode). In the sixth embodiments or any other embodiments, the movable optical element is refractive and expands a width of the light from the light source. In the sixth embodiments or any other embodiments, the movable optical element is refractive and shifts a centerline of the light from the light source.

In the sixth embodiments or any other embodiments, the scanning-de-scanning assembly is configured to scan a focused spot or line in the volume region when said movable optical element is selectively positioned to provide a broad illumination beam extending across said back aperture (confocal mode).

In the sixth embodiments or any other embodiments, the scanning-de-scanning assembly is configured to scan a focused spot or line in the volume region in response to a confocal mode control command that selectively positions said movable optical element.

In the sixth embodiments or any other embodiments, the scanning-de-scanning assembly includes image-forming optics, with an optical axis, that, in scan mode, generate an intermediate real image of image light returned from said illumination planar beam and a detection module that images said intermediate real image, the light sensor including a linear or two-dimensional array of pixels onto which an image of said intermediate real image is focused. The detection module has an optical axis that is oblique to said image-forming optics optical axis, whereby one or selected ones of said pixels may function as a confocal pinhole or slit in confocal mode and whereby, in scan mode, the angle between said detection module and image-forming optics optical axes is effective for correcting for variations in axial positions of points along said illumination planar beam that are imaged by said detection module.

In one or more seventh embodiments, an imaging device, such as a microscope, comprises one or more lenses, a light-diverting element, and scanning/de-scanning apparatus. The one or more lenses includes an objective and is arranged to convey an illumination beam from an illumination source through the objective to form a planar illumination beam lying in a plane that is oblique with respect to an optical axis of the objective. The objective has a forward end where a subject to be imaged may be positioned and a back end opposite said forward end. The objective has an aperture, through which an image beam passes from the forward end to the back end adjacent to said illumination beam, the image beam filling a major fraction of the aperture and having a cross-section that extends through the objective optical axis. The light-diverting element is positioned along a first path of said illumination beam extending away from the back end of the objective, the illumination beam and the image beam being along said first path. The light-diverting element is shaped, sized, and positioned relative to the objective to divert the image beam along said first path away from the illumination beam so that the image beam follows a second path that progresses away from a third path followed by the illumination beam. The scanning/de-scanning apparatus is positioned to scan and de-scan, respectively, the image and illumination beams being such that the planar illumination beam sweeps through a volume proximate said objective front end and such that a focus on the planar illumination beam is maintained on a detector at all times during the sweep.

In the seventh embodiments or any other embodiment, the scanning/de-scanning apparatus includes a motor that pivots the light-diverting element or an acousto-optical deflector.

In the seventh embodiments or any other embodiment, the light-diverting element has a V-shaped reflecting surface.

In one or more eighth embodiment, a multiple-mode microscope comprises a microscope objective, an illumination component, a receive component, a scanning/de-scanning element, and a light detection module. The microscope objective has an aperture and an optical axis. The illumination component is configured to generate, selectively, first and second beams, the first beam having a width spanning a major fraction of the objective aperture and centered on, or offset with respect to, said optical axis, the second beam being confined to a region of the aperture smaller than the first and on a single side of the objective aperture. The receive component is positioned to receive an image beam constituting light received through said aperture and propagating in a direction opposite a propagation direction of the illumination beam, the image beam spanning a major fraction of said aperture. The scanning/de-scanning element includes a movable light redirector in the paths of the first beam, the second beam, and the image beam, the movable light redirector being positioned to scan the illumination beam and de-scan each of said first and second beams and said image beam. The light detection module is positioned to receive light from the light redirector, the light detection module having an imaging element, the imaging element having multiple pixels extending along one or two axes. The light detection module has optics adapted to form and rotate an image from said image beam and to map said image to said imaging element, the image including a development of light returned from a target at multiple depths along the objective optical axis in a volumetric imaging mode.

In the eighth embodiments or any other embodiment, said image includes a two-dimensional image of a plane in a volume imaged by the objective, wherein the plane is oblique relative to the objective optical axis. In the eighth embodiments or any other embodiment, said image includes a two-dimensional image of a line in a volume imaged by the objective, wherein the line is oblique relative to the objective optical axis.

In the eighth embodiments or any other embodiment, the movable light redirector is adapted to pivot about two orthogonal axes to scan and de-scan the illumination and image beams through a solid angular range. In the eighth embodiments or any other embodiment, the movable light redirector is adapted to pivot to scan and de-scan the illumination and image beams through an angular range.

In one or more ninth embodiments, a method of using the microscope of any of the eighth embodiments comprises configuring the illumination component to generate the first beam and using light from a selected subset of the pixels to discriminate light in said image beam arising from a single point during a confocal mode.

In one or more tenth embodiments, a method of using the microscope of any of the eighth embodiments comprises configuring the illumination component to generate the first beam and using light from a selected single one of the pixels to discriminate light in said image beam arising from a single point during a confocal mode.

In one or more eleventh embodiments, a method of using the microscope of any of the eighth embodiments comprises configuring the illumination component to generate the second beam and using light from all of said pixels to generate an image of a volume of a subject.

In one or more twelfth embodiments, a method of using the microscope of any of the eighth embodiments comprises using light from a selected subset of the pixels to discriminate light in said image beam arising from a single point during a confocal mode.

In one or more thirteenth embodiments, a method of using the microscope of any of the eighth embodiments comprises using light from a selected single one of the pixels to discriminate light in said image beam arising from a single point during a confocal mode.

In one or more fourteenth embodiments, a method of using the microscope of any of the eighth embodiments using light from all of said pixels to generate an image of a volume of a subject.

In one or more fifteenth embodiments, a multiple-mode microscope comprises a microscope objective, an illumination component, a receive component, a scanning/de-scanning element, and a light detection module. The microscope objective has an aperture and an optical axis. The illumination component is configured to generate, selectively, first and second beams, the first beam having a width spanning the objective aperture and centered on said optical axis, the second beam being confined to a smaller region of the aperture on a single side of the objective aperture. The receive component is positioned to receive an image beam constituting light received through said aperture and propagating in a direction opposite a propagation direction of the illumination beam, the image beam spanning a major fraction of said aperture. The scanning/de-scanning element includes a movable light redirector in the paths of the first beam, the second beam, and the image beam, the movable light redirector being positioned to scan the illumination beam and de-scan each of said first and second beams and said image beam. The light detection module is positioned to receive light from the light redirector, the light detection module having an imaging element, the imaging element having multiple pixels extending along one or two axes. The light detection module has optics adapted to form and rotate an image from said image beam and to map said image to said imaging element, the image including a development of light returned from a target at multiple depths along the objective optical axis in a volumetric imaging mode.

In the fifteenth embodiments or any other embodiment, said image includes a two-dimensional image of a plane in a volume imaged by the objective, wherein the plane is oblique relative to the objective optical axis. In the fifteenth embodiments or any other embodiment, said image includes a two-dimensional image of a line in a volume imaged by the objective, wherein the line is oblique relative to the objective optical axis.

In the fifteenth embodiments or any other embodiment, the movable light redirector is adapted to pivot about two orthogonal axes to scan and de-scan the illumination and image beams through a solid angular range. In the fifteenth embodiments or any other embodiment, the movable light redirector is adapted to pivot to scan and de-scan the illumination and image beams through an angular range.

In one or more sixteenth embodiments, a method of using the microscope of any of the fifteenth embodiments comprises configuring the illumination component to generate the first beam and using light from a selected subset of the pixels to discriminate light in said image beam arising from a single point during a confocal mode.

In one or more seventeenth embodiments, a method of using the microscope of any of the fifteenth embodiments comprises configuring the illumination component to generate the first beam and using light from a selected single one of the pixels to discriminate light in said image beam arising from a single point during a confocal mode.

In one or more eighteenth embodiments, a method of using the microscope of any of the fifteenth embodiments comprises configuring the illumination component to generate the second beam and using light from all of said pixels to generate an image of a volume of a subject.

In one or more nineteenth embodiments, a method of using the microscope of any of the fifteenth embodiments comprises using light from a selected subset of the pixels to discriminate light in said image beam arising from a single point during a confocal mode.

In one or more twentieth embodiments, a method of using the microscope of any of the fifteenth embodiments comprises using light from a selected single one of the pixels to discriminate light in said image beam arising from a single point during a confocal mode.

In one or more twenty-first embodiments, a method of using the microscope of any of the fifteenth embodiments comprises using light from all of said pixels to generate an image of a volume of a subject.

In one or more twenty-second embodiments, an imaging device, such as a microscope, comprises an objective, further optical elements, and a detection module. The objective is arranged to receive light from a volumetric region at a front end of the objective. The further optical elements are arranged to receive image light from the objective and to form a first image of a planar region in the volumetric region, wherein a plane of the first image and a plane of the planar region are oblique relative to an optical axis of the objective. The detection module has first detection optics with an optical axis positioned at a first angle relative to an optical axis of the further optical elements at a point where the first image is formed, the first angle being selected to be less a second angle of the first image relative to the optical axis of the further optical elements, whereby the further optical elements are focused on a plane that forms an angle relative to said plane of the first image. The detection module includes a light detector positioned to receive image light from said first image and to form an unfocused image of the first image.

In the twenty-second embodiments or any other embodiment, the further optical elements include an optical element substantially identical to said objective.

In the twenty-second embodiments or any other embodiment, the imaging device further comprises scanning/de-scanning element adapted for changing a position of a planar illumination beam passing through planar region such that the planar region moves. In the twenty-second embodiments or any other embodiment, the imaging device further comprises scanning/de-scanning element adapted for changing a position of the planar region by redirecting image light received from the objective.

In one or more twenty-third embodiments, an imaging device, such as a microscope, comprises an objective, further optical elements, and a detection module. The objective is arranged to receive light from a volumetric region at a front end of the objective. The further optical elements are arranged to receive image light from the objective and to form a first image of a planar region in the volumetric region, wherein a plane of the first image and a plane of the planar region are oblique relative to an optical axis of the objective. The detection module has first detection optics with an optical axis positioned at a first angle relative to an optical axis of the further optical elements at a point where the first image is formed, the first angle being selected to be less a second angle of the first image relative to the optical axis of the further optical elements, whereby the further optical elements are focused on a plane that forms an angle relative to said plane of the first image and forms a second image. The detection module includes second detection optics focused on said second image and a light detector positioned having a detecting surface that coincides with the second image.

In the twenty-third embodiments or any other embodiment, the further optical elements include an optical element substantially identical to said objective.

In the twenty-third embodiments or any other embodiment, the imaging device further comprises scanning/de-scanning element adapted for changing a position of a planar illumination beam passing through planar region such that the planar region moves. In the twenty-third embodiments or any other embodiment, the imaging device further comprises scanning/de-scanning element adapted for changing a position of the planar region by redirecting image light received from the objective.

In one or more twenty-fourth embodiments, an imaging device, such as a microscope, comprises an objective, further optical elements, a detection module, and an optical prism. The objective is arranged to receive light from a volumetric region at a front end of the objective. The further optical elements are arranged to receive image light from the objective and to form a first image of a planar region in the volumetric region, wherein a plane of the first image and a plane of the planar region are oblique relative to an optical axis of the objective. The detection module has first detection optics with an optical axis positioned parallel to and offset relative to an optical axis of the further optical elements at a point where the first image would be formed by the further optical elements. The optical prism is positioned between the further optical elements and the detection module to rotate the first image to be orthogonal to the first detection optics optical axis. The detection module includes a light detector positioned to receive image light from said first image, the first detection optics being adapted to form a final image of the first image on the light detector.

In the twenty-fourth embodiments or any other embodiment, the further optical elements include an optical element substantially identical to said objective.

In the twenty-fourth embodiments or any other embodiment, the imaging device further comprises scanning/de-scanning element adapted for changing a position of a planar illumination beam passing through planar region such that the planar region moves. In the twenty-fourth embodiments or any other embodiment, the imaging device further comprises scanning/de-scanning element adapted for changing a position of the planar region by redirecting image light received from the objective.

In one or more twenty-fifth embodiments, a multiple-mode microscope comprises a microscope objective, an illumination component, a receive component, a scanning/de-scanning element, and a light detection module. The microscope objective has an aperture and an optical axis. The illumination component is configured to generate, selectively, first and second beams, the first beam being confined to one side of said optical axis and the second beam being confined to an opposite side of the optical axis. The receive component is positioned to receive an image beam constituting light received through said aperture and propagating in a direction opposite a propagation direction of the illumination beam, the image beam spanning a major fraction of said aperture. The scanning/de-scanning element includes a movable light redirector in the paths of the first beam, the second beam, and the image beam, the movable light redirector being positioned to scan the illumination beam and de-scan each of said first and second beams and said image beam. The light detection module is positioned to receive light from the light redirector, the light detection module having an imaging element, the imaging element having multiple pixels extending along one or two axes. The light detection module has optics adapted to form and rotate an image from said image beam and to map said image to said imaging element, the image including a development of light returned from a target at multiple depths along the objective optical axis in a volumetric imaging mode.

In the twenty-fifth embodiments or any other embodiment, said image includes a two-dimensional image of a plane in a volume imaged by the objective, wherein the plane is oblique relative to the objective optical axis. In the twenty-fifth embodiments or any other embodiment, said image includes a two-dimensional image of a line in a volume imaged by the objective, wherein the line is oblique relative to the objective optical axis.

In the twenty-fifth embodiments or any other embodiment, the movable light redirector is adapted to pivot about two orthogonal axes to scan and de-scan the illumination and image beams through a solid angular range. In the twenty-fifth embodiments or any other embodiment, the movable light redirector is adapted to pivot to scan and de-scan the illumination and image beams through an angular range.

In one or more twenty-sixth embodiments, a method of using the microscope of any of the twenty-fifth embodiments comprises configuring the illumination component to generate the first beam and using light from a selected subset of the pixels to discriminate light in said image beam arising from a single point during a confocal mode.

In one or more twenty-seventh embodiments, a method of using the microscope of any of the twenty-fifth embodiments comprises configuring the illumination component to generate the first beam and using light from a selected single one of the pixels to discriminate light in said image beam arising from a single point during a confocal mode.

In one or more twenty-eighth embodiments, a method of using the microscope of any of the twenty-fifth embodiments comprises configuring the illumination component to generate the second beam and using light from all of said pixels to generate an image of a volume of a subject.

In one or more twenty-ninth embodiments, a method of using the microscope of any of the twenty-fifth embodiments comprises using light from a selected subset of the pixels to discriminate light in said image beam arising from a single point during a confocal mode.

In one or more thirtieth embodiments, a method of using the microscope of any of the twenty-fifth embodiments comprises using light from a selected single one of the pixels to discriminate light in said image beam arising from a single point during a confocal mode.

In one or more thirty-first embodiments, a method of using the microscope of any of the twenty-fifth embodiments comprises using light from all of said pixels to generate an image of a volume of a subject.

In one or more thirty-second embodiments, an imaging device, such as a microscope, comprises one or more lenses, a light-diverting element, and an adjustment mechanism. The one or more lenses, including an objective, are arranged to convey an illumination beam from an illumination source through the objective to form a planar illumination beam lying in a plane that is oblique with respect to an optical axis of the objective. The objective has a forward end where a subject to be imaged may be positioned and a back end opposite said forward end. The objective has an aperture, through which an image beam passes from the forward end to the back end adjacent to said illumination beam. The light-diverting element is positioned along a first path of said illumination beam extending away from the back end of the objective, the illumination beam and the image beam being adjacent along said first path. The light-diverting element is shaped, sized, and positioned relative to the objective to divert the image beam along said first path away from the illumination beam so that the image beam follows a second path that progresses away from a third path followed by the illumination beam. The scanning/de-scanning apparatus is positioned to scan and de-scan, respectively, the image and illumination beams such that the planar illumination beam sweeps through a volume proximate said objective front end and such that a focus on the planar illumination beam is maintained on a detector, where by multiple planar illumination beam planes are defined by the sweep, the planes being infinite series of instances or discrete instances. The adjustment mechanism allows the spacing of one or more lenses to be adjusted to allow the proximal spacing and angles between adjacent instances of said planes to be adjusted.

In one or more thirty-third embodiments, an imaging device, such as a microscope, comprises a light redirecting element and a beam splitter. The light redirecting element is positioned to sweep a light beam, received from a light source, through a subject volume so as to illuminate a line along an axial extent thereof. The light redirecting element is further positioned and configured to receive light from multiple depths within the subject volume illuminated by the light received from the light source and to hold a focus of received light to an imaging sensor so as to form an image of the volumetric region. The beam splitter is located and configured so as to separate light received from the light source from light received from the multiple depths within the subject volume. The light redirecting element has one or more planar reflecting surfaces on which both light received from the light source from light received from the multiple depths within the subject volume are incident.

In the thirty-third embodiments or any other embodiment, the beam splitter is a polarizing or dichroic beam splitter.

In the thirty-third embodiments or any other embodiment, the imaging device further comprises a beam-flattening element that forms a sheet of light of light from the light source, the light swept through the subject volume swept having a direction of sweep with a substantial component normal to a principal plane of said sheet of light.

In the thirty-third embodiments or any other embodiment, the light redirecting element is controlled to form a stationary image of the subject volume on the imaging sensor, whereby a changing feature of the subject volume is received by the imaging sensor.

In the thirty-third embodiments or any other embodiment, the microscope comprises an element configured to receive the light from different depths within the subject volume and to compensate for an oblique orientation of the stationary image with respect to an optical axis of a primary objective.

In one or more thirty-fourth embodiments, a method for imaging a subject comprises scanning an illumination beam and de-scanning an image beam, respectively, by redirecting an illumination beam from a light source using a light redirector, to provide light to a subject volume, redirecting, to the light redirector, an image beam comprising light from different depths within the subject volume to provide said light to a light detector capable of detecting individual measurements of light from different locations along a first direction, using a beam splitter to separate illumination beam provided to the subject volume from image beam, and controlling the light redirector during said scanning and de-scanning so as to provide a stationary image of the illuminated region of the subject volume to the light detector.

In the thirty-fourth embodiments or any other embodiment, the illumination beam includes a planar beam that illuminates a plane within the subject.

In the thirty-fourth embodiments or any other embodiment, the method comprises refracting the light from the light source to be provided to the subject volume, or refracting the light from different depths within the subject volume to be provided to the light redirector.

In the thirty-fourth embodiments or any other embodiment, the method comprises refracting the light received from the light source to illuminate a plane within the subject volume.

In the thirty-fourth embodiments or any other embodiment, the method comprises filtering the light received from the different depths within the subject volume to provide a filtered stationary image to said light detector during the scan.

In the thirty-fourth embodiments or any other embodiment, the method comprises converting scan data detected by the light detector to two-dimensional (2D) or three-dimensional (3D) image data at appropriate image pixel positions corresponding to locations within the subject volume from.

In the thirty-fourth embodiments or any other embodiment, the method comprises compensating the light received from different depths in within the subject volume for the orientation of the stationary image.

In the thirty-fourth embodiments or any other embodiment, the method comprises altering a beam width of the light from different depths within the subject volume with an aperture.

In one or more thirty-fifth embodiments, a method for forming an imaging comprises passing an illumination beam through an objective and into a subject, traversing multiple depths along an optical axis of the objective, receiving image light returned from the subject through the objective, the image light including light returned from the multiple depths, controlling the illumination beam to move the illumination beam through multiple locations transverse of the objective optical axis, and controlling the image light returned through the objective to generate a stationary image of the light returned from multiple depths on respective portions of a light detector as the illumination beam is moved. The controlling is such that the illumination beam and the light returned through the objective follow adjacent paths that propagate through a common aperture. The method can further comprise separating the image light from the illumination beam and the image light at said common aperture.

In the thirty-fifth embodiments or any other embodiment, the separating is done using a beam splitter. In the thirty-fifth embodiments or any other embodiment, the beam splitter is a dichroic beam splitter and the image light and the illumination beam have different wavelength characteristics.

In the thirty-fifth embodiments or any other embodiment, the controlling the light returned through the objective includes passing the image light through an optical assembly in a first direction and reflecting it from a stationary mirror to direct it back again through the same optical assembly in a reverse direction. In the thirty-fifth embodiments or any other embodiment, the optical assembly includes focusing optics. In the thirty-fifth embodiments or any other embodiment, the optical assembly is effective to form an intermediate real image of features in the subject illuminated by the illumination beam. In the thirty-fifth embodiments or any other embodiment, the optical assembly is identical to said objective.

In the thirty-fifth embodiments or any other embodiment, the controlling the image light returned through the objective is effective to generate a stationary image of the light returned from multiple depths on respective portions of a light detector at every instant of a movement of the illumination beam.

In the thirty-fifth embodiments or any other embodiment, the controlling the illumination beam includes directing the illumination beam from a light source onto a movable mirror. In the thirty-fifth embodiments or any other embodiment, the controlling the image light includes directing the image light onto the same movable mirror. In the thirty-fifth embodiments or any other embodiment, the illumination beam and the image light pass through a common aperture to the same movable mirror. In the thirty-fifth embodiments or any other embodiment, the same movable mirror has a single continuous planar reflective surface that redirects both the illumination beam and the image light. In the thirty-fifth embodiments or any other embodiment, the stationary mirror is oriented at an angle with respect to the optical axis of the optical assembly.

In the thirty-fifth embodiments or any other embodiment, the illumination beam wavelength properties are selected to cause fluorescence of a predefined dye and the method further includes incorporating said predefined dye in a composition of said subject.

In the thirty-fifth embodiments or any other embodiment, the controlling the illumination beam includes actuating said movable mirror with a motor. In the thirty-fifth embodiments or any other embodiment, the controlling the illumination beam includes actuating said movable mirror with a galvo motor. In the thirty-fifth embodiments or any other embodiment, the controlling the illumination beam includes actuating said movable mirror with a motor controlled by a processor to implement a predefined scan sequence.

In the thirty-fifth embodiments or any other embodiment, the controlling the illumination beam includes directing the illumination beam from a light source onto processor controlled light redirector. In the thirty-fifth embodiments or any other embodiment, the light redirector includes one of a motor-actuated reflecting element, a motor-actuated refracting element, a Digital Micromirror Device (DMD), a microelectromechanical system (MEMS) optical guide, mirror, or other suitable MEMS device, optical fiber bundle, an acousto-optic deflector (AOD), Spatial Light Modulator (SLM) or other technologies such as MEMS, DMD, or SLM devices capable of serving as light directors that can be controlled to provide the specified spatial relationship of the first light redirector to the illumination and image light. In the thirty-fifth embodiments or any other embodiment, the light-redirecting element includes a reflecting element with a reflecting characteristic that makes identical angular changes in the direction of the illumination beam from the light source and the image light received from the subject. In the thirty-fifth embodiments or any other embodiment, the light redirector causes identical angular changes to both the image light and the illumination beam incident thereon.

In the thirty-fifth embodiments or any other embodiment, the light detector includes a camera, a CCD sensor, and/or a linear photomultiplier array.

In the thirty-fifth embodiments or any other embodiment, the method further comprises conditioning the illumination beam so that it has a flat cross-section.

In the thirty-fifth embodiments or any other embodiment, the controlling the illumination beam is effective to cause it to move in a discontinuous pattern. In the thirty-fifth embodiments or any other embodiment, the controlling the illumination beam is effective to cause it to move in a pattern that includes nonlinear portions.

In the thirty-fifth embodiments or any other embodiment, the method further comprises changing a width of said illumination beam and processing image data received from said light detector to discriminate light returned from focal spots or focal lines in said subject. In the thirty-fifth embodiments or any other embodiment, the processing includes deconvolving image data to remove blur in the image. In the thirty-fifth embodiments or any other embodiment, the processing includes selecting data from predefined pixels such that the light detector functions as a slit aperture or pinhole. In the thirty-fifth embodiments or any other embodiment, at a time during which said width is so changed, controlling the illumination beam to cause a focal spot or focal line to traverse a plane at a single axial distance from the objective. In the thirty-fifth embodiments or any other embodiment, the changing is responsive to a command to change from a depth-resolved imaging mode to a confocal mode.

In one or more thirty-sixth embodiments, a method for forming an imaging comprises passing an illumination beam through an objective and into a subject, traversing multiple depths along an optical axis of the objective, receiving image light returned from the subject through the objective, the image light including light returned from the multiple depths, controlling the illumination beam to move the illumination beam through multiple locations transverse of the objective optical axis, and controlling the image light returned through the objective to generate a stationary image of the light returned from multiple depths on respective portions of a light detector as the illumination beam is moved. The controlling the image light includes passing the image light through focusing optics to generate an intermediate image and focusing optics on a plane that intersects a plane of said intermediate image but not on the plane of the intermediate image and using said focusing optics, generating said stationary image from said intermediate image on said light detector.

In the thirty-sixth embodiments or any other embodiment, the first and second controlling steps are such that the illumination beam and the light returned through the objective follow adjacent paths that propagate through a common aperture.

In the thirty-sixth embodiments or any other embodiment, the method further comprises separating the image light from the illumination beam and the image light at said common aperture. In the thirty-sixth embodiments or any other embodiment, the separating is done using a beam splitter. In the thirty-sixth embodiments or any other embodiment, the beam splitter is a dichroic beam splitter and the image light and the illumination beam have different wavelength characteristics.

In the thirty-sixth embodiments or any other embodiment, the controlling the illumination beam includes directing the illumination beam from a light source onto a movable mirror. In the thirty-sixth embodiments or any other embodiment, the controlling the image light includes directing the image light onto the same movable mirror. In the thirty-sixth embodiments or any other embodiment, the illumination beam and the image light pass through a common aperture to the same movable mirror. In the thirty-sixth embodiments or any other embodiment, the same movable mirror has a single continuous planar reflective surface that redirects both the illumination beam and the image light.

In the thirty-sixth embodiments or any other embodiment, the illumination beam wavelength properties are selected to cause fluorescence of a predefined dye and the method further includes incorporating said predefined dye in a composition of said subject.

In the thirty-sixth embodiments or any other embodiment, the controlling the illumination beam includes actuating said movable mirror with a motor. In the thirty-sixth embodiments or any other embodiment, the controlling the illumination beam includes actuating said movable mirror with a galvo motor. In the thirty-sixth embodiments or any other embodiment, the controlling the illumination beam includes actuating said movable mirror with a motor controlled by a processor to implement a predefined scan sequence.

In the thirty-sixth embodiments or any other embodiment, the controlling the illumination beam includes directing the illumination beam from a light source onto processor controlled light redirector. In the thirty-sixth embodiments or any other embodiment, the light redirector includes one of a motor-actuated reflecting element, a motor-actuated refracting element, a Digital Micromirror Device (DMD), a microelectromechanical system (MEMS) optical guide, mirror, or other suitable MEMS device, optical fiber bundle, an acousto-optic deflector (AOD), Spatial Light Modulator (SLM) or other technologies such as MEMS, DMD, or SLM devices capable of serving as light directors that can be controlled to provide the specified spatial relationship of the first light redirector to the illumination and image light. In the thirty-sixth embodiments or any other embodiment, the light-redirector includes a reflecting element with a reflecting characteristic that makes identical angular changes in the direction of the illumination beam from the light source and the image light received from the subject. In the thirty-sixth embodiments or any other embodiment, the light redirector causes identical angular changes to both the image light and the illumination beam incident thereon.

In the thirty-sixth embodiments or any other embodiment, the light detector includes a camera, a CCD sensor, and/or a linear photomultiplier array.

In one or more thirty-seventh embodiments, a method for forming an imaging comprises passing an illumination beam through an objective and into a subject, traversing multiple depths along an optical axis of the objective, receiving image light returned from the subject through the objective, the image light including light returned from the multiple depths, controlling the illumination beam to move the illumination beam through multiple locations transverse of the objective optical axis, and controlling the image light returned through the objective to generate a stationary image of the light returned from multiple depths on respective portions of a light detector as the illumination beam is moved. The controlling the image light includes passing the image light through focusing optics configured to generate an intermediate image of said light returned from multiple depths. The method can further include receiving light in the focusing optics that would otherwise form said intermediate image and turning rays in the received light.

In the thirty-seventh embodiments or any other embodiment, the turning beams includes passing the rays through an optical wedge.

In one or more thirty-eighth embodiments, a method for forming an image of a subject comprises projecting light into the subject through a first lens with a magnification along a path such that the light illuminates a region with a major dimension that forms a first angle relative to the first optical assembly optical axis; capturing image light from said region of the subject through the first optical assembly, and relaying said image light through a back aperture of the first optical assembly to an aperture of a second optical assembly to focus said captured image light, the second optical assembly having a second magnification that is higher than the magnification of the first optical assembly; using a third optical assembly located such that a point at which the capture image light is focused by the second optical assembly lies between the second optical and the third optical assembly, capturing light from the second optical assembly and forming an image of the illuminated region therefrom. As a consequence, the angle formed by an intermediate image relayed between the second and third optical assemblies relative an optical axis of the second optical assembly is reduced compared to an angle of the same image where the magnification of the second optical assembly were the same as that of the first optical assembly.

In the thirty-eighth embodiments or any other embodiments, the second and third optical assembly are the same optical assembly. In the thirty-eighth embodiments or any other embodiments, the using a third optical assembly includes reflecting image light from a mirror back into the second optical assembly which thereby operates as the third optical assembly. In the thirty-eighth embodiments or any other embodiments, the second and third optical assemblies are physically different apparatuses and have different magnifications. In the thirty-eighth embodiments or any other embodiments, the optical axes of the second and third optical assemblies form an angle. In the thirty-eighth embodiments or any other embodiments, the capturing light from the second optical assembly includes passing light through a prism such that light from different depths in the subject have different path lengths within said prism. In the thirty-eighth embodiments or any other embodiments, the combination of higher magnification and the prism path lengths causes rotation of an intermediate image between the second and third optical assemblies.

In one or more thirty-ninth embodiments, a method for forming an image of a subject comprises projecting light into the subject through a first lens along a path such that the light illuminates a region with a major dimension that forms a first angle relative to the first optical assembly optical axis; capturing image light from said region of the subject through the first optical assembly, and relaying said image light through a back aperture of the first optical assembly through a polarization beam splitter into an aperture of a second optical assembly to focus said captured image light; reflecting image light back into the second optical assembly and back into the polarizing beam splitter where it is reflected to an imaging device; relaying said image light through said back aperture of the first optical assembly by reflecting it from said polarization beam splitter into an aperture of a third optical assembly to focus said captured image light; reflecting image light back into the third optical assembly and back through the polarizing beam splitter where passes through it into the imaging device. As a result, imaging light initially passing through said polarization beam splitter and initially reflected from it is directed to said imaging device.

In the thirty-ninth embodiments or any other embodiments, the second and third optical assembly are identical in their optical properties.

In one or more fortieth embodiments, a method for forming an image of a subject comprises at a first time, projecting light into the subject through a first lens along a path such that the light illuminates a first region with a major dimension that forms a first angle relative to the first optical assembly optical axis; at a second time, projecting light into the subject through a first lens along a path such that the light illuminates a second region with a major dimension that forms a second angle relative to the first optical assembly optical axis; capturing image light from said first region of the subject through the first optical assembly, and relaying said image light through a back aperture of the first optical assembly through a polarization beam splitter into an aperture of a second optical assembly to focus said captured image light; reflecting said image light from said first region back into the second optical assembly and back into the polarizing beam splitter where it is reflected to an imaging device; relaying said image light from said second region of the subject through said back aperture of the first optical assembly by reflecting it from said polarization beam splitter into an aperture of a third optical assembly to focus said captured image light; reflecting said image light back from said second region into the third optical assembly and back through the polarizing beam splitter where it passes through it into the imaging device; whereby imaging light initially passing through said polarization beam splitter and initially reflected from it is directed to said imaging device.

In the fortieth embodiments or any other embodiments, the first and second angles are equal and oppositely directed. In the fortieth embodiments or any other embodiments, the first and second regions intersect. The fortieth embodiments or any other embodiments may include splitting the image light to form an image from the image light from first region and the second region on respective portions of a light detecting array. In the fortieth embodiments or any other embodiments, the second and third optical assembly are identical in their optical properties.

In one or more forty-first embodiments, a method of imaging a subject includes projecting light into multiple depths of a subject as a sheet and at respective times; tilting the sheet of light at multiple angles in the plane of the sheet so as to cast shadows of same features in the subject in different directions; capturing image light from the multiple depths and forming multiple images from said captured image light, each corresponding to a different one of said multiple angles and each of said images having a respective portion corresponding to a depth; and combining the multiple images to form a single image.

In the forty-first embodiments or any other embodiments, the combining includes compensating for shadowed regions in one image using a region in another image. In the forty-first embodiments or any other embodiments, the projecting includes forming a light sheet that forms an angle relative to an optical axis of an objective, and wherein the capturing includes passing light received from the subject through the same objective, the method further comprising iterating said steps of projecting, tilting and capturing for multiple positions or angles of said light sheet relative to the optical axis, whereby said sheet of light is scanned, and wherein said forming multiple images includes de-scanning image light such that said multiple images are stationary over iterations of said iterating.

In one or more forty-second embodiments, an optical imaging apparatus comprises a beam splitter, a first light scanning element, a second light scanning element, an objective, an illumination source, and a light detector. The illumination source sends illumination light into the objective via a first optical path that includes the beam splitter and the first light scanning element. The beam splitter and the first light scanning element redirect the illumination light towards a peripheral region of the objective such that the illumination light passes through the objective and forms an oblique imaging plane in a tissue. The position of the oblique imaging plane within the tissue varies depending on an orientation of the first light scanning element. The objective accepts return light from the oblique imaging plane and passes the return light onto a second optical path that includes the beam splitter and the second light scanning element, and the beam splitter and the second light scanning element route the return light along the second optical path so as to form a stationary tilted intermediate image plane. The light detector captures an image of the stationary tilted intermediate image plane.

In the forty-second embodiments or any other embodiments, a single reflecting surface serves as both the first light scanning element and the second light scanning element. In some of those embodiments, the illumination light arrives at the beam splitter before arriving at the single reflecting surface, and the return light arrives at the single reflecting surface before arriving at the beam splitter. In some of those embodiments, the apparatus further comprises a telescope disposed in both the first optical path and the second optical path. The illumination light arrives at the single reflecting surface before arriving at the telescope, and the illumination light arrives at the telescope before arriving at the objective. The return light arrives at the objective before arriving at the telescope, and the return light arrives at the telescope before arriving at the single reflecting surface.

In the forty-second embodiments or any other embodiments, the first light scanning element and the second light scanning element use different reflecting surfaces that move in synchronization with each other. In some of those embodiments, the illumination light arrives at the first light scanning element before arriving at the beam splitter, and the return light arrives at the beam splitter before arriving at the second light scanning element. In some of those embodiments, the apparatus further comprises an illumination telescope disposed in the first optical path and a return-light telescope disposed in the second optical path. The illumination light arrives at the first light scanning element before arriving at the illumination telescope, and the illumination light arrives at the illumination telescope before arriving at the objective. The return light arrives at the objective before arriving at the return-light telescope, and the return light arrives at the return-light telescope before arriving at the second light scanning element. In some of those embodiments, the first light scanning element and the second light scanning element are mechanically independent from each other.

In the forty-second embodiments or any other embodiments, the light detector is positioned directly at the stationary tilted intermediate image plane. In the forty-second embodiments or any other embodiments, the light detector is positioned remotely from the stationary tilted intermediate image plane, and the optical imaging apparatus further comprises at least one telescope that routes light from the stationary tilted intermediate image plane onto the light detector. In the forty-second embodiments or any other embodiments, the light detector is positioned remotely from the stationary tilted intermediate image plane, and the optical imaging apparatus further comprises a fiber-optic bundle that routes light from the stationary tilted intermediate image plane onto the light detector.

In the forty-second embodiments or any other embodiments, the illumination source comprises a laser that generates a pencil beam and an auxiliary light scanning element that expands the pencil beam into a sheet of light, and the light detector comprises a linear image sensor. In the forty-second embodiments or any other embodiments, the illumination source comprises a laser that generates a pencil beam and a cylindrical lens that expands the pencil beam into a sheet of light, and the light detector comprises a 2D image sensor.

In the forty-second embodiments or any other embodiments, the return light comprises florescent light emitted by the tissue at the oblique imaging plane in response to illumination of the tissue at the oblique imaging plane by the illumination light.

In one or more forty-third embodiments, an optical imaging apparatus comprises a beam splitter, a light scanning element, an objective, an illumination source, and a light detector. The illumination source sends illumination light into the objective via a first optical path that includes the beam splitter and the light scanning element. The beam splitter and the light scanning element redirect the illumination light towards a peripheral region of the objective such that the illumination light passes through the objective and forms an oblique imaging plane in a tissue, wherein the position of the oblique imaging plane within the tissue varies depending on an orientation of the light scanning element. The objective accepts return light from the oblique imaging plane and passes the return light onto a second optical path that includes the beam splitter and the light scanning element, and the beam splitter and the light scanning element route the return light along the second optical path so as to form a stationary tilted intermediate image plane. The light detector captures an image of the stationary tilted intermediate image plane.

In the forty-third embodiments or any other embodiments, the light scanning element has only a single planar reflecting surface.

In the forty-third embodiments or any other embodiments, the illumination light arrives at the beam splitter before arriving at the light scanning element, and the return light arrives at the light scanning element before arriving at the beam splitter. In some of those embodiments, the apparatus further comprises a telescope disposed in both the first optical path and the second optical path, wherein the illumination light arrives at the light scanning element before arriving at the telescope, wherein the illumination light arrives at the telescope before arriving at the objective, wherein the return light arrives at the objective before arriving at the telescope, and wherein the return light arrives at the telescope before arriving at the light scanning element.

In one or more forty-fourth embodiments, a method of optical imaging comprises sending illumination light towards an objective via a first optical path, wherein the first optical path includes a beam splitter and a first light scanning element. The illumination light is redirected towards a peripheral region of the objective such that the illumination light passes through the objective and forms an oblique imaging plane in a tissue, wherein the position of the oblique imaging plane within the tissue varies depending on an orientation of the first light scanning element. The return light is routed from the oblique imaging plane along a second optical path that includes the beam splitter and a second light scanning element, so as to form a stationary tilted intermediate image plane. An image of the stationary tilted intermediate image plane is captured.

In the forty-fourth embodiments or any other embodiments, a single reflecting surface serves as both the first light scanning element and the second light scanning element. In some of those embodiments, the illumination light arrives at the beam splitter before arriving at the single reflecting surface, and the return light arrives at the single reflecting surface before arriving at the beam splitter.

In the forty-fourth embodiments or any other embodiments, the first light scanning element and the second light scanning element use different reflecting surfaces that move in synchronization with each other. In some of those embodiments, the illumination light arrives at the first light scanning element before arriving at the beam splitter, and the return light arrives at the beam splitter before arriving at the second light scanning element. In some of those embodiments, the first light scanning element and the second light scanning element are mechanically independent from each other.

In one or more forty-fifth embodiments, an imaging device comprises an objective and a further optical assembly, a light source, a scanning/de-scanning optical assembly, a light sensor, the light-redirecting element, and a beam splitter. The objective and the a further optical assembly are arranged to pass image light, received by the objective lens, through the further optical assembly. The scanning/de-scanning optical assembly has a light-redirecting element that directs illumination light from the light source to cause an illumination beam to pass through the objective and project at multiple depths through a volume region at multiple positions and/or angles of the volume region whereby the illumination beam is scanned across the volume region. The light-redirecting element redirects image light received from the volume region to the light sensor. In cooperation with the optical properties of said further optical assembly, this is effective to hold a focus of light returning from a region illuminated by the illumination beam onto the light sensor as said illumination beam is scanned. The beam splitter is arranged to form a junction positioned such that the image light and the illumination light follow adjacent paths through the objective but follow separate paths remote from the objective.

In the forty-fifth embodiments or any other embodiments, the device further comprises a stationary reflector positioned to reflect the image light back through the further optical assembly. In some of those embodiments, the stationary reflector is oriented at an angle with respect to the optical axis of the further optical assembly, the angle being selected responsively to an angle of an intermediate image formed at the position of the mirror by the objective and further optical assembly.

In the forty-fifth embodiments or any other embodiments, the beam splitter is a dichroic beam splitter and a wavelength of said light source is selected to excite fluorescence in a predefined fluorescing material selected by the properties of the dichroic beam splitter.

In the forty-fifth embodiments or any other embodiments, the light-redirecting element includes one of a motor-actuated reflecting element, a motor-actuated refracting element, a Digital Micromirror Device (DMD), a microelectromechanical system (MEMS) optical guide, mirror, or other suitable MEMS device, optical fiber bundle, an acousto-optic deflector (AOD), Spatial Light Modulator (SLM) or other technologies such as MEMS, DMD, or SLM devices capable of serving as light directors that can be controlled to provide the specified spatial relationship of the first light redirector to the illumination and image light.

In the forty-fifth embodiments or any other embodiments, the light-redirecting element includes a reflecting element with a reflecting characteristic that makes identical angular changes in the direction of the illumination light from the light source and the image light received from the volume region. In some of those embodiments, the reflecting element has a single planar reflecting surface on which both the illumination light from the light source and the light received from the volume region are incident.

In the forty-fifth embodiments or any other embodiments, the light source generates light that is selected to generate fluorescence in a subject containing predefined fluorescent dye. In the forty-fifth embodiments or any other embodiments, the light sensor includes a camera, a linear array of photomultiplier elements, or a single photomultiplier element.

In the forty-fifth embodiments or any other embodiments, the light source includes a beam flattening optical element that flattens a cross-section of said illumination beam.

In the forty-fifth embodiments or any other embodiments, scanning/de-scanning optical assembly includes a configurable optical element that is positioned in the path of light from the light source to change a path and a shape of the illumination light cross-section to switch between depth-resolving mode and confocal mode, wherein in the confocal mode the illumination beam cross-section has a lower aspect ratio and follows a different path compared to those in the depth-resolving mode. In some of those embodiments, the configurable optical element includes a refractive component that is movable relative to the light source and that is shaped to expand a width of a light beam incident thereon. In some of those embodiments, the configurable optical element includes a refractive component that is movable relative to the light source and that is shaped to shift a centerline of a light beam incident thereon. In some of those embodiments, the scanning/de-scanning assembly varies the position of a focused spot or line within the volume region in confocal mode. In some of those embodiments, the scanning/de-scanning assembly is configured to scan focused spot or line in the volume region in response to a confocal mode control command that selectively positions said movable optical element.

In one or more forty-sixth embodiments, an imaging apparatus comprises a first light redirector, a second light redirector, and a beam splitter. The first light redirector is located and configured to redirect light received from a light source to provide said light to a sample volume. The second light redirector is located and configured to receive light from different depths within the sample volume and to provide said light to a light detector capable of detecting individual measurements of light from different locations along a first direction. The beam splitter is located and configured so as to separate light directed into the sample volume from light received from different depths within the sample volume. The first and second light redirectors are configured to be adjusted during a scan of the sample volume so as to provide a stationary image of the illuminated region of the sample volume to the light detector.

In the forty-sixth embodiments or any other embodiments, the apparatus further comprises a first lens located and configured to refract light from the light source and redirected by the first light redirector, to provide refracted light to the sample volume. In the forty-sixth embodiments or any other embodiments, the apparatus further comprises a second lens located and configured to refract the light redirected by the second light redirector to provide refracted light to the light detector.

In the forty-sixth embodiments or any other embodiments, the first and second light redirectors are capable of being controlled to provide the stationary image of the illuminated region of the sample volume to the light detector during the scan. In the forty-sixth embodiments or any other embodiments, the apparatus further comprises the light source, wherein the light source comprises a collimated light source configured to provide an illuminated line or illuminated plane.

In the forty-sixth embodiments or any other embodiments, the apparatus further comprises a processor circuit configured to include or access a processor-readable medium that includes instructions or information that configure the processor circuit to be capable of converting scan data detected by the light detector to two-dimensional (2D) or three-dimensional (3D) image data at appropriate image pixel positions corresponding to locations within the sample volume.

In the forty-sixth embodiments or any other embodiments, the apparatus further comprises the light detector, and the light detector comprises a detector assembly configured to measure a one-dimensional (1D) image. Optionally, an element is configured to redirect light received from the light source to illuminate a plane within the sample volume.

In the forty-sixth embodiments or any other embodiments, the apparatus further comprises an element configured to receive the light from different depths within the sample volume and to compensate for the orientation of the stationary image. In the forty-sixth embodiments or any other embodiments, the apparatus further comprises an element located and configured to filter the light received from different depths within the sample volume. In the forty-sixth embodiments or any other embodiments, the apparatus further comprises an aperture configured to alter a beam width of the light received from different depths within the sample volume. In the forty-sixth embodiments or any other embodiments, the apparatus further comprises a lens disposed in the path of the light between the first light redirector and the sample volume and in the path of the light received at the second light redirector from different depths within the sample volume.

In one or more forty-seventh embodiments, a method comprises redirecting light from a light source using a first light redirector, to provide said light to a sample volume; redirecting, at a second light redirector, light from different depths within the sample volume to provide said light to a light detector capable of detecting individual measurements of light from different locations along a first direction; using a beam-splitter to separate the light provided to the sample volume from the light received from different depths within the sample volume; and adjusting the first and second light redirectors during a scan of the sample volume so as to provide a stationary image of the illuminated region of the sample volume to the light detector.

In the forty-seventh embodiments or any other embodiments, the method further comprises moving the first and second light redirectors together to provide the stationary image of the illuminated region of the sample volume to the light detector during the scan.

In the forty-seventh embodiments or any other embodiments, the method further comprises refracting light from the light source to be provided to the sample volume, or refracting light received from different depths within the sample volume to be provided to the second light redirector. In the forty-seventh embodiments or any other embodiments, the method further comprises refracting the light received from the light source to illuminate a plane within the sample volume. In the forty-seventh embodiments or any other embodiments, the method further comprises filtering the light received from the different depths within the sample volume to provide a filtered stationary image to said light detector during the scan.

In the forty-seventh embodiments or any other embodiments, the method further comprises converting scan data provided by the light detected by the light detector to two-dimensional (2D) or three-dimensional (3D) image data at appropriate image pixel positions corresponding to locations within the sample volume. In the forty-seventh embodiments or any other embodiments, the method further comprises compensating the light received from different depths in within the sample volume for the orientation of the stationary image. In the forty-seventh embodiments or any other embodiments, the method further comprises altering a beam width of the light from different depths within the sample volume with an aperture.

In one or more forty-eighth embodiments, an imaging apparatus comprises a light redirector and a beam splitter. The light redirector is located and configured to redirect light received from a light source to provide said light to a sample volume. The light redirector is further configured to receive light from different depths within the sample volume and to provide said light to a light detector capable of detecting individual measurements of light from different locations along a first direction. The beam splitter is located and configured so as to separate light directed into the sample volume from the light received from different depths within the sample volume. The light redirector is configured to be adjusted during a scan of the sample volume so as to provide a stationary image of the illuminated region of the sample volume to the light detector.

In the forty-eighth embodiments or any other embodiments, the light redirector is capable of being controlled to provide the stationary image of the illuminated sample volume to the light detector during the scan. In the forty-eighth embodiments or any other embodiments, the apparatus further comprises the light source, and the light source comprises a collimated light source configured to provide an illuminated line or illuminated plane.

In the forty-eighth embodiments or any other embodiments, the apparatus further comprises a processor circuit configured to include or access a processor-readable medium that includes instructions or information that configure the processor circuit to be capable of converting scan data detected by the light detector to two-dimensional (2D) or three-dimensional (3D) image data at appropriate image pixel positions corresponding to locations within the sample volume.

In the forty-eighth embodiments or any other embodiments, the apparatus further comprises the light detector, wherein the light detector comprises a detector assembly configured to measure a one-dimensional (1D) image or a two-dimensional (2D) image. In the forty-eighth embodiments or any other embodiments, the apparatus further comprises an element configured to redirect light received from the light source to illuminate a plane within the sample volume. In the forty-eighth embodiments or any other embodiments, the apparatus further comprises an element configured to receive the light from different depths within the sample volume, and to compensate for the orientation of the stationary image.

In the forty-eighth embodiments or any other embodiments, the apparatus further comprises an element located and configured to filter the light received from different depths within the sample volume. In the forty-seventh embodiments or any other embodiments, the apparatus further comprising an aperture configured to alter a beam width of the light received from different depths within the sample volume. In the forty-eighth embodiments or any other embodiments, the apparatus further comprises a lens disposed in the path of the light between the light redirector and the sample volume and in a path of the light received from different depths within the sample volume and the light redirector. In the forty-eighth embodiments or any other embodiments, the apparatus, further comprises a Graded Index lens disposed in the path of the light between the light redirector and the sample volume and in a path of the light received from different depths within the sample volume and the light redirector.

In the forty-eighth embodiments or any other embodiments, the light source may be pulsed. In the forty-eighth embodiments or any other embodiments, the apparatus further comprises an element configured to provide a line of illumination to the sample volume.

In one or more forty-ninth embodiments, a method comprises redirecting light from a light source using a light redirector, to provide light to a sample volume; redirecting, to the light redirector, light from different depths within the sample volume to provide said light to a light detector capable of detecting individual measurements of light from different locations along a first direction; using a beam splitter to separate light provided to the sample volume from the light from different depths within the sample volume; and adjusting the light redirector during a scan of the sample volume so as to provide a stationary image of the illuminated region of the sample volume to the light detector.

In the forty-ninth embodiments or any other embodiments, the method further comprises refracting the light from the light source to be provided to the sample volume; or refracting the light from different depths within the sample volume to be provided to the light redirector. In the forty-ninth embodiments or any other embodiments, the method further comprises refracting the light received from the light source to illuminate a plane within the sample volume. In the forty-ninth embodiments or any other embodiments, the method further comprises filtering the light received from the different depths within the sample volume to provide a filtered stationary image to said light detector during the scan. In the forty-ninth embodiments or any other embodiments, the method further comprises converting scan data detected by the light detector to two-dimensional (2D) or three-dimensional (3D) image data at appropriate image pixel positions corresponding to locations within the sample volume from.

In the forty-ninth embodiments or any other embodiments, the method further comprises compensating the light received from different depths in within the sample volume for the orientation of the stationary image. In the forty-ninth embodiments or any other embodiments, the method further comprising altering a beam width of the light from different depths within the sample volume with an aperture.

In some of those embodiments, the scanning-de-scanning assembly includes image-forming optics, with an optical axis, that, in scan mode, generate an intermediate real image of image light returned from said illumination beam and a detection module that images said intermediate real image, the light sensor including a linear or two-dimensional array of pixels onto which an image of said intermediate real image is focused. The detection module has an optical axis that is oblique to said image-forming optics optical axis, whereby one or selected ones of said pixels may function as a confocal pinhole or slit in confocal mode and whereby, in scan mode, the angle between said detection module and image-forming optics optical axes is effective for correcting for variations in axial positions of points along said illumination beam that are imaged by said detection module.

In any of the embodiments defined above, the recited features of a microscope may be employed in any other type of imaging device since the optical functions can be applied to subject features of other sizes.

In any embodiment, including the claims, where an illumination beam, sheet of light, illumination light or other type of outgoing excitation or illumination light is recited, structured illumination may alternatively be substituted to form additional embodiments. Any of the embodiments may be provided with image processing to enhance the resolution of images as is known in the art. Such image processing as known to be employed with structured illumination to obtain super-resolution is considered to be inherently disclosed in connection with structured illumination. In any of the devices, methods, or systems that employ structured illumination, the movement of the illumination beam may be controlled such that at a given location, multiple images may be obtained by controlling the illumination beam to visit a particular region multiple times with different illumination patterns at each time. This may be done in any suitable sequence.

In all embodiments where a light redirector is described, the light redirector including any of mirrors, prisms, acousto-optic deflectors, electric lenses, spatial light modulators (SLM), beam steering mirrors or optics, flexible optical light guides or fibers, other types of adaptive optics, or any other mechanism for controlling the directions of outgoing and incoming light, an associated actuator may be provided. Further the associated actuator may be controlled by a processor, computer, smart controller, embedded system or any of control or computational technology identified below based on techniques known in the art of programmable control systems.

It will be appreciated that the control system and/or image processing described herein can be implemented in hardware, hardware programmed by software, software instruction stored on a non-transitory computer readable medium or a combination of the above. For example, the disclosed control method and/or image processing techniques can be implemented, for example, using a processor configured to execute a sequence of programmed instructions stored on a non-transitory computer readable medium. For example, the processor may include, but is not limited to, a personal computer or workstation or other such computing system that includes a processor, microprocessor, microcontroller device, or is comprised of control logic including integrated circuits such as, for example, an Application Specific Integrated Circuit (ASIC). The instructions can be compiled from source code instructions provided in accordance with a programming language such as Java, C++, C#.net or the like. The instructions can also comprise code and data objects provided in accordance with, for example, the Visual Basic™ language, LabVIEW, or another structured or object-oriented programming language. The sequence of programmed instructions and data associated therewith can be stored in a non-transitory computer-readable medium such as a computer memory or storage device which may be any suitable memory apparatus, such as, but not limited to read-only memory (ROM), programmable read-only memory (PROM), electrically erasable programmable read-only memory (EEPROM), random-access memory (RAM), flash memory, disk drive and the like.

Furthermore, the control system and/or image processing can be implemented as a single processor or as a distributed processor. Further, it should be appreciated that the steps mentioned herein may be performed on a single or distributed processor (single and/or multi-core). Also, the processes, modules, and sub-modules described in the various figures of and for embodiments herein may be distributed across multiple computers or systems or may be co-located in a single processor or system. Exemplary structural embodiment alternatives suitable for implementing the control system and/or image processing described herein are provided below.

The control system and/or image processing described above can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and a software module or object stored on a computer-readable medium or signal, for example.

Embodiments of the control system and/or image processing (or their sub-components or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a programmable logic device (PLD), programmable logic array (PLA), field-programmable gate array (FPGA), programmable array logic (PAL) device, or the like. In general, any process capable of implementing the functions or steps described herein can be used to implement embodiments of the methods, systems, or computer program products (software program stored on a non-transitory computer readable medium).

Furthermore, embodiments of the control system and/or image processing may be readily implemented, fully or partially, in software using, for example, object or object-oriented software development environments that provide portable source code that can be used on a variety of computer platforms. Alternatively, embodiments of the control system and/or image processing can be implemented partially or fully in hardware using, for example, standard logic circuits or a very-large-scale integration (VLSI) design. Other hardware or software can be used to implement embodiments depending on the speed and/or efficiency requirements of the systems, the particular function, and/or particular software or hardware system, microprocessor, or microcomputer being utilized. Embodiments of the control system and/or image processing can be implemented in hardware and/or software using any known or later developed systems or structures, devices and/or software by those of ordinary skill in the applicable art from the functional description provided herein and with a general basic knowledge of optical system, image processing, and/or computer programming arts.

In this application, unless specifically stated otherwise, the use of the singular includes the plural and the use of "or" means "and/or." Furthermore, use of the terms "including" or "having," as well as other forms, such as "includes," "included," "has," or "had" is not limiting. Any range described herein will be understood to include the endpoints and all values between the endpoints. Any recitation herein of relationships between positions or angles between optics, components, beam paths, and/or optical rays are intended to include variations up to and including 10%. In general, whenever "substantially", "approximately", "near" or similar language is used herein, variations up to and including 10% are intended.

Furthermore, the foregoing descriptions apply, in some cases, to examples generated in a laboratory, but these examples can be extended to production techniques. For example, where quantities, techniques, or configurations apply to the laboratory examples, they should not be understood as limiting.

Features of the disclosed embodiments may be combined, rearranged, omitted, etc., within the scope of the invention to produce additional embodiments. Furthermore, certain features may sometimes be used to advantage without a corresponding use of other features.

It is thus apparent that there is provided in accordance with the present disclosure, system, methods, and devices for imaging. Many alternatives, modifications, and variations are enabled by the present disclosure. While specific embodiments have been shown and described in detail to illustrate the application of the principles of the present invention, it will be understood that the invention may be embodied otherwise without departing from such principles. Accordingly, Applicant intends to embrace all such alternatives, modifications, equivalents, and variations that are within the spirit and scope of the present invention.

Appendix (Section 2)

Transgenic techniques are providing ever-improving fluorescent reporters of dynamic in-vivo processes such as neuronal activity. As a result, there is a growing need for high-speed, 3D volumetric optical microscopy methods that can capture these events in-vivo beyond conventional light-sheet imaging techniques and two photon microscopy.

Conventional light-sheet imaging techniques illuminate samples from the side using a thin sheet of light and acquire images of the illuminated plane using an orthogonally aligned second objective. The sample is then translated relative to this co-aligned plane to form a 3D volumetric image. This dual-objective geometry, and the need for side-on illumination and physical translation of the sample are major limitations, making sample mounting and positioning highly challenging, restricting the types of samples that can be imaged, and limiting achievable volumetric imaging speeds. Recent advances have achieved higher frame rate light sheet imaging using coordinated scanning of the light sheet with translation of the detection focal plane, either via piezoelectric movement of the orthogonal detection objective or an electrically tunable lens. However, the speed of these imaging systems is restricted by the need for coordinated translation of both planes, and their dual-objective geometry is still limiting. Other approaches have rotated the standard light-sheet geometry by 45 degrees making it easier to image un-mounted samples, yet still requiring the same dual-objective configuration as well as physical translation of the sample with respect to the objectives for volumetric imaging. A light-sheet technique that has been implemented through a single objective still required the use of piezoelectric objective scanning for volumetric imaging and has a limited field of view since the light sheet is not swept across the volume. In all cases, piezoelectric objective scanning is inherently limiting both to acquisition speeds, and the types of in-vivo samples that can be imaged.

For in-vivo rodent brain imaging, two-photon microscopy has become the method of choice to capture neuronal activity via genetically encoded calcium indicators. However, two-photon microscopy generally requires sequential scanning of a single point to generate volumetric images, forcing trade-offs between 3D imaging speed, resolution and field of view. Wide-field, multi-spot and temporal focusing implementations can improve parallelization but add significant cost and complexity, still require piezoelectric objective scanning, provide limited fields of view, and are reaching the limits of available laser power. Random access scanning using acousto-optic deflectors, which visits a subset of locations within the sample to increase speed, is currently the favored approach for rapidly recording the activity of multiple neurons in the intact brain. However, this approach is highly sensitive to motion, requires a-priori selection of specific neuronal cell bodies (which is limiting in the case of GCaMP imaging where cells can be dark in their non-firing state) and is not yet suitable for capturing free motion. Random access scanning increases speed by measuring far fewer locations within the volume and can thus not detect spontaneous, unanticipated changes in the volume at locations that were not selected, and does not produce 'images' per se. Thus, even recent advances in two-photon microscopy do not fully address the above-described need for high-speed, 3D volumetric optical microscopy methods that can capture in-vivo processes such as neuronal activity.

Appendix Section 3

Some embodiments are directed to new 3D imaging systems and techniques, with applications to microscopy and macroscopic imaging. For example, in certain embodiments, the instant disclosure is directed to a technique for volumetric imaging of living samples at ultra-high speeds, identified herein as Swept, Confocally-Aligned Planar Excitation (SCAPE) microscopy. Certain embodiments of SCAPE have also been referred to as Laser Scanning Intersecting Plane Tomography (LSIPT or L-SIPT), Swept Oblique Light Sheet (SOLiS), or Swept Light-Sheet (SLS) microscopy. While two-photon and confocal microscopy techniques have revolutionized biomedical research, current implementations are costly, complex and limited in their ability to image 3D volumes at high speeds. Light-sheet microscopy techniques using two-objective orthogonal illumination and detection require a highly constrained sample geometry, and either physical sample translation or complex synchronization of illumination and detection planes. SCAPE, in contrast, overcomes the limitations described above, combining optical sectioning via light-sheet illumination with a unique scanning-descanning configuration that permits ultra-fast translationless volumetric imaging of diverse, unmounted samples, and can implemented relatively inexpensively.

In certain embodiments, SCAPE microscopy acquires images using an angled, swept light sheet in a single objective, en-face geometry. In certain embodiments, descanning and image rotation optics map this moving plane onto a stationary high-speed camera, permitting completely translationless 3D imaging of intact samples at rates exceeding 20 volumes per second. As demonstrated herein, SCAPE microscopy is able to image spontaneous neuronal firing in the intact brain of awake behaving mice, as well as freely moving transgenic *Drosophila larvae*.

In certain embodiments, the instant disclosure provides systems and methods for three-dimensional imaging of a sample. In certain embodiments, the systems and methods can comprise projecting sheets of light into the sample. In certain embodiments, the plane of a camera is aligned with the plane of the illuminating sheet of light, providing optical sectioning. In certain embodiments, the methods can comprise sweeping the sheets of light. In certain embodiments, the detected light is de-scanned to maintain the stationary detection plane of the camera in alignment with the illuminating sheet of light, despite the scanning motion of the illuminating light sheet. In certain embodiments, the sheets of light can be at an oblique or vertical angle to the surface of the sample. In certain embodiments, the method further comprises rotating the plane of the detected light to account for the oblique orientation of the illuminating sheet of light to permit better detection of the emitted light in the plane of the camera. In certain embodiments, the sheets of light are swept using a scanning polygon mirror. In certain embodiments, the sheets of light are swept using other scanning reflective or diffractive elements. In certain embodiments, the methods can further comprise receiving light emission elicited from the swept light sheets and de-scanning the received light emission using a polygon scanner, or other combination of scanning mirrors or diffractive elements that synchronize scanning of the illumination sheet and descanning of detected light into a stationary detection plane. In certain embodiments, multiple wavelengths or sources of light, in parallel or sequentially, can be used to illuminate the sample to evoke different physical processes in the sample. In certain embodiments, the methods can utilize spectral separation of detected light to permit multi-color detection and imaging. In certain embodiments, the method can be used to detect contrast from physical effects including Raman scattering, stimulated Raman, two-photon excited fluorescence, second harmonic generation, backscattering, Förster resonance energy transfer, luminescence, thermal radiation and other electromagnetic effects commonly detected via optical imaging and microscopy.

In certain embodiments, the disclosed subject matter relates to systems for three-dimensional microscopic imaging. In certain embodiments, the disclosed subject matter relates to systems for three-dimensional macroscopic imaging. In certain embodiments, systems disclosed herein can comprise a laser producing a predetermined optical power. In certain embodiments, systems disclosed herein can comprise any collimated/collimatible light source or combination of light sources, pulsed or continuous wave producing a predetermined optical power. In certain embodiments, systems disclosed herein can comprise one or more beam alignment mirrors, reflective or diffractive elements. In certain embodiments, the systems can comprise one or more telescopes, wherein each telescope is composed of one or more lenses to expand a beam before creating a light sheet, as well as a scanning telescope. In certain embodiments, the system can comprise the polygon implementation provided in FIG. 24f.

In certain embodiments, the systems and techniques according to the disclosed subject matter can allow for in-vivo three-dimensional volumetric imaging of living samples at high speeds. Furthermore, in certain embodiments, the disclosed subject matter can allow for the acquisition of data in an en-face, non-contact, 'epi-fluorescence-style' imaging geometry. In certain embodiments the disclosed subject matter can allow for the acquisition of data in a transmission geometry. In certain embodiments, the disclosed subject matter can allow for capturing of three-dimensional dynamics of diverse samples within a large field of view, including freely moving, living organisms as well as in intact organs and tissues, e.g., an intact rodent brain. The system has also been demonstrated on living zebrafish (*D-Rerio*) larva and fish, C-elegans and the human fingertip. In certain embodiments, the systems described herein have also been demonstrated able to image fixed histology slides, immunohistochemistry slides and fluid flow within microfluidic chambers. Additional applications including or beyond life sciences include 3-dimensional flow, fluid mixing or particle tracking, 3D profilometry as well as clinical applications such as intravascular, endoscopic, intrasurgical or intraocular imaging of the cornea or retina.

3.2. Additional Optical Layouts to Achieve Scanning and Descanning

Figure 24A:
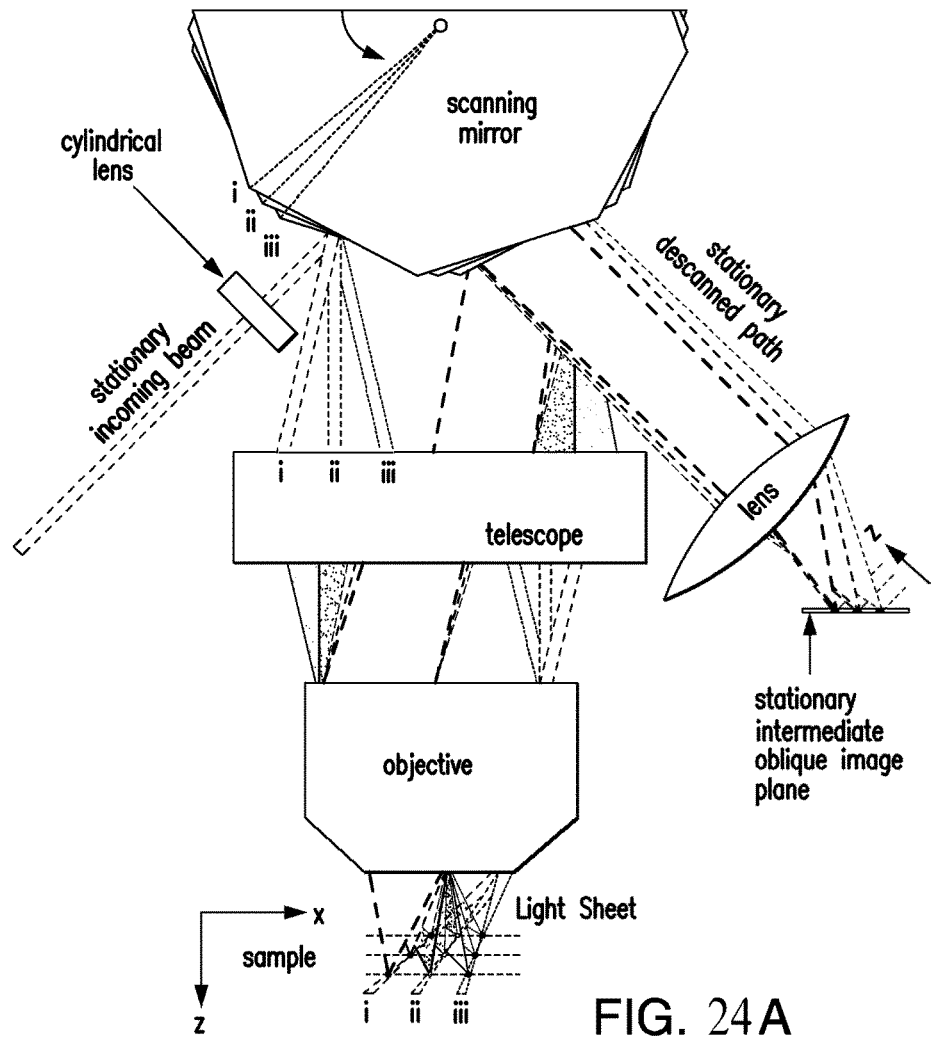
FIG. 24A depicts a scanning/descanning geometry that sweeps an oblique light sheet back and forth across the sample while the descanned detection plane remains stationary.
Figure 24B:
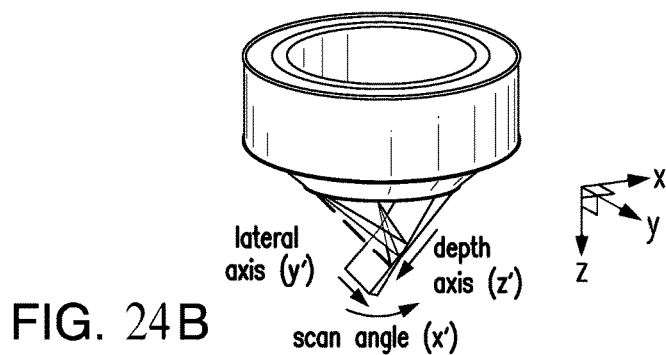
FIG. 24B depicts how the oblique light sheet illuminates the sample, while emitted light is collected by the same objective lens.
Figure 24:
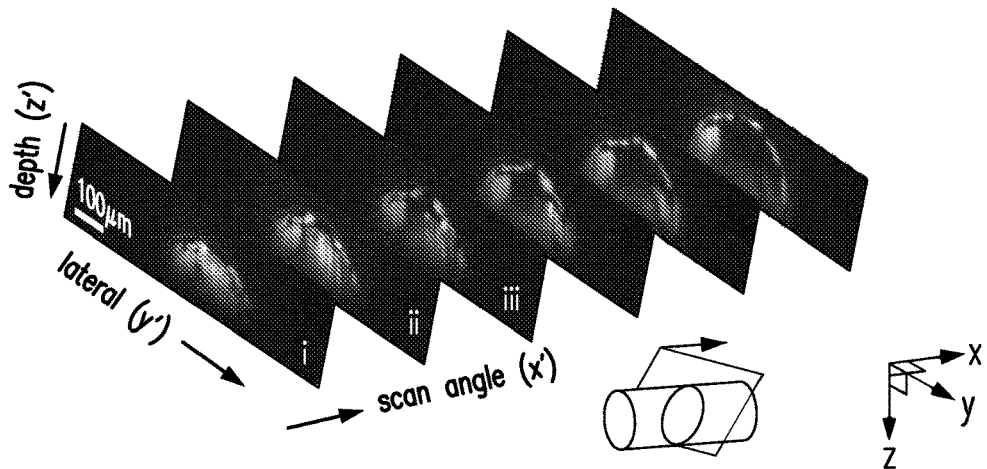
FIG. 24C depicts how images are captured as the light sheet sweeps on a *Drosophila* larva.
FIG. 24D depicts how resolution depends upon the axial and lateral resolutions of the low numerical aperture (NA) input light sheet
FIG. 24E depicts a Fourier-optics modeled point spread function
FIG. 24F depicts a detailed view of one embodiment of the invention.
Figure 24:
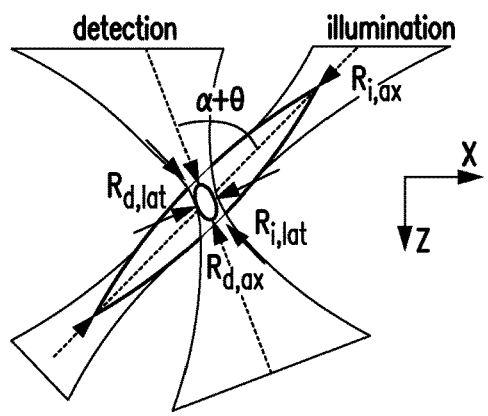
Figure 24E:
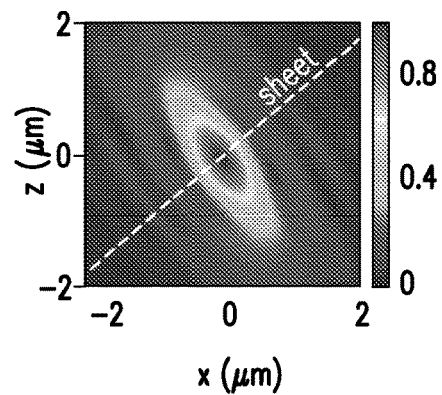
Figure 24F:
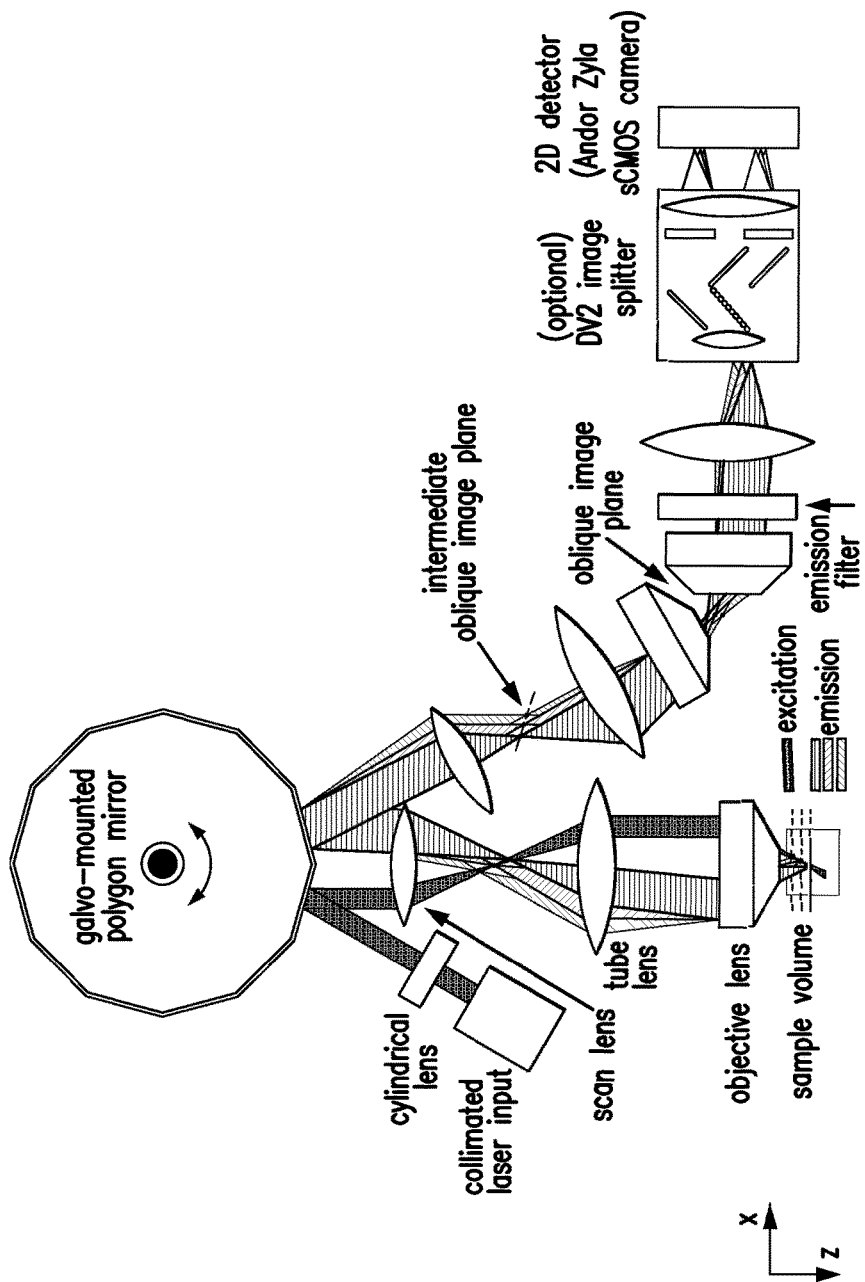
Figure 47A:
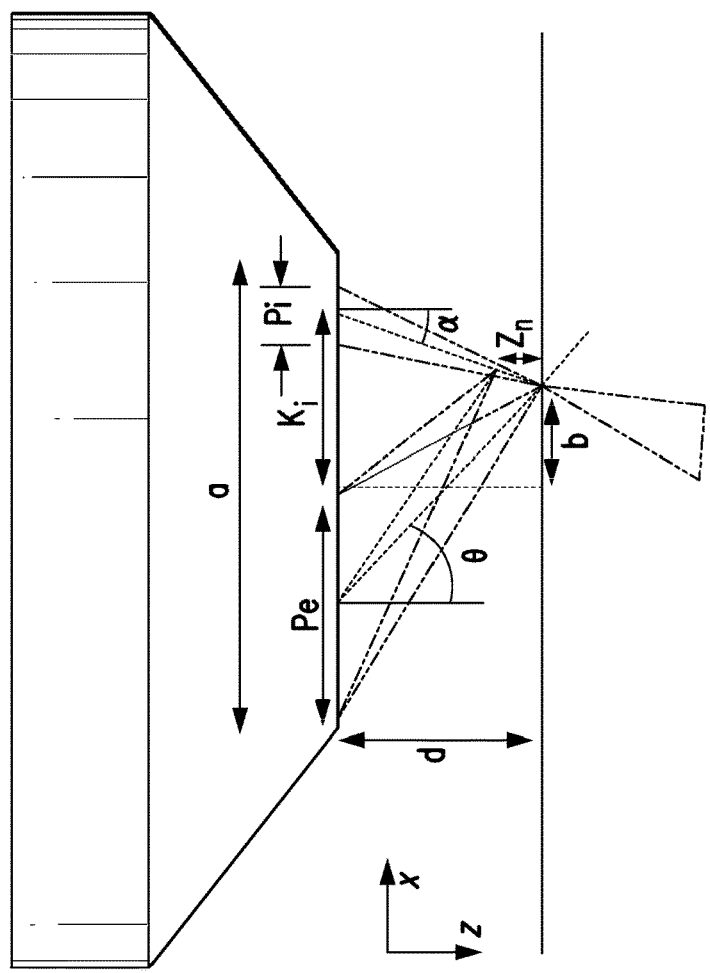
FIG. 47A depicts an imaging geometry of SCAPE.

A number of alternatives to the SCAPE optical layout presented in FIG. 24(f) are disclosed herein. Non-limiting examples of such additional optical layouts achieve the same or similar scanning/descanning configurations as shown in FIGS. 29-33. In certain embodiments, rather than using a polygonal scanner to both scan and descan returning light, it is possible to use two, physically uncoupled scanning mirrors. While the polygon mirror is physically coupled permitting precisely coupled scanning and descanning, given that the speed at which the sheet must be scanned, even for high volume rates of 50-100 volumes per second is relatively slow (50-100 sweeps per second respectively), synchronization of two separate mirrors is readily achievable. Embodiments employing two (or more) separate mirrors, or as disclosed below, a single mirror, have benefits over the polygon-based embodiments. First, the polygon's rotation is not an ideal scan pattern since the mirrored facet both translates and rotates as the polygon rotates around its axis of rotation, which can cause some scan/descan errors. Second, use of the polygon limits the detected light to only half of the light emerging from the back aperture of the objective lens. This limits the numerical aperture (NA) of the detected light, thereby reducing the resolution of the resulting image (as predicted by modeling shown in FIGS. 47 and 25), while also reducing the amount of emitted light reaching the camera (reducing signal to noise). Although collecting a larger NA of detected light will reduce the effective angle between the incident light sheet and the detection point spread function, our models predict that this effect of this change on the imaging point spread function will be dominated by positive effects of increasing in NA by collecting all emitted light, overall improving resolution compared to use of the polygon. Finally, the physical shape of available polygons limits the physical size of the facet, further reducing the amount of light reaching the camera for detection. Inertia of the polygon can introduce slew into high speed bilateral scanning.

Figure 29:
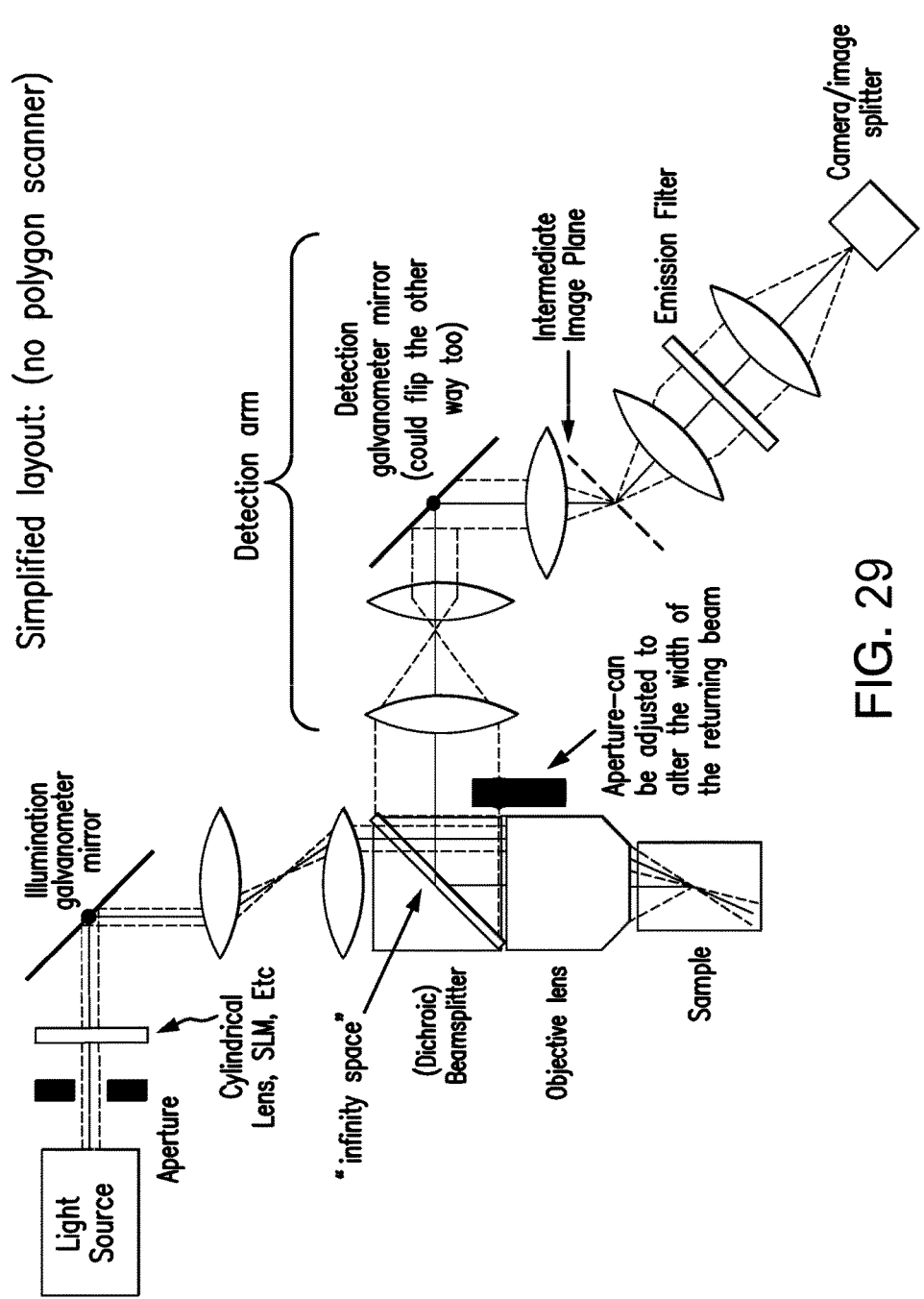
FIG. 29 depicts a detailed view of an embodiment of the invention.
Figure 30:
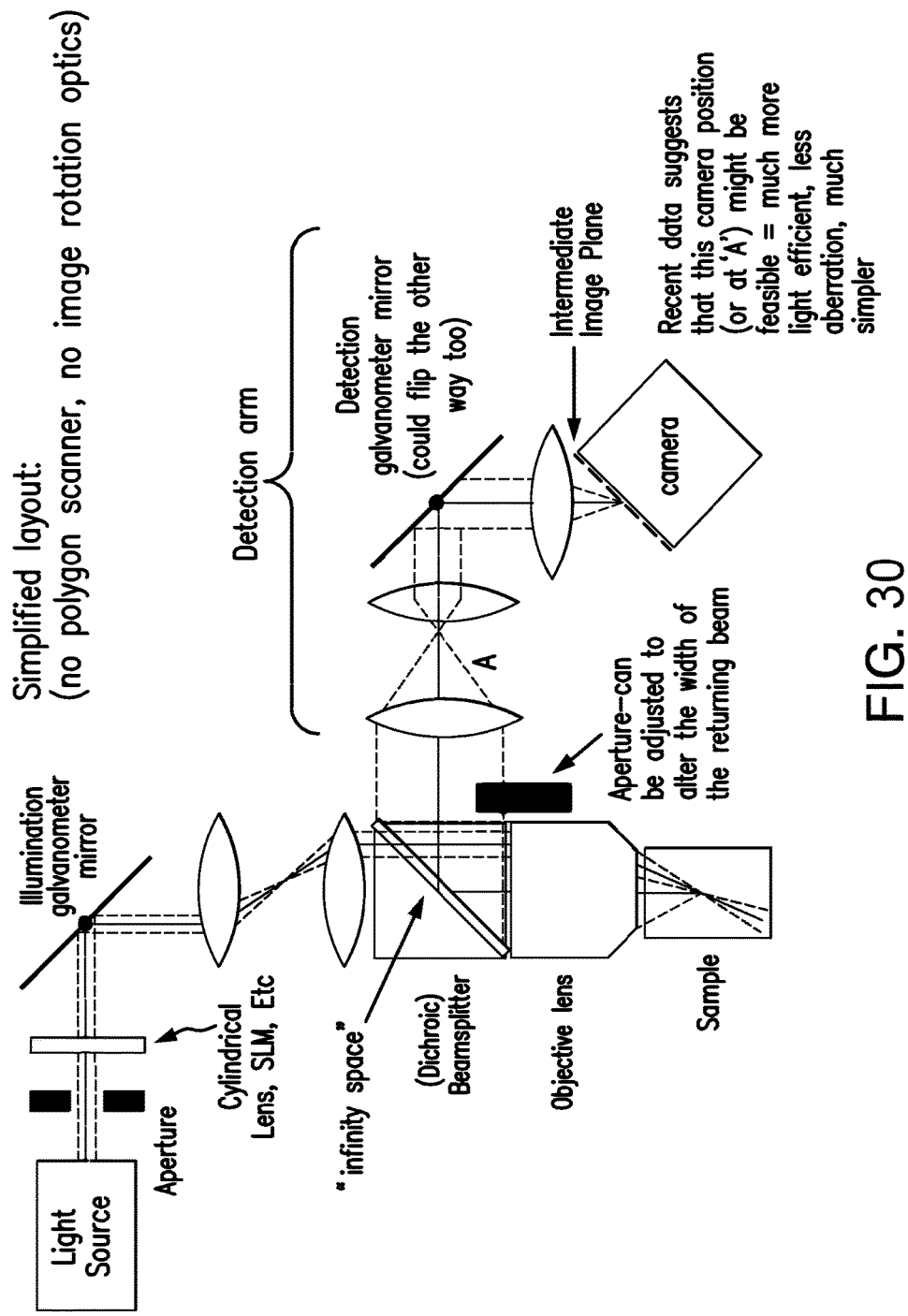
FIG. 30 depicts a detailed view of an embodiment of the invention.
Figure 31:
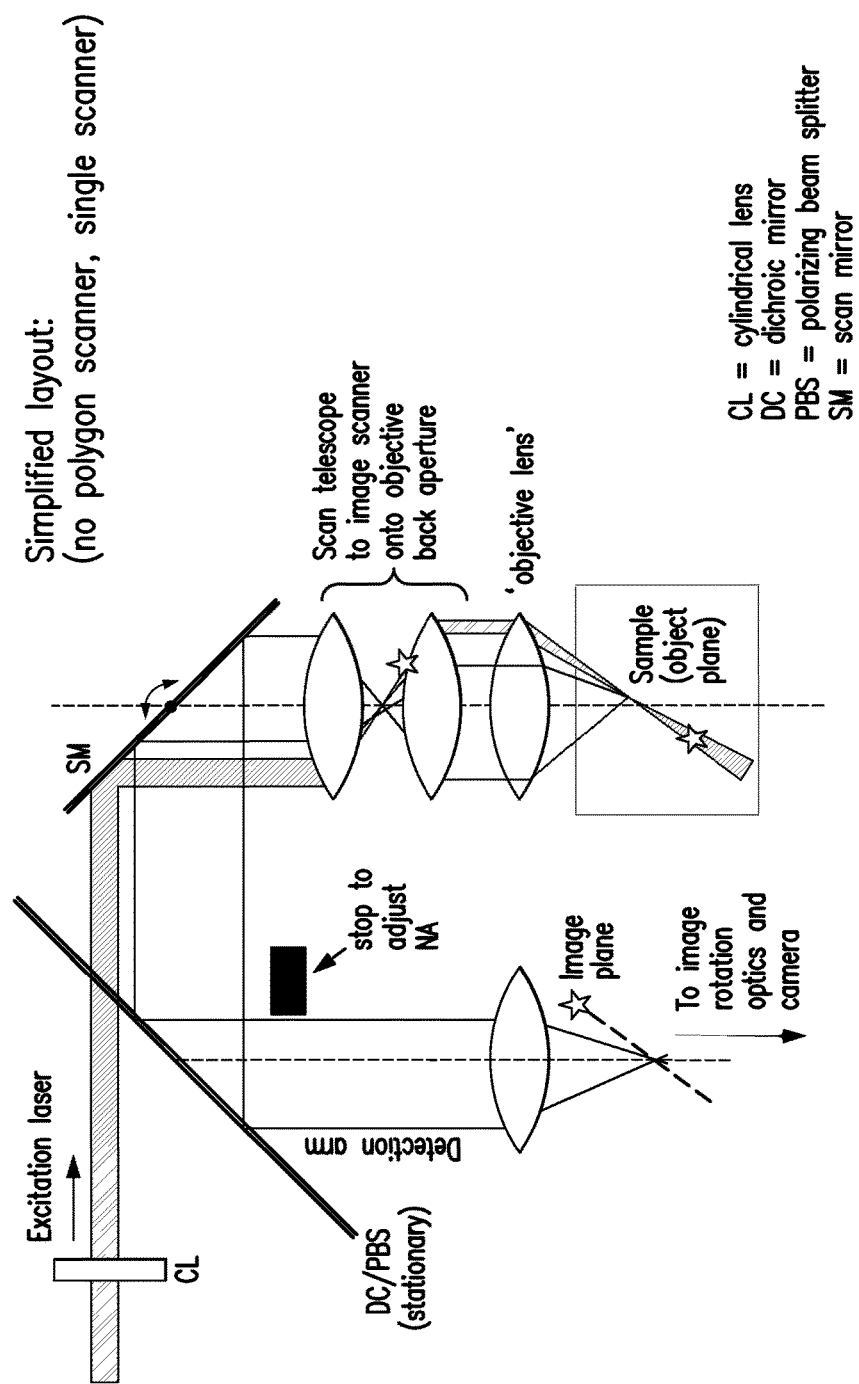
FIG. 31 depicts a detailed view of an embodiment of the invention.
Figure 32:
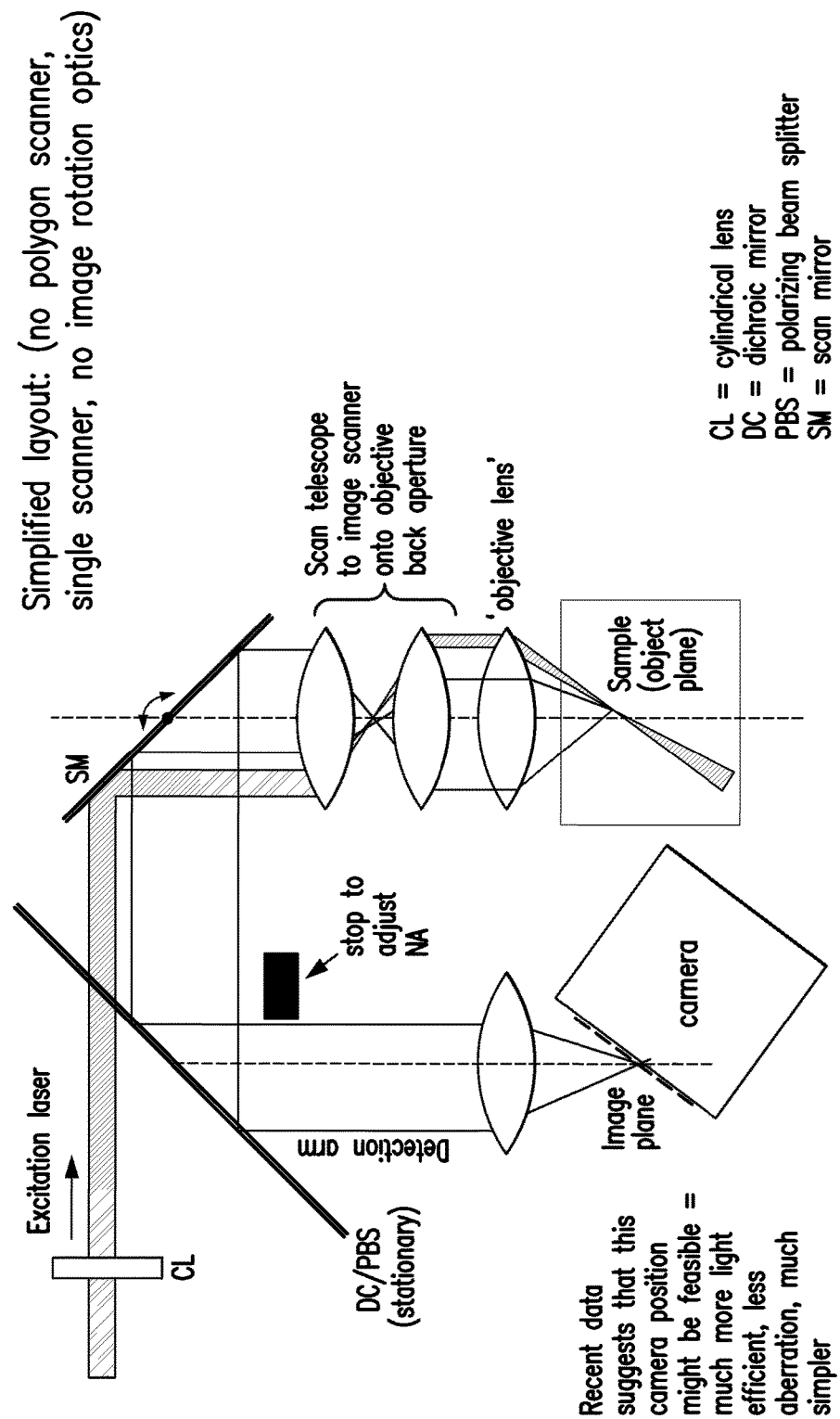
FIG. 32 depicts a detailed view of an embodiment of the invention.
Figure 33:
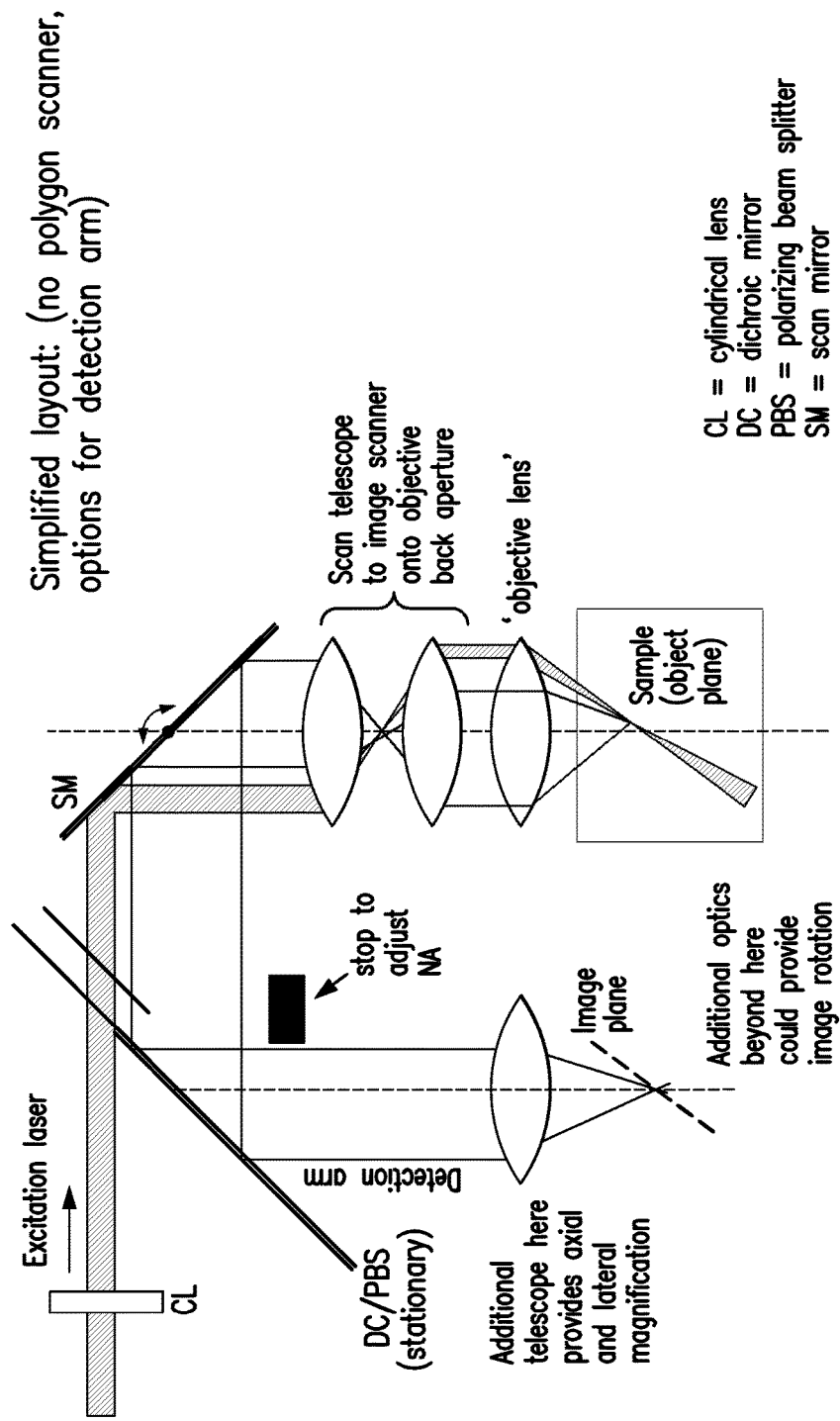
FIG. 33 depicts a detailed view of an embodiment of the invention.

The alternative configurations shown in FIGS. 29-33, 49 and others aim to collect and descan the detected light in an improved way compared to the polygonal mirror scanner. FIG. 29 shows an embodiment with two scan mirrors (which could be mirrors, reflective, refractive or diffractive elements, acousto-optic modulators, MEMS devices etc). One mirror scans the light sheet, while the other descans the returning light in a synchronized way. In certain embodiments, this also permits an adjustable aperture to be used to select how much of the detection NA reaches the camera, as required. FIG. 30 shows an embodiment with fewer image rotation optics, placing the camera at an angle to align its face with the oblique image plane as described further in section 3.3 below (which allows for simpler implementation, improved through-put and reductions in aberrations associated with image rotation optics). FIGS. 31-33 show a further simplification of the SCAPE system which uses a single, planar scan mirror analogous to the polygon, but where the detected light is reflected in the same direction as the incoming laser light. The detected light can be separated from the incoming light by employing one or more optical elements, e.g., a beam splitter (such as a dichroic or polarizing beam splitter). In certain embodiments, a beam splitter is placed within the infinity space of the illumination arm, either between the objective and tube lens, or scanner and scan lens, and is configured to channel emitted light down the detection arm where it is descanned. In certain embodiments elements such adjustable irises or spatial light modulators can be placed along the beam path to shape and scan light and/or to compensate for changes in numerical aperture or the emergence of specific aberrations (spherical, coma, etc). In certain embodiments, the scan mirror (or equivalent element) will achieve both scanning and descanning, such that a stationary oblique image plane should be formed as in the original SCAPE configuration. In certain embodiments, the scan mirror(s) (or equivalent element(s)) are planar. In certain embodiments, the scan mirror(s) (or equivalent element(s)) are non-planar, for example, but not limited to, bent, triangular, or curved. In certain embodiments, additional optical components can be used in the detection arm, and elsewhere, to achieve adjustment of the position, magnification and angle of the stationary image plane to map it onto a 2D camera (or in alternative embodiments to undergo additional descanning to permit detection with a linear or point detector).

Figure 56:
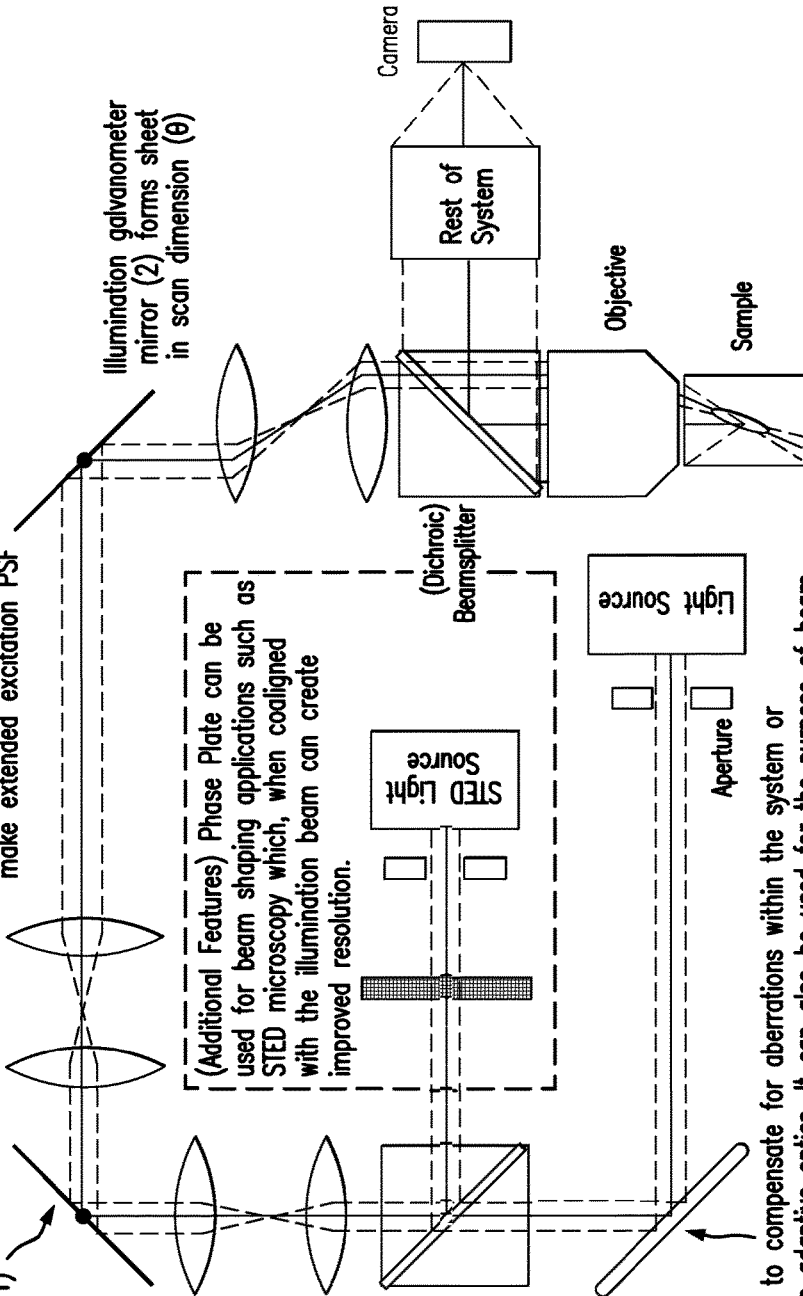
Figure 57:
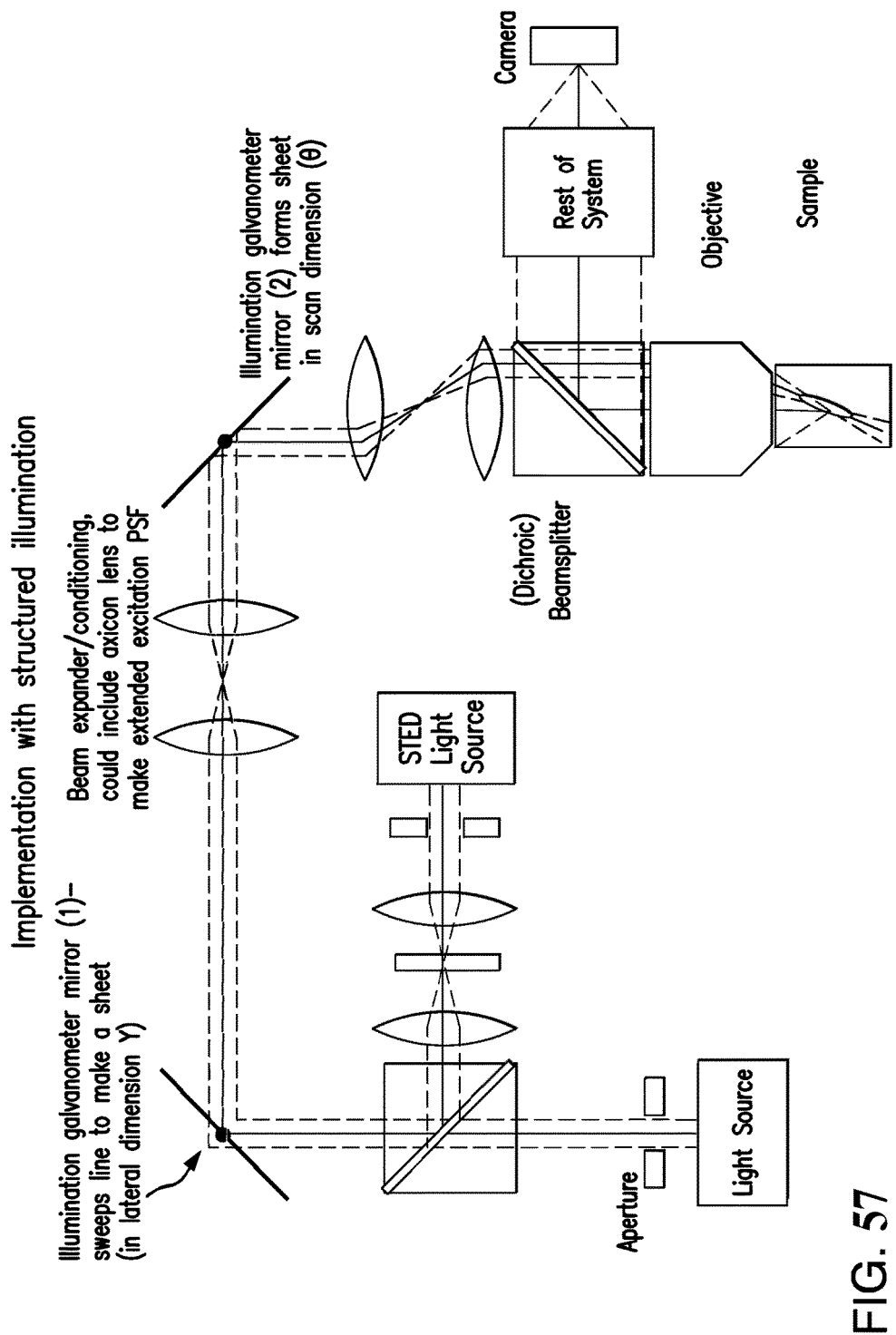

In certain embodiments the light incident at the sample can be formed by means other than a cylindrical lens. A planar illumination of the sample can be formed by scanning a linear beam of light across in the y' dimension using a scanning element positioned after the light source. Detection of the resultant illuminated plane could be achieved through integrated exposure of the camera chip during the duration of the plane-forming scan, or via rolling shutter or additional de-scanning to generate a stationary linear image (oblique along z') for detection. The incoming light can also be shaped in almost arbitrary ways to enhance performance including depth of field, for example using an axicon lens, Bessel or Airy beam shaping, temporal focusing or other shaping through the use of specialized optical elements or spatial light modulators. Stimulated emission depletion (STED) can also be incorporated into SCAPE through modification of the incident beam. STED is a super-resolution technique that employs stimulated emission depletion to reduce the diameter/width of the diffraction limited spot or sheet. In certain embodiments this can be achieved by aligning a second laser into a donut shape aligned around the focal point (for point scanning), an extended donut shape (for line scanning) or into two sheets either side of the illumination light sheet for planar scanning. This could be readily implemented in SCAPE to narrow the width of the excitation sheet. In certain embodiments, STED implementation can involve adding a second light source that is red-shifted from the one used for illumination and by way of a cylindrical lens, spatial light modulator or phase plate placed along its beam path, shape the beam into either a donut (for the line-scanning implementation) or two light sheets (for sheet-based scanning). See FIGS. 55-57.

Figure 59:
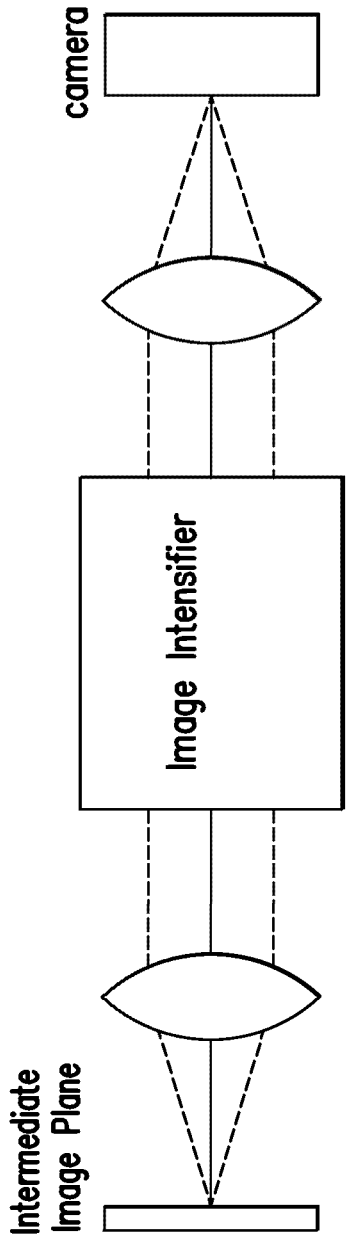

In certain embodiments, an image intensifier can be positioned in front of the camera. The image intensifier may decrease resolution, but can significantly increase detection efficiency for low light levels, increasing imaging speed. See, e.g., FIG. 59. Additional technologies for low level light detection could be employed, including avalanche photodiode or photomultiplier tube arrays.

Figure 55:
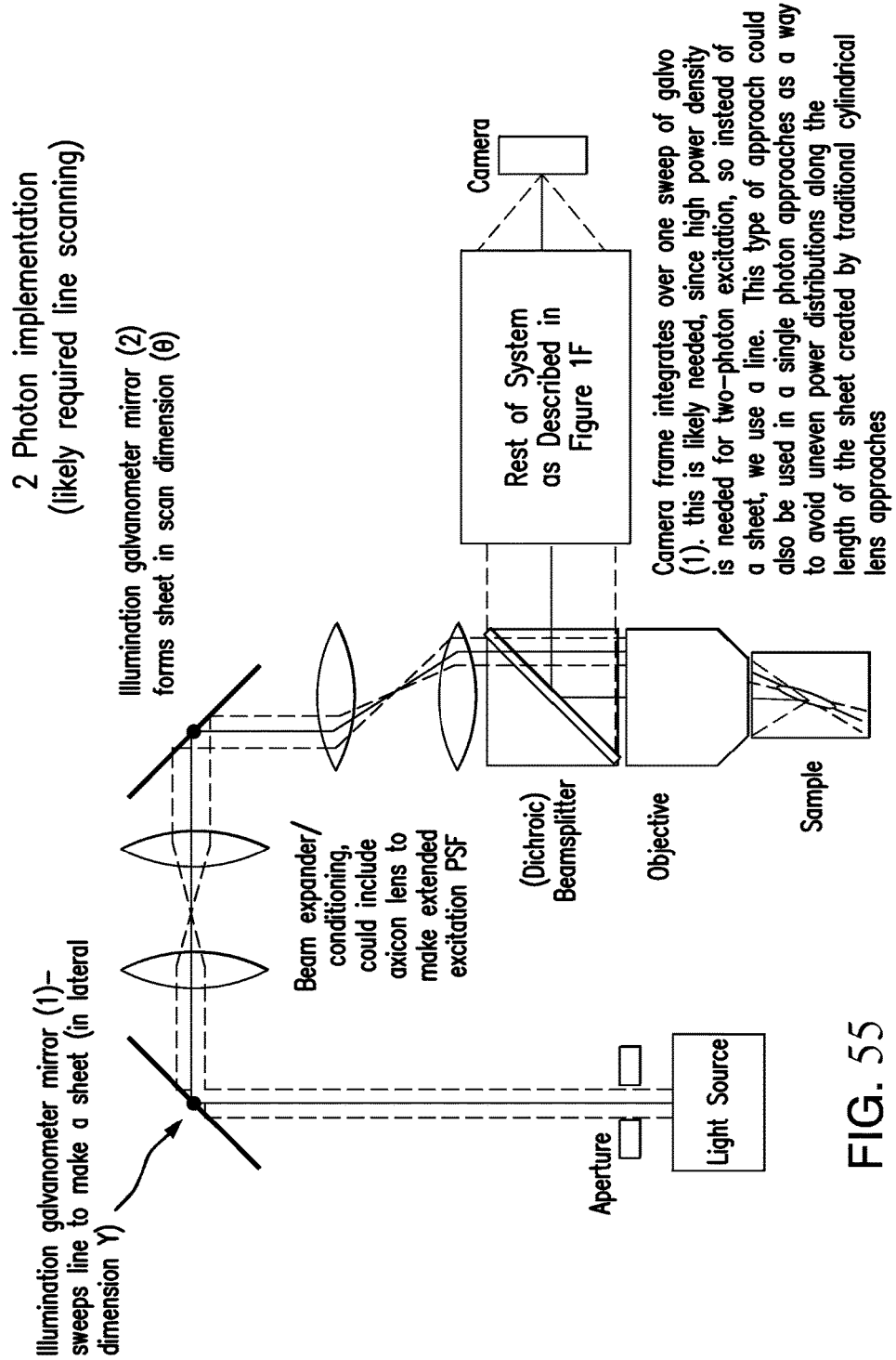

In certain embodiments, structured light can be used to improve the in-plane resolution and sectioning of SCAPE (similar to structured illumination or HiLo microscopy). By patterning illumination at different spatial frequencies, low and high frequency components of the image can be separated leading to ~factor of 2 or more resolution improvement. In certain embodiments, such structured illumination can be created by modulating the intensity of the laser beam at specific frequencies in the line-scanning configuration of SCAPE (FIG. 55). In certain embodiments, structure can also be created using a diffraction grating in the illumination path, or arbitrary patterns can be generated using a spatial light modulator. In certain embodiments, repeated images per plane may be needed, but for significant resolution improvement, this can be an acceptable trade-off. Parallel imaging of multiple frequencies could be achieved through spectral mixing of excitation in the presence of multiple fluorophores, or when imaging contrast such as second harmonic generation where a relationship between excitation and emission wavelength is maintained. In certain embodiments, STED methods can be combined with structured light imaging. In certain embodiments, Bessel beam or Airy beam imaging can also provide improved resolution in this kind of imaging geometry.

Figure 58:
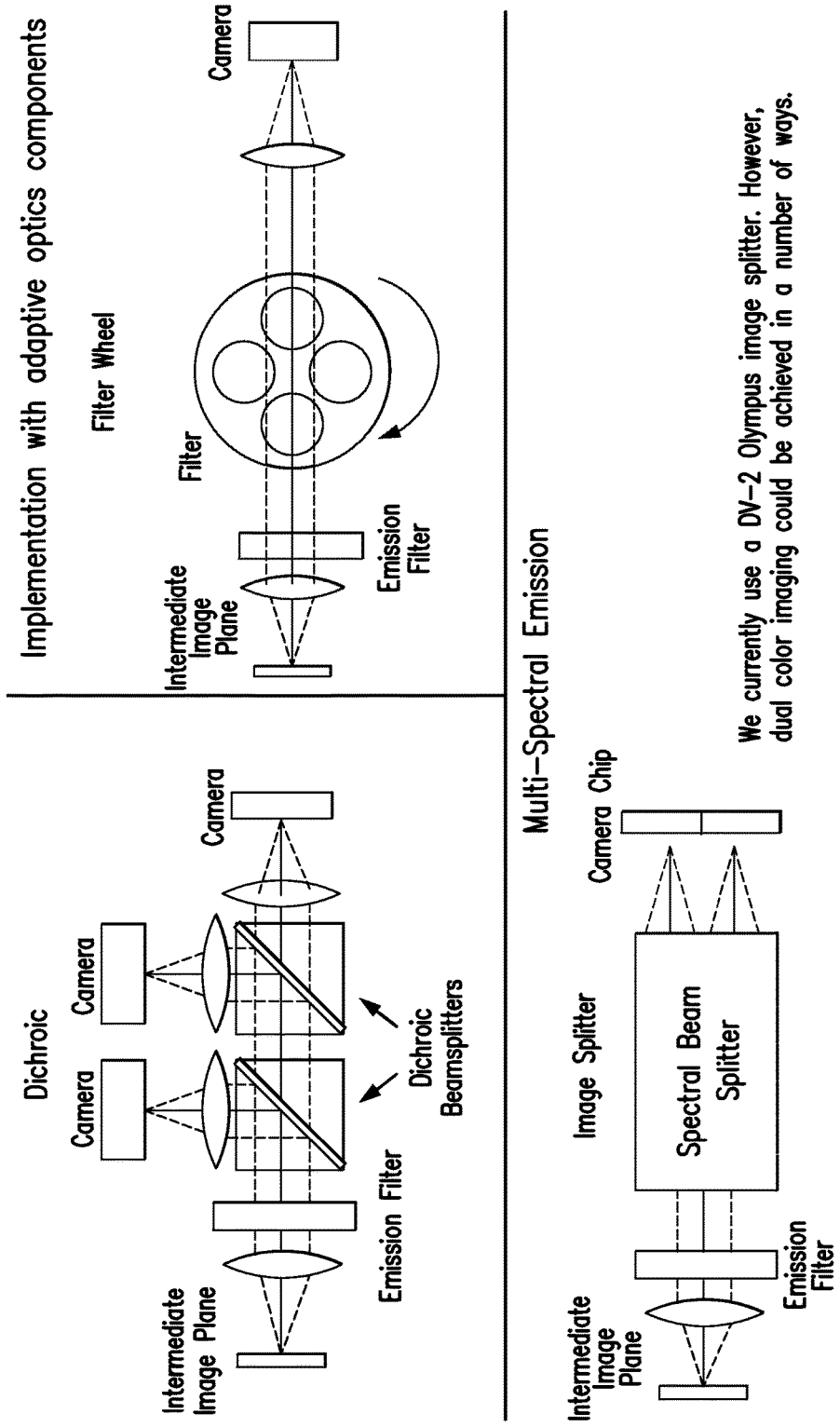

In certain embodiments, multi-color detection can be incorporated into SCAPE. In certain embodiments, such multi-color detection will rely upon optics placed between the stationary image plane and the image detector. In certain embodiments, a filter wheel and multiple cameras with dichroics between them can be employed. It is also possible to separate various color channels onto different parts of a camera chip and custom parts can be commissioned for a variety of color channel separations. Such separation is essentially limited by camera pixel density, frame rate and the optics available to perform the spectral separation. In certain embodiments, the color will be the result of two (or more) fluorophores being excited by the same wavelength of illumination, or the use of multiple laser lines or light sources simultaneously, with suitable excitation light blocking filters within the detection arm. Different lasers or collimatible light sources can also be modulated on and off. See, e.g., FIG. 58.

Figure 60:
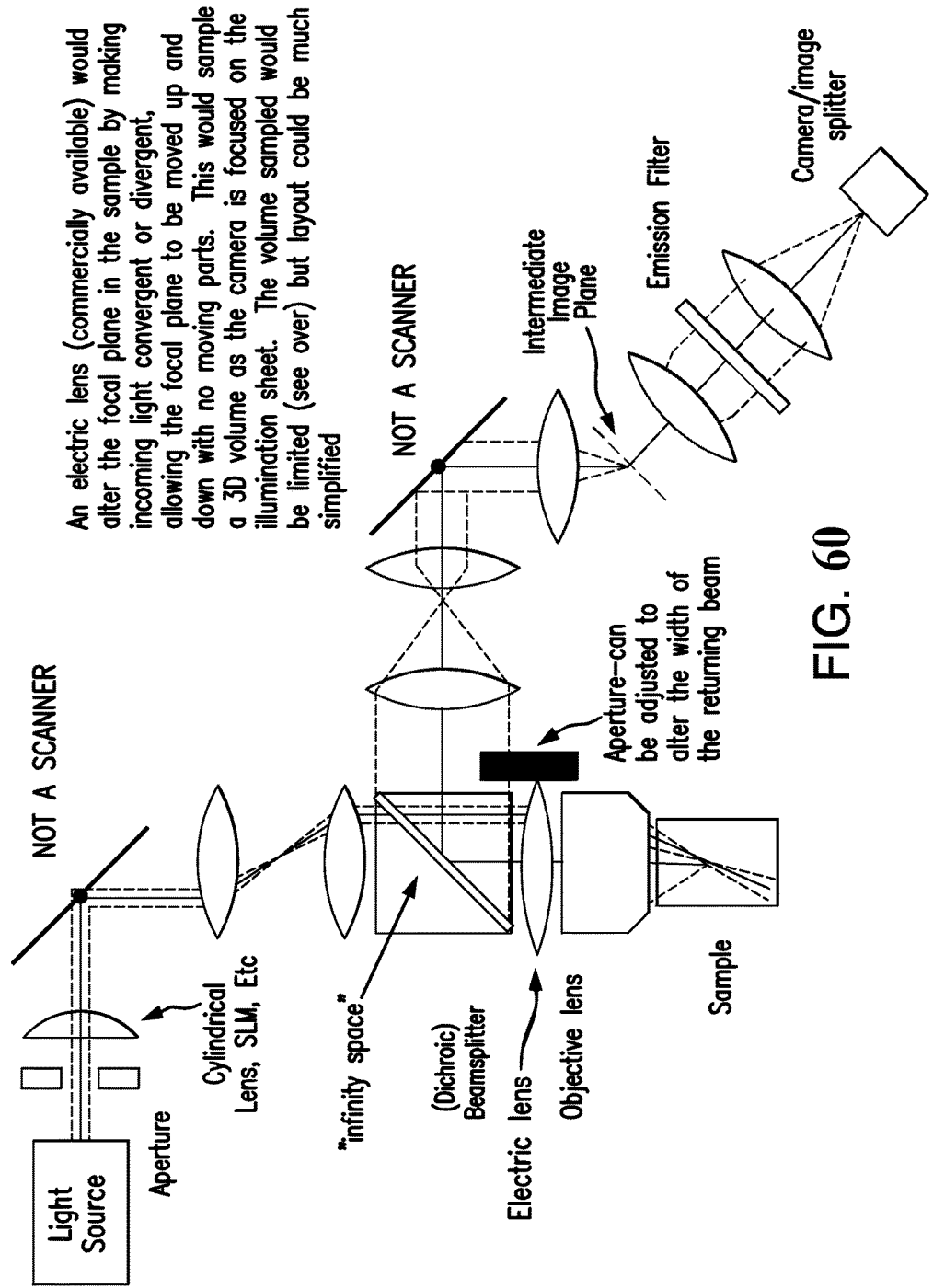
Figure 61:
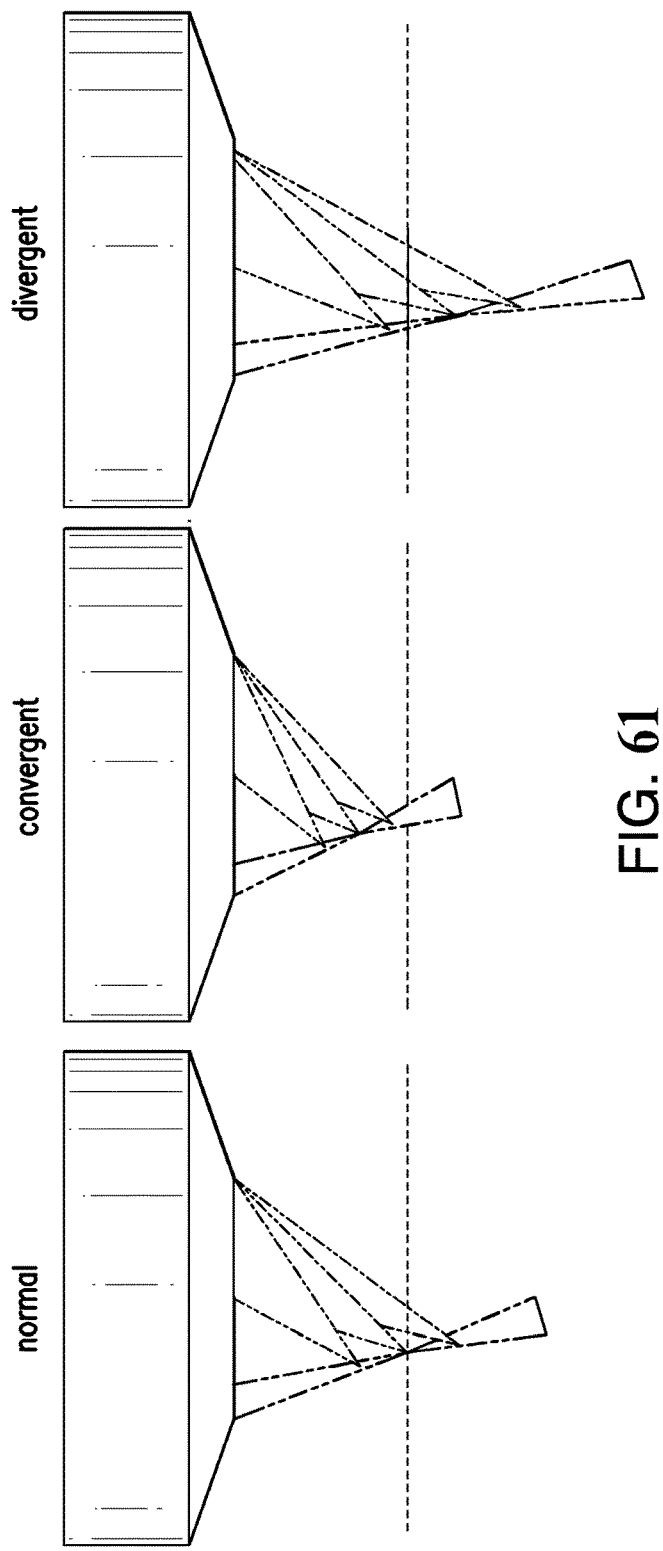

In certain embodiments, an electric lens can be employed in the context of SCAPE. For example, but not by way of limitation, FIGS. 60 and 61 provide SCAPE configurations employing electric lenses to adjust the vertical position of the excitation and detection planes as a means of sampling the volume or adjusting positioning.

3.3. Field Rotation

One aspect of SCAPE is that it acquires data from multiple depths simultaneously by illuminating the tissue with an beam or sheet of light with extent along depth. This takes note of the fact that a lens can create an image of an object that has axial extent, if it is acceptable that the image created can have axial extent too. In the extreme case, the image could be of a completely axial plane, however in practice, light sheet illumination with a more slanted oblique plane works well and provides better sectioning because the angle between excitation plane and detected light can be larger. However, this means that the image of the oblique sheet formed is also oblique. If a camera is positioned normal to the incoming, detected light, rather than aligned to the oblique image plane, light from above and below the axial focal plane of the light sheet will form a blurred image of the illuminated plane. Image rotation optics can be used to re-orient this oblique image plane to allow it to fall onto the face of a normally positioned camera chip, while maintaining the whole image, and thus all depths, in focus at the same time. Several alternatives to this original image rotation scheme can be implemented to provide both simplification and improved light throughput. These are also presented with alternative configurations to the scanning/descanning optical paths of SCAPE, although image rotation alternatives can be variously combined with different scanning/descanning approaches as also described herein.

For example, in certain embodiments, a camera can be placed at the first intermediate image plane (e.g., as in FIG. 32). In preliminary tests we have found that image rotation optics can be eliminated if the camera chip is placed directly at an intermediate image plane at an incline corresponding to the angle of the image. This configuration removes the significant light losses that can occur in our existing layout for the case of real lenses. In practice, this can also be achieved through insertion of a mirror to re-orient this plane. In certain embodiments, additional lenses to adjust the magnification of the image can allow it to match the size of the camera chip. These lenses can also be designed to minimize the relative axial magnification of the image to minimize the angle that the camera chip needs to be positioned at with respect to the optical axis. These approaches can reduce the number of lenses in the system and thus the amount of aberration of detected light. These approaches can also incorporate image relay optics that allow insertion of an image splitter, although color imaging could also be achieved with Bayer-mask type color cameras in tandem with emission/notch filters as appropriate.

Figure 34:
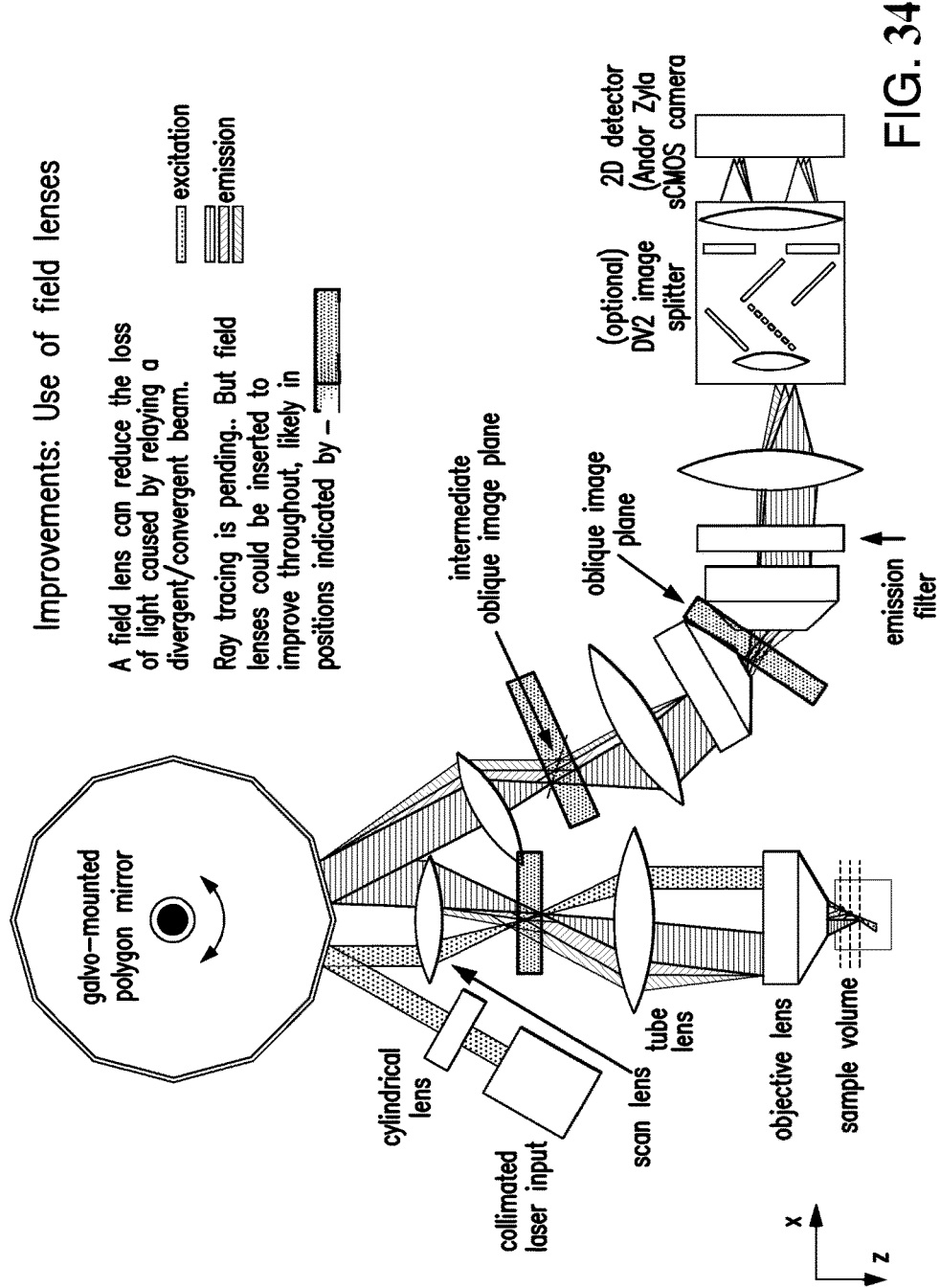
FIG. 34 depicts a detailed view of an embodiment of the invention employing field lenses.

Current image rotation optics can lose light because of the directionality of the light forming the intermediate image. Field lenses can be used redirect this light without altering its focal plane, such as is achieved in relaying images over long distances within a submarine telescope. In certain embodiments, a field lens can be positioned at the focal plane of a relay lens set. An exemplary, non-limiting, design for a field lens layout is illustrated in FIG. 34. Designs such as the one included FIG. 34 can improve the collection efficiency of image rotation optics. However, this is only one example of how specially design lenses, combinations of lenses and glass elements, possibly incorporating combinations of concave and convex lenses (as in microscope objectives) can be used to improve aberrations and throughput compared to performance achieved with standard off-the-shelf optical components.

In certain embodiments, other optical elements can also be used to redirect the light during image plane rotation. Such elements include, but are not limited to, mirrors and mirror combinations, prisms, gratings, deformable mirrors, and spatial light modulators that can redirect light to form an image at a specified position and orientation. In certain embodiments, the relative position of the descanned image plane would not be expected to change during scanning such that correction optics can be static during 3D scanning, e.g., as in FIG. 34. This figure shows how a spatial light modulator, such as adjusting the phase of reflected light, can redirect light falling at different locations to alter its angle and focal position to achieve image rotation to improve camera alignment.

Figure 35:
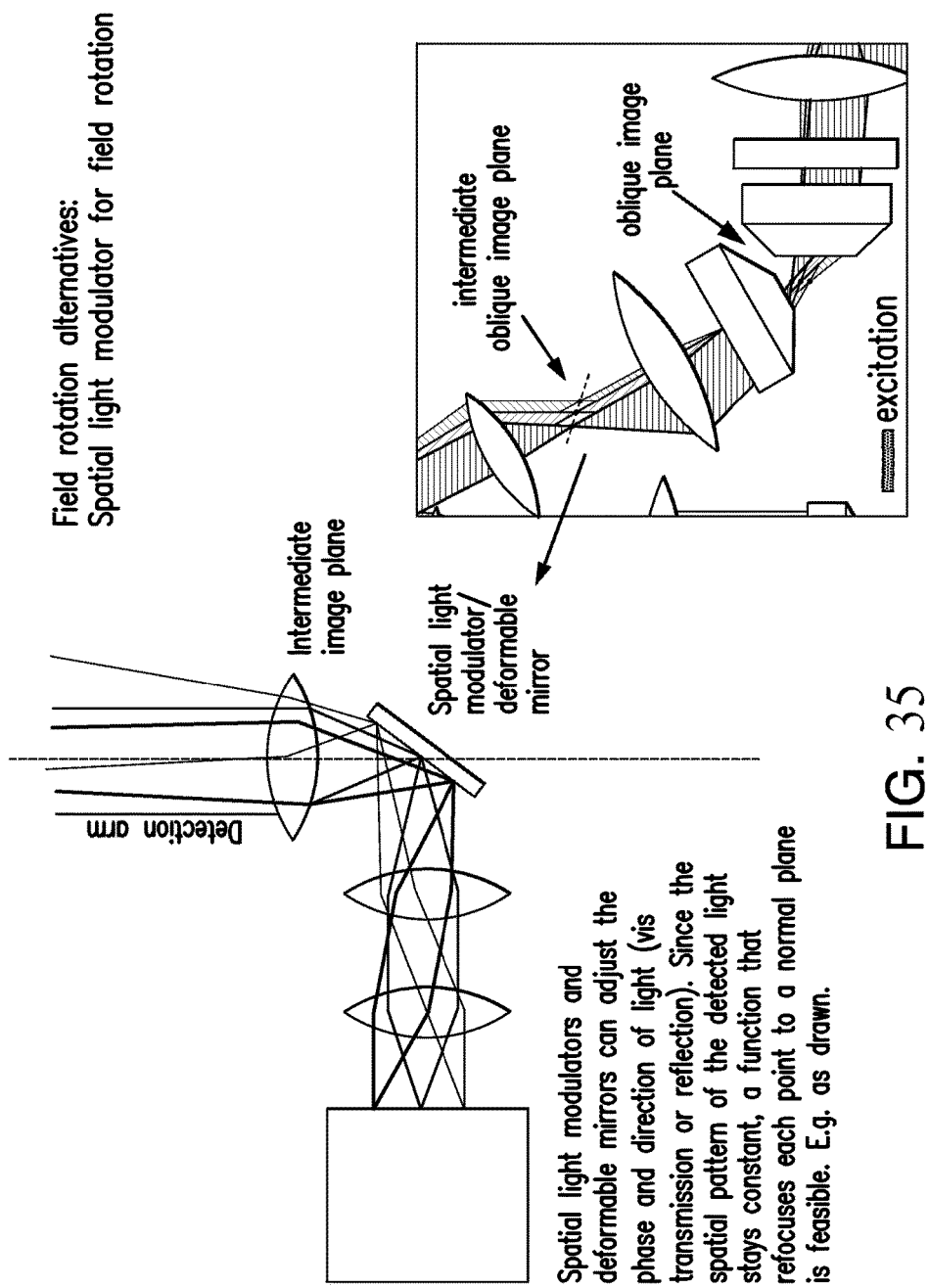
FIG. 35 depicts a detailed view of an embodiment of the invention employing spatial light modulators.

In certain embodiments, a dense fiber array can be positioned in the image plane and used to redirect light to a planar face which can be directly mapped onto a camera face. In certain embodiments, the face of the array can be angled, or positioned at an angle with respect to the incoming light, e.g., as in FIG. 35.

3.4. Dynamic Range

One potential issue with using SCAPE for imaging deeper tissues is the attenuation of light detected from shallow to deep layers. For example, since the image of an obliquely illuminated plane is captured in a single camera frame, the parts closest to the surface could be very bright while the deeper tissue signal could be very dim. In certain embodiments, the surface could be more damaged by bright light and/or the camera signal could be saturated for longer integration times or brighter illumination powers, while signal from deeper tissues could be below the noise floor for allowable excitation intensities. To extend this dynamic range, it is possible to use a spatially varying attenuator either at the camera face of at/close to an intermediate image plane between the descanning optics and the camera. For example, in certain embodiments, a strip of attenuator (such as partially reflective or absorbing glass or film) can be positioned to decrease the intensity of light reaching the camera from the superficial tissue, while letting all of the light from the deeper layers reach the camera, thereby permitting higher incident light illumination or camera integration time/gain without saturation. In certain embodiments, a graded attenuator could serve a similar purpose. Such attenuators could be physically moved (or altered using a LCD-type adjustable filter or reflective surface such as an SLM) to adjust the amount of attenuation in a sample-specific manner. This configuration works because the relative position of tissues at a specific depth in a tissue maps to specific row on the camera face, and this physical relationship does not change during scanning (except where the surface may not be flat, or is moving itself during the scan). Information about the location of a sliding attenuator, or the relative pattern of attenuation from a spatially varying attenuator can be used to correct acquired data for this attenuation via a calibration, so images in absolute intensity can be retrieved.

Figure 37:
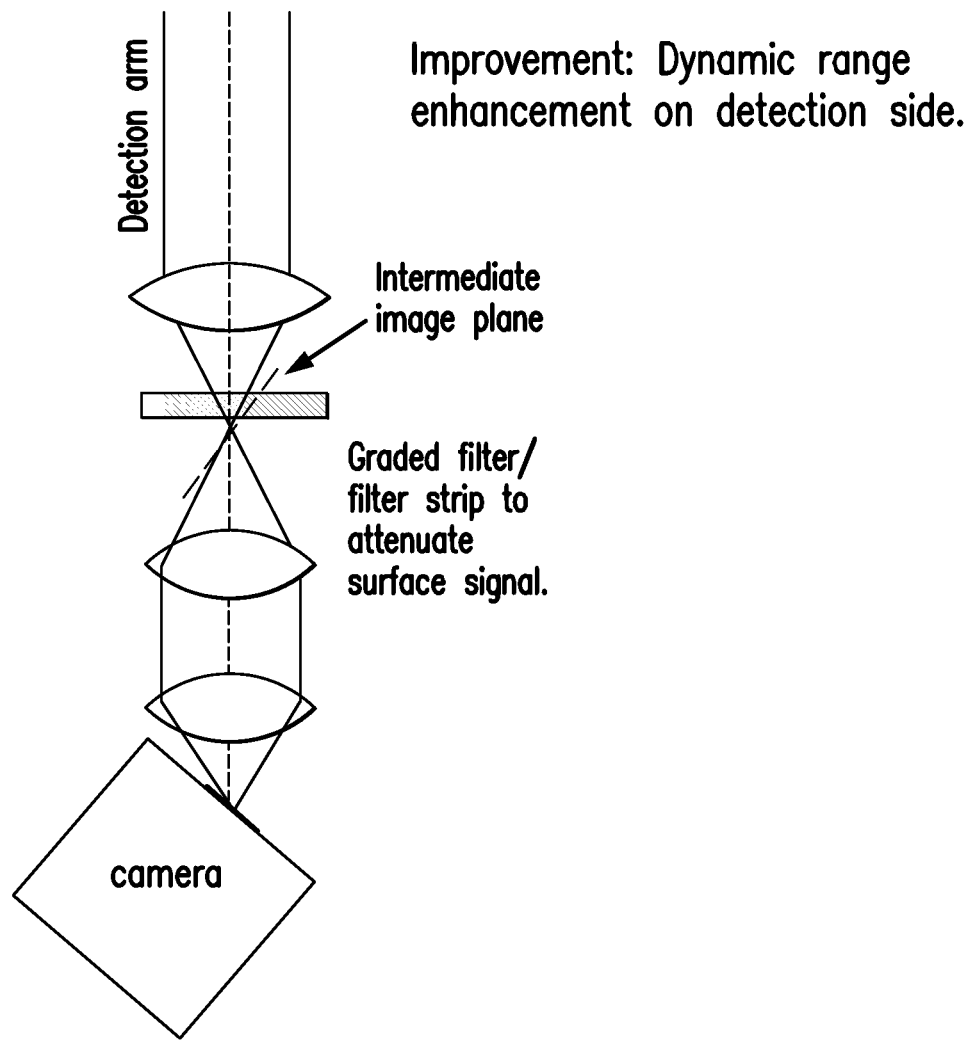
FIG. 37 depicts a detailed view of an embodiment of the invention where dynamic range is enhanced on the detector side.

In certain embodiments, excessive illumination of the surface tissue in order to better illuminate deeper tissues can be addressed by shaping the input plane such that intensity is more spatially distributed at the surface of the tissue. In certain embodiments, this can be achieved by positioning the axial focal plane of the light sheet deeper within the sample than the surface reducing the power density experienced by superficial layers. While this may lead to poorer resolution of superficial structures, it can enhance resolution and signal to noise at deeper depths. This could be especially useful for two-photon implementations of SCAPE, e.g., as in FIG. 37. This could be achieved by using a higher NA illumination beam, or through more advanced beam designs such as Bessel beams, or combinations of beamlets.

3.5. Adjustment to Accommodate Different Objective Lenses

Figure 38:
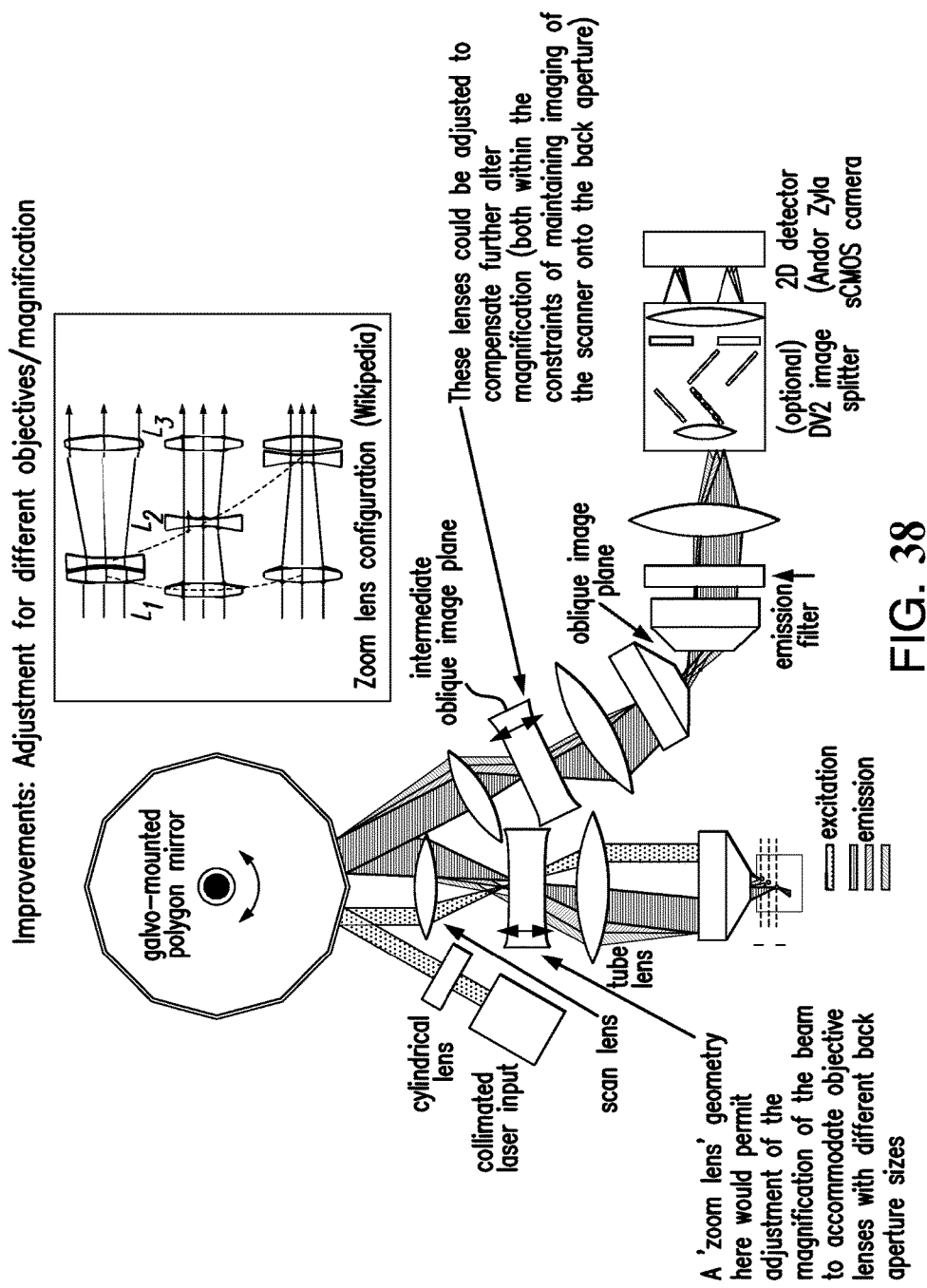
FIG. 38 depicts a detailed view of an embodiment of the invention wherein adjustments are made for different objectives.

To form the SCAPE imaging geometry, the incoming excitation beam of light can be positioned, in certain embodiments, to be incident off-center to the back aperture of the objective, a position which determines the angle of the light sheet in the sample. Some objectives have different sizes of back aperture. If there is a desire to change objective, e.g. to have a turret of objectives (or similar) in which objective lenses of different properties (such as magnification) which can be used interchangeably, it may be necessary to alter the light path. This can be achieved, in certain embodiments, by changing the magnification of the scan and tube lens combination, which can be done by inserting a zoom-lens type geometry in which a combination of concave and convex lenses are moved in combination to alter the position of the beam at the back aperture of the objective lens (see, e.g., FIG. 38). In certain embodiments, this can be done via a motor or manual movement, or can employ an electric lens. This adjustment could also be achieved through insertion of specially designed lenses or composite lenses attached to each objective lens to be used in the system. Similar adjustment to the lenses on the detection side can also be made to provide different levels of magnification, dependent on the configuration of the detection side optics and method of descanning and image rotation. In certain embodiments, additional translation of the detection lenses can permit optimal adjustment of the focus of the image on the camera. Since objective lenses do not need to be translated in the "Z" axis for fast volumetric imaging in SCAPE, a convenient turret type setup for the objectives is feasible.

3.6. Clinical Implementations

SCAPE can also be implemented for clinical use. While confocal endoscopy has become a popular technique for providing microscopic resolution imaging of intact tissues to guide biopsy and aid in in-situ diagnosis it is slow and it is difficult to get 3D data since in most cases the distance between the objective and the tissue surface needs to be physically adjusted in a very constrained environment. Even systems for imaging more accessible tissues such as the oral mucosa and skin have difficulty with 3D scanning, despite optical sectioning capabilities. In contrast, SCAPE can permit almost video-rate imaging, thus improving upon current clinical microscopy techniques by being more tolerant to motion artefacts during imaging, and providing the ability to sample larger areas of tissues through 'searchlight' type imaging that can canvass sequential regions in real-time. SCAPE can also leverage its translationless objective configuration to overcome the need for physical adjustment of the distance between the tissue and imaging lens. For example, in certain embodiments, a constant thickness spacer can hold tissue at the required offset and images will provide depth-sectioned visualization of the tissue touching the spacer.

Figure 39:
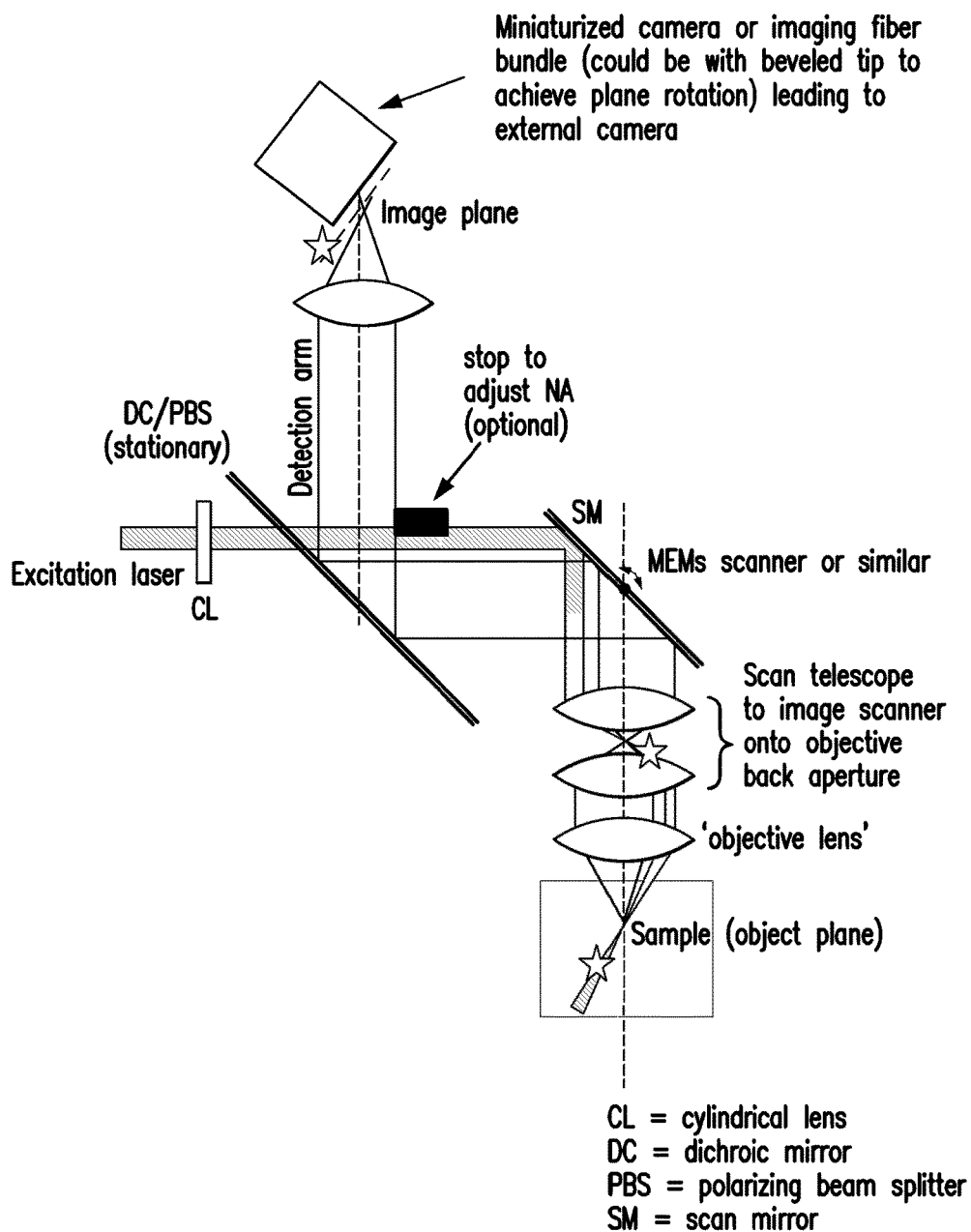
FIG. 39 depicts a detailed view of an embodiment of the invention with simplified scanning.

Implementing SCAPE in a miniaturized format can be achieved in a number of ways. The primary constraint is the need for a high-speed imaging element (e.g. camera) that can record an image of the illuminated plane, which can be addressed in a number of ways. In certain embodiments, a miniaturized camera can be placed at the tip of, e.g., an endoscope (or miniaturized probe system that could be positioned for imaging oral mucosa, for example). Camera technologies developed for modern smartphones are becoming significantly more powerful and could provide options for high speed acquisition in this setting, e.g., FIG. 39. In FIG. 39, the optical layout has been configured in a way that could feasibly be miniaturized at the head of an endoscopic or slender imaging head.

Figure 36:
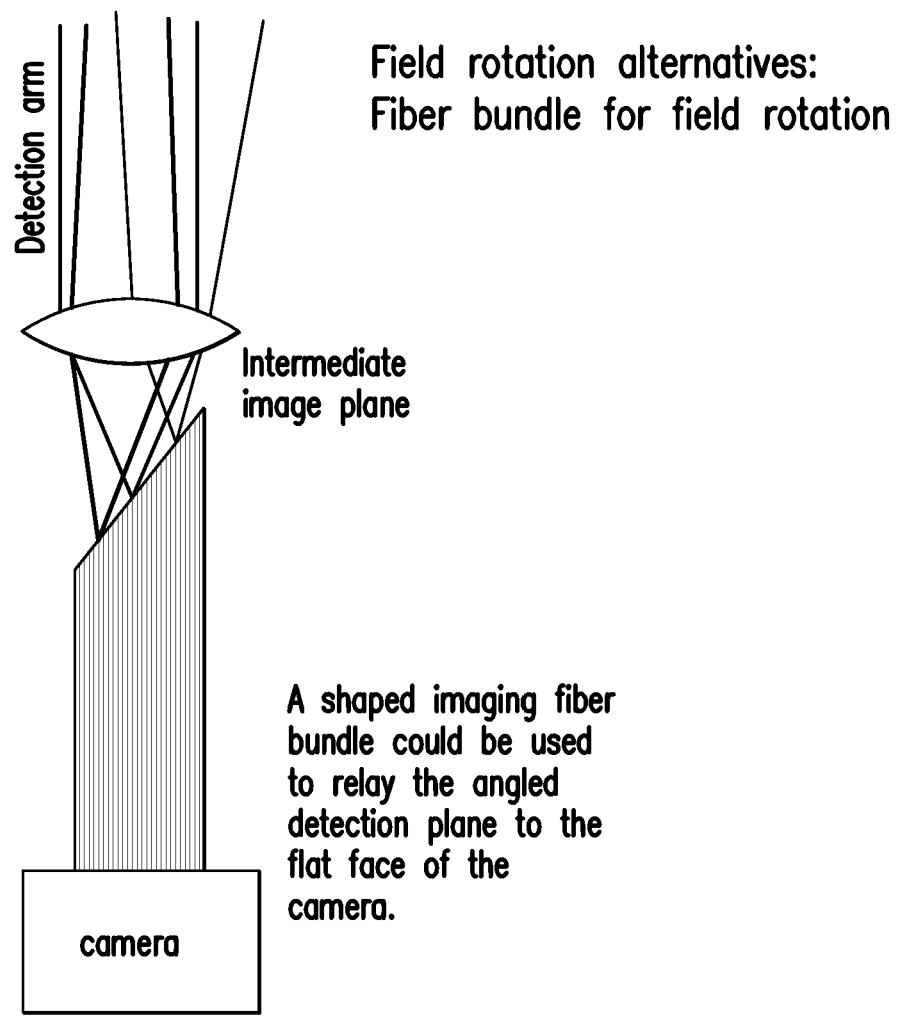
FIG. 36 depicts a detailed view of an embodiment of the invention employing a shaped imaging fiber bundle.

In certain miniaturized embodiments, the imaging can be performed by a fast camera external to the body. In certain embodiments, the image can be relayed via a 2D fiber optic bundle or similar imaging conduit, e.g., as depicted in FIG. 36.

Figure 40:
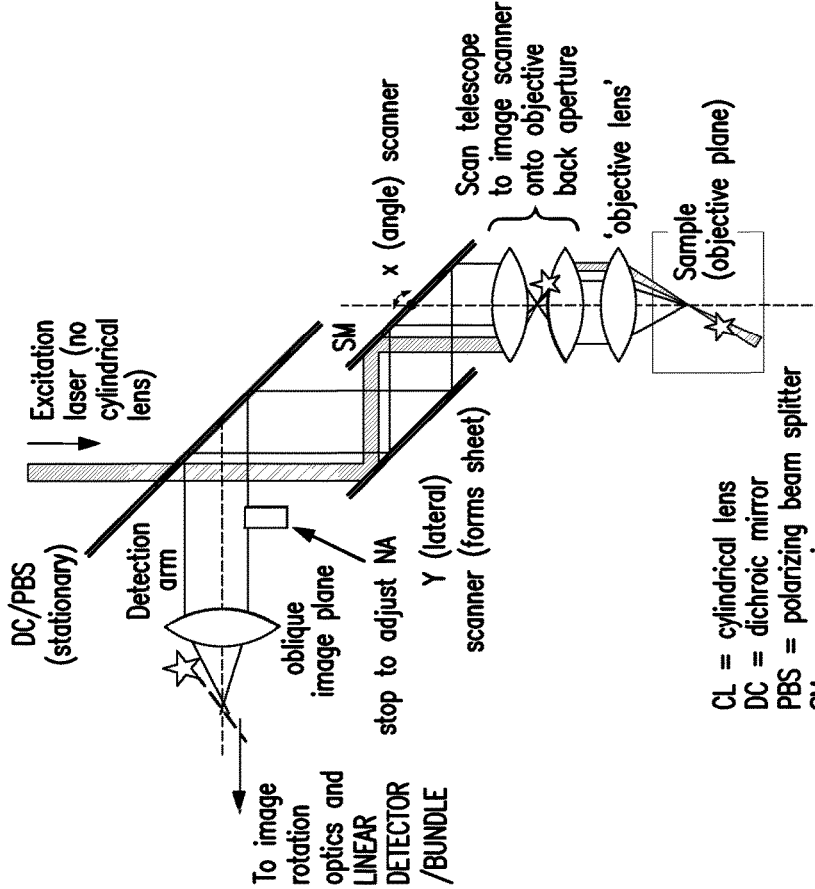
FIG. 40 depicts a detailed view of an embodiment of the invention with additional scanners for linear (1-D) rather than 2D image acquisition.

In certain miniaturized embodiments, the image can be encoded into a linear pattern that can be relayed by a less expensive and denser linear fiber bundle as compared to the 2D fiber optic bundle above, or detection within the probe using a compact linear detector such as a line-scan camera, avalanche photodiode or photomultiplier tube array. e.g., FIG. 40. In certain embodiments, this type of configuration is an extension of the standard SCAPE method and can be achieved in a number of ways (and is similar to that described for two-photon SCAPE with line-scanning on the excitation side). Essentially, instead of using a cylindrical lens to form the light sheet on the excitation side, a separate scanner can be used to scan a low NA (or similar) single beam (extending along z') to compose the sheet along the y' direction, prior to sweeping of the sheet along the x' direction. Here we are referring to the SCAPE coordinates defined in FIG. 24b. In certain embodiments, it is then possible to image the resultant illuminated sheet onto a 2D camera array as in the conventional SCAPE configuration. In such embodiments, the camera can simply expose as the line sweeps along y' to form the sheet, filling the plane and forming one 2D y'-z' image. In certain embodiments, this strategy can be combined and synchronized with 'rolling shutter' type acquisition on the camera which would be similar to having a detection slit (as in line-scanning confocal but in the orthogonal direction) which can improve optical sectioning and resolution. In certain embodiments, this detection arm light can be both de-scanned in the usual way (along x') and descanned again (along y') to correct for the motion of the sheet-forming linear beam. Descanning in this second dimension can reduce the detection side image to a single line corresponding to the line of light illuminating the sample (in the oblique z' direction) at a given point in time. This incident beam scanning, and/or additional de-scanning would be at the line-scan rate equal to the volume rate (e.g. 20 volumes per second) multiplied by the y' sweep rate (e.g. 200 y' pixels per plane) which is an achievable 4 kHz scan/de-scan rate. Detection de-scanning of light along the y' dimension can also be combined with conventional cylindrical lens or similar formation of the full excitation light sheet, or any other combination of sheet formation and descanning. In certain embodiments, linear detectors used in such implementations can be line-scan cameras or linear arrays (such as avalanche photodiode arrays) or linear fiber bundles leading to linear arrays or even individual detectors, with the number of elements corresponding to the number of depths along z' being acquired. Such linear detectors can typically be read out very rapidly (equivalent to camera read-out rates multiplied by the number of lines along y'). This configuration may be more suitable for endoscopic implementations since a linear fiber bundle can be used to relay the imaging data to an external linear imaging array far more efficiently, more compactly and at lower cost than a full 2D imaging bundle. The layout in FIG. 40 further notes that this configuration can be achieved in a standard optical layout in which conventional 'x and y' scanners can be used together for both scanning and descanning of the beam in both dimensions. Such embodiments differ from conventional confocal microscope design, in that the excitation light is directed towards the edge of the objective lens (or equivalent) to form an oblique illumination line, and the conventional 'confocal plane' would (instead of a pinhole) have a corresponding oblique linear image which can be captured digitally via the methods described previously, including, but not limited to, an obliquely oriented linear detector, image rotation and magnification optics mapping the image onto an orthogonal 2D detector, or optical fiber bundle or optical conduits for relating the image to a linear 2D detector. Compared to confocal microscopy, the described embodiment would acquire optically sectioned data from all depths in the sampled volume in parallel, during a conventional x-y raster scan of the region of interest, whereas a confocal microscope would limit its detection to the focal point of the incident beam, requiring sequential translation of this focal point in z to form a 3D image.

Figure 41:
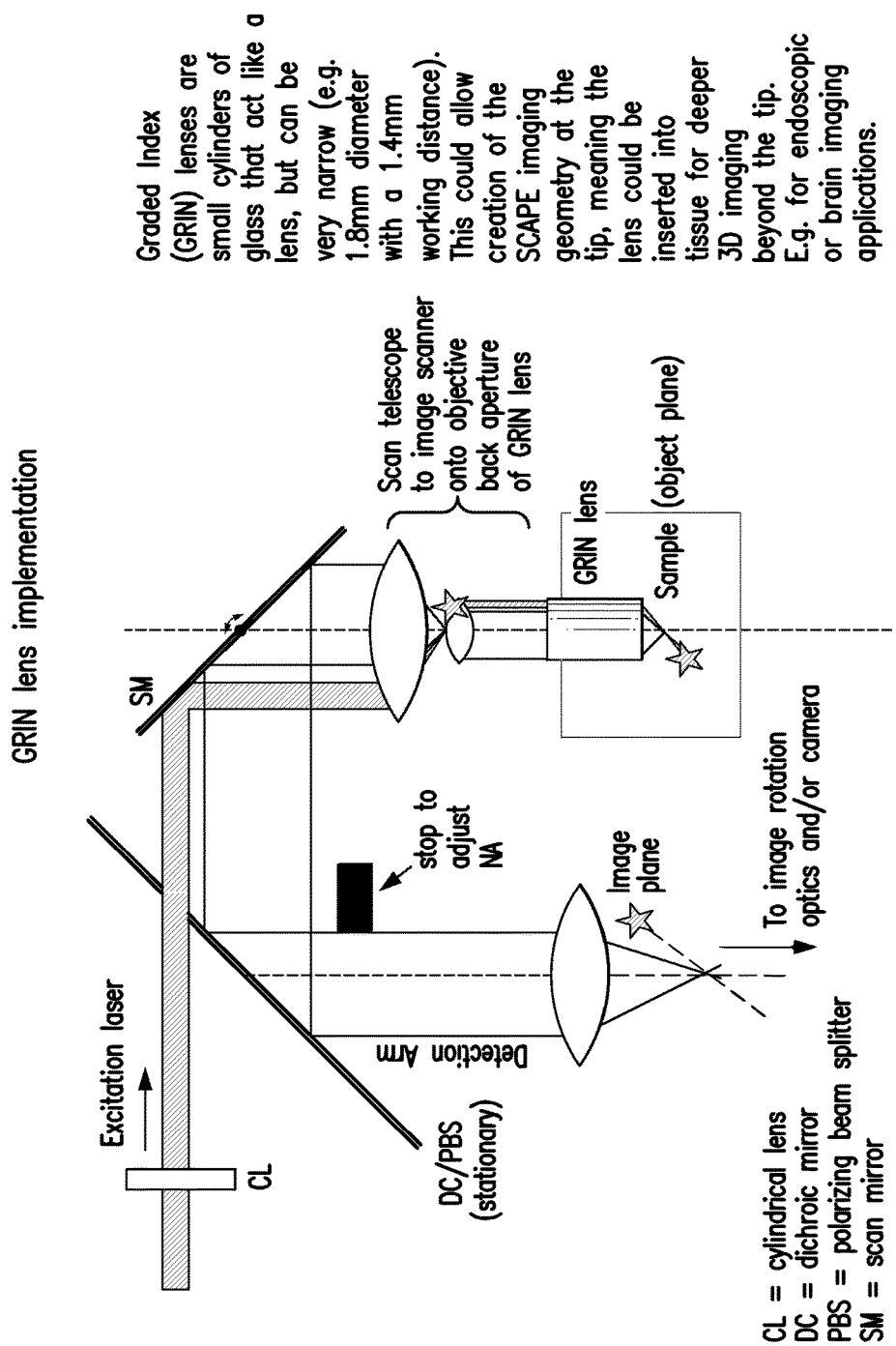
FIG. 41 depicts a detailed view of an embodiment of the invention employing a graded index (GRIN) lens.

In certain embodiments, gradient-index (GRIN) lenses can be used to map the object plane of a conventionally designed SCAPE system into a plane deep within tissues. In certain embodiments, such GRIN lenses can be used within the brain or a needle inserted into a solid tumor such as in the breast, e.g., FIG. 41.

In certain embodiments, scanning and de-scanning of the light sheet/detected light can be achieved using micro-mirror technology MEMs, DLP, deformable mirror, spatial light modulator or similar technology at the tip of the endoscope (or probe).

3.7. Alternatives for Generating and Scanning the Imaging Geometry

Figure 42A:
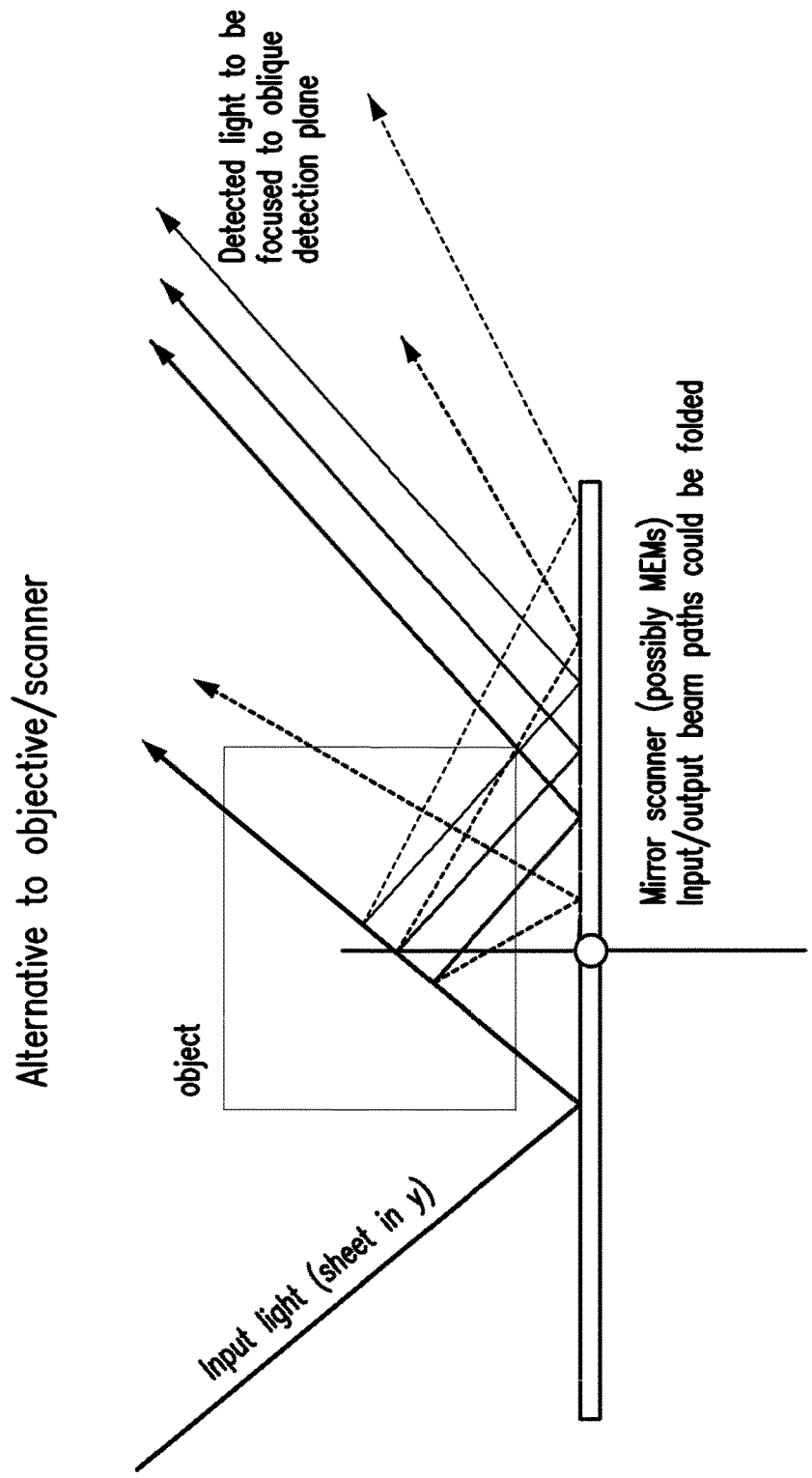
FIG. 42(*a*)-(*c*) depict a detailed view of an embodiment of the invention using a polygon scanner.
Figure 42B:
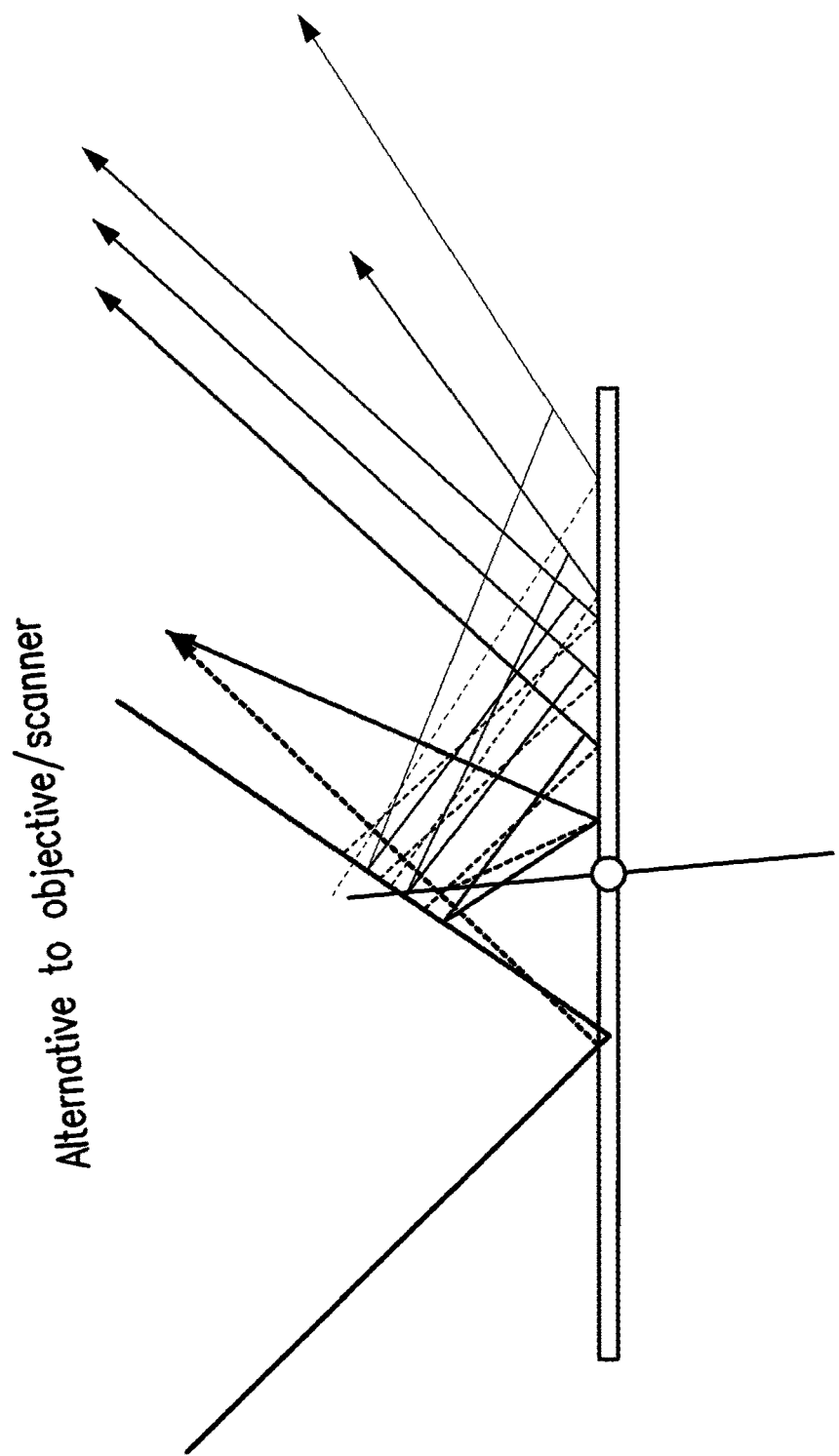
Figure 42C:
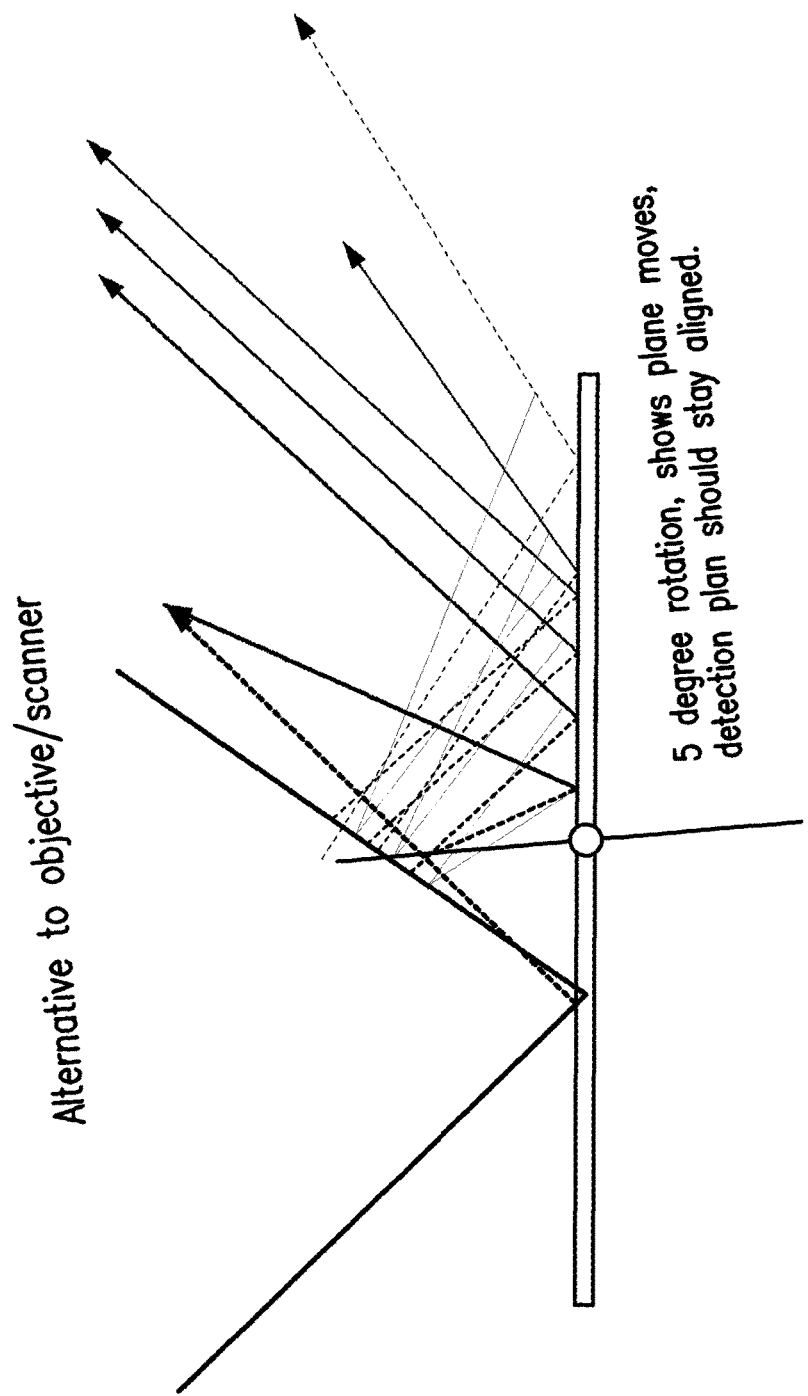

A wide range of technologies and approaches can be used to generate the SCAPE imaging geometry beyond using mirror scanners and an objective lens. In certain embodiments, such as those illustrated in FIG. 42a-c, a single reflective surface can be rotated back and forth. In certain embodiments, a suitably aligned input beam and aligned detection plane can be co-aligned, and will stay aligned with each-other as the mirror is moved back and forth. In certain embodiments of this type of design, there are no lenses between the scanner and the sample. However, in certain embodiments, intermediate lenses can be added to relay this measurement geometry to the sample. In certain embodiments, this simple configuration can be useful for both macro and compact configurations of SCAPE, such as for MEMs-based microendoscopy.

3.8. Optogenetics, Photo-Manipulation and Multi-Modality Imaging

Since, in certain embodiments, an objective lens in SCAPE stays stationary during 3D imaging, it is possible to utilize the same lens for additional simultaneous optical actuation or imaging of tissues during imaging (and is also possible to use other lenses focused on the sample, although such geometries may restrict the choice of sample). In conventional two-photon and confocal laser scanning microscopy, it is necessary to axially scan the objective up and down to form a 3D image, which not only physically disturbs the sample, but makes simultaneous illumination of a fixed spot through the same objective almost impossible. In contrast, in certain embodiments, SCAPE imaging can proceed in parallel with additional photo-manipulation and/or imaging techniques.

Figure 43:
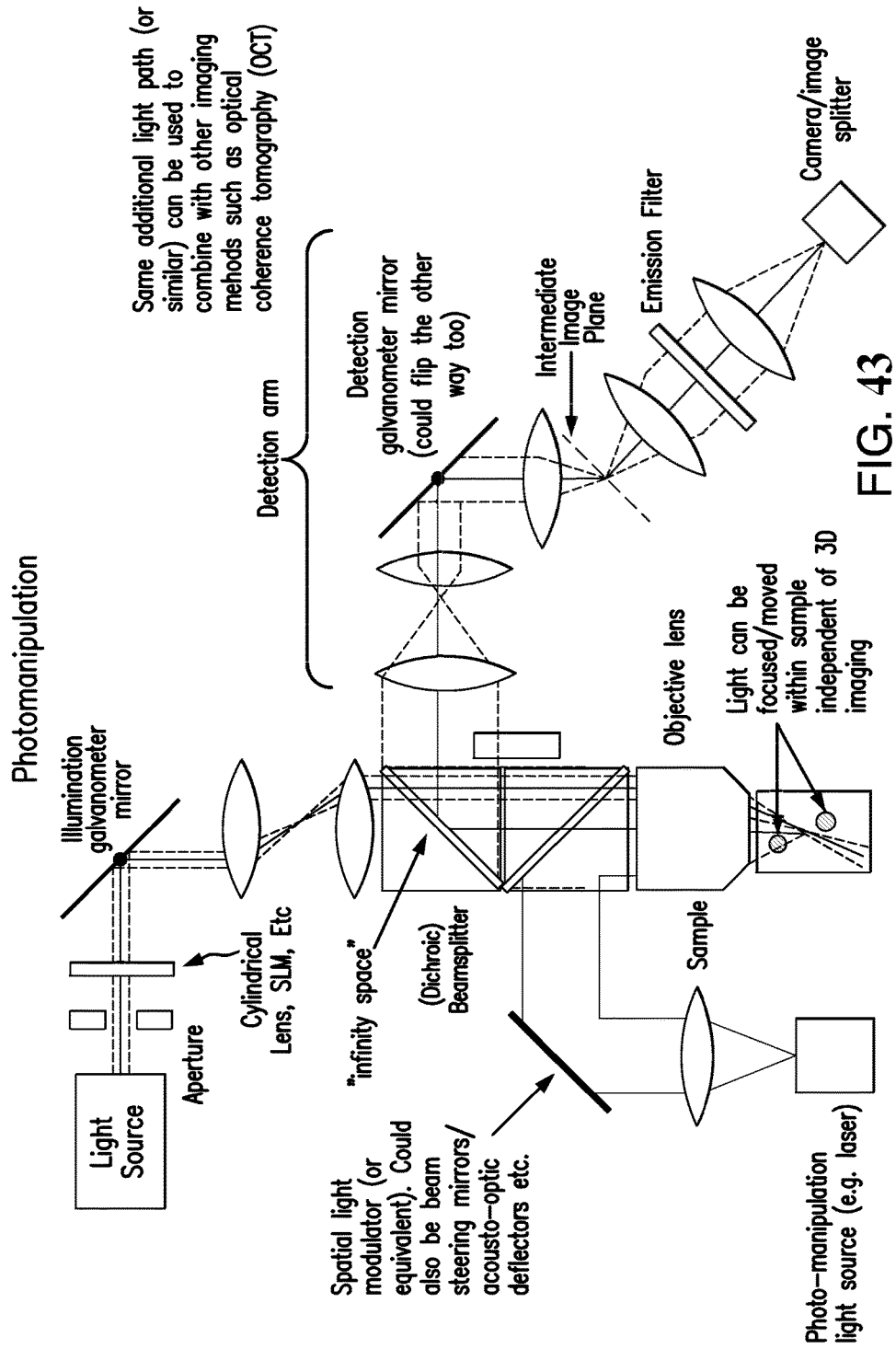
FIG. 43 depicts a detailed view of an embodiment of the invention with photo-manipulation of the tissue using a dichroic or polarizing beam splitter.

In certain embodiments, optogenetics or similar photo-manipulation of the tissue being imaged can be accomplished using a dichroic or polarizing beam splitter or other beam-combining method to simultaneously illuminate the tissue down the same objective, e.g., FIG. 43. In certain embodiments, wavelength can be used to discriminate the light used for photo-manipulation from emitted SCAPE imaging light, although the SCAPE system could feasibly image the effects of this incident light to provide 3D co-registration of the site of photo-manipulation with respect to the SCAPE image (since the descanning action of SCAPE effectively provides optical sectioning of the sample (as in deconvolution microscopy) even if the excitation plane of SCAPE is not illuminated). This photo-manipulation light can, in certain embodiments, be generated by any beam-shaping optical components, from simply focusing laser light at the objective's focal plane, to scanning with galvanometer mirrors, acousto-optic scanners, MEMs scanners, DLP devices or spatial light modulators (SLMs). In certain embodiments, the latter can be used to generate arbitrary 3D patterns of photo-manipulation, which can be dynamically altered during SCAPE imaging, even using real-time closed loop guidance of which regions to excite. In certain embodiments, photo-manipulation can include optogenetic excitation or inhibition of cells, optical tweezing, photocoagulation, photobleaching, e.g. for 3D FRAP, optically induced cell death or impairment, optical cavitation for the photo-release from micro or nanoparticles, photo-uncaging etc.

In certain embodiments, imaging using other modalities can also be achieved through the same objective, including optical coherence tomography (OCT). OCT uses coherence gating to resolve depth and so, like SCAPE, does not require axial translation of the objective to generate a 3D image. OCT can provide detailed structural imaging of tissues to depths of several millimeters at high speeds and could be greatly complemented by SCAPE's sensitivity to fluorescence. This can be a useful combination for clinical imaging, since OCT is already implemented for corneal, retinal and intravascular imaging, to which SCAPE could add fluorescence sensitivity, for example, for molecular or metabolic imaging. Conventional wide-field imaging, with UV, visible or near infrared imaging can also be valuable to image the surface of tissue at high speeds simultaneously with SCAPE. In certain embodiments, speckle-flow or laser Doppler could be implemented. In certain embodiments, conventional laser scanning confocal and two-photon microscopy can also be incorporated into a SCAPE system, either as a supplemental method to image or a method to align photo-excitation, for example. In certain embodiments, 3D imaging can be achieved via translation of the objective, or through use of an electric lens or remote focusing within the optics of the combined imaging system.

3.9. Two-Photon Implementation

Figure 44:
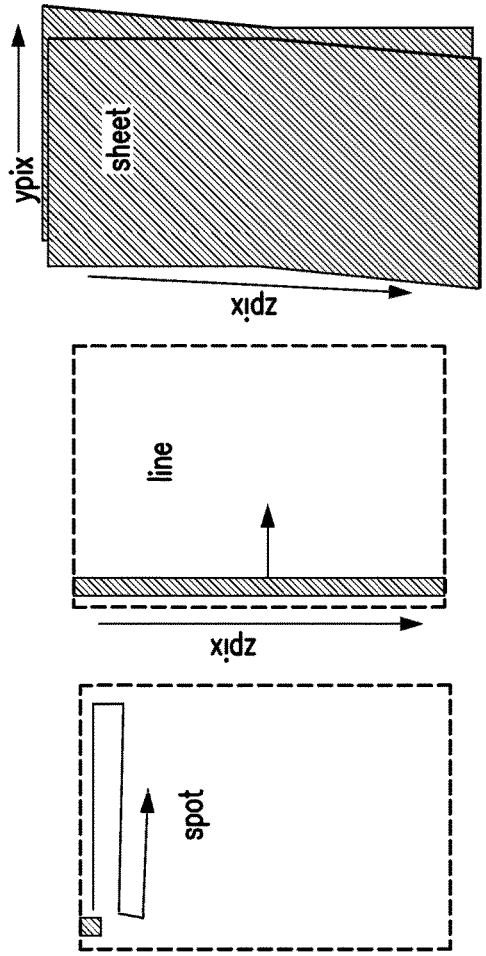
FIG. 44 depicts different data acquisition approaches for two-photon excitation.
Figure 45:
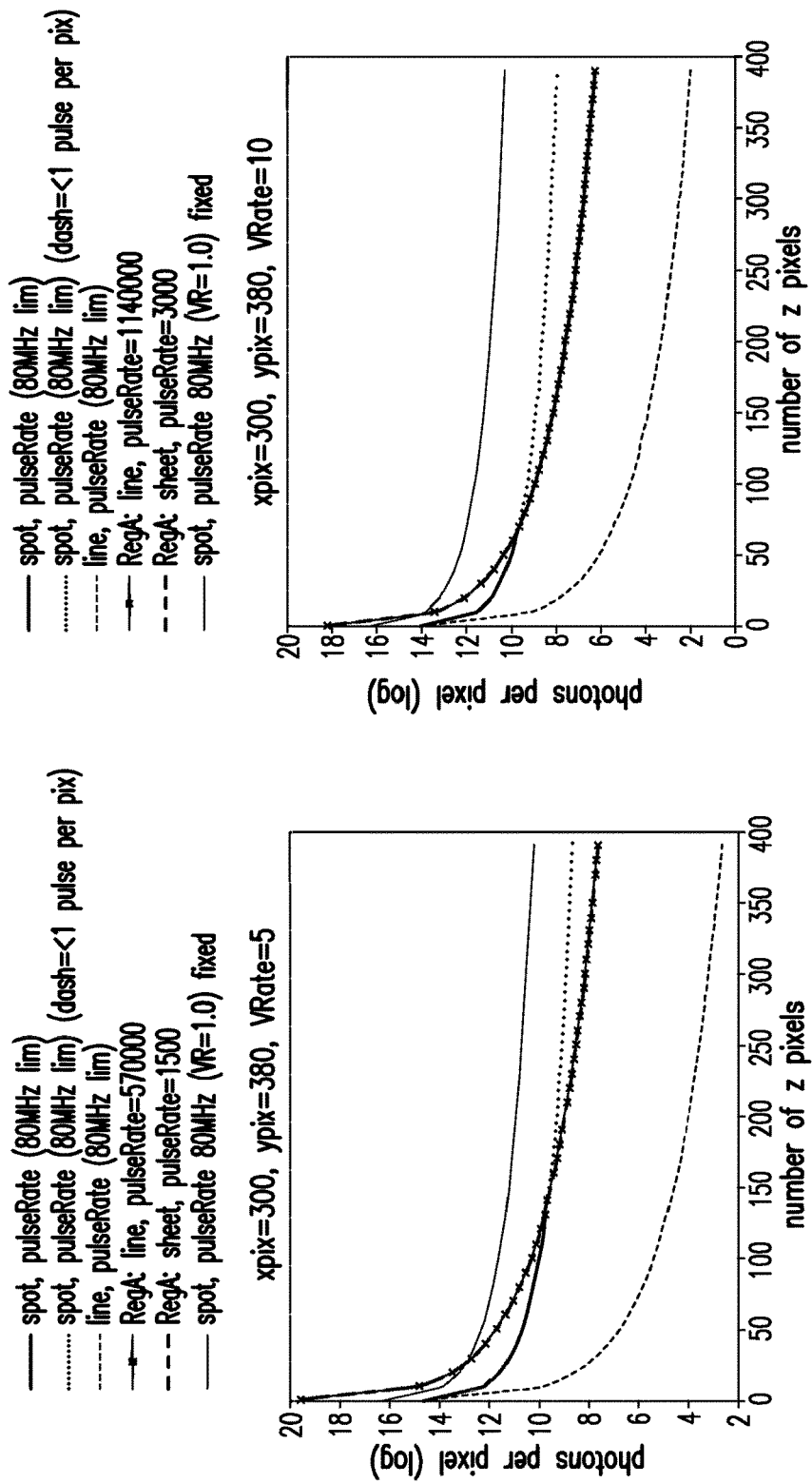
FIG. 45 depicts results from the models described in FIG. 44 showing the different factors that influence photon production in each configuration.
Figure 45:
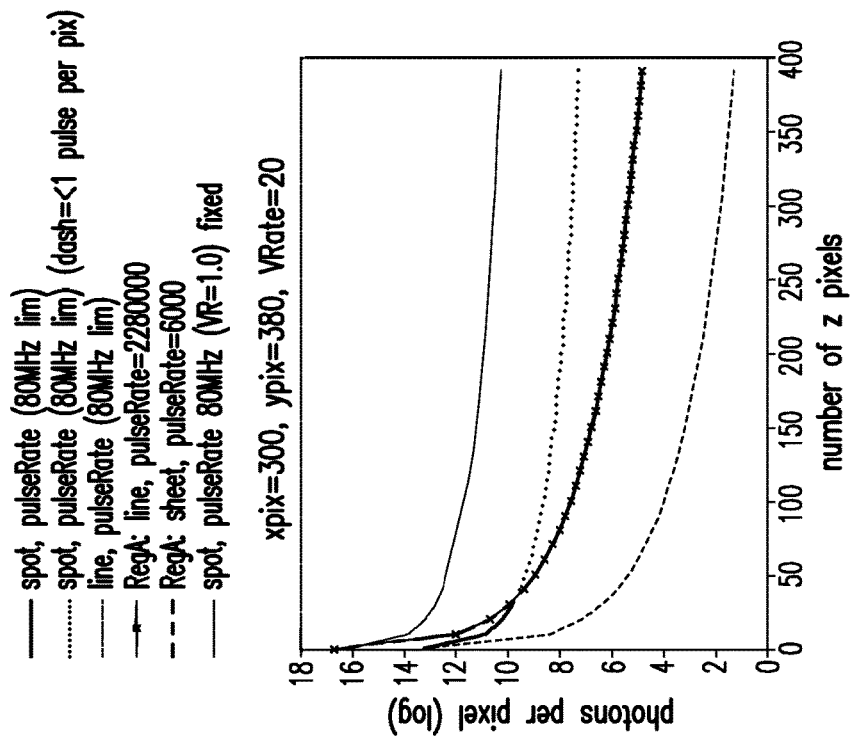

Implementing SCAPE with two-photon excitation can provide improved penetration depth, contrast and resolution. Near infrared light (used for two-photon excitation) travels more deeply into materials such as scattering living tissue. This would mean that the incident light sheet employed in SCAPE would stay more narrow at it travels deeper, while also losing less energy on its way to deeper depths. However, the laser power demands of two-photon microscopy are high, and for our standard SCAPE geometry would likely be difficult to achieve using standard lasers commonly used for two-photon microscopy. For example, most two-photon microscopes scan a single focused spot (approx 1 micron cubed), and to image deep into scattering samples, some can use the full power available from a Ti:Sapphire laser (around 1.5 W at the laser, less at the sample). If this same power were spread out over a light sheet that was 500×500 microns, one would need 500×500 this power to achieve the same instantaneous intensity of illumination at each point. Moreover, two-photon excitation produces emitted signal as a function of incident power squared ($P^2$), so if the initial beam is split into 4, only $\frac{1}{16}$th of the signal will be obtained from one of these beams, for the same dwell time. While all 4 spots could be imaged at the same time, giving 4× longer integration time and thus 4× more signal than a microscope that has to visit all 4 spots in turn within the same period of time, this still leads to a factor of 4 reduction in detected signal, e.g., see FIGS. 44-45.

To address these optical power issues, SCAPE illumination can be spread into a line of illumination, which can be scanned laterally to make a sheet, which is more efficient for two-photon imaging than extending available power into a light sheet (assuming that the laser has the same pulse repetition rate and power etc. as in standard point scanning two-photon microscopy). This is shown in the example below:

With highly efficient focus, line or light sheet formation, power incident in a 1×1×1 micron volume can be approximated by: $P_{i,\,pix} \approx$ laser_power $$P_{i,line} \approx \text{laser\_power}/(z\text{FOV}), \text{ and}$$

$$P_{i,sheet} \approx \text{laser\_power}/(y\text{FOV} \times z\text{FOV}),$$

where z/yFOV is the micron dimension of the field of view in z/y. Integration time for a given volume rate in each case would be:

$$t_{pix} \approx 1/(V_r \times \text{xpix} \times \text{ypix} \times \text{zpix})$$

$$t_{line} \approx 1/(V_r \times \text{xpix} \times \text{ypix})$$

$t_{sheet} \approx 1/(V_r \times \text{xpix})$ where x/y/zpix is the number of voxels in x/y/z. Since two-photon excitation scales as power$^2$, the emission intensity x integration time product for each case will scale as $P_i^2 \times t$. We find that the single point scanning model has the highest value of $P_{i,pix}^2 t_{pix}$ (since the division over FOV is not squared), but for a 400×400×200 volume (x-y-z) at 50 VPS, single point scanning would require a pixel rate of 1,600 MHz, which is not feasible (Ti:Sapphire lasers typically used for two-photon microscopy pulse at 80 MHz). A light line yields a better PA than a light sheet, and has the advantage that the camera frame rate will be $V_r$/xpix in both cases (in this example, a somewhat more feasible 20,000 fps).

In certain embodiments, a regenerative amplifier, or a similar pulsed laser with lower repetition rate than a standard Ti:Sapphire can be used to provide improved two-photon excitation performance. A regenerative amplifier concentrates the pulses of a ~MHz laser into lower frequency pulses with much higher peak energy. A 80 MHz Ti:sapphire (usually used for two-photon microscopy) can have its pulses concentrated into 5 kHz pulses with a mean power of (for example) 7 W. This would provide over 50,000× more power per pulse than a standard 80 MHz laser. This illumination can be spatially spread out over the SCAPE plane (e.g. 500×100 pixels) to provide equivalent instantaneous excitation to a pulse from an 80 MHz laser. The slower pulse rate is not a problem if SCAPE imaging is grabbing images of the plane at 2,000 fps (or similar), such that each plane can be illuminated with just 2 pulses from the regenerative amplifier. Similar efficiencies are found when using line-scanning type configurations to form the light sheet. For example, the pulse rate of the laser could be adjusted to match the y' direction line rate, e.g. for 200 y' lines, and a 2,000 Hz plane acquisition rate, the laser repetition rate would be adjusted to 400 kHz. Although this would reduce peak power by a factor of 200, all excitation light would be concentrated into the line of illumination, providing a 200× factor to correct for this reduction in peak power. Assuming one pulse per sample point, integration or dwell time does not factor into the amount of light emitted, making line and sheet excitation configurations in the pulse-rate matched scheme largely equivalent. In both cases, a 2D detector array or camera, or other configuration of image detection could be implemented. Further calculations and discussions of these relative trade-offs are provided in FIGS. 44-45.

3.10. Algorithms

Many different analysis and image correction strategies can be applied to SCAPE data to improve its resolution, contrast and spatial linearity. In certain embodiments, the imaging geometry including intermediate lenses and the objective lens can be modeled to map camera pixels detected during a scan to 3D Cartesian space at the object plane. This model could be used to generate predicted spatially-varying point spread functions for full deconvolution of the resulting data. In certain embodiments, radiative transport-type models of light propagation could further correct for the effects of scattering of both excitation and emission light to 'reconstruct' a corrected image (as in laminar optical tomography LOT and diffuse optical tomography).

In certain embodiments, lateral shift adjustments can be made. One prominent effect of SCAPE's unusual imaging geometry is the effect of oblique illumination. Stacking acquired planes into a simple cube does not correct for this skew, such that each depth layer is laterally shifted with respect to the one above. This shift is directly dependent on the angle of the illumination sheet with respect to the optical axis. In certain embodiments, either through measurement or modeling of this angle, or through estimation from the data or calibration using an object, for example with an axially straight feature, image volumes can be approximately corrected by shifting each layer, if necessary with interpolation for non-integer shifts. In certain embodiments, shifts can occur in both x' and y' directions depending on sheet alignment.

In certain embodiments, deconvolution can be employed. The point spread function (PSF) of SCAPE is spatially varying, but stays fairly constant over a small field of view. This PSF, whether spatially varying or not, can be estimated from a data set, or a phantom measurement (e.g. fluorescent beads suspended in agarose) and used to correct for the point spread function through deconvolution. Applying this step after lateral shift adjustment described above can be simpler to implement, as following shifting, the apparent PSF of SCAPE is more similar to that expected in confocal and two-photon laser scanning microscopy, for which established convolution techniques have already been developed. These properties of the system can also be modeled for all system configurations and throughout the field of view, given accurate knowledge of the optical elements and their positions during imaging. Deconvolution would provide improved resolution and sectioning of the resulting SCAPE images, to within the limits of resolvability.

In certain embodiments, diffuse background subtraction can be employed. For example, but not by way of limitation, when imaging scattering tissues, diffuse background signal (particularly for single-photon fluorescence) can affect contrast and create ghosting of other image planes on a particular plane. This effect can be caused by both the scattering of excitation light and emission light. In certain embodiments, two-photon or structured light approaches can improve this. However, in certain embodiments, mathematical correction is also feasible since the entire volume is sampled, so there is information in the data that can account for the shadowing in a given plane. In certain embodiments, the common pattern in each sequential image, which shifts laterally during a scan, can be shifted, scaled and subtracted from subsequent plane to isolate the differences between each measurement which correspond to the selectively sampled plane.

In certain embodiments, high pass filtering can be employed. A simple way to remove diffuse background signal that is known to not reflect the high-resolution structure of a given image plane is to use a spatial high pass filter or other shaped background subtraction tool to accentuate higher resolution structure. Equivalently, spatially low pass filtered data can also be subtracted. This method has been found to work well in practice, providing maximum intensity projections of similar quality to two-photon microscopy.

In certain embodiments, spatiotemporal unmixing can be employed. The principle of super-resolution techniques such as PALM and STORM are that if a structure of interest can be caused to blink or switch on and off, its location can be determined, even if the system's spatial resolution could not have resolved the object from another object within the Rayleigh range from the first object. Spatiotemporal unmixing affords the same benefit in dynamic data, wherein objects that, if all illuminated together, would blur together and be unresolvable can be resolved if they individually flash on and off in turn. We have shown that with neuronal firing in the brain of animals expressing a genetically encoded fluorescent calcium sensor, this principle can allow dendritic branches of individual neurons to be resolved within scattering tissues without the effects of light scattering and diffuse background influencing detectability. This approach works with SCAPE because data from the entire volume can be captured quickly enough to match the time-courses of a given neuronal firing event across voxels within the whole volume. For example, if a volume time-sequence is acquired where 200 neurons are each firing spontaneously, mathematical methods such as principal component analysis or blind source separation can be used to identify the 200 unique timing patterns present in the data. Fitting the time-course of each voxel in the volume to each of these isolated time-courses will identify the 3D spatial extent of each individual neuron with each given firing pattern. In a system that did not have sufficient 3D spatiotemporal resolution, this unmixing approach would not be effective: for example, if imaging of spontaneous activity needed be done in one plane at a time, while parts of the same neuron within that plane could be identified based on their correlated time-courses, if imaging was then performed in another plane, it would not be possible to determine which parts of a given neuron were common to each plane.

Spatiotemporal unmixing can thus provide enhanced, and in certain embodiments, even 'super-resolution' spatial delineation of structures in 3D.

4. Appendix—Example 4.1. Introduction

Transgenic techniques are providing ever-improving fluorescent reporters of dynamic in-vivo processes such as neuronal activity. As a result, there is a growing need for high-speed, 3D volumetric optical microscopy methods that can capture these events in-vivo. Here, we introduce SCAPE microscopy, a fundamentally different light-sheet imaging technology that offers substantial improvements in volumetric imaging speeds over existing microscopy techniques. SCAPE acquires optically sectioned 3D data in the geometry of a standard epi-fluorescence microscope, and requires no translation of the objective (if present) or sample, making it capable of capturing the 3D dynamics of diverse samples including the intact rodent brain and freely moving whole organisms such *Drosophila larvae* at rates exceeding 20 volumes per second.

Conventional light-sheet imaging techniques illuminate the sample from the side using a thin sheet of light, and acquire images of the illuminated plane using an orthogonally aligned second objective. The sample is then translated relative to this co-aligned plane to form a 3D volumetric image. This dual-objective geometry, and the need for side-on illumination and physical translation of the sample are major limitations, making sample mounting and positioning highly challenging, restricting the types of samples that can be imaged, and limiting achievable volumetric imaging speeds. Recent advances have achieved higher frame rate light sheet imaging using coordinated scanning of the light sheet with translation of the detection focal plane, either via piezoelectric movement of the orthogonal detection objective or an electrically tunable lens. However, the maximum volumetric imaging speeds reported in these cases did not exceed 1 Hz for volumes equivalent to SCAPE, and both configurations still required restrictive dual orthogonal objectives. Other approaches have rotated the standard light-sheet geometry by 45 degrees making it easier to image un-mounted samples, yet still requiring the same dual-objective configuration as well as physical translation of the sample with respect to the objectives for volumetric imaging. Only one other light-sheet technique has been implemented through a single objective, although volumetric imaging still required the use of piezoelectric objective scanning with a limited field of view. In all cases, piezoelectric objective scanning is inherently limiting both to acquisition speeds, and the types of in-vivo samples that can be imaged.

For in-vivo rodent brain imaging, two-photon microscopy has become the method of choice to capture neuronal activity via genetically encoded calcium indicators. However, two-photon microscopy generally requires sequential scanning of a single point to generate volumetric images, forcing trade-offs between 3D imaging speed, resolution and field of view. Wide-field, multi-spot and temporal focusing implementations can improve parallelization but add significant cost and complexity, still require piezoelectric objective scanning, provide limited fields of view, and are reaching the limits of available laser power. Random access scanning using acousto-optic deflectors, which visits a subset of locations within the sample to increase speed, is currently the favored approach for rapidly recording the activity of multiple neurons in the intact brain. However, this approach is highly sensitive to motion, requires a-priori selection of specific neuronal cell bodies and would be very challenging to implement in freely moving organisms.

SCAPE overcomes many of the limitations described above, combining, in certain embodiments, optical sectioning via light-sheet illumination with a unique scanning-descanning configuration that permits ultra-fast translation-less volumetric imaging of diverse, unmounted samples through a single, stationary objective lens. We demonstrate the ability of SCAPE to image both the superficial layers of the awake behaving mouse brain and in freely moving *Drosophila melanogaster* larvae. These samples are inaccessible to conventional light-sheet imaging approaches, and while our single-photon implementation of SCAPE cannot compete with the penetration depth of two-photon microscopy, our demonstrated volumetric imaging speeds far exceed those achievable with standard laser scanning microscopy.

The imaging geometry of the particular SCAPE embodiment employed in the instant example is shown in FIG. 24a-b. In this embodiment, the sample is illuminated by an oblique sheet of laser light emerging from the edge of the objective lens, exciting fluorescence within a thin, diagonal plane. A slow-moving scanner (here, a polygon mirror mounted on a galvanometer motor) changes the angle of the light entering the back of the objective, which causes the illumination plane to sweep within the sample. Light emitted from the illuminated plane is collected by the same objective lens, and could simply be focused to form an oblique, moving image of the illuminated plane. However, reflecting the emission light off the same scan mirror de-scans the light in the same way as confocal theta microscopy, forming a stationary 'oblique image plane' that is always coaligned with the moving light sheet (see modeling in FIG. 46). Image rotation optics are then used to project this oblique image plane onto the face of a high speed 2D camera (see FIG. 24(f) and Section 4.5, below, for full optical layout). SCAPE thus acquires 3D volumes by capturing high speed images as the light-sheet is swept back and forth through the sample, with each camera frame being equivalent to one y'-z' oblique section for each light sheet location (x') (FIG. 24c). No translation of the sample or objective lens is required, and one full 3D volume is acquired within a single <+/−4° sweep of the scan mirror.

This unusual geometry provides a slightly non-Cartesian field of view, as illustrated in FIG. 24b. FIG. 24d illustrates the factors governing SCAPE resolution, while FIG. 24e provides an example of a simulated SCAPE point spread function (PSF). Section 4.6 provides further demonstration that the theoretical diffraction limited lateral (x-y) and axial (z) resolutions of the SCAPE imaging geometry rival conventional light sheet microscopy at 0.4-2 microns and 1-3 microns respectively over large fields of view. An achievable 600×1000×550 micron x-y-z field of view is demonstrated in non-scattering phantom measurements in Section 4.7, where the limiting effects of light scattering on penetration depth and resolution are also characterized in tissue-mimicking phantoms and the in-vivo mouse brain.

In terms of imaging speed, since SCAPE requires no movement beyond sweeping the scan mirror back and forth at the ~10-40 Hz volume rate, imaging speed is limited primarily by camera frame-rate (and signal to noise). The volume rate is equal to the camera's frame-rate divided by the number of angular sampling steps desired in the volume. Our current Andor Zyla sCMOS camera can be binned to read-out 2560×80 (lateral (y')×depth (z')) images at 2,404 fps, such that a volume with 50, 100 and 200 'scan angles' (x') would be imaged at 48, 24 and 12 volumes per second (VPS) respectively. Commercially available cameras could feasibly acquire data at rates exceeding 300 VPS, as detailed in Section 4.8. The large lateral width of our sCMOS camera chip enabled insertion of a spectral image-splitter permitting exactly simultaneous dual-color imaging with side-by-side fields of view up to 1280 voxels wide, with no effect on imaging speed.

For conventional laser scanning microscopy, assuming a 1 MHz pixel rate and no overhead for physical z-scanning, an equivalent 100×1280×80 (x,y,z) voxel volume could be acquired at 0.1 VPS (one volume per 10 seconds, or 240 times slower than the 24 VPS rate of our current SCAPE system). Even at the Ti: Sapphire repetition rate of 80 MHz (the fundamental pixel-rate limit for two-photon microscopy) the maximum equivalent volume rate would be 7.8 VPS.

Here, we demonstrate the performance of SCAPE microscopy in two very challenging in vivo systems of great relevance to current neuroscience and biomedical research: the intact brain of awake behaving mice and freely moving transgenic *Drosophila melanogaster* larvae. Capturing the spontaneous activity of large numbers of neurons in the mammalian brain is an urgent priority in neuroscience research; a need not met by current two-photon techniques. We demonstrate that SCAPE microscopy (using single-photon 488 nm illumination) can image spontaneous GCaMP transients in dendritic branches in cortical layers I/II in awake behaving mice with sufficient spatiotemporal resolution to resolve different onset and decay dynamics at different depths within a single 3D dendritic branch. Our *Drosophila* imaging examples address the recent trend towards imaging small organisms, where the whole body, brain and nervous system can feasibly be imaged in their entirety, extending previous results by capturing dynamic cellular function during spontaneous motion and behavior. We demonstrate volumetric imaging of peristaltic crawling, the beating heart, neuronal tracking and both the motion and calcium dynamics of muscle contraction within freely moving *larvae*.

4.2. Results

All data shown were acquired using an Olympus XLUMPlanFl 20×/0.95 W or /1.0 W objective in an upright epifluorescence geometry and a 30 mW or 50 mW, CW 488 nm laser with between 0.5 and 5 mW incident at the sample. All data shown are in the SCAPE 'raw' coordinate system (lateral (y')×scan angle (x)×oblique depth (z') unless noted, see FIG. 24b), with fields of view determined via post-experiment system calibrations (see Section 4.5, below).

4.2.1. In-Vivo Rodent Brain Imaging

Figure 51:
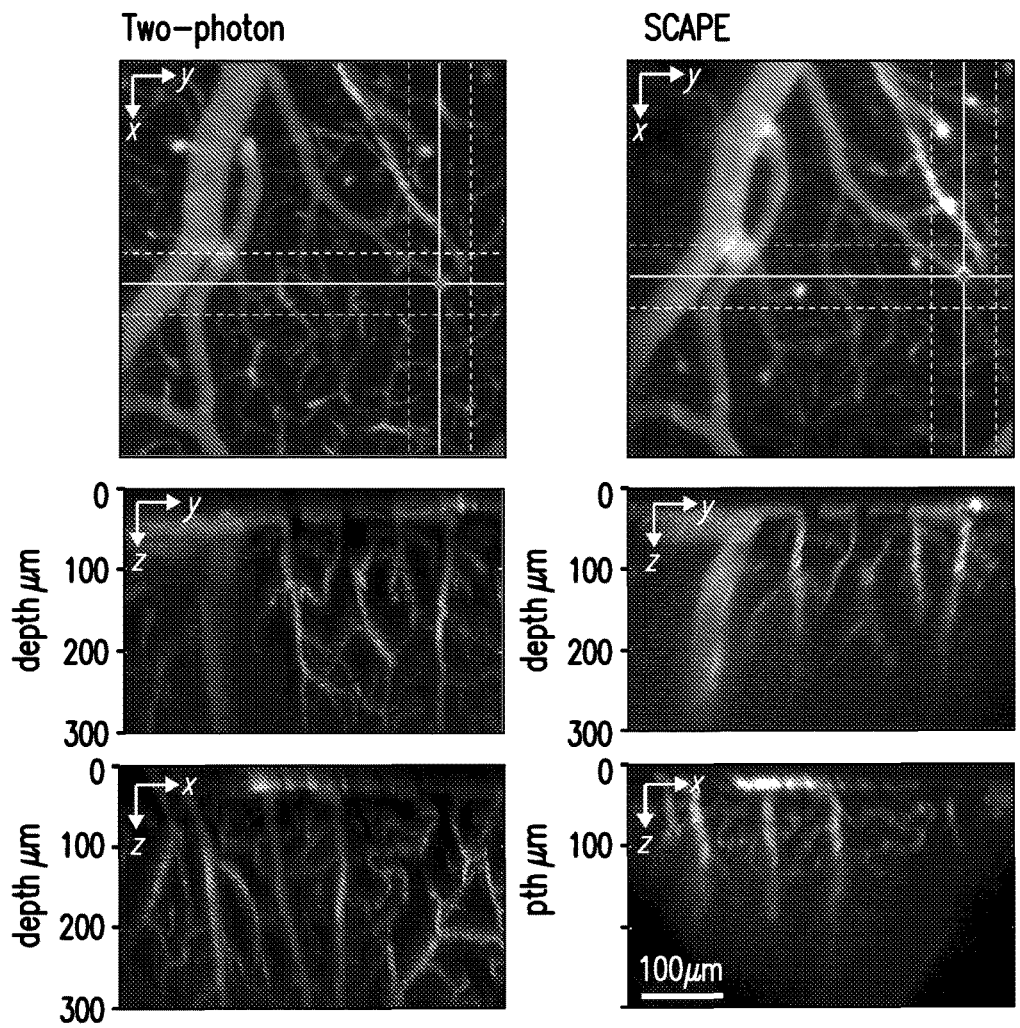
FIG. 51 depicts a Two-photon v/s SCAPE comparison of depth-dependent imaging of in-vivo mouse brain vasculature.

FIG. 25 shows SCAPE imaging of in-vivo mouse brain. FIG. 25c shows a SCAPE volume rendering, while FIG. 25d shows a range of x'-y' depth-slices acquired in a head-fixed, awake behaving mouse expressing GCaMP6f in layer V pyramidal neurons of the whisker barrel cortex, with intravascular Texas red dextran labeling blood vessels. Images were acquired at 488 nm excitation with a dual-color image splitter in place. The dual-color 350×800×105 micron volumes (corresponding to 100×500×80 voxels x'-y'-z') were imaged at 10 VPS. FIG. 25e shows a comparison between in-vivo two-photon microscopy and high-resolution SCAPE in a mouse with intravascular dextran conjugated fluorescein. At a depth of 140 microns, single capillaries (5-10 microns in size) can be resolved, while diving vessels exhibit higher contrast than in two-photon microscopy. FIG. 51 shows that larger vessels can be resolved to depths of almost 300 microns. See Sections 4.4. and 4.5 for animal preparation, alignment and imaging and parameters.

FIG. 26 shows SCAPE data from a second mouse expressing GCaMP5g in layer 5 pyramidal neurons. Single-color 600×650×134 micron volumes (corresponding to 240×200×40 voxels x'-y'-z') were imaged at 10 VPS (using 2×2 camera binning and no image splitter). 180 seconds of data were captured just as the head-fixed mouse was waking from isoflurane anesthesia (mouse was fully awake by the end of the scan).

Figure 26A:
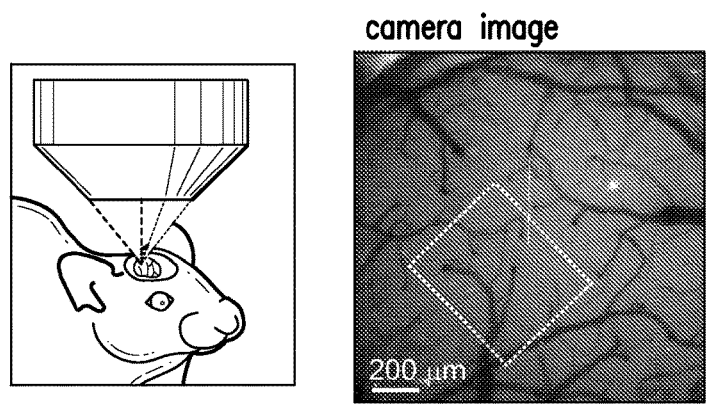
FIG. 26A depicts a camera image of an exposed mouse cortex showing SCAPE field of view.
Figures 26B, 26C:
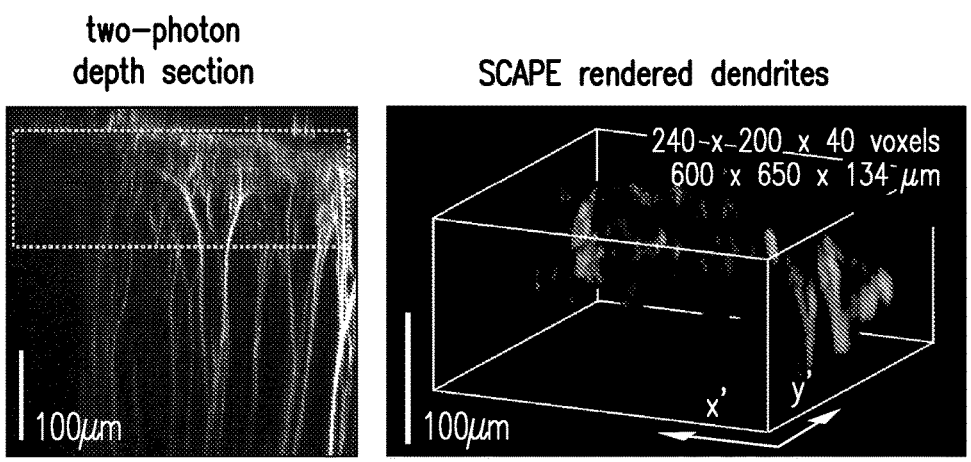
FIG. 26B depicts the SCAPE depth range.
FIG. 26C depicts a volume rendering of the dendritic trees captured by SCAPE.
Figure 26D:
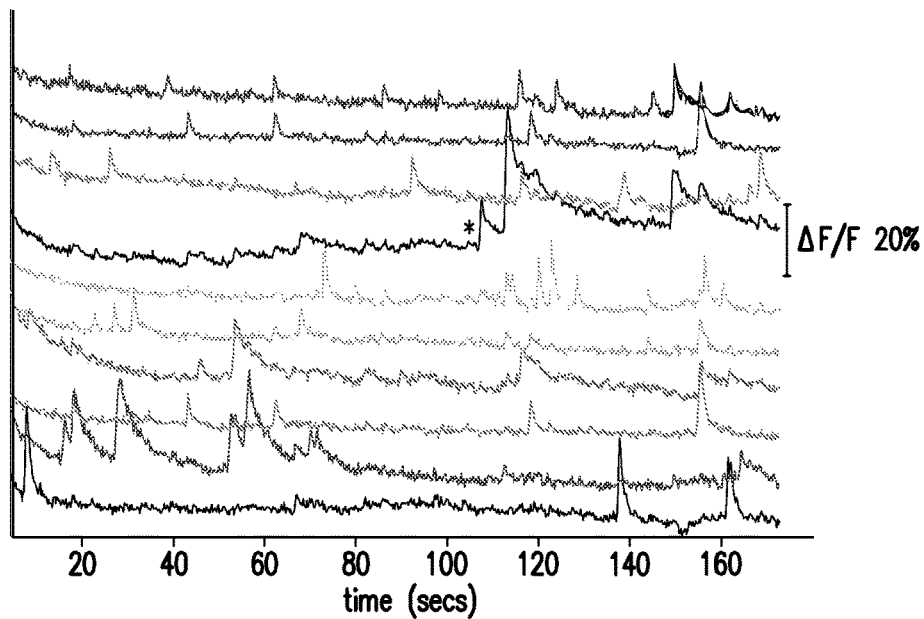
FIG. 26D depicts color-matched raw time-courses for each dendritic tree.
Figure 26E:
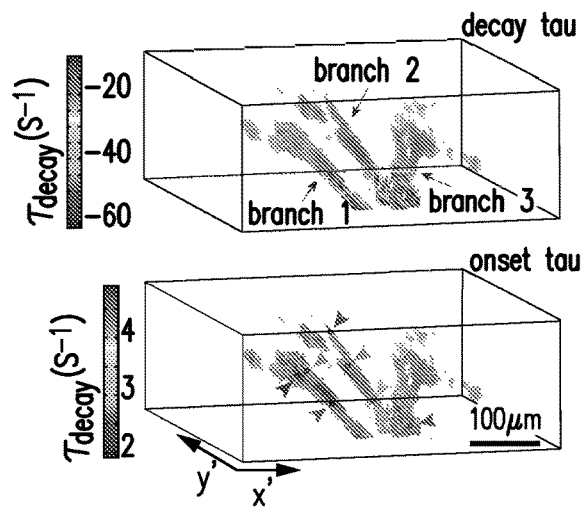
FIG. 26E depicts maps of onset and decay dynamics within a single dendritic tree.
Figure 26F:
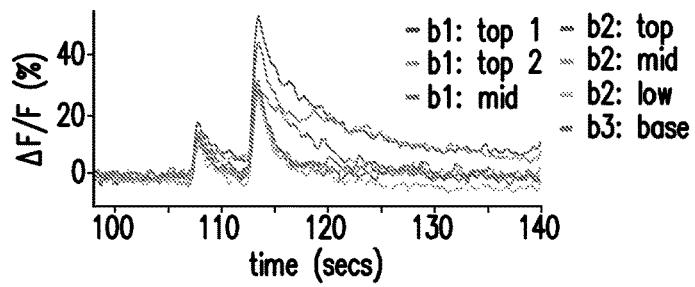
FIG. 26F depicts time-courses extracted from regions.
Figure 53A:
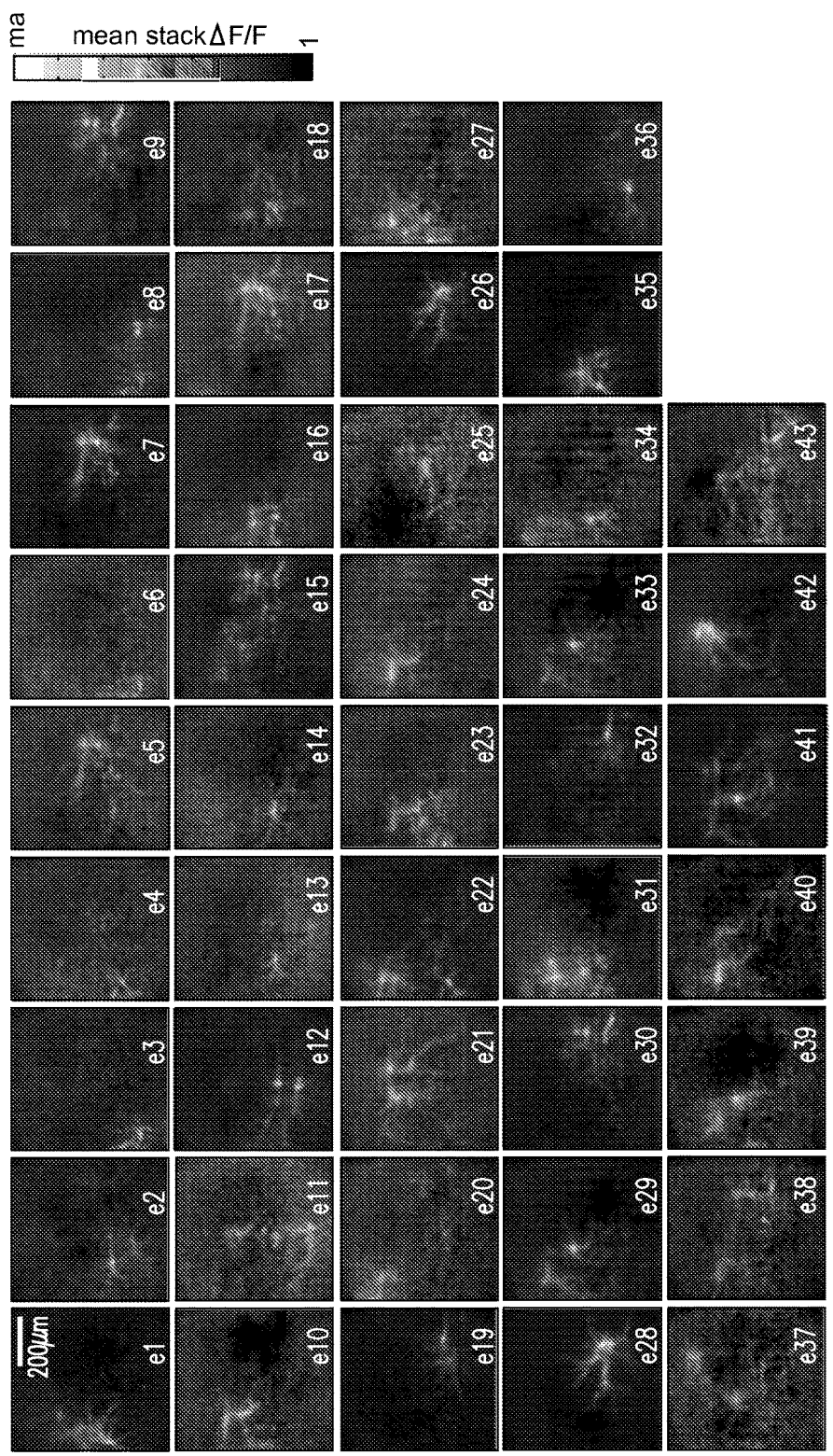
Figure 53D:
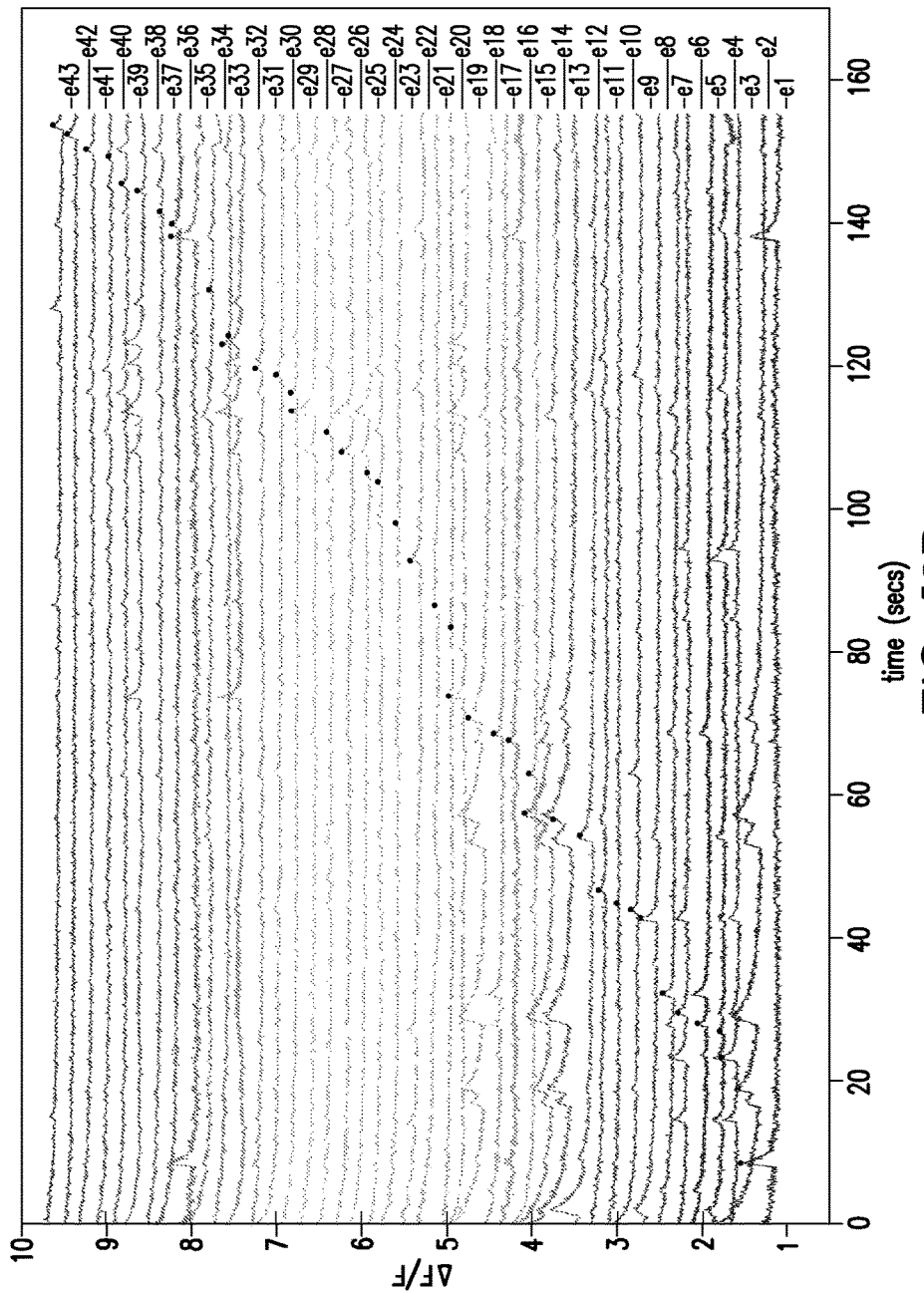

FIG. 26b shows a two-photon image stack acquired in the same animal for reference. FIG. 26c shows SCAPE volume renderings of individual dendritic trees within layers I/II, distinguished from one another and color-coded on the basis of their unique firing dynamics, as shown in FIG. 26d. The time-courses shown in FIG. 26d are just 10 of many distinct neuronal firing patterns observed over the 180 second acquisition period (see FIG. 53 for more analysis). Time-courses were extracted from small regions of interest over individual dendrites, and are shown raw, without filtering or interpolation. Individual firing events can be cleanly distinguished and exhibit the classical pattern of GCaMP onsets and decays. Subtle differences in temporal shape can also be discerned, even within a single dendritic tree. FIG. 26e shows volumetric maps of onset and decay t (where $F(t)=F(t0)e-t/t$) for a single firing event (at t=113.5 seconds). Time-courses extracted from 2×2×1 voxel ROIs at different depths within these branches corroborate these maps, revealing that two of the dendrite's branches have similar firing dynamics, while one branch has regions with very different onset and decay transients (FIG. 26f). The same behavior can be seen in the firing event in the same dendrite which occurs 8 seconds before the larger amplitude event, demonstrating that the behavior is a property of this neuron and not a transient effect.

4.2.2. Imaging Freely Moving Whole Organisms

Figure 54:
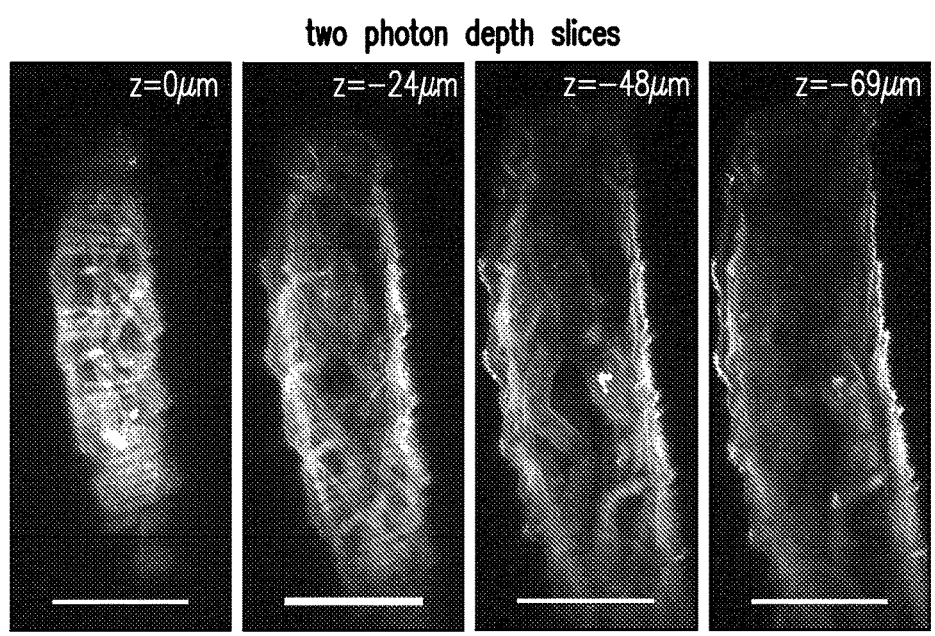

*Drosophila* larvae of different ages and sizes, between $1^{st}$ and $3^{rd}$ instar, were imaged while freely moving on a glass slide in phosphate buffered saline (FIG. 27a). In some cases agarose channels were used to restrict sideways motion. FIG. 27 shows SCAPE images of $1^{st}$ instar myosin heavy chain (mhc)-Gal4,UAS-CD8:GFP *larvae* in which all muscles including the body wall, the heart tube and smooth muscle in the gut are expressing green fluorescent protein (GFP) (FIG. 54 shows two-photon images of a similar larva). A 430×1330×134 micron field of view (corresponding to 120×800×80 voxels to x'-y'-z') was imaged at 20 VPS while the animal moved freely. FIG. 27b shows an SCAPE volume rendering of the whole body, while FIG. 27c shows a sequence of three sequential SCAPE x'-y' image planes at two different depths, capturing the beating of the heart tube. The kymograph below (FIG. 27e) shows the average of two depth planes, taken from a single lateral scan position, capturing both a peristaltic wave of circumferential muscle contraction and the rhythmic beating of the heart tube at 2-3 beats per second.

Figure 28A:
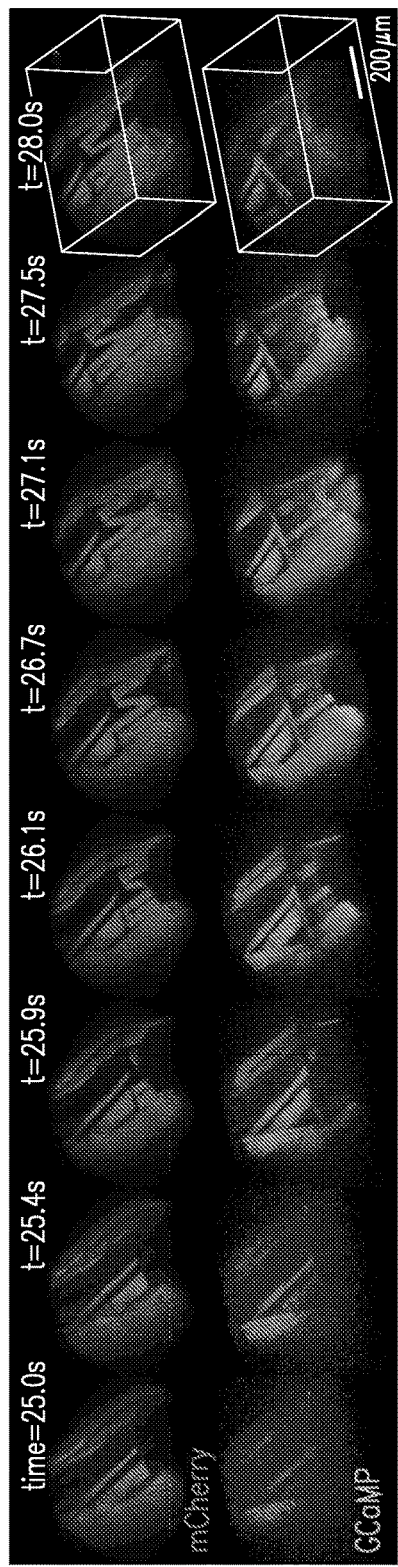
FIG. 28A depicts a SCAPE volume renderings of a *Drosophila* larva.
Figure 28C:
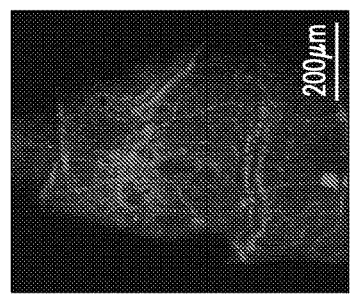
FIG. 28C depicts a high resolution SCAPE rendering showing sub-cellular resolution.
Figure 28B:
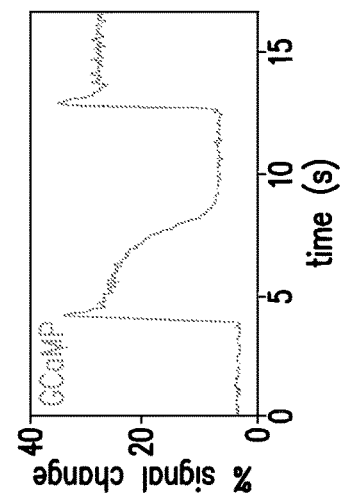
FIG. 28B depicts GCaMP dynamics extracted from a slower moving larva.

FIG. 28a-b shows data from a $3^{rd}$ instar mhc-Gal4, UAS-GCaMP6f, UAS-CD8:mCherry larva coexpressing mCherry and GCaMP6f in its muscles. One point on the larva's ventral side was affixed to the glass side to restrict its forward motion. A dual-color, 300×1000×264 micron field of view (corresponding to 100×300×100 voxels x'-y'-z') was imaged at 10 VPS, with both fluorophores excited at 488 nm. The field of view encompasses the probing 'head' of the large larva as it reaches out and withdraws. The SCAPE image sequence shown captures complex 3D dynamics of muscle motion and contraction, in parallel with intracellular calcium dynamics revealing pulses of GCaMP fluorescence as each muscle contracts. FIG. 28c shows GCaMP calcium dynamics extracted from another larva whose motion was more restricted.

Figure 28D:
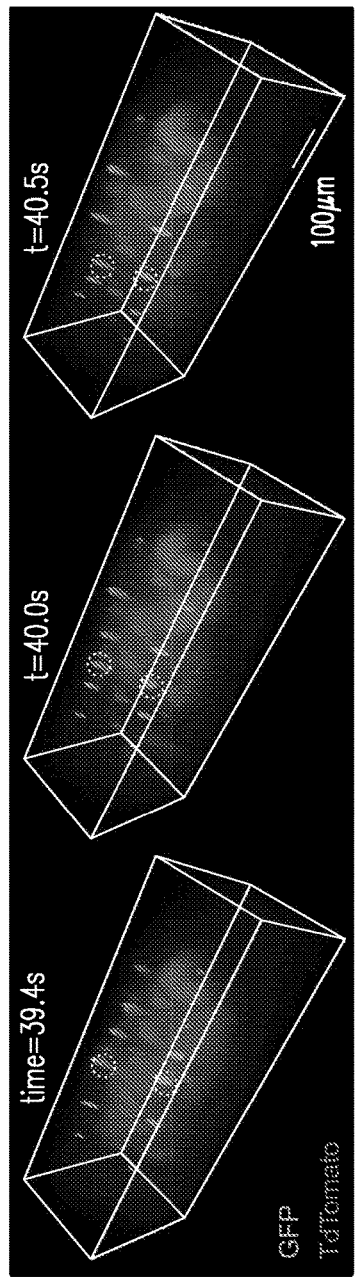
FIG. 28D depicts an in-vivo SCAPE volume sequence.
Figure 28E:
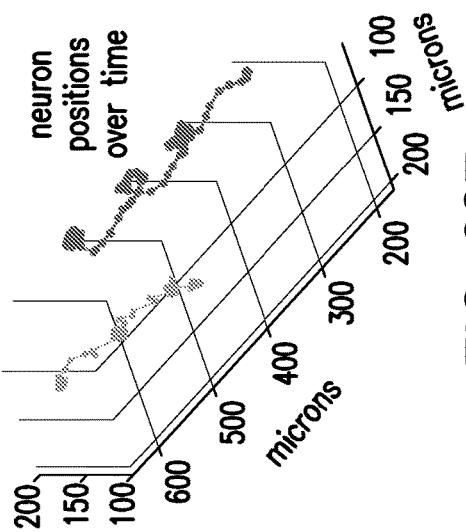
FIG. 28E depicts an output of a 4D motion tracking algorithm.

FIG. 28c-d shows data acquired on a $1^{st}$ instar NompC-QF; QUAS-tdTomato×ppk-Gal4; UASmCD8::GFP larva co-expressing TdTomato and GFP in two neuronal subtypes: class III dendritic arborization (da) sensory neurons and class IV da sensory neurons respectively. A dual-color 260×800×265 micron field of view (corresponding to 80×240×100 voxels x' y'-z') was acquired at 10 VPS. The image sequence shows selected (non-sequential) frames that depict a wave of 3D motion of the neurons as the animal crawls forward. Autofluorescence of food in the animal's gut can also be seen. A 4D motion-tracking algorithm was written in Matlab™ to track the location of individual neurons in 4D space, as shown in FIG. 28e. While these neurons were not expressing GCaMP, these data demonstrate the feasibility of using SCAPE to both continuously track and measure the signal from individual neurons in freely moving whole organisms, where dual-color labeling (as in FIG. 28a) could be used to ratiometrically account for motion-dependent changes in detected signal. FIG. 28c shows a SCAPE volume rendering of a larva from the same strain, acquired ex-vivo at very high scanning resolution. While trade-offs in sampling rates are made to permit high-speed imaging over large volumes, this image demonstrates the very high intrinsic resolution of SCAPE, where individual cell bodies and processes can be clearly resolved.

4.3. Discussion

SCAPE is a new, ultra-fast volumetric microscopy approach capable of imaging 3D structure and function in a diverse range of intact, living, freely moving samples. SCAPE's simple, translationless configuration provides significant advantages over multiobjective light sheet geometries, while delivering order of magnitude improvements in volumetric imaging speeds compared to conventional laser scanning microscopy techniques. Compared to wide-field techniques such as spinning-disc confocal, SCAPE removes the need for physical z-scanning, while leveraging the benefits of selective plane illumination and thus reducing photodamage for in-vivo imaging. Our simulations and phantom measurements demonstrate that SCAPE brings these many benefits with only moderate trade-offs to resolution and penetration depth compared to conventional confocal and light-sheet microscopies.

All SCAPE images shown in the instant example were acquired using a <$50,000 bench-top prototype constructed with off-the-shelf optical components and a 30 mW 488 nm laser. All data are shown as-acquired, with no reconstruction or deconvolution. In addition to the alternative high-NA configurations described in Section 4.6, we anticipate that improvements to resolution and penetration could be achieved using red-shifted fluorophores, model-based or inter-plane deconvolution procedures and optical components optimized for off-axis transmission. More advanced implementations of SCAPE could also include using two-photon excitation (e.g. with linear swept excitation, as well as IR-shifted excitation wavelengths for improved penetration), stimulated emission-depletion (STED), to restrict the light-sheet thickness, and Bessel-beam-type or structured light implementations to improve resolution. We note also that the enface, translationless configuration of SCAPE makes it ideal for combination with second-beam structured light excitation techniques that could permit video-rate volumetric microscopy of the living brain with simultaneous optogenetic manipulation of cellular activity.

Our SCAPE results in the brains of awake, behaving mice demonstrated the enormous benefit of full volumetric imaging, even in superficial cortical layers. Sampling every point in the volume meant that all spontaneous activity was captured, without requiring motion-sensitive and time-consuming a-priori selection of regions of interest, and permitting 3D volume rendering of dendritic trees based on their spontaneous dynamics. While the spatial resolution of our bench-top SCAPE prototype is certainly worse than that of two-photon microscopy in mouse brain, resolution was shown to be sufficient for complex 3D analysis of neuronal dynamics at very high sample rates. Our *Drosophila* results demonstrated SCAPE imaging of large 3D fields of view at up to 20 VPS, capturing the freely moving behavior and cellular function of $1^{st}$ to $3^{rd}$ instar, motile *larvae*. The ability to perform real-time 3D sampling of the complete brain and nervous system in an entire, awake behaving organism, at cellular resolution, is a new frontier for biological and neuroscience research.

Our low-cost SCAPE prototype is compact, simple to use, and provides results in realtime. We thus envisage many additional applications of SCAPE, ranging from imaging cellular replication, function and motion in 3D cell cultures, intact and engineered tissues, to imaging 3D dynamics in microfluidics and flow-cell cytometry systems. In data not shown, we have also found SCAPE to be effective for imaging *C-elegans, D-Rerio* (zebrafish) and even the human fingertip. Endoscopic or GRIN-lens based implementations of SCAPE are feasible for invasive imaging in animals and perhaps humans. At a range of magnifications, SCAPE could also be used for applications such as dynamic surface profilometry or 3D particle velocimetry in settings beyond the life sciences.

4.4. Methods

Imaging system. Our current prototype SCAPE system is depicted in FIG. 24f. The main components of the system are: 1) An Olympus XLUMPlanFl 20x/0.95W objective lens in an upright epifluorescence geometry. 2) A 30 mW, CW 488 nm laser (Melles-Griot, 85-BCD-030-115) providing between 0.5 and 5 mW incident at the sample. 3) The system's scanning element, a light-weight 12-sided polygonal scanning mirror (Lincoln Laser, DT-12-138-043) custom-mounted on a galvanometer motor (6240HA, Cambridge Technology). 4) An Andor Zyla sCMOS camera (Zyla-5.5-CL10) and 5) A Photometrics DV-2 image splitter for dual color imaging. All other parts of the system were standard optical and optomechanical components. The full configuration and optical path of our prototype, as well as calibration procedures are described in Section 4.5, below.

Live mouse imaging. The mice shown in FIG. 25a-d and 3 were transgenic mice expressing Cre recombinase in cortical Layer V pyramidal neurons (Rbp4:Cre, GENSAT), which received cortical injection of adeno-associated virus carrying a Cre-inducible genetically encoded calcium indicator, GCaMP (AAV2:hSyn:FLEX:GCaMP5g or 6f PENN Vector Core). Cortical injections of virus were performed in 6-8 week old male transgenic mice (~25 g). The barrel cortex of each mouse was first mapped using intrinsic optical signal imaging during single-whisker stimulation in order to target the virus injection to a functionally identified region. Following injection, mice were chronically implanted with a headplate for head fixation. After recovery from surgery, animals were habituated to head fixation for two weeks before being implanted with a 2 mm cranial window, under isoflurane anesthesia, and allowed to recover overnight. The following days animals were trained on behavioral tasks, and the mouse shown in FIG. 26 underwent two-photon microscopy imaging during several 30-60 min behavioral sessions, performing a whisker based detection task.

During SCAPE imaging, mice were positioned in their usual behavioral set-up under SCAPE's objective, and data were acquired for sessions lasting up to 30 minutes. The mouse shown in FIG. 25a-d was briefly anesthetized with isoflurane prior to SCAPE imaging to permit tail vein injection of ~0.1 ml of 140 µM of Texas red dextran (70,000 MW), co-labelling the vasculature in red. The animal was then head-fixed and allowed to acclimate. The mouse shown in FIG. 26 was briefly anesthetized with isoflurane during head fixation. The mouse was fully awake by the end of the 180 second SCAPE scan shown.

Figure 25A:
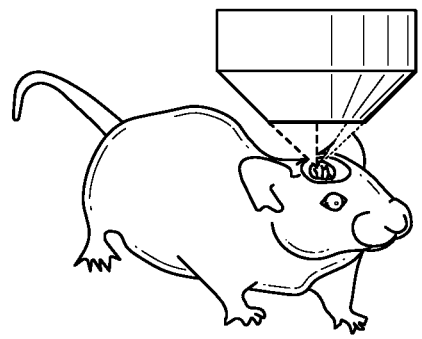
FIG. 25A depicts a SCAPE image acquisition geometry.
Figure 25B:
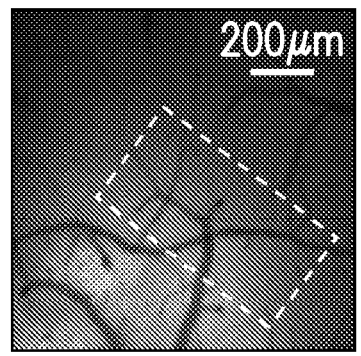
FIG. 25B depicts a wide-field camera image of the cortex of a mouse.
Figure 25C:
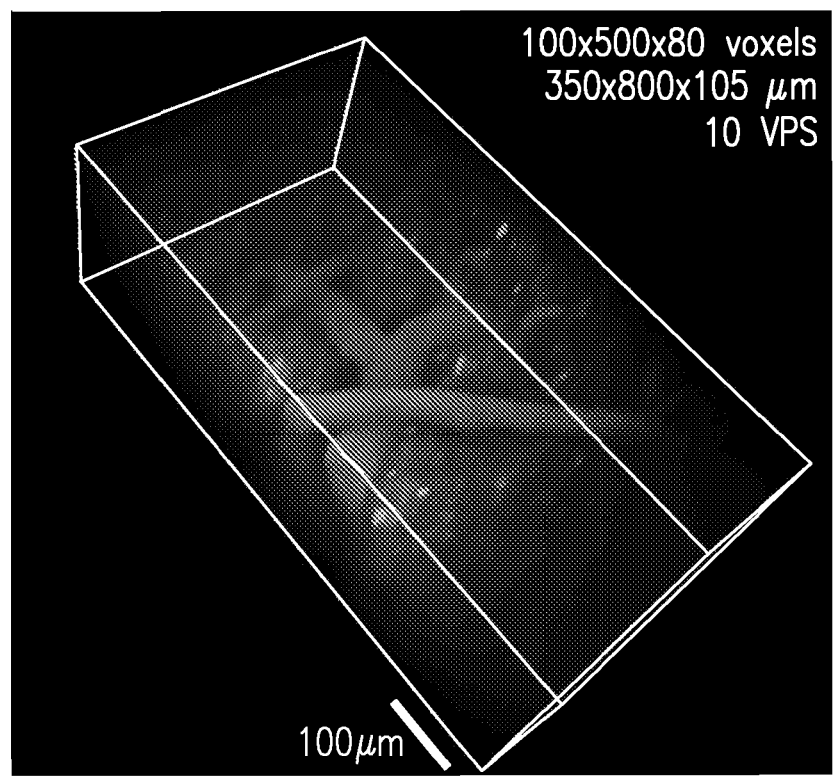
FIG. 25C depicts imaging of an awake, behaving mouse.
Figure 25D:
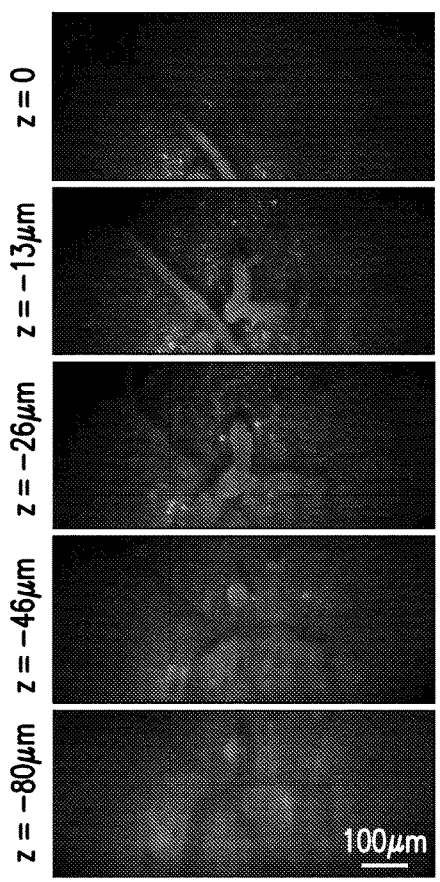
FIG. 25D also depicts imaging of an awake, behaving mouse.
Figure 25E:
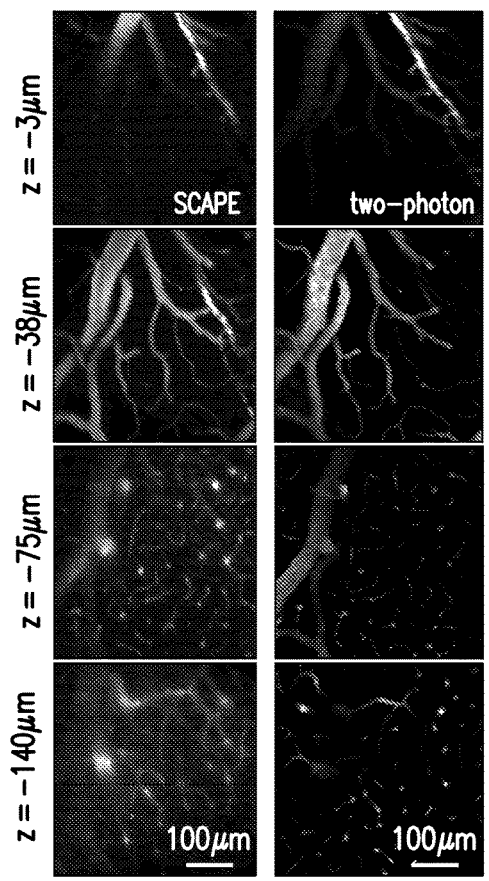
FIG. 25E depicts a comparison between two-photon microscopy and SCAPE.

The vascular imaging data in FIG. 25e was acquired in a urethane-anesthetized wild-type mouse with an acute cranial window, and following tail vein injection of 0.1 ml of 5% Fluorescein isothiocyanate-dextran (70,000 MW, 46945-F Sigma). Following SCAPE imaging the mouse was transferred to the stage of our custom-built upright two-photon microscope for comparative imaging (see Section 4.5). The mouse was positioned on a homeothermic heat pad and monitored with pulse oximetry throughout surgery and imaging.

*Drosophila larvae.* Live $1^{st}$-$3^{rd}$ instar *larvae* were bred under standard conditions and selected by visual inspection under a standard Olympus BX51 epifluorescence microscope. Each larva was then washed in phosphate buffered saline (PBS) to remove surface debris, and placed in a drop of PBS on top of a glass slide. ~1 mm thick spacers were used to loosely support a glass coverslip over the sample such that the upright SCAPE objective could be immersed in a drop of water on top of the coverslip without disturbing the sample. In some cases, the larva was positioned within an agarose channel, to restrict its motion during imaging. In some cases, the sample was manually translated during imaging to keep it within the field of view (e.g., FIG. 27). The large, $3^{rd}$ instar larva FIG. 28*a-b* was affixed to the cover glass using a tiny drop of cyanoacrylate in the center of its ventral surface leaving its ends free to move but preventing forward motion out of the field of view. Additional *larvae* (not shown) were imaged with SCAPE in an inverted configuration. The larva in FIG. 28*c* was imaged postmortem after euthanasia in 100% ethanol for 10 minutes.

SCAPE image analysis and visualization: The relatively simple visualization and analysis presented here was performed using Matlab™ and Amira™. Planar images are shown as raw data, unless otherwise noted, with no smoothing, interpolation or registration applied. 3D volume renderings were generated using volren modules in Amira 5.2.1 (Visage Imaging) using custom colormaps. All data shown is in 'SCAPE' (x'-y'-z') image space (see FIG. 24*b*). The SCAPE data shown in FIG. 25*e* and FIG. 51 was corrected for the skewing effect of the oblique light sheet by shifting each depth plane laterally by a constant, linear factor. Two-photon data was digitally rotated in the x-y plane to match the orientation of the SCAPE image field of view. See Section 4.5 for additional details and spatiotemporal analysis of dendritic firing in mouse brain, and neuronal tracking in *Drosophila larvae*.

4.5. Supplementary Methods

SCAPE prototype design and optical path. As shown in FIG. 24*f*, SCAPE can be implemented using a 12-sided polygonal scanning mirror (Lincoln Laser, DT-12-138-043) custom-mounted on a galvanometer motor (6240HA, Cambridge Technology). Since, in this embodiment, SCAPE acquires one whole volume per single facet sweep, the polygon is not spun, but bidirectionally scanned back and forth over a relatively small angular range, overcoming the duty-cycle limitations of large facets while maintaining sufficient mirror surface area. Controlling this motion using a galvanometer allows precisely synchronized camera acquisition relative to mirror motion: the galvanometer is driven by a DAQ analog output board whose clock is driven by the camera's frame capture signal, although at high imaging speeds, the polygon's motion can be considered continuous.

All data shown herein used a 30 mW, 488 nm laser (Melles-Griot, 85-BCD-030-115), with optical power at the sample of between 0.5 and 5.05 mW (dependent on sample brightness, desired scan speeds and photosensitivity of the sample). After beam alignment mirrors, a 5× anamorphic telescope composed of two cylindrical lenses is used to unidirectionally expand the beam before creation of the light sheet with a further 50 mm focal length cylindrical lens (Thorlabs, LJ1695RM-A, LJ1267RM-A and LJ1695RM-A respectively) (FIG. 24*a*). This incoming beam is incident on the center of one polygon facet, at an angle such that, at the center of the scan sweep, the beam is offset, but perpendicular to the front surface of the scan lens (this angle is a function of the number of facets in the polygon). A scanning telescope is then used to image the reflected beam onto the edge of the back aperture of the objective lens to create an oblique illumination plane within the sample. This beam should be focused at the edge of the true front aperture of the objective, a plane which should also be conjugate to the polygon facet. The scanning telescope AC254-050-A1 and AC508-100-A1 lenses, with magnification chosen to maximize the use of the objective lens' numerical aperture (NA), and so should be equal to the ratio of the objective's back aperture diameter and the distance between the centers of two adjacent polygon facets. All images shown here were acquired using an Olympus XLUMPlanFL 20×/0.95W objective lens, although other objective lenses, and even achromatic doublets can be used to provide highly adaptable numerical apertures, working distances and fields of view (with appropriate adjustment of the scan telescope to maintain the conditions above). Changes in objective NA will alter resolution both through alteration of the intersection angle between the incident and detected light, and changes in the individual excitation and emission point spread functions, see Section 4.6).

Fluorescence emission light emerging from the objective back aperture on the side opposite to the 488 nm excitation beam is mapped back through the scanning telescope and onto an adjacent facet of the polygonal mirror. The polygon de-scans this light into the stationary detection arm. In our current system, the first two lenses of this arm are identical to those within the scan arm telescope (in order from polygon: Thorlabs, AC254-050-A1 and AC508-100-A1). The light emerging from this telescope can be focused into an oblique plane, corresponding to an image of the illuminated plane within the object being imaged. Following the method of Dunsby, some embodiments use a pair of objective lenses to create and then rotate this plane. Using objective lenses here provides the necessary NAs and short working distances to achieve plane this rotation while still capturing the detected light. This objective pair is currently an Olympus UPlanSApo 20×/0.75NA and either an Olympus, UPlanFL N 10×/0.30 NA or an Olympus, LCPlanFL 20×/0.40NA (for adjustable magnification). Light from this last objective is focused onto a high-speed sCMOS camera using a final lens (Thorlabs, AC508-075-A).

For fluorescence imaging, excitation light was blocked using a 500 nm long pass filter (Semrock, FF01-496/LP-25) positioned in the collimated space in front of the camera after the oblique image plane had been optically rotated. For dual-color imaging, a 2-channel commercial image splitter (Photometrics DV-2) was inserted, spectrally separating the rotated image plane and repositioning two relayed images side by side onto the camera chip. A green/red filter cube was used in this case, consisting of a Chroma 565dcxr dichroic filter and 525±25 nm and 600±25 nm bandpass filters (86984 and 84785 Edmund Optics, respectively).

For the images shown here, an Andor Zyla sCMOS camera (Zyla-5.5-CL10) was used, operated using the Andor proprietary software installed on a high performance desktop with a 1 Tb solid state hard drive (for high speed data streaming). The galvanometer-mounted polygonal mirror's motion was controlled via a National Instruments analog input/output board, synchronized to the camera's frame-grab signal. A simple graphical user interface (GUI) written in Matlab™ was used to generate scan patterns, triggered and monitored camera streaming and galvanometer position signals, controlled laser shutters and animal stimulation (where used).

One prototype SCAPE system was not optimized for aberrations due to the off-axis propagation of light through standard lenses, or for throughput and field of view. Numerous improvements, guided by our simulations, allow a larger active area of illumination. In particular, our modeling demonstrated that sampling the 'full aperture' of light emerging from the sample could dramatically improve resolution and throughput (see FIG. 48), and can be achieved by a modification that would remove the polygon scanner (which descans only half of the returning light) and would employ two separate scanning elements (see Section 4.6 and FIG. 49). In certain embodiments SCAPE thus could further utilize MEMs technology (also suitable for miniaturization) and spatial light modulators (which could also provide improved beam shaping, structured light, STED patterning and adaptive optics corrections) and acousto-optic deflectors. For two-photon implementations, a further scanning mirror could be used to scan a line onto the polygonal mirror, synchronized such that one line fills one camera frame (achievable up to 4,000 LPS for standard galvanometers, fitting well to 2,000 FPS camera acquisition, assuming sufficient illumination power). A regenerative amplifier could also be used to generate high energy pulses at lower repetition rates than a standard Ti: Sapphire laser, such that two-photon excitation could be achieved with full light sheet illumination, e.g. 2 kHz pulses could illuminate one full light-sheet per camera frame.

Methods for In-Vivo Two-Photon Microscopy Comparison. Two-photon microscopy data for comparison to SCAPE was acquired using our home-built two-photon microscope system. The system utilizes a MaiTai HP laser, and three spectrally resolved R3896 Hamamatsu photomultiplier detectors. The two-photon data shown in FIGS. 25e and 51 were acquired with a 505-560 nm emission filter and 800 nm excitation of FITC-dx and an Olympus XLUMPlanFl 20×/0.95W objective. Two-photon images shown were acquired with 400×400 x-y pixels corresponding to a 750 micron field of view, at 3 micron depth steps.

The comparison SCAPE data (shown in FIGS. 25e and 51) was acquired using 0.4 mW of 488 nm laser light. A slow scan with 300 angular positions (x'), and a 1000×500 pixel (y'-z') planes (corresponding to a 924×667×375 micron (x-y-z) volume) was acquired with a 250 ms integration time per plane to maximize signal to noise (although similar contrast at 200 microns was seen with 2.4 mW illumination and a 2.9 ms integration time at 10 VPS). To improve dynamic range, a strip of 50% reflecting plastic film was positioned between the polygon and detection arm to attenuate signal originating from the very surface of the brain. This kind of spatially dependent attenuation is effective since the position of shallow v/s deep signal on the camera stays constant throughout a scan.

To enable direct comparison to two-photon imaging, SCAPE data was corrected for depth-dependent skew caused by the angle of the oblique light sheet. This was achieved by selecting a skew angle (for both y and x directions) and laterally shifting frames at successive depths by a constant linear factor. Two-photon data was digitally rotated, and both data sets were cropped to match their regions of interest.

System Calibration. Calibration factors for our current SCAPE system were measured after each imaging experiment using the following methods. While these calibrations do not formally convert the SCAPE space into Cartesian space, they do result in real (micron) dimensions along each axis.

Depth Axis Calibration. The oblique sheet was focused onto a flat surface coated in fluorescent tape. The sample was translated along the depth dimension (z) using a micromanipulator stage in increments of 1/1000th of an inch, and image displacement along the camera chip (in the depth direction) was calculated in pixels. Using this calibration factor converts pixel space in z' to real depth within the sample z.

Lateral Axis Calibration. A standard microscopic test sample (in this case, a fluorescently stained Convallaria stem slice) was imaged with the system. The sample was translated along the lateral dimension (y) using a micromanipulator stage in increments of 1/1000th of an inch. Image displacement along the camera chip (in the y direction) was calculated in pixels. Using this calibration factor converts lateral pixels into real distance in y Scan Axis Calibration. Assuming even angular spacing between consecutive frames in a single volume, the scanaxis conversion factor is calculated from two sets of measurements of a standard microscopic test sample (in this case, a fluorescently stained Convallaria stem slice). First, a high resolution volume scan of the sample is acquired over the maximum angular range of the polygonal scanner (at 0.01 volumes/sec). Then, with the illumination plane fixed in a central location, the same sample is physically translated in the x dimension using a micromanipulator stage, acquiring images at increments of 1/1000th of an inch. The two data sets are then compared across the scan range to determine the physical translation (in microns) that equates to 1 degree of angular scan of the polygon (defined as constant K, with units of μm/deg). For a given data set, the conversion factor is then given by:

$$\text{Conversion Factor} (\mu m/step) = K * \frac{\text{Total polygonal scan angle}}{\text{Number of steps per volume}}$$

Using this calibration factor converts angular steps into real distance in x.

In-vivo data analysis methods. Dendrite analysis (mouse). Color-coded dendritic trees shown in FIG. 26c were generated by first searching the 4D data set for neuronal events. Maps of the peak of each event, relative to 10-20 frames before the peak were used to identify the location of firing dendrites, and time-courses were extracted from these pixels as a representation of other events in the same neuron. Maps for each firing event for a given neuron were then compared and sorted to ensure that each identified event corresponded to the same neuron. These matched neurons were then averaged over all events to generate a 3D map of a given temporally correlated dendritic tree. Each averaged volume was rendered using the Volren function in Amira and given a unique colormap. Time-courses extracted from the location of the peak pixel in each map are plotted (as raw, unfiltered data) in FIG. 26d.

Analysis of intradendrite dynamics in FIG. 26e-f was performed using Matlab™. Raw data was first low pass filtered at 1.5 Hz and then a time-window surrounding a particular neuronal event was identified, along with the time of the event's peak. Voxel time-courses were normalized to the start of this time-window, and then the log of each time-course for the rising (up to the peak) and decay (down from the peak) slopes were fit to a linear function. The reciprocal of the gradient of this fit was recorded as onset or decay tau for each voxel respectively. Voxels in which the peak value did not exceed a predetermined threshold were set to zero. The resulting volumetric maps of taus were visualized in Amira™ using the 'physics' colorscale. Voxels for further interrogation and time-course extraction were identified by visualizing individual slices of the tau volumes in Matlab™.

Neuronal tracking algorithm (*Drosophila larvae*). Neuronal tracking shown in FIG. 28e was performed in Matlab™ and was achieved by first spectrally unmixing the pure green signal of GFP neuronal subset from the mixed emission signal of the larva's gut. The location of a neuron at the start of the time-sequence was then chosen manually from a maximum intensity projection over depth (z'). Sequential frames were then analyzed to identify the point of peak intensity within a selected radius of the starting point, first from a maximum intensity projection over depth (finding y' and z'), and then finding the location of this peak intensity as a function of x' within a column defined by y' and z'. The 'start' location was then updated before moving to the next frame. The process was supervised to ensure no errors, but proceeded in almost real time.

4.6. Supplemental Information S1

4.6.1. Scan/Descan Geometry

Our current bench-top system is built with off-the-shelf components that are not optimized for off-axis transmission. So while demonstrating proof of principle; our measurements do not capture the theoretical limits of SCAPE's performance. To fully understand these limits, we developed several computational models of the SCAPE system. The first is an OpTalix™ model of SCAPE, which is used to demonstrate how SCAPE's descanning geometry allows the system's moving illuminated plane to be mapped onto a stationary camera. One model was generated based on a prototype system's exact lenses, including a full model of the Olympus XLUMPlanFl 20×/0.95W objective, while another model was generated using the thin lens approximation, and included a 30 mm focal length, 1" diameter lens as the system's objective. The simulation identifies the location of the light sheet in object space for a given polygon rotation angle, and then maps that illuminated plane to the descanned intermediate oblique image plane (see FIG. 24a).

Figure 46:
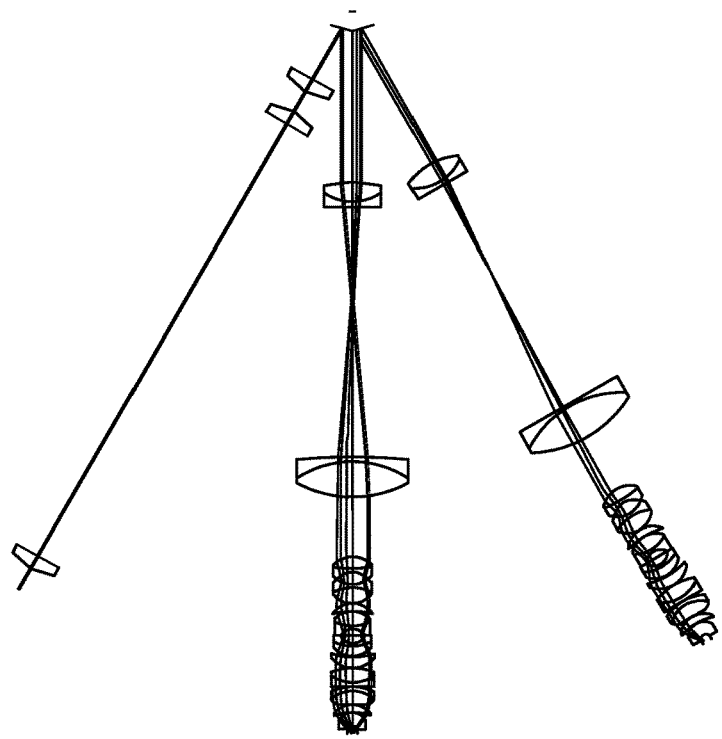
FIG. 46 depicts Optalix simulations of the SCAPE optical geometry for 'real' lenses.
Figure 46:
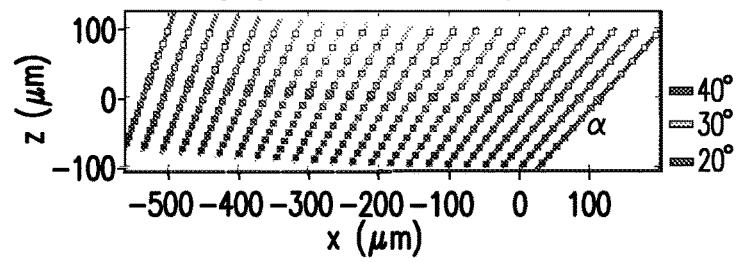
Figure 46:
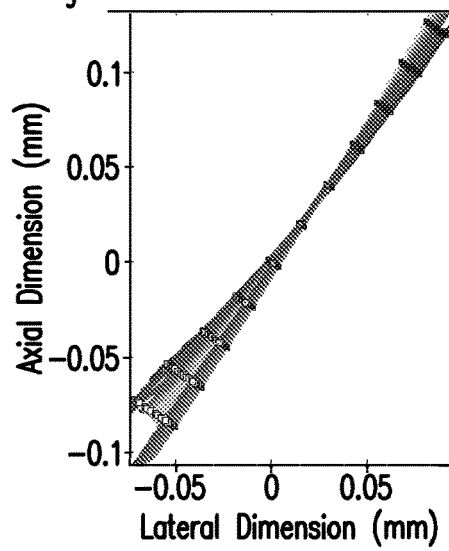
Figure 46:
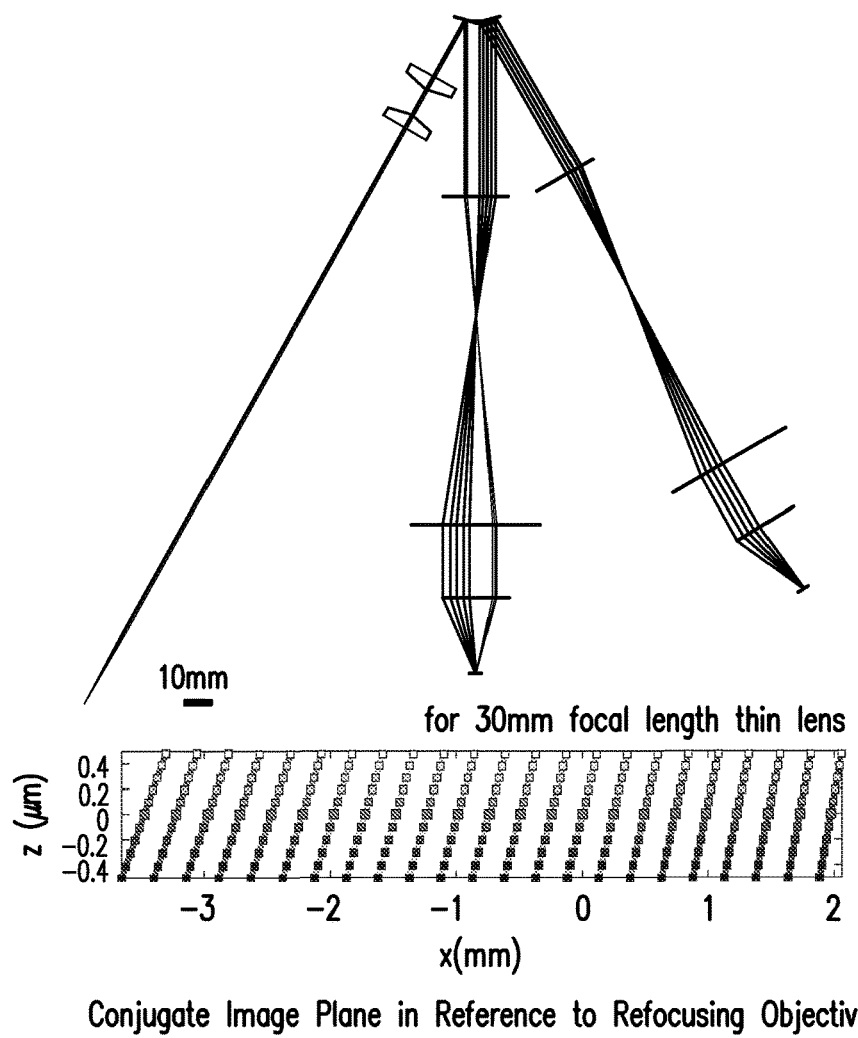
Figure 46:
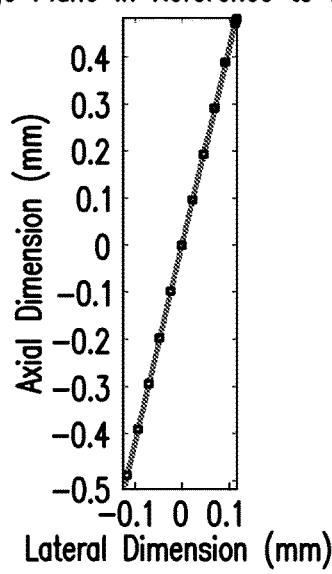

As shown in FIG. 46, the thin lens example shows that the illumination sheet can be descanned almost perfectly to a stationary intermediate oblique image plane (note also the very large achievable field of view). Given the 1× magnification of the system, this plane has the same oblique angle in conjugate image space (with respect to the last lens) as the excitation sheet in object space at 0 degree rotation of the polygon. For the real-lens case, with a Olympus XLUMPlanFl 20×/0.95W objective, the descan pattern is also adequate, although it has around 20 microns of wobble at the edges resulting from to the field curvature of the real achromatic lenses, and the slight translation of the polygon. In practice, this wobble would defocus the descanned image on the camera, an effect that would be lessened for lower NA detection paths. The field of view in the Olympus XLUMPlanFl 20×/0.95W objective case is also limited by aperturing within the lens of light entering the edge of the lens with incident angles of greater than 90 degrees (shifting the field of view off-center).

These simulations also demonstrate the overall angular scan pattern of SCAPE, revealing an expected distortion from Cartesian space. All data shown herein is uncorrected for this pattern, and exhibits little noticeable scaling. However, system-specific models such as these could be readily used to map this distorted measurement space onto 3D Cartesian space if absolute dimensional measurements are required.

4.6.2. System Resolution

Figure 47B:
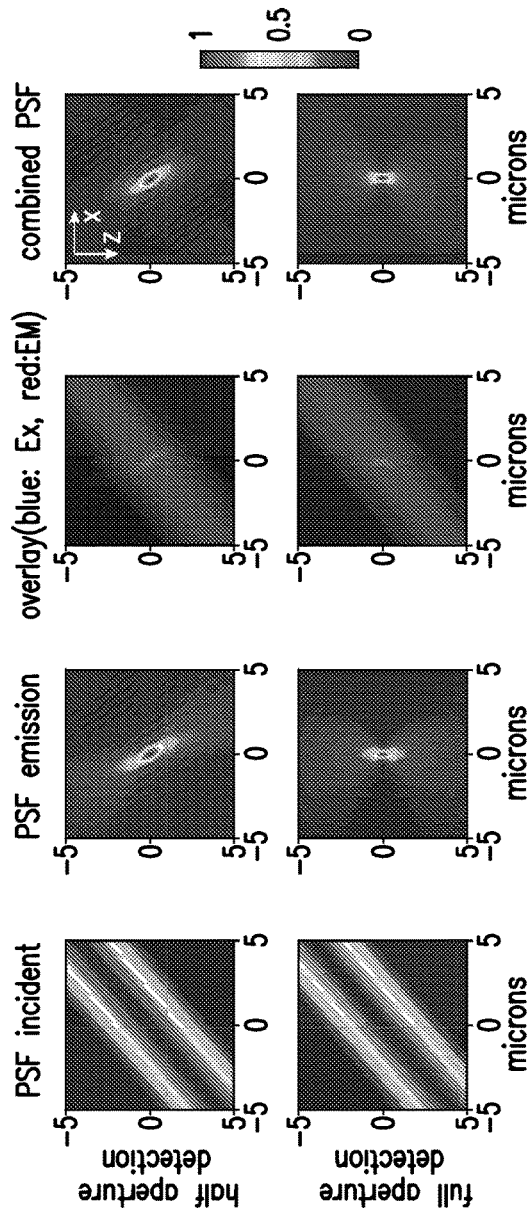
FIG. 47B depicts an excitation sheet, and a detection point spread function
Figure 47C:
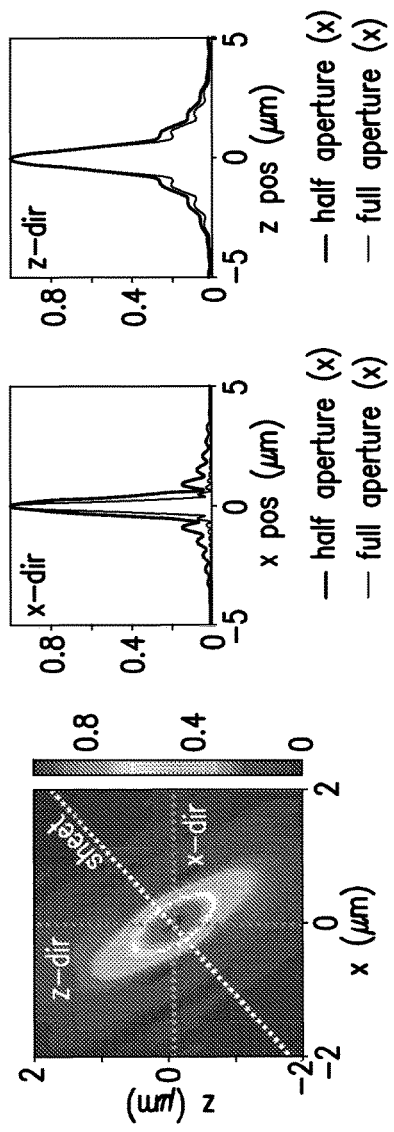
FIG. 47C depicts a zoomed in version of FIG. 24E, with corresponding plots of the x and z cross-sections indicated for both half and full-aperture detection.

Next we consider the diffraction-limited resolution of SCAPE, for which we utilized two different models. The first was based on a 3D Fourier optics analysis, following the method of Engelbrecht and Stelzer for calculation of a light-sheet imaging point spread function, and was used to generate the point spread function shown in FIG. 24e. This model was based on the geometry of the Olympus XLUMPlanFl 20×/0.95W lens (2 mm WD, 2.3 mm radius front aperture) and incorporated off-axis apertures at the pupil plane to generate an aberrated excitation light sheet (488 nm) and a detection point (530 nm) corresponding to our 'half aperture' polygon geometry $p_e=a/2$ as defined in FIG. 47a. Note that this model did not consider the additional effects of the image rotation optics in the detection side of SCAPE, which may further reduce the PSF size in practice. FIG. 47b illustrates how this system PSF was assembled. FIG. 47c shows the x-direction and z-direction cross-sections through the point spread function for both half-aperture ($p_e=a/2$) and full-aperture ($p_e=a$) detection.

This first Fourier model shows the 'ideal' resolution of the central point of a SCAPE scan, however an important feature of SCAPE's scan pattern is that its resolution will change as a function of the position within the field of view. This is caused by a combination of lens-based aberrations (such as coma), and the crossing angle between the excitation sheet and the effective 'detection cone'. Given the need to generate scanning beams with high resolutions over large fields of view, to assess these effects we used a simplified PSF model based on rotating Gaussian beams, which primarily captures the effects of crossing angle rather than lens aberrations (although individual points were compared to the Fourier model for validation). Briefly: an excitation beam, with initial diameter pi and a focal point at z=d (assuming a Plan imaging plane, see FIG. 48a) was modeled and rotated by angle α. A second 2D Gaussian beam was then also simulated representing the detection (emission) side, with a numerical aperture defined by the aperture $p_e$, and with its focus intersecting with the excitation beam at z=d once rotated by angle θ. The product of these two beams was then calculated to form the crossed PSF. This process was repeated for detection paths intersecting the illumination beam at locations $z_n$ above and below the focal plane z=d, and for different sets of α and θ values across the scan range. PSFs were generated for three different geometries (a 20× objective with full, or half detection aperture, and for a 30 mm focal length 1" lens as the objective), at three different scan positions at the extremes of the field of view. This model was also used to assess the FWHM of the PSF in the x and z directions as a function of a large field of view for each of these cases.

Figure 48A:
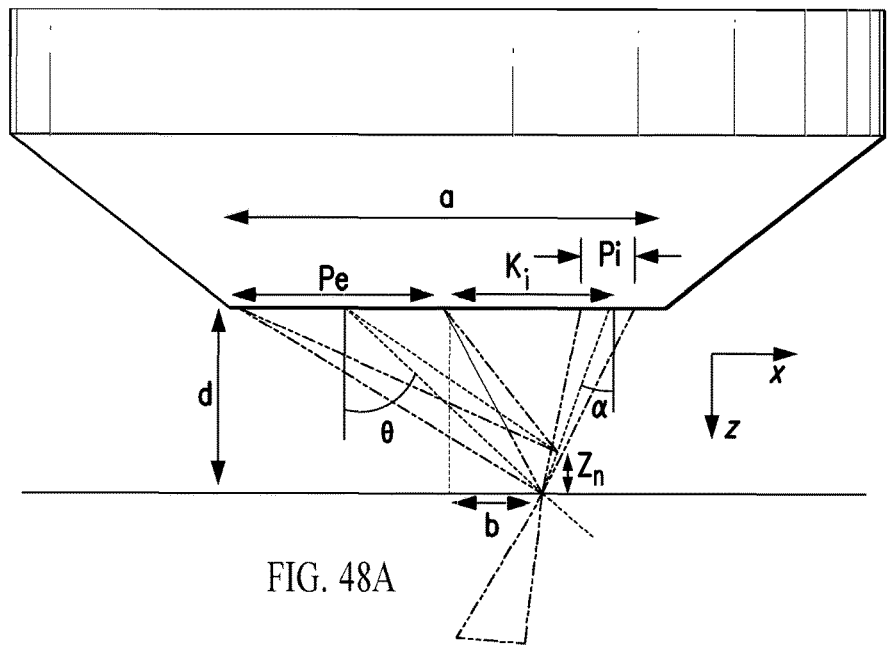
FIG. 48A depicts an imaging geometry.
Figure 48B:
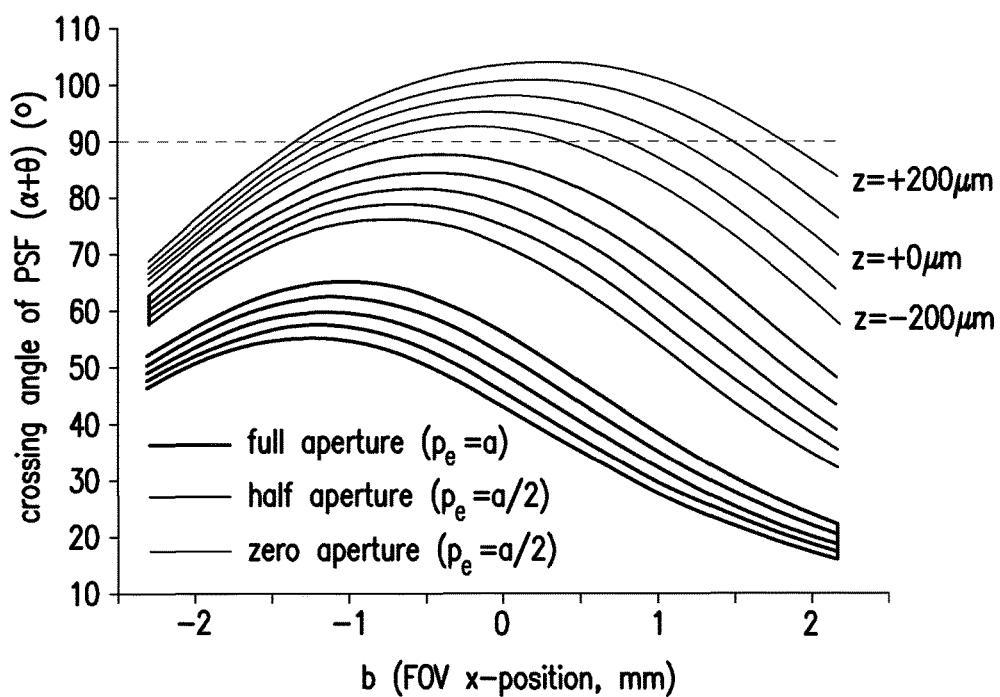
FIG. 48B depicts plots of the effective angle between the excitation sheet and detection 'cone' for different x-direction scan positions
Figure 48E:
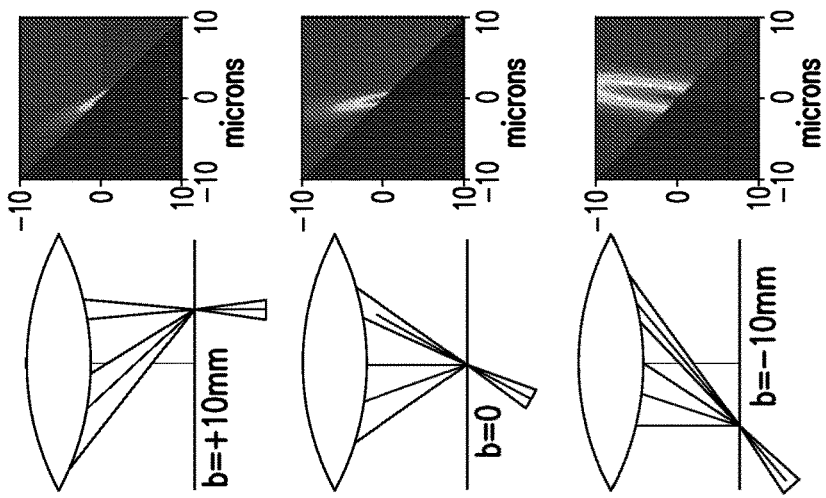
FIGS. 48C, 48D, and 48E depict an imaging geometry and predicted x-z PSFs for three different scan positions.
Figure 48D:
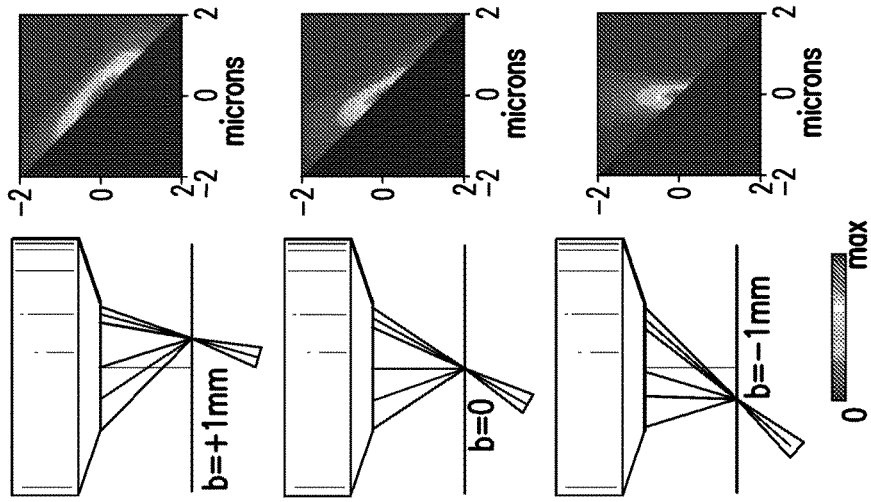
Figure 48C:
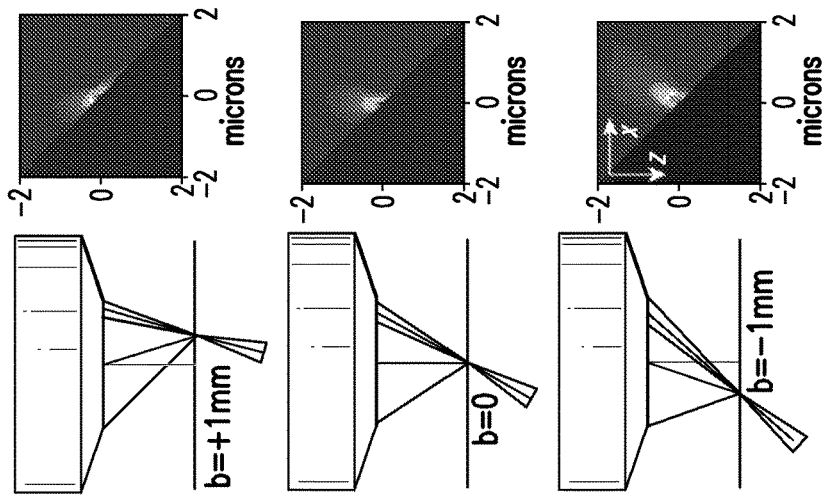

The plots in FIG. 48b show expected crossing angles between the excitation sheet and 'detection cone' for different x-scan positions and depths $z_n$ for a 0.95 NA, 2 mm WD objective. Within a usable field of view (FOV) the 'half aperture' configuration maintains a crossing angle close to 90 degrees, which is equivalent to conventional light sheet microscopy. The PSFs shown in FIG. 48c-e demonstrate the predictable effect of scan position on PSF resulting from changes in the crossing angle between the excitation sheet and the detection cone (note, this model does not account for aberrations or the additional remapping of the PSF in the image rotation arm). Estimated patterns of x and y resolution across the field of view are shown in the maps in FIGS. 48*f-h*. In practice, some embodiments use a smaller field of view than the range modeled here, for example; owing to clipping of the incident light within the Olympus XLUMP-lanFl 20×/0.95W, we detect little signal for x-positions where b>0 mm. However, the field of view could feasibly be extended through specialized lens design. The simulation of the 30 mm lens as an objective similarly demonstrates that certain regions of the field of view could yield surprisingly good resolutions over a very large (~cm) fields of view. SCAPE has been used in this 'macroscopic' imaging configuration to image cleared samples such as whole adult *Drosophila*.

Figure 49:
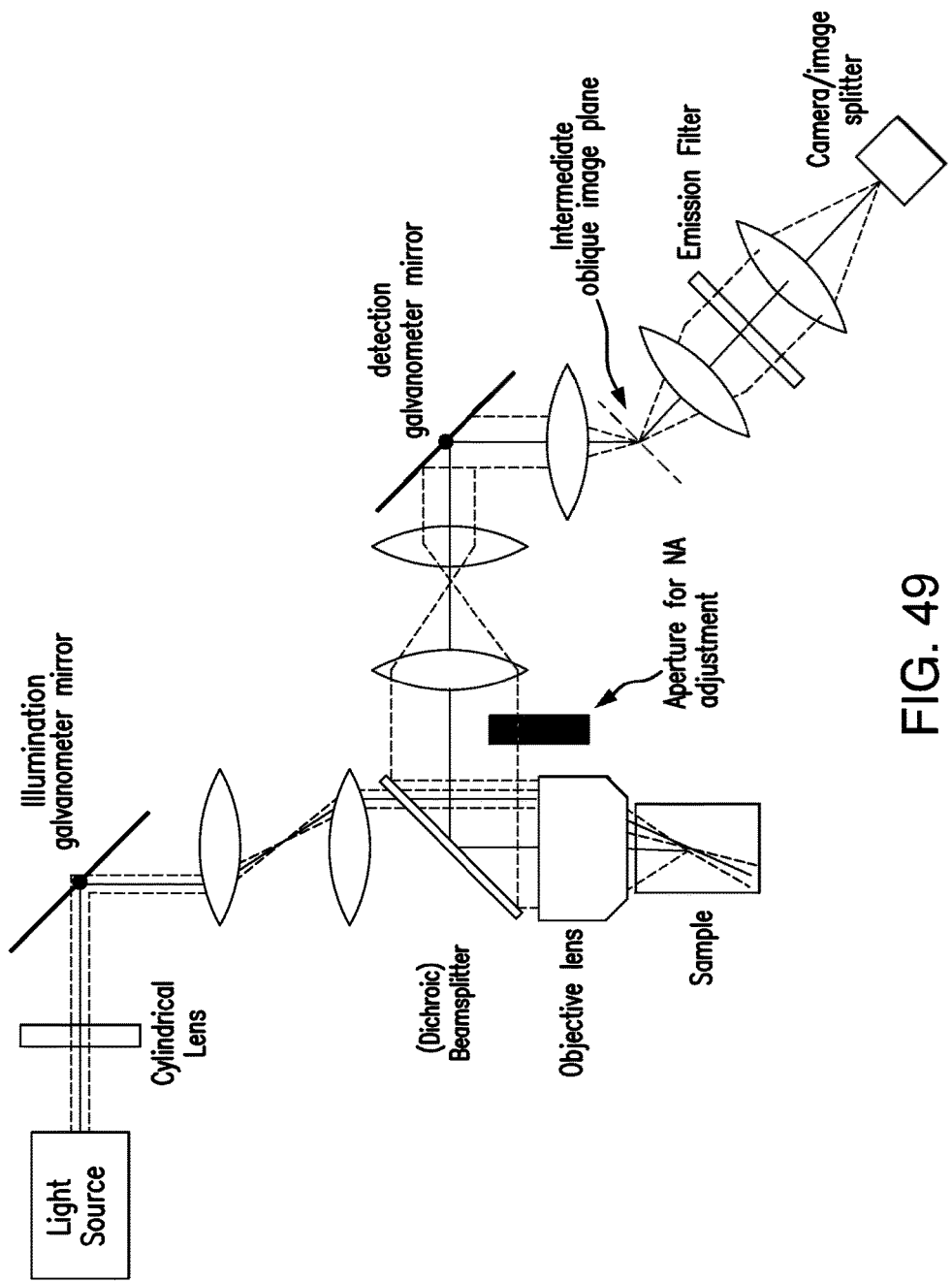
FIG. 49 depicts an alternative optical design.

Comparing 'full aperture' to 'half aperture' detection, as predicted by our Fourier model, for high NA objectives, the dominating factor in the system resolution is the NA of the detection side, more than the angle between the excitation sheet and the detection path. Our choice of a polygonal scanning element in our first generation design intentionally limited the numerical aperture of the detection path to maximize the angle between the incident and detected light. However, there is a clear trade-off between maximizing the angle between the two intersecting beam paths ($\alpha+\theta$), versus maximizing the NA of the detected light to improve throughput, lateral and axial resolution. Our simulations show that maximizing the aperture of the detected light has the most significant effect on the system's resolution and depth of field, and would also significantly improve system throughput. We conclude from this modeling that increasing the NA of our detection side would be highly beneficial. One possible alternative system configuration for SCAPE, guided by this model, is shown in FIG. 49. In this case, the full angle of emitted light would be separated using a dichroic beam-splitter and descanned using a second galvanometric mirror. This configuration would also improve descanning inaccuracies caused by the slight translation that accompanies rotation of a polygon mirror (FIG. 46). Mirror synchronization is unlikely to be a problem since the mirrors scan at the volume acquisition rate (under 100 Hz). A third scanner could also be incorporated here to generate the light sheet from a light line, which could be preferable for two-photon implementations of SCAPE.

4.7. Supplemental Information S2

While the simulations in section 4.6 sought to define the fundamental limit of resolution of SCAPE, we also performed a range of phantom measurements to demonstrate the imaging performance of one current prototype SCAPE system. In most of the in-vivo imaging examples shown, the number of depths acquired (corresponding to the number of rows of the camera, and thus the maximum depth measured) was generally chosen to maximize imaging speed, since the number of rows binned in the camera directly influences the camera read-out rate (see Section 4.8). The phantom measurements below demonstrate the field of view of one current prototype system in non-scattering versus scattering samples, as well as to determine how close resolution performance is to our predicted 'best-case' model.

Phantoms were created using standard green-fluorescent beads with diameters of either 4 microns (F-8859, Life Technologies) or 200 nm (F8811, Life Technologies). Beads were suspended in 1% low-temperature agarose (05073, Fluka), avoiding aggregation. Intralipid-20% (1141, Sigma) was used to add scattering to two of the 200 nm bead phantoms to yield reduced scattering coefficients of $\mu_s'$ ~1 mm$^{-1}$ and 2 mm$^{-1}$ at 488 nm (1:36 and 1:18 solutions respectively based on)). These values were chosen to span the range of reported scattering coefficients in rat and mouse brain.

Once prepared, agar solutions were cast into small discs by filling a 5 mm inner diameter reservoir glued to a microscope slide and immediately covering with a glass coverslip. The presence of the glass coverslip, as well as the aqueous agar phantom (with added lipid) provides a reasonable approximation in terms of geometry and refractive indices to the cranial window in our awake mouse experiments.

The SCAPE system was configured with the LCPlanFL 20×/0.40NA objective at the image rotation plane (rather than a UPlanFL N 10×/0.30 NA used in some studies) to maximize magnification of the image onto the camera (reducing field of view, but providing maximal sampling of the system's point spread function PSF). The DV-2 image splitter was removed, and all light emerging from the phantoms was captured through a 500 nm long-pass filter. Phantoms were imaged with more 'scan-dimension' (x') steps than data shown in the manuscript, again to capture detail of the system's PSF. Images were acquired to explore both the 3D field of view of the system, as well as the dependence of the system's PSF on depth and scattering.

4.7.1. Field of View

Figure 50A:
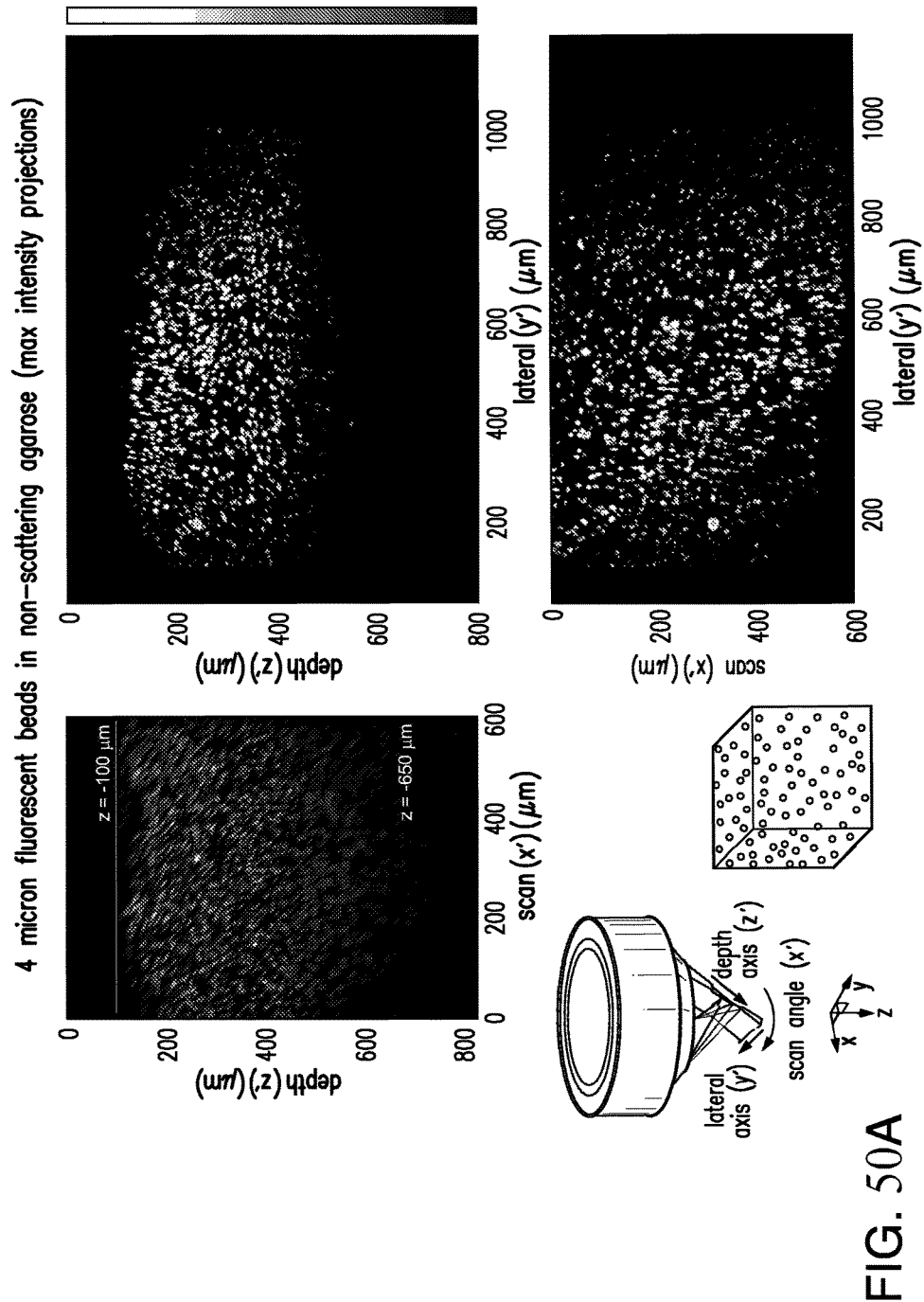
FIGS. 50A and 50B depict SCAPE data acquired on fluorescent bead phantoms.
Figure 50B:
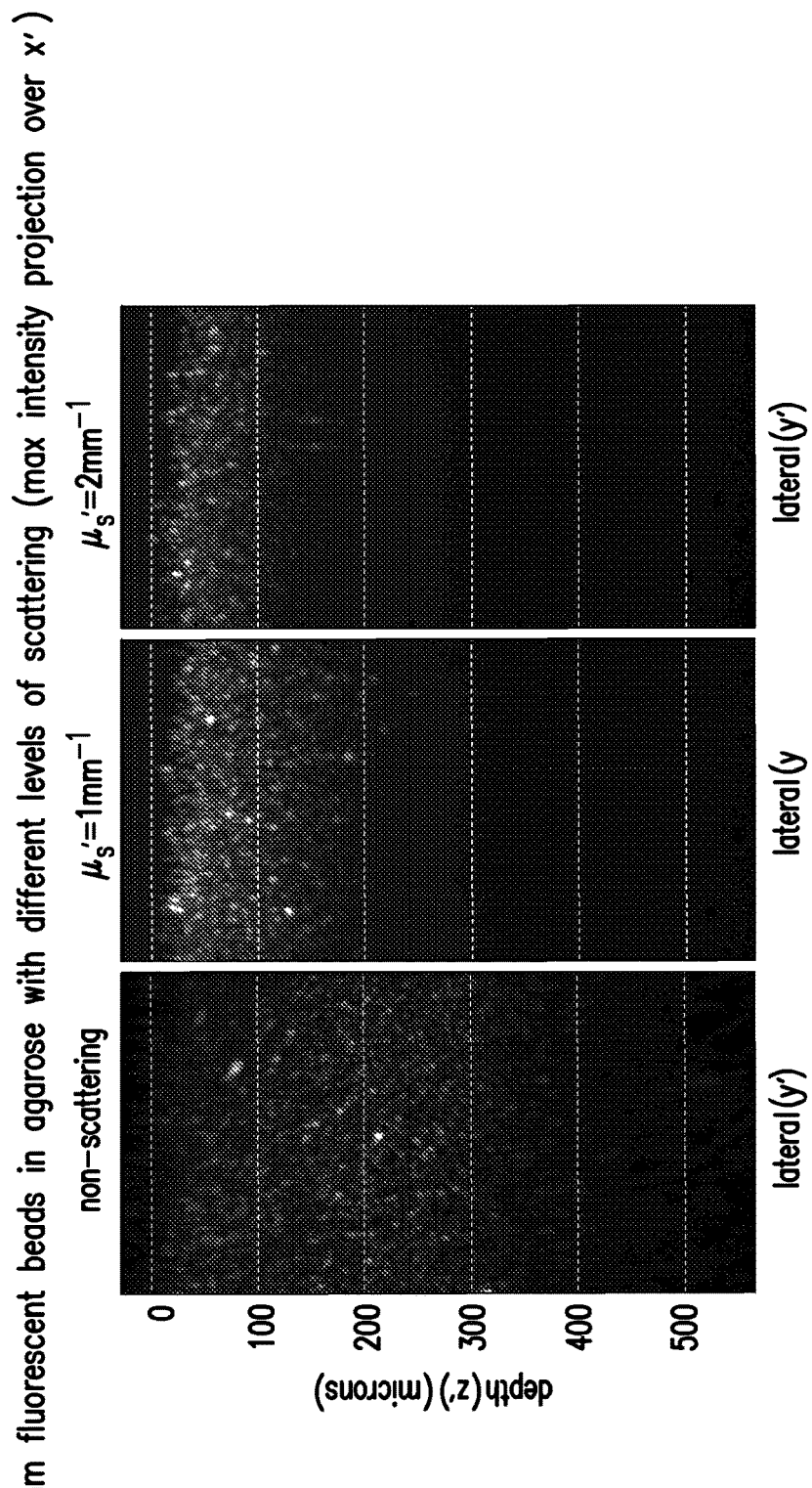

FIG. 50 shows SCAPE measurements acquired to demonstrate the field of view of one prototype system. A) shows data acquired on 4 micron fluorescent beads in nonscattering agarose. Images are maximum intensity projections over each dimension. Data is shown in SCAPE x', y', z' space, which is not fully Cartesian, as defined in the inset picture. All dimensions were converted to microns via calibration measurements detailed in Section 4.5. A scan (x') range corresponding to 600 microns was used and is uniformly filled. The lateral (y') dimension field of view corresponds to the width of the camera sensor, but detected signal is limited by the lateral width of the illuminating light sheet and aperturing of the returning light by detection optics. The usable field of view is thus around 1 mm in the configuration shown. The depth (z') axis was acquired with a large number of camera rows to demonstrate achievable penetration depth. Imaging depth is limited by both attenuation and scattering of excitation and emitted light, as well as aperturing of light in the detection beam path. A usable range of around 550 microns is demonstrated in this configuration.

Another important effect is visible in the z'-x' projection. As explored further in FIG. 52, and consistent with our modeling results, the thickness of the light sheet causes some diagonal stretching of the imaging point spread function (PSF) above and below the focal plane of the light sheet (x'-z' panel in A). In low-scattering samples, maximum penetration depth can be achieved by positioning the focal plane below the surface of the sample, such that the best resolution is at the center of the z' field of view. Here, the best focal range is around 200-400 microns below the surface of the sample such that diagonal PSF stretching is seen at the surface, and in deeper sections. We note that these images show minimal effects from the de-scanning imperfections and field curvature predicted by our modeling of real lenses in FIG. 46.

Panel B shows data acquired in 200 nm bead phantoms where different levels of scattering were added to the agarose background. Scattering causes additional signal decay with depth due to broadening of the light-sheet as well as losses in detected light traveling to and from deeper layers. The usable penetration depth for a reduced scattering coefficient of ~1 mm$^{-1}$ is found to be around 250 microns, while at $\mu_s' \sim 2$ mm$^{-1}$, this reduces to 150-200 microns. While the data in the non-scattering phantom was acquired by positioning the focal plane of the light sheet around 250 microns below the surface, data in the scattering phantoms was acquired with the focal plane closer to the surface of the sample, which sacrifices some depth penetration but maximizes signal and resolution within the usable field of view. It should be noted that the images shown here were acquired using a 488 nm laser source. Scattering levels in tissue at 488 nm are very high, a feature that has limited the use of standard confocal microscopy in living tissues. Since scattering in tissue is exponentially lower at longer wavelengths (approximately following $\mu_s'=A\lambda^{-b}$) implementation of SCAPE at longer excitation wavelengths (e.g. >600 nm, or even near infrared) would be expected to provide greatly enhanced penetration into scattering tissues. Optimization of alignment, NA and throughput would also improve signal to noise at deeper depths, extending the usable range with appropriate scaling.

4.7.2. Penetration Depth Quantification in In-Vivo Brain Tissue

As a further demonstration of the effects of in-vivo brain optical properties on SCAPE penetration depth and resolution, we performed comparative imaging using SCAPE and twophoton microscopy in the in vivo mouse brain after intravenous injection of dextran conjugated fluorescein. Intravenous labeling provides structures throughout the depths of the cortex, with deeper capillaries on the order of 5-10 microns in diameter being filled with dye of uniform concentration (providing similar targets to the fluorescent beads imaged above). For animal preparation see Section 4.4, for imaging parameters and alignment see Section 4.5.

FIG. 25*e* shows side by side comparisons of x-y planes acquired with SCAPE and two-photon microscopy at 4 different depths. FIG. 51 further compares the two data sets as a function of depth, displaying maximum intensity projections over x-z and y-z in approximately the same planes in both the two-photon and SCAPE data. In this case only, a high-pass filter (Matlab™ 'unsharp') was applied to remove diffuse background from the SCAPE data (visible in FIG. 25*e*), in order to improve maximum intensity projections. Each depth plane was also normalized to its own mean for both techniques; for the two-photon data to account for the 4 discrete increases in laser power required to cover the range of depths, and for SCAPE to account for the gradual attenuation of signal with depth.

This comparison demonstrates that SCAPE can provide near-isotropic resolution in vivo, revealing capillary loops in superficial cortical layers with similar performance to two photon microscopy. At deeper depths (>200 microns) the larger diving arterioles and ascending venules are still resolved, in fact SCAPE provides much stronger contrast for these axially oriented structures than two-photon microscopy, in part because angled SCAPE illumination avoids the attenuation of signals from vessels diving directly beneath surface vessels (as can be seen in the two-photon images in FIG. 25*e*). Signal in larger diving vessels can be resolved to depths of around 300 microns in-vivo using 488 nm excitation. Near-identical contrast and signal to noise was seen with 6× more power and a 340 Hz frame rate, yielding 10 VPS at with 34 angular steps. Again, longer wavelengths, and potentially two photon implementations of SCAPE are expected to improve this penetration depth performance significantly.

4.7.3. Resolution and the Effects of Scatter

Figure 52:
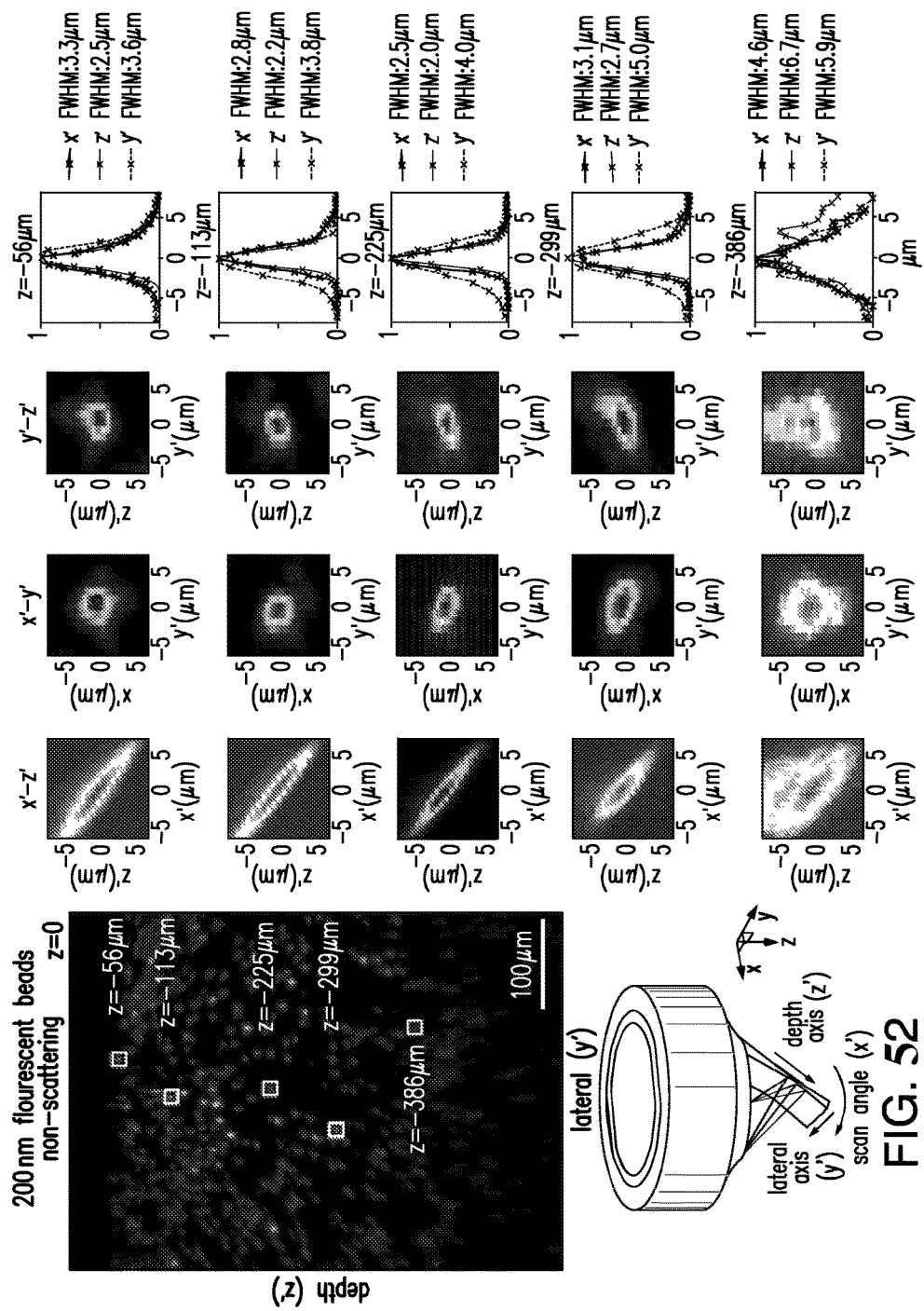
FIG. 52 depicts a point spread function analysis for a prototype system
Figure 52:
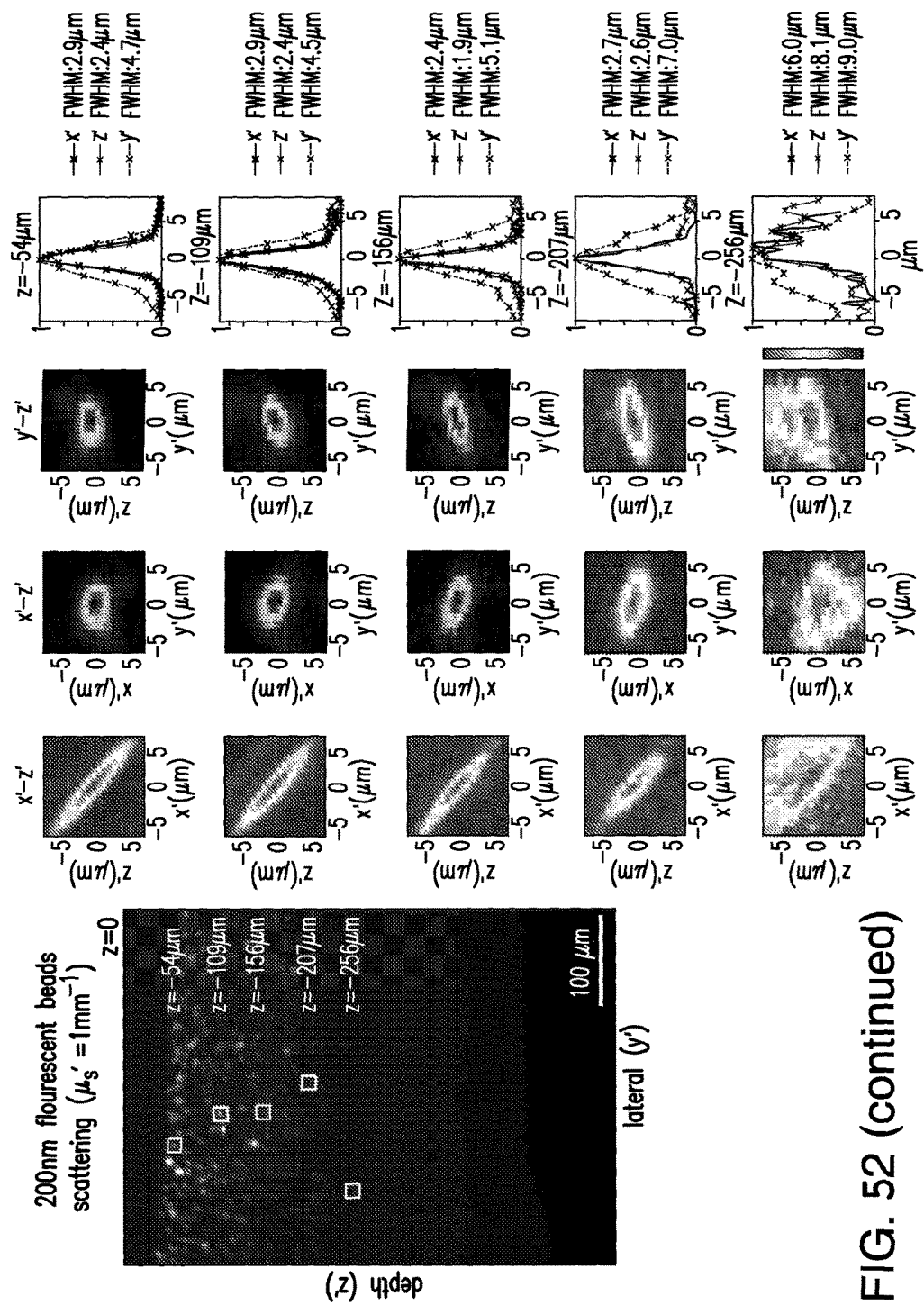

FIG. 52 shows a more detailed analysis of one prototype system's resolution through analysis of data acquired on 200 nm beads in a non-scattering (top) and a $\mu s' \sim 1$ mm$^{-1}$ scattering phantom (bottom). Since the system's PSF is spatially variant (as predicted by our simulations), rather than averaging we show raw, single-bead PSFs for a range of beads at different depths in each phantom as indicated. Cross-sections through each PSF are shown to the right, with full width half maxima (FWHM) noted. As before, dimensions are converted to microns based on our calibration procedure, but data is shown in x'-y'-z' space at its native sample resolution.

Several interesting features can be observed. Firstly, the x'-y' and y'-z' PSFs look generally circular, with some distortions owing to aberrations such as coma in our non-optimized optical path. The x'-z' projections show the slightly elongated, diagonal shape predicted in our simulations, which is caused by the light sheet thickness and the relatively low NA detection of one current prototype. As expected, this PSF shape changes as a function of depth, corresponding to the narrowing of the light sheet towards its focal plane. Our simulations predict that this distortion would improve with higher NA detection.

It should be noted that the relative resolution in all dimensions can be varied based on alignment. For these measurements, we used less of an aperture to block coma aberration in order to maximize the field of view, causing the y' dimension to be broadened at the expense of improved x' and z' resolution. Alignment of the image rotation optics can also cause depth-dependent aberrations and loss of single, and can never be perfect in one prototype system owing to expected field curvature as predicted by our modeling in FIG. 46.

Data in the scattering sample shows reduced signal at deeper depths, as expected. However, it is interesting to note that scattering does not appear to have a marked effect on the system's resolution. We conclude this based on the PSF of the deepest bead in both phantoms, which exhibits distortions likely due to light-sheet aberrations, field curvature and imperfections in detection optics. While this deepest PSF in the scattering phantom is sampled from a shallower depth than in the non-scattering phantom, its position is consistent with the shallower position of the light sheet focal plane in the scattering sample, as described above. The depth at which this aberration occurs is essentially consistent between the two samples, such that it cannot be the result of light scattering. We conclude that within this length scale, the dominant effect of scattering is to reduce detectable signal, rather than to introduce blurring, again indicating the longer-wavelength and two-photon implementations of SCAPE will provide significant benefits in terms of penetration depth in scattering samples.

In both samples, the resolution of one prototype system is found to be between 2-3 microns in most cases (with aberration in y' leading to 4-7 micron resolution), over a large field of view. We anticipate that this resolution can be dramatically improved with custom optics, optimized alignment and higher NA detection. However, it should also be noted that the sample density of data shown herein is lower than the sample density used here, in order to optimize volumetric frame rate and field of view for in-vivo imaging. For example, the data shown in FIG. 26 used 240×200×40 voxels x'-y'-z' to sample a 600×650×134 micron field of view such that each voxel corresponded to 2.5×3.25×3.6 microns x'-y'-z' respectively, making our chosen voxel size similar to one prototype system's optical PSF.

4.8. Supplemental Information S3

Since the only moving component of the SCAPE embodiment employed in the instant example is a slow scan mirror, the system's imaging speed is limited primarily by camera frame-rate (and ultimately, signal to noise). The volumes per second (VPS) rate for a given acquisition is the camera's frame-rate divided by the number of x' direction angular steps desired in the volume. The different parameters used for the data shown in this paper are shown below:

| FIG. | Camera y'-z' FOV (pixels) | # Angular steps (x') | Camera fps | VPS | Pixel rate (MHz) |
|---|---|---|---|---|---|
| 2 | 1400 × 80 (2-color, 500 wide each) | 100 | 1000 | 10 | 40 |
| 3 | 400 × 40 (2 × 2 binning) | 240 | 2404 | 10 | 38.5 |
| 4 | 800 × 80 (1 × 1 binning) | 120 | 2404 | 20 | 153.9 |
| 5 | 700 × 100 (2-color, 300 wide, 2 × 2 binning) | 100 | 1000 | 10 | 70 |
| 6 | 660 × 100 (2-color, 240 wide, 2 × 2 binning) | 80 | 800 | 10 | 52.8 |

Volumetric imaging speed can be increased by choosing fewer angular steps (x') for each volume, which will either reduce the sampling density, or field of view along the x' axis, depending on the corresponding angular range. Binning cameras to acquire less rows can also significantly increase their frame rates, up to 2404 fps for 80 rows=depths for our current inexpensive Andor Zyla sCMOS camera. Importantly, faster cameras are commercially available that could go beyond the speeds demonstrated here. The NAC Memrecam HX-3, for example, can sample 384×288 frames at 75,000 fps, which could yield 375 vps for a field of view with 200 lateral sampling steps, assuming adequate signal to noise.

Ultimately then, the speed limit of certain SCAPE embodiments will be governed by the signal-to-noise achievable at the very low integration times required for very high frame rate acquisition. Performance will therefore be a trade-off between the camera's sensitivity and noise levels, the efficiency of the fluorophore in the sample, available laser power and the ability of the sample to withstand illumination intensities high enough to yield images of sufficient quality. This limit is therefore sample dependent, and will be determined by the chosen application of the system. This sample-dependent fundamental volumetric scan rate limit applies to all optical imaging systems, although SCAPE shares the feature of all light-sheet imaging approaches in that it should minimize photodamage compared to confocal and wide-field fluorescence imaging.

A prototype SCAPE system demonstrated in the instant example used a relatively inexpensive sCMOS camera with small 7×7 µm pixels, and had reduced throughput owing to the detection aperturing by the polygon scanner. Nevertheless, we saw only minimal evidence of photobleaching or phototoxicity when imaging living samples. We therefore anticipate that improving throughput, using higher laser powers and cooled cameras with larger pixel sizes in combination with increasingly bright and stable in-vivo fluorophores will readily enable practical SCAPE volumetric scan rates exceeding 50 VPS in typical biological samples.

What is claimed is:
1. An optical imaging apparatus comprising:
a beam splitter;
a first light scanning element;
a second light scanning element;
an objective;
an illumination source that sends illumination light into the objective via a first optical path, wherein the first optical path includes the beam splitter and the first light scanning element,
wherein the beam splitter and the first light scanning element redirect the illumination light towards a peripheral region of the objective such that the illumination light passes through the objective and forms an oblique imaging plane in a tissue, and wherein the position of the oblique imaging plane within the tissue varies depending on an orientation of the first light scanning element,
wherein the objective accepts return light from the oblique imaging plane and passes the return light onto a second optical path that includes the beam splitter and the second light scanning element, and wherein the beam splitter and the second light scanning element route the return light along the second optical path so as to form a stationary tilted intermediate image plane; and
a light detector that captures an image of the stationary tilted intermediate image plane.

2. The apparatus of claim 1, wherein a single reflecting surface serves as both the first light scanning element and the second light scanning element.

3. The apparatus of claim 2, wherein the illumination light arrives at the beam splitter before arriving at the single reflecting surface, and wherein the return light arrives at the single reflecting surface before arriving at the beam splitter.

4. The apparatus of claim 3, further comprising a telescope disposed in both the first optical path and the second optical path, wherein the illumination light arrives at the single reflecting surface before arriving at the telescope, wherein the illumination light arrives at the telescope before arriving at the objective, wherein the return light arrives at the objective before arriving at the telescope, and wherein the return light arrives at the telescope before arriving at the single reflecting surface.

5. The apparatus of claim 1, wherein the first light scanning element and the second light scanning element use different reflecting surfaces that move in synchronization with each other.

6. The apparatus of claim 5, wherein the illumination light arrives at the first light scanning element before arriving at the beam splitter, and wherein the return light arrives at the beam splitter before arriving at the second light scanning element.

7. The apparatus of claim 6, further comprising an illumination telescope disposed in the first optical path and a return-light telescope disposed in the second optical path, wherein the illumination light arrives at the first light scanning element before arriving at the illumination telescope, wherein the illumination light arrives at the illumination telescope before arriving at the objective, wherein the return light arrives at the objective before arriving at the return-light telescope, and wherein the return light arrives at the return-light telescope before arriving at the second light scanning element.

8. The apparatus of claim 7, where in the first light scanning element and the second light scanning element are mechanically independent from each other.

9. The apparatus of claim 5, where in the first light scanning element and the second light scanning element are mechanically independent from each other.

10. The apparatus of claim 1, wherein the light detector is positioned directly at the stationary tilted intermediate image plane.

11. The apparatus of claim 1, wherein the light detector is positioned remotely from the stationary tilted intermediate image plane, and wherein the optical imaging apparatus further comprises at least one telescope that routes light from the stationary tilted intermediate image plane onto the light detector.

12. The apparatus of claim 1, wherein the light detector is positioned remotely from the stationary tilted intermediate image plane, and wherein the optical imaging apparatus further comprises a fiber-optic bundle that routes light from the stationary tilted intermediate image plane onto the light detector.

13. The apparatus of claim 1, wherein the illumination source comprises a laser that generates a pencil beam and an auxiliary light scanning element that expands the pencil beam into a sheet of light, and wherein the light detector comprises a linear image sensor.

14. The apparatus of claim 1, wherein the illumination source comprises a laser that generates a pencil beam and a cylindrical lens that expands the pencil beam into a sheet of light, and wherein the light detector comprises a 2D image sensor.

15. The apparatus of claim 1, wherein the return light comprises florescent light emitted by the tissue at the oblique imaging plane in response to illumination of the tissue at the oblique imaging plane by the illumination light.

16. An optical imaging apparatus comprising:
a beam splitter;
a light scanning element;
an objective;
an illumination source that sends illumination light into the objective via a first optical path, wherein the first optical path includes the beam splitter and the light scanning element,
wherein the beam splitter and the light scanning element redirect the illumination light towards a peripheral region of the objective such that the illumination light passes through the objective and forms an oblique imaging plane in a tissue, and wherein the position of the oblique imaging plane within the tissue varies depending on an orientation of the light scanning element,
wherein the objective accepts return light from the oblique imaging plane and passes the return light onto a second optical path that includes the beam splitter and the light scanning element, and wherein the beam splitter and the light scanning element route the return light along the second optical path so as to form a stationary tilted intermediate image plane; and
a light detector that captures an image of the stationary tilted intermediate image plane.

17. The apparatus of claim 16, wherein the light scanning element has only a single planar reflecting surface.

18. The apparatus of claim 16, wherein the illumination light arrives at the beam splitter before arriving at the light scanning element, and wherein the return light arrives at the light scanning element before arriving at the beam splitter.

19. The apparatus of claim 18, further comprising a telescope disposed in both the first optical path and the second optical path, wherein the illumination light arrives at the light scanning element before arriving at the telescope, wherein the illumination light arrives at the telescope before arriving at the objective, wherein the return light arrives at the objective before arriving at the telescope, and wherein the return light arrives at the telescope before arriving at the light scanning element.

20. A method of optical imaging comprising:
sending illumination light towards an objective via a first optical path, wherein the first optical path includes a beam splitter and a first light scanning element;
redirecting the illumination light towards a peripheral region of the objective such that the illumination light passes through the objective and forms an oblique imaging plane in a tissue, wherein the position of the oblique imaging plane within the tissue varies depending on an orientation of the first light scanning element;
routing return light from the oblique imaging plane along a second optical path that includes the beam splitter and a second light scanning element, so as to form a stationary tilted intermediate image plane; and
capturing an image of the stationary tilted intermediate image plane.

21. The method of claim 20, wherein a single reflecting surface serves as both the first light scanning element and the second light scanning element.

22. The method of claim 21, wherein the illumination light arrives at the beam splitter before arriving at the single reflecting surface, and wherein the return light arrives at the single reflecting surface before arriving at the beam splitter.

23. The method of claim 20, wherein the first light scanning element and the second light scanning element use different reflecting surfaces that move in synchronization with each other.

24. The method of claim 23, wherein the illumination light arrives at the first light scanning element before arriving at the beam splitter, and wherein the return light arrives at the beam splitter before arriving at the second light scanning element.

25. The method of claim 24, wherein the first light scanning element and the second light scanning element are mechanically independent from each other.

* * * * *